Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 1

INVENTORS
DANIEL C. DURAND
WARREN R. WINES

BY William Grolman

ATTORNEY

INVENTORS.
DANIEL C. DURAND
WARREN R. WINES
BY
William Grobman
ATTORNEY

INVENTORS.
DANIEL C. DURAND
WARREN R. WINES
BY
William Grolman
ATTORNEY

INVENTORS
DANIEL C. DURAND
WARREN R. WINES

BY

William Grobman
ATTORNEY

ELECTRONICALLY CONTROLLED HIGH SPEED PRINTER

Filed Sept. 17, 1958

INVENTORS
DANIEL C. DURAND
WARREN R. WINES
BY
William Grolman
ATTORNEY

INVENTORS.
DANIEL C. DURAND
WARREN R. WINES
BY
William Godman
ATTORNEY

INVENTORS.
DANIEL C. DURAND
WARREN R. WINES
BY
William Holman
ATTORNEY

INVENTORS
DANIEL C. DURAND
WARREN R. WINES
BY William Grolman
ATTORNEY

INVENTORS
DANIEL C. DURAND
WARREN R. WINES
BY
William Grobman
ATTORNEY

INVENTORS
DANIEL C. DURAND
WARREN R. WINES

BY

William Goldman
ATTORNEY

INVENTORS
DANIEL C. DURAND
WARREN R. WINES
BY
William Gohm
ATTORNEY

INVENTORS
DANIEL C. DURAND
WARREN R. WINES
BY
William Grolman
ATTORNEY

INVENTORS
DANIEL C. DURAND
WARREN R. WINES
BY
William Gulman
ATTORNEY

INVENTORS
DANIEL C. DURAND
WARREN R. WINES
BY
William Grobman
ATTORNEY

INVENTORS
DANIEL C. DURAND
WARREN R. WINES
BY William Grolman
ATTORNEY

INVENTORS.
DANIEL C. DURAND
WARREN R. WINES

BY William [signature]
ATTORNEY

ELECTRONICALLY CONTROLLED HIGH SPEED PRINTER

Filed Sept. 17, 1958 62 Sheets-Sheet 17

INVENTORS.
DANIEL C. DURAND
WARREN R. WINES

BY William Grohman

ATTORNEY

INVENTORS
DANIEL C. DURAND
WARREN R. WINES
BY
William Grobman
ATTORNEY

INVENTORS.
DANIEL C. DURAND
WARREN R. WINES
BY
William [signature]
ATTORNEY (COMPARATOR AND CODE GENERATOR REG.)

INVENTORS.
DANIEL C. DURAND
WARREN R. WINES
BY William Grohman
ATTORNEY (ODD-EVEN CHECKER)

INVENTORS
DANIEL C. DURAND
WARREN R. WINES
BY
William Sholman
ATTORNEY

Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 22

(BUFFER MEMORY - SAMPLE BANK OF CORES)

INVENTORS.
DANIEL C. DURAND
WARREN R. WINES

BY William Grolman

ATTORNEY

ELECTRONICALLY CONTROLLED HIGH SPEED PRINTER

Filed Sept. 17, 1958 62 Sheets-Sheet 23

FIG. 38 (BUFFER MEMORY)

INVENTORS
DANIEL C. DURAND
WARREN R. WINES

BY William Goldman
ATTORNEY

INVENTORS
DANIEL C. DURAND
WARREN R. WINES
BY
William Grolman
ATTORNEY

Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 25

INVENTORS.
DANIEL C. DURAND
WARREN R. WINES
BY
William Grolman
ATTORNEY

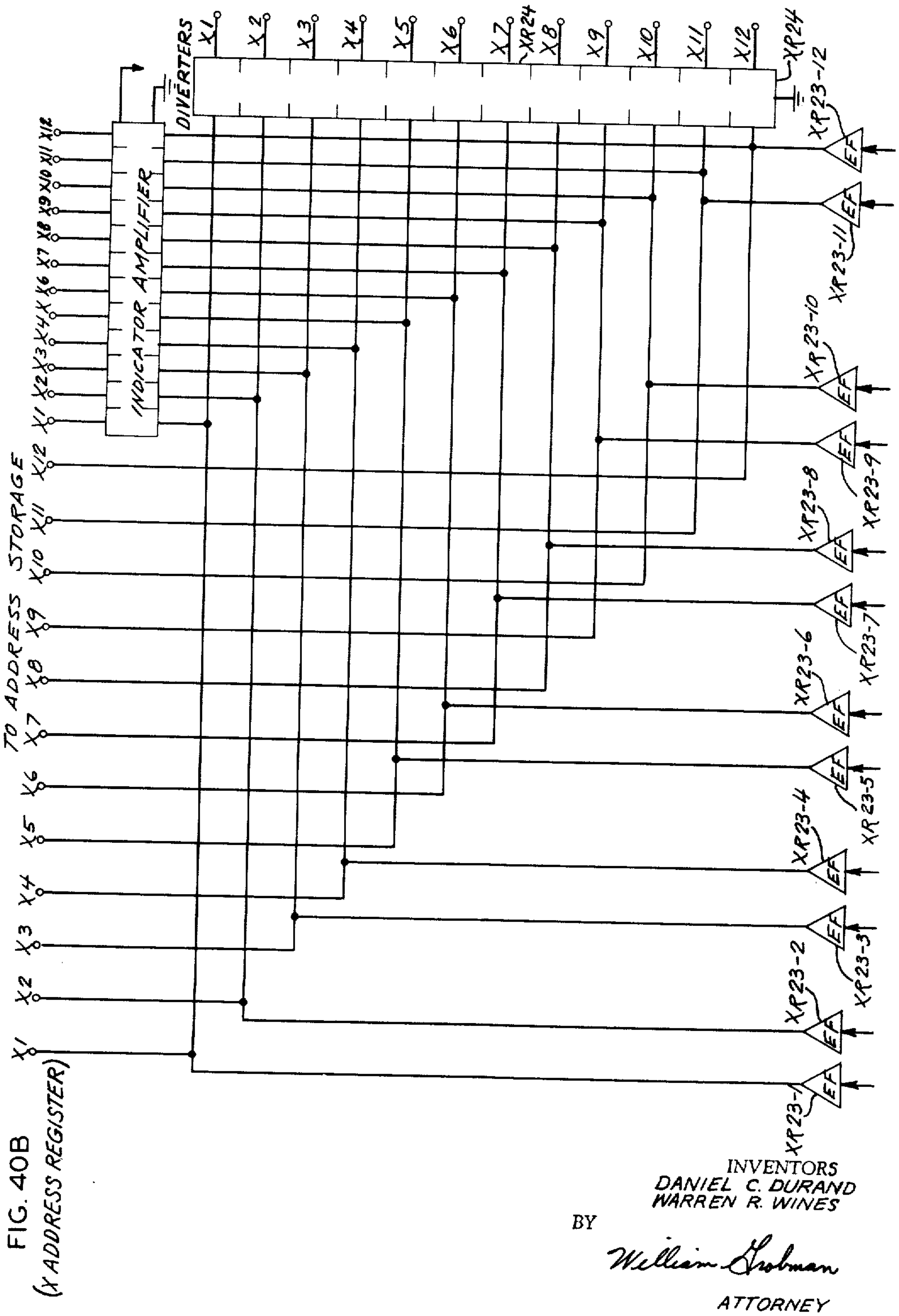
FIG. 40B (X ADDRESS REGISTER)
INVENTORS
DANIEL C. DURAND
WARREN R. WINES
BY
William Grobman
ATTORNEY Oct. 4, 1960 D. C. DURAND, JR., ET AL 2,954,731

ELECTRONICALLY CONTROLLED HIGH SPEED PRINTER

Filed Sept. 17, 1958

62 Sheets-Sheet 27

INVENTORS.
DANIEL C. DURAND
WARREN R. WINES
By William Grobman
ATTORNEY

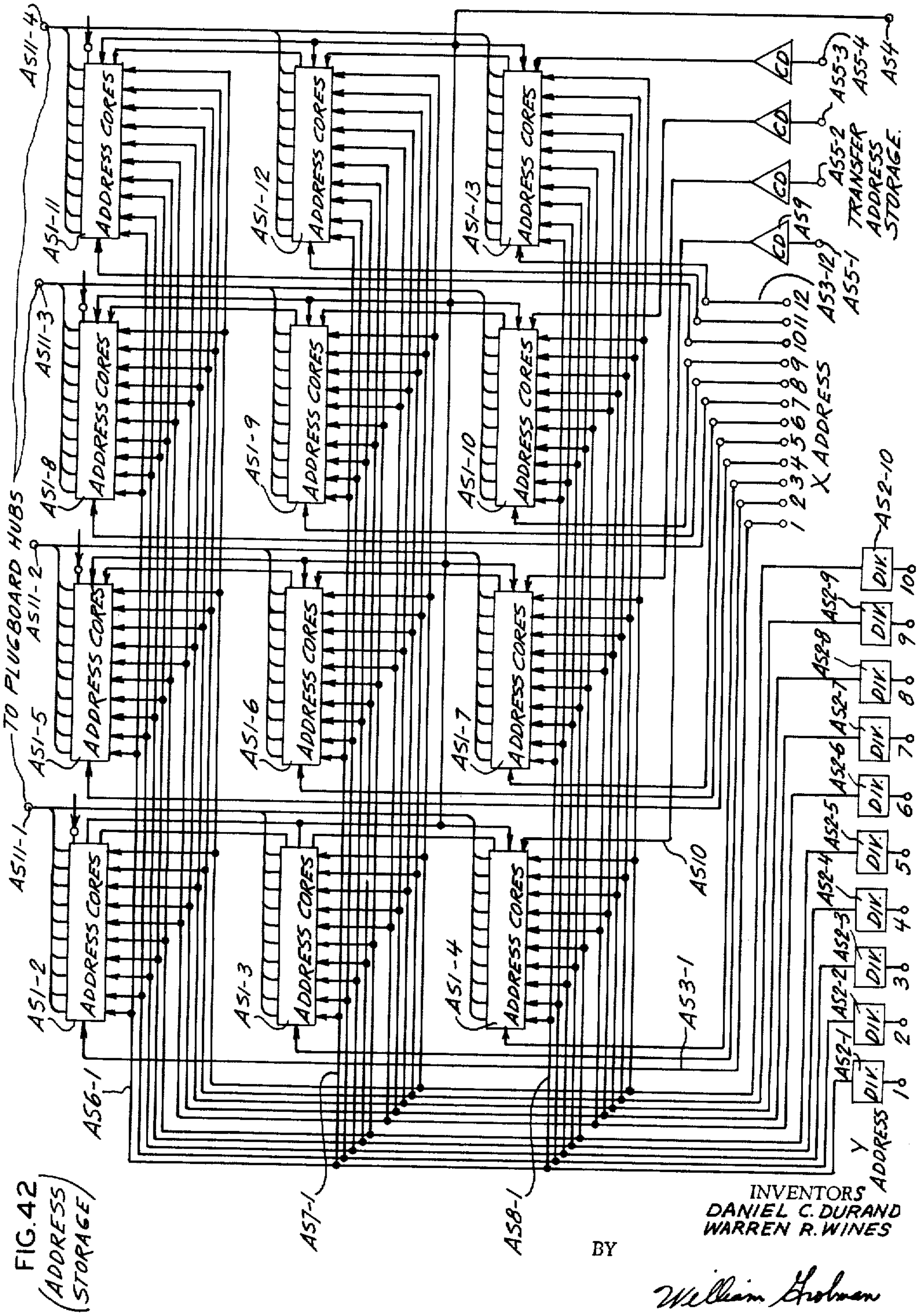
FIG.42 (ADDRESS STORAGE)
INVENTORS
DANIEL C. DURAND
WARREN R. WINES
BY
William Grobman
ATTORNEY Oct. 4, 1960 D. C. DURAND, JR., ET AL 2,954,731
ELECTRONICALLY CONTROLLED HIGH SPEED PRINTER
Filed Sept. 17, 1958 62 Sheets-Sheet 29
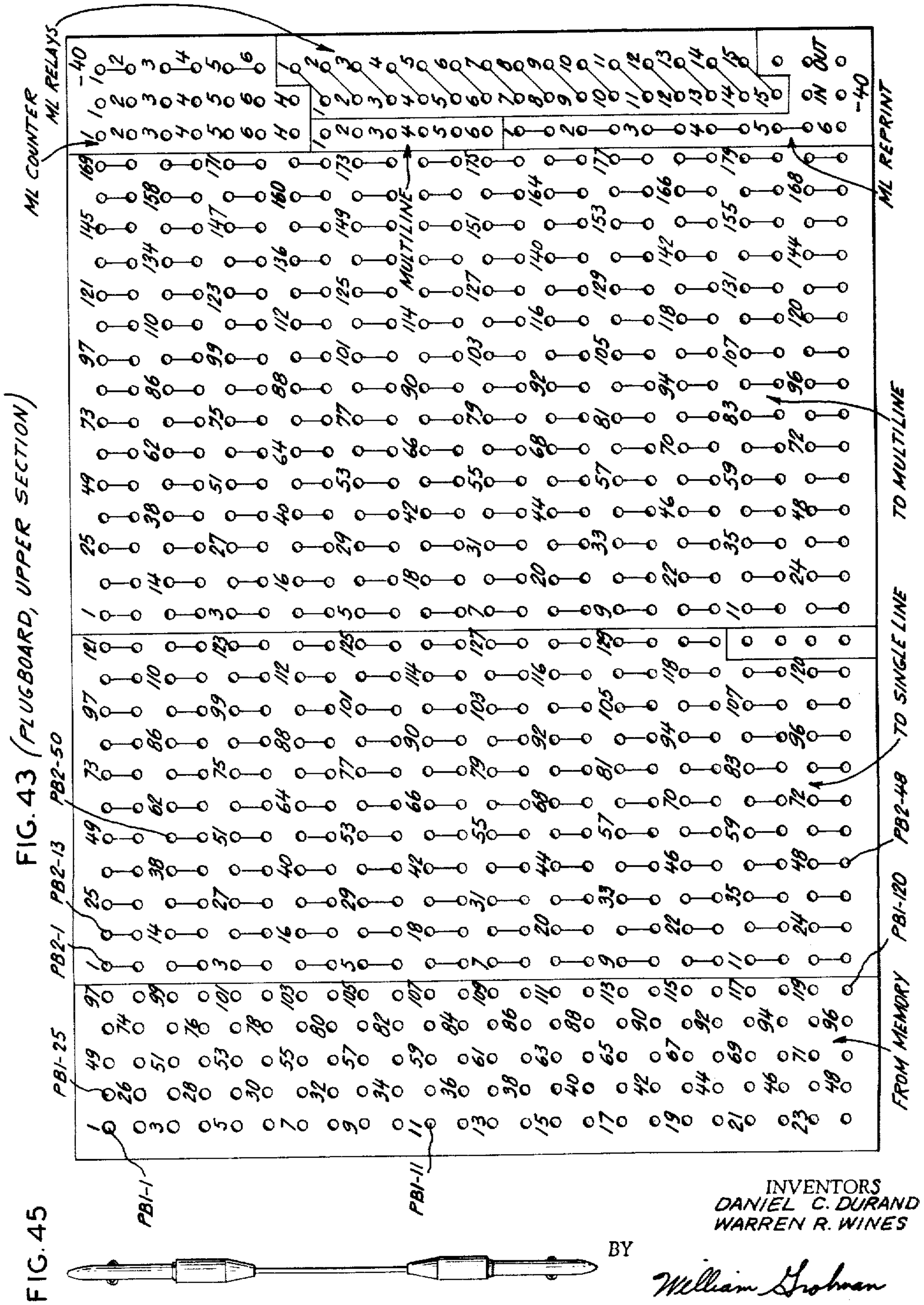
FIG. 43 (PLUGBOARD, UPPER SECTION), FIG. 45
INVENTORS
DANIEL C. DURAND
WARREN R. WINES
BY William Grohman
ATTORNEY

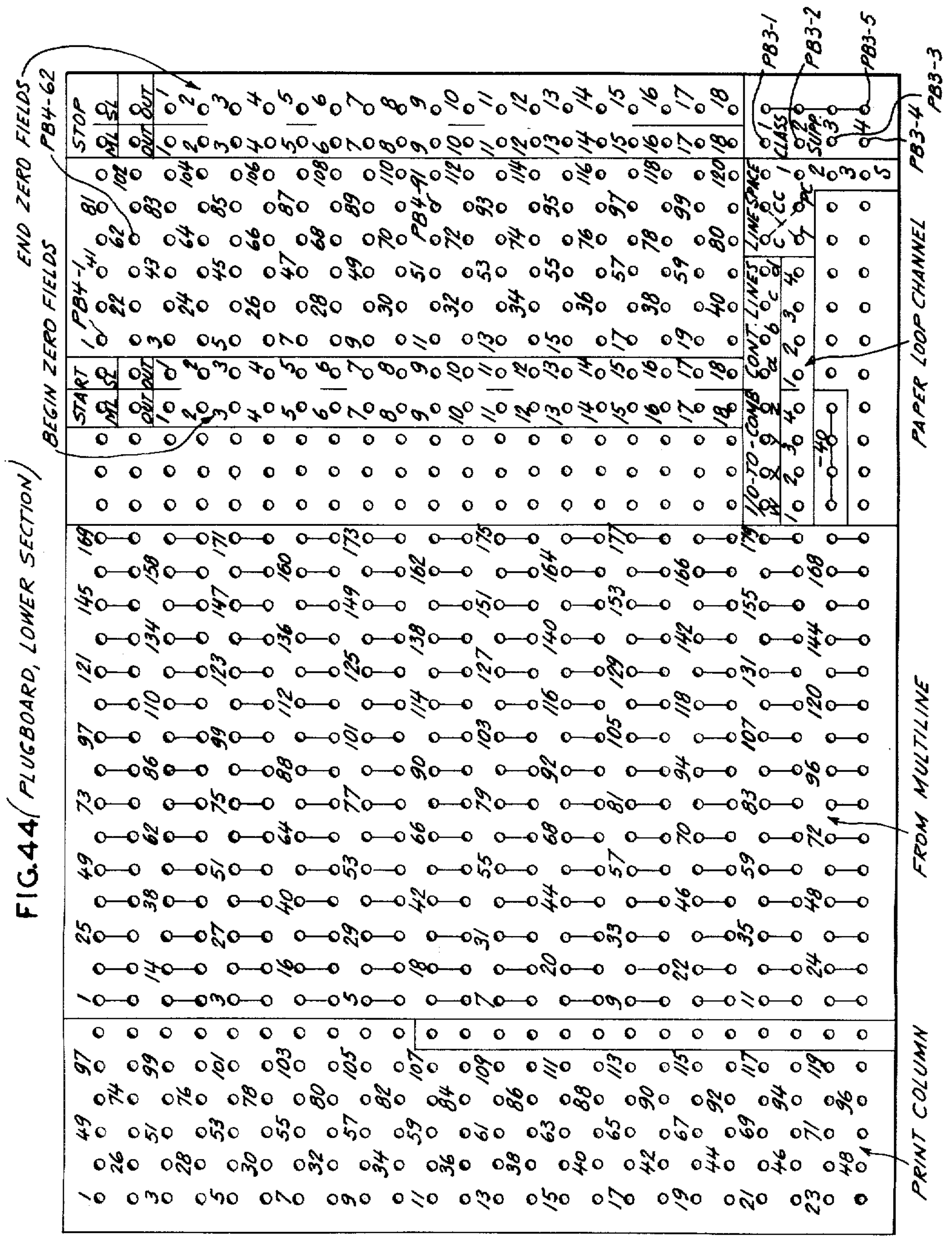
FIG. 44 (PLUGBOARD, LOWER SECTION)
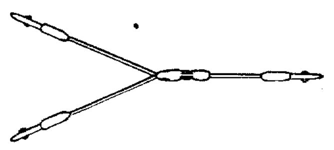
FIG. 46
INVENTORS
DANIEL C. DURAND
WARREN R. WINES
BY William Grolman
ATTORNEY Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 31

(PRINT AND CHECK STORAGE, ODD)

INVENTORS
DANIEL C. DURAND
WARREN R. WINES

BY William Grolman

ATTORNEY

ELECTRONICALLY CONTROLLED HIGH SPEED PRINTER

Filed Sept. 17, 1958 62 Sheets-Sheet 32

(PRINT AND CHECK STORAGE, EVEN)

INVENTORS
DANIEL C. DURAND
WARREN R. WINES

BY

William Grolman

ATTORNEY

ELECTRONICALLY CONTROLLED HIGH SPEED PRINTER

Filed Sept. 17, 1958 62 Sheets-Sheet 33

FIG. 49 (TAPE UNIT CONTROL)

INVENTORS
DANIEL C. DURAND
WARREN R. WINES

BY William Grolman

ATTORNEY (TAPE UNIT CONTROL)

INVENTORS
DANIEL C. DURAND
WARREN R. WINES
BY
William Grolman
ATTORNEY

FIG. 51 (DEMAND STATION)

INVENTORS
DANIEL C. DURAND
WARREN R. WINES
BY
By William Goldman
ATTORNEY

FIG. 52 (DEMAND STATION HEAD SWITCH)

INVENTORS
DANIEL C. DURAND
WARREN R. WINES
BY
William Grolman
ATTORNEY (DEMAND STATION—COMPUTER CONTROL)

INVENTORS
DANIEL C. DURAND
WARREN R. WINES
BY
William Grolman
ATTORNEY (DEMAND STATION-COMPUTER CONTROL)

INVENTORS
DANIEL C. DURAND
WARREN R. WINES
BY William Grolman
ATTORNEY (INPUT CONTROL)

INVENTORS
DANIEL C. DURAND
WARREN R. WINES

BY William Grobman
ATTORNEY

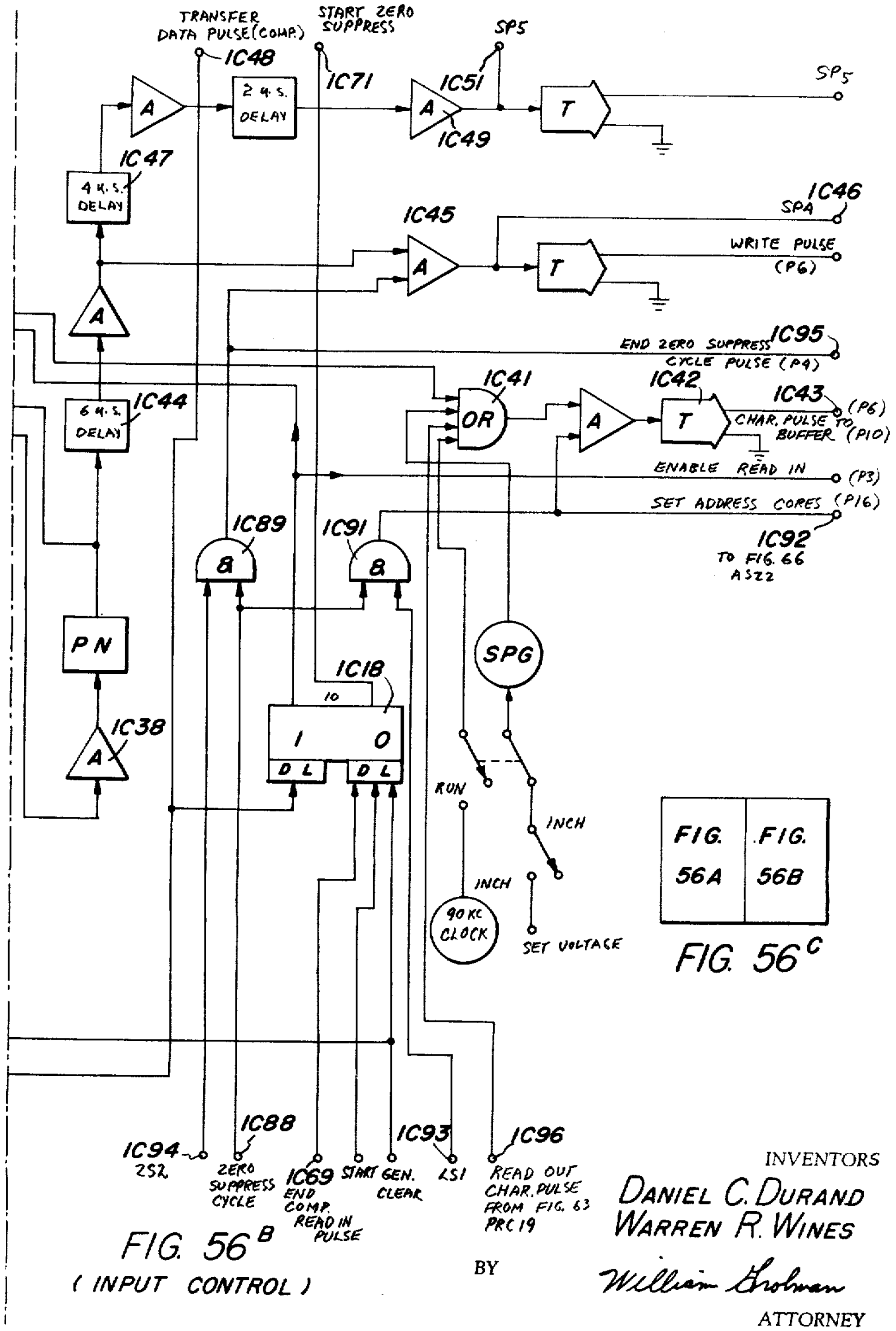
FIG. 56B (INPUT CONTROL), FIG. 56C
INVENTORS
DANIEL C. DURAND
WARREN R. WINES
BY William Grolman
ATTORNEY ELECTRONICALLY CONTROLLED HIGH SPEED PRINTER
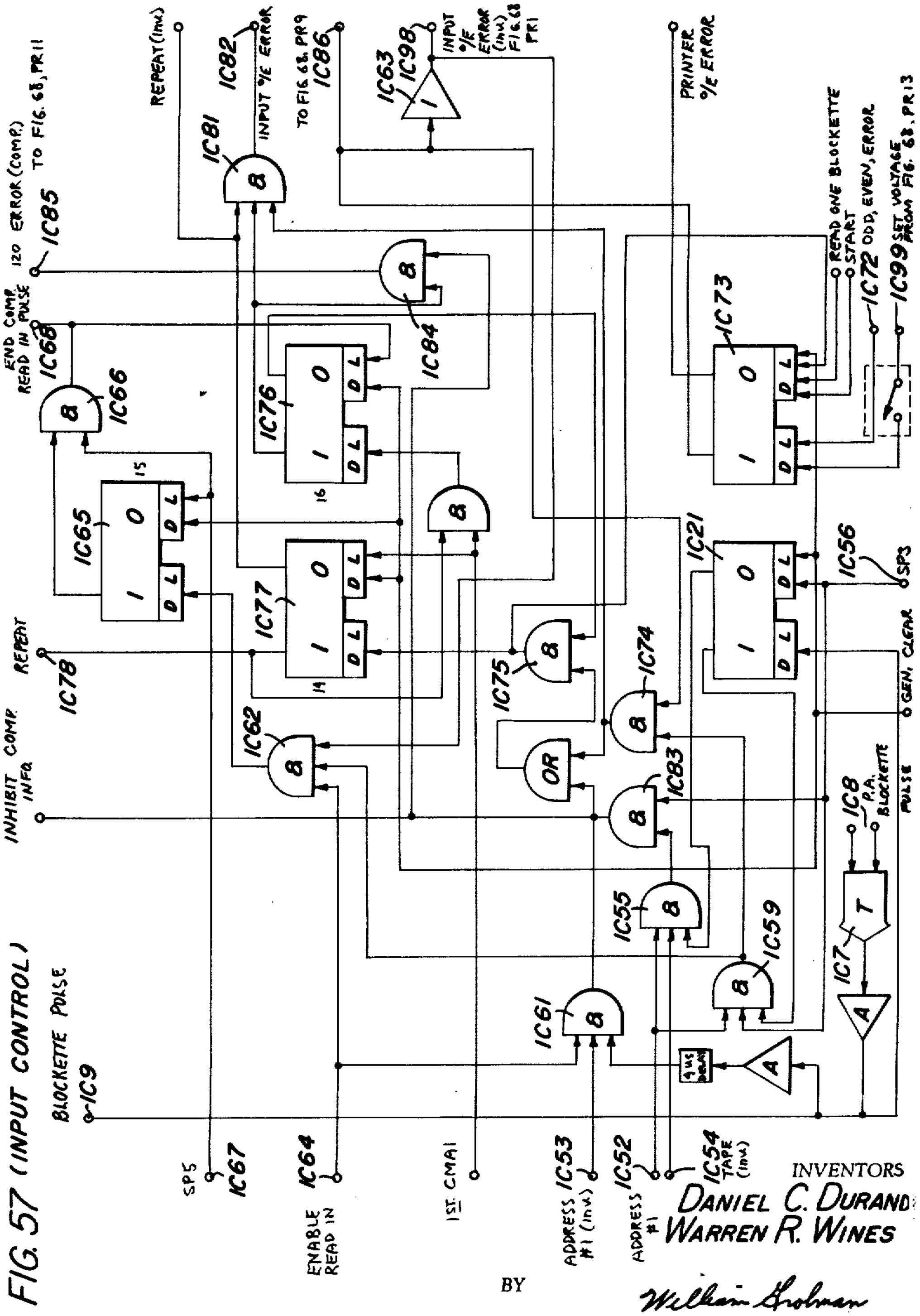
FIG. 57 (INPUT CONTROL)
INVENTORS
DANIEL C. DURAND
WARREN R. WINES
BY William Grobman
ATTORNEY (SPECIAL ADDRESS GATES)

INVENTORS
DANIEL C. DURAND
WARREN R. WINES

BY William Grolman
ATTORNEY

ELECTRONICALLY CONTROLLED HIGH SPEED PRINTER
Filed Sept. 17, 1958
62 Sheets-Sheet 43
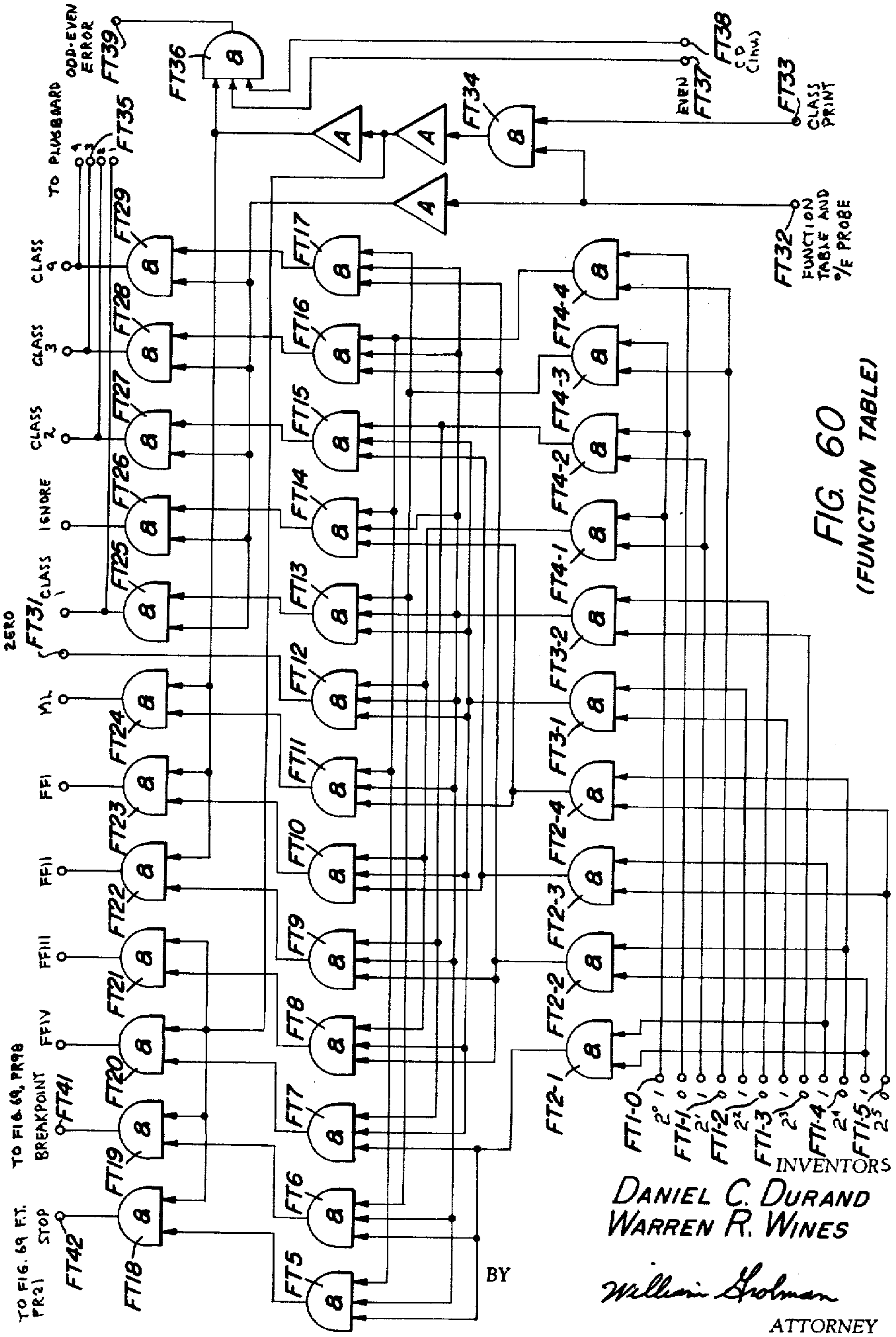
FIG. 60 (FUNCTION TABLE)
INVENTORS
DANIEL C. DURAND
WARREN R. WINES
BY William Grolman
ATTORNEY (FUNCTION TABLE AND ZERO SUPPRESS CRT.)

INVENTORS
DANIEL C. DURAND
WARREN R. WINES

BY

*William Golman*

ATTORNEY

ELECTRONICALLY CONTROLLED HIGH SPEED PRINTER
Filed Sept. 17, 1958 62 Sheets-Sheet 45
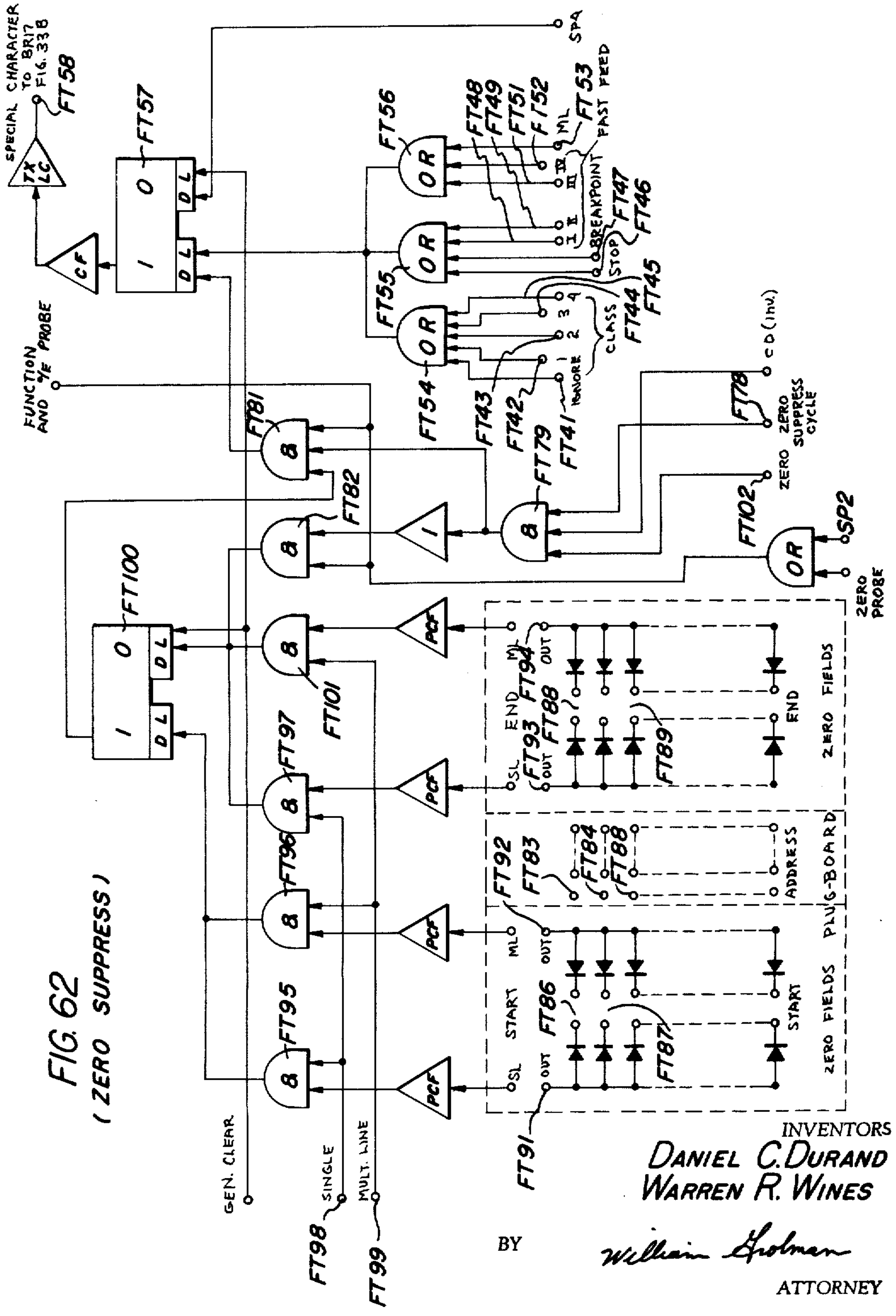
FIG. 62 (ZERO SUPPRESS)
INVENTORS
DANIEL C. DURAND
WARREN R. WINES
BY William Grolman
ATTORNEY Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 46

INVENTORS
DANIEL C. DURAND
WARREN R. WINES

BY
By William Grolman
ATTORNEY

FIG. 63B (PRINT CONTROL)

INVENTORS
DANIEL C. DURAND
WARREN R. WINES
BY
William Grolman
ATTORNEY

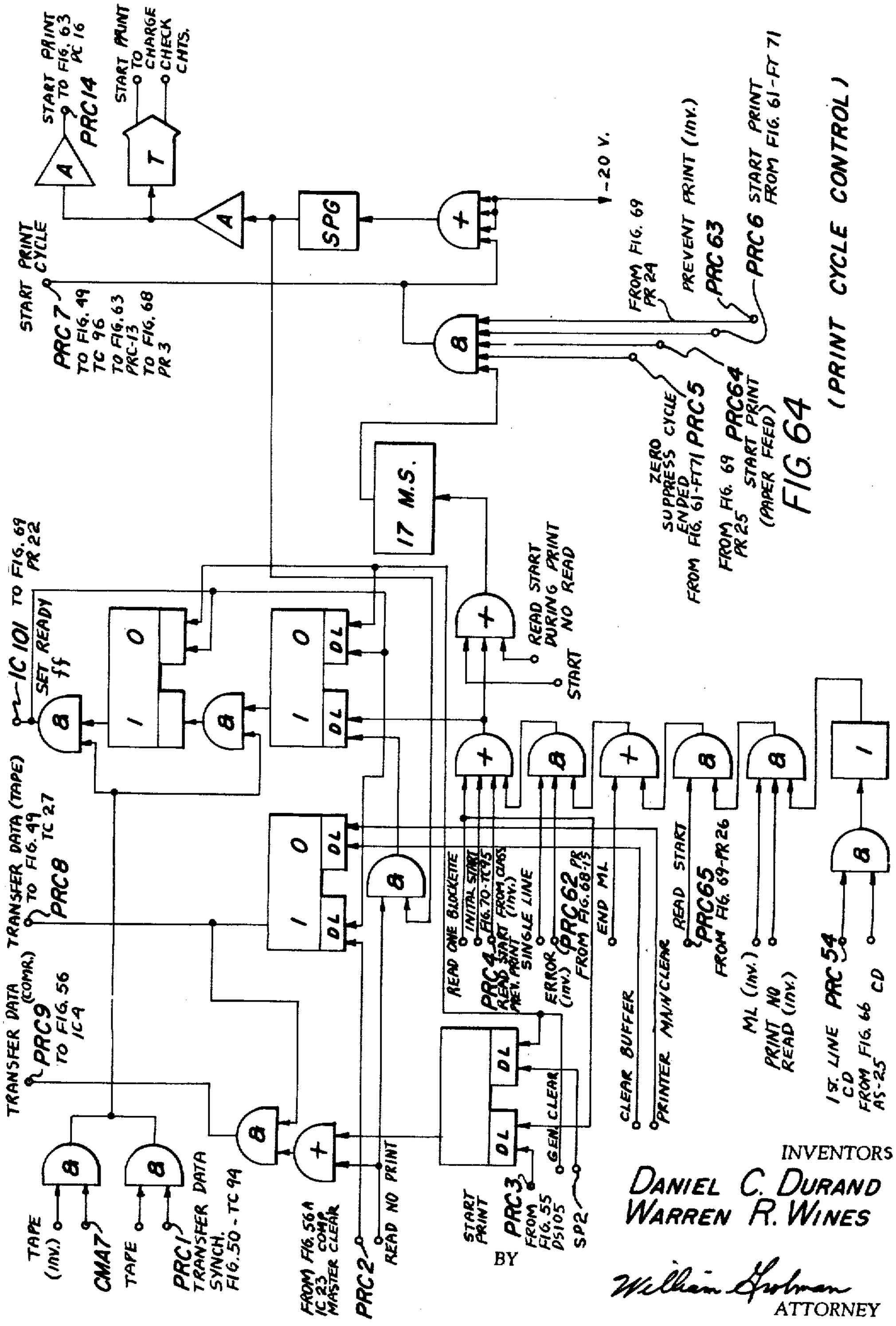
FIG. 64 (PRINT CYCLE CONTROL)
INVENTORS
DANIEL C. DURAND
WARREN R. WINES
BY
William Grolman
ATTORNEY

ELECTRONICALLY CONTROLLED HIGH SPEED PRINTER

Filed Sept. 17, 1958

INVENTORS
DANIEL C. DURAND
WARREN R. WINES
By William Grolman
ATTORNEY

INVENTORS
DANIEL C. DURAND
WARREN R. WINES
BY William Grolman
ATTORNEY

Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 51

(PRINT INDEX COUNTER)

INVENTORS

DANIEL C. DURAND

WARREN R. WINES

BY William Grolman

ATTORNEY

FIG. 68 (PRINTER CONTROL)

INVENTOR.
DANIEL C. DURAND
WARREN R. WINES

BY William Grohman
ATTORNEY (PRINTER CONTROL)

INVENTORS.
DANIEL C. DURAND
WARREN R. WINES
BY
William Grolman
ATTORNEY

FIG. 70 (TAPE UNIT CONTROL)
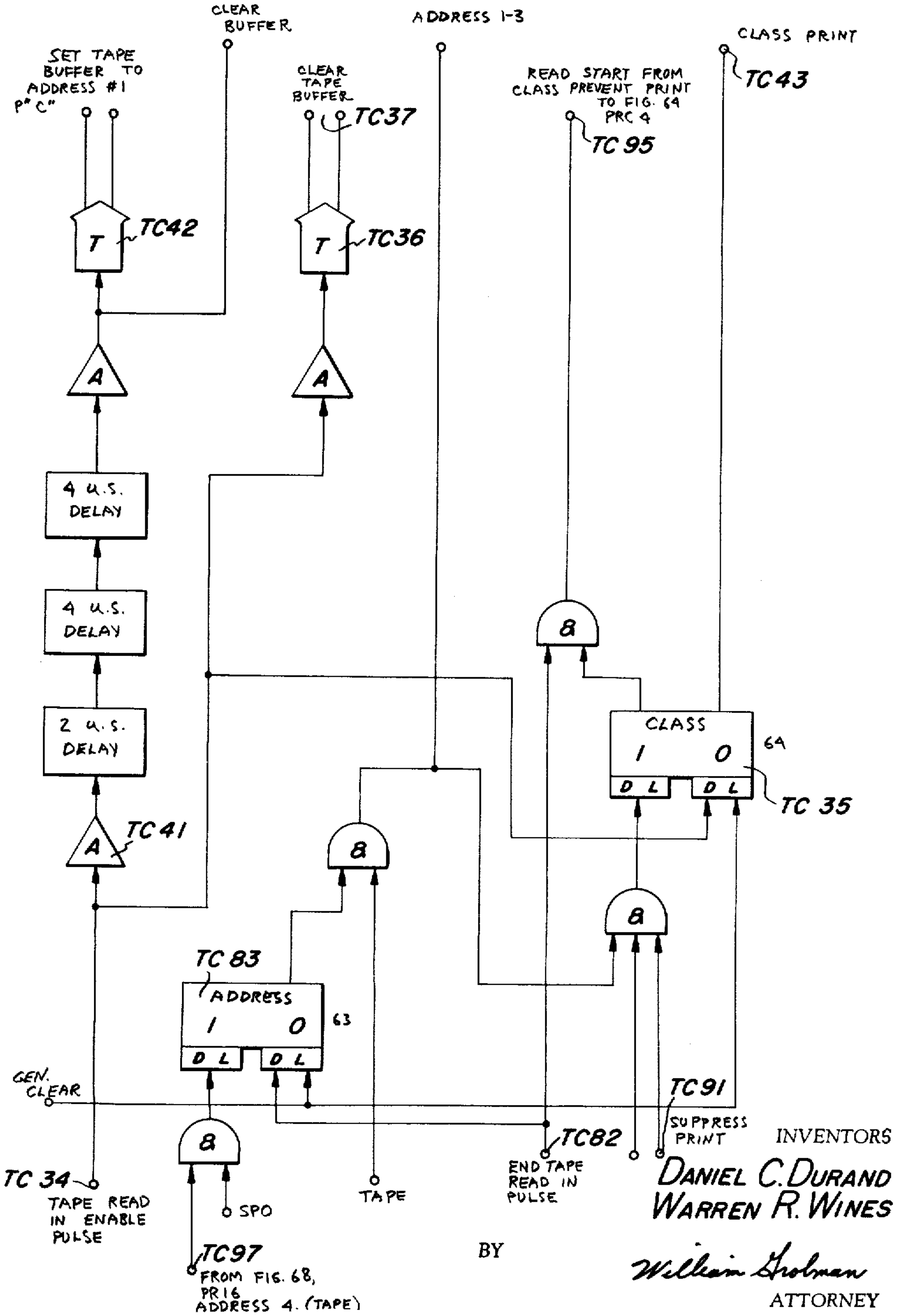
INVENTORS
DANIEL C. DURAND
WARREN R. WINES
BY
William Grolman
ATTORNEY FIG. 71A (MULTILINE COUNTER AND RELAYS)
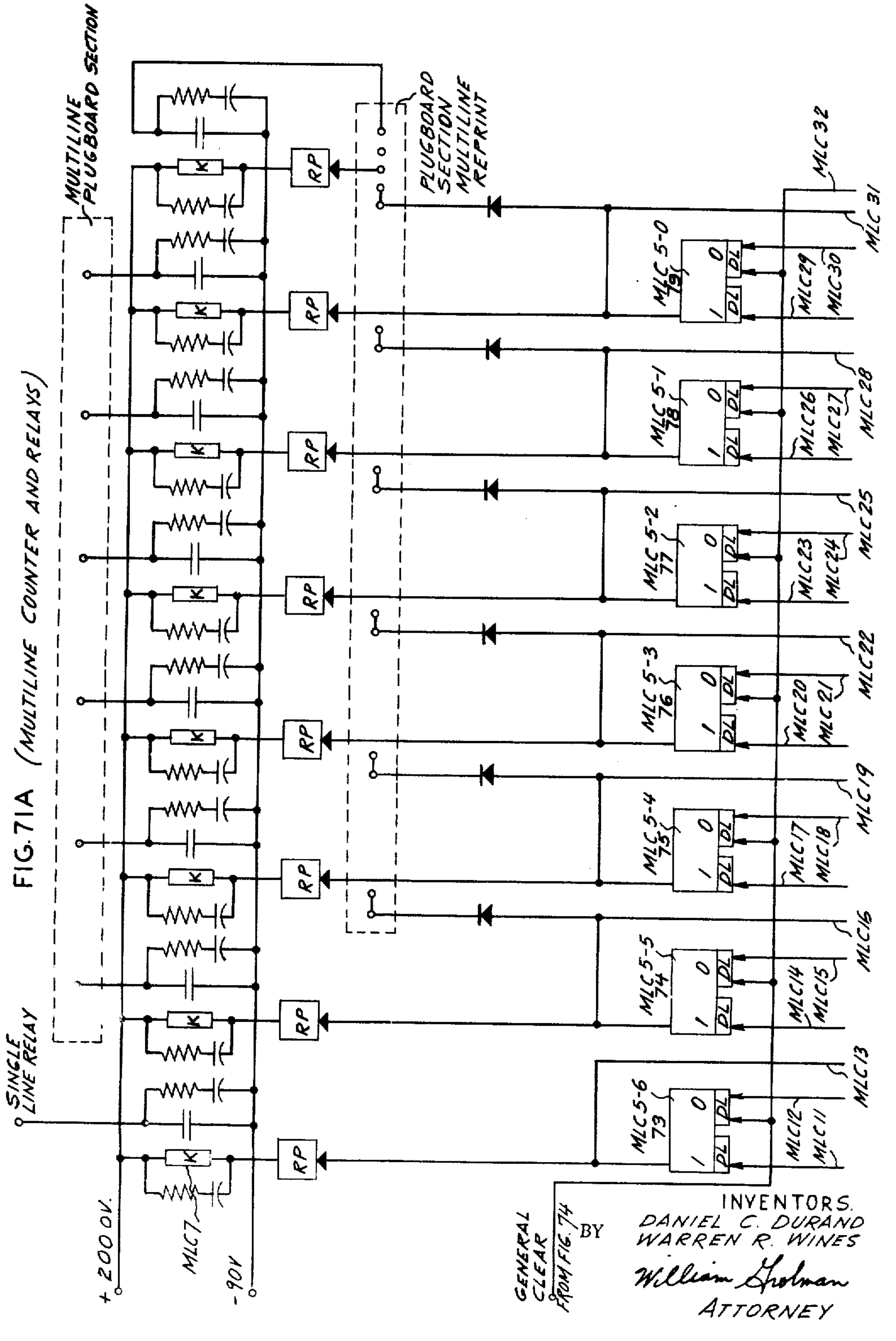
INVENTORS.
DANIEL C. DURAND
WARREN R. WINES
BY William Grolman
ATTORNEY

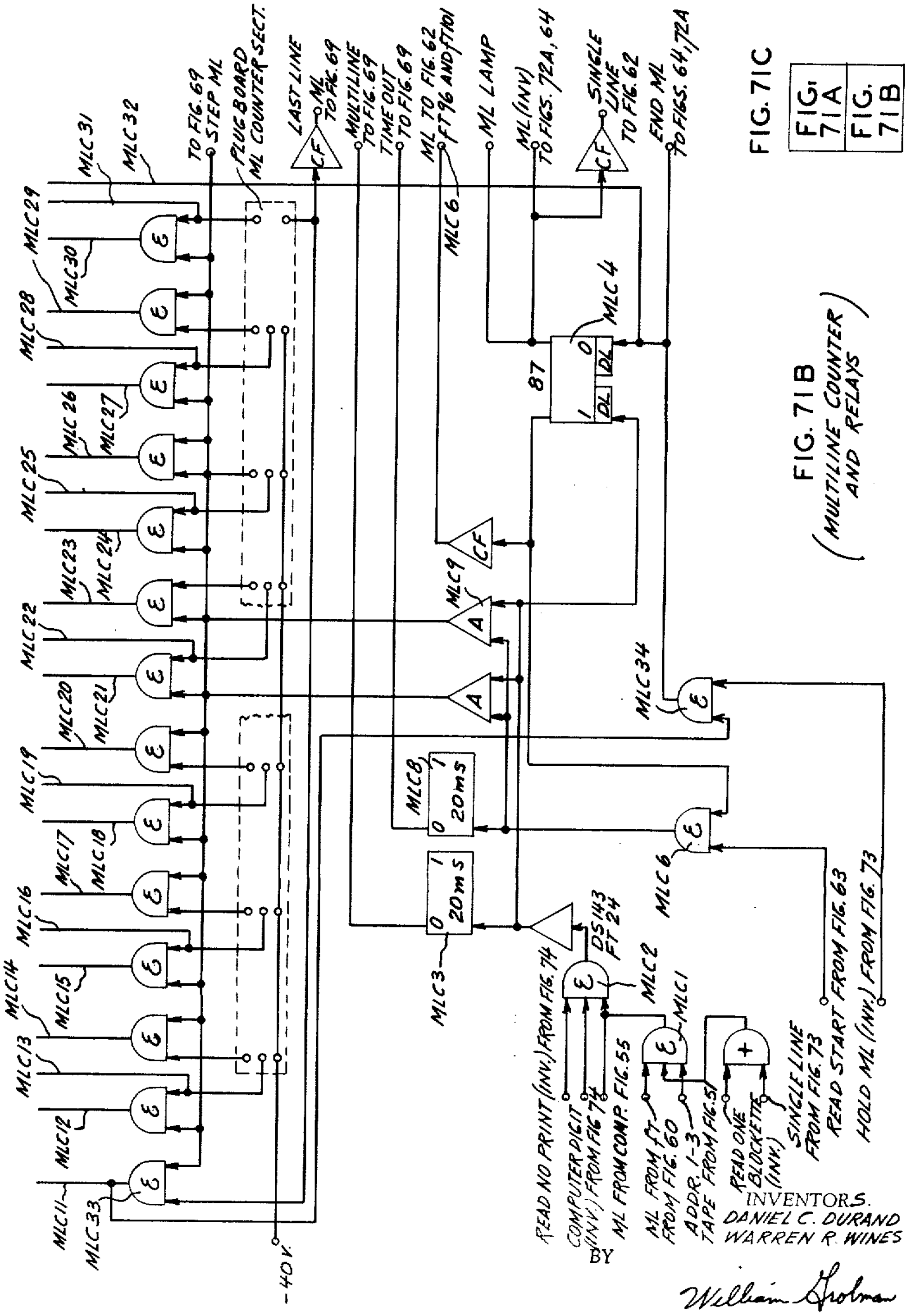
FIG. 71C, FIG. 71B (MULTILINE COUNTER AND RELAYS)
INVENTORS.
DANIEL C. DURAND
WARREN R. WINES
BY
William Grolman
ATTORNEY (PAPER FEED CONTROL)

INVENTORS.
DANIEL C. DURAND
WARREN R. WINES
BY
William Grolman
ATTORNEY (PAPER FEED CONTROL)

INVENTORS.
DANIEL C. DURAND
WARREN R. WINES
BY
William Grobman
ATTORNEY

Oct. 4, 1960 D. C. DURAND, JR., ET AL 2,954,731

ELECTRONICALLY CONTROLLED HIGH SPEED PRINTER

Filed Sept. 17, 1958 62 Sheets-Sheet 59

(MANUAL CONTROLS)

INVENTORS.
DANIEL C. DURAND
WARREN R. WINES

BY William Grobman

ATTORNEY (MANUAL CONTROLS)

INVENTORS.
DANIEL C. DURAND
WARREN R. WINES
BY William Grolman
ATTORNEY (GENERAL OPERATION)

INVENTORS.
DANIEL C. DURAND
WARREN R. WINES
BY
William Grolman
ATTORNEY

INVENTORS.
DANIEL C. DURAND
WARREN R. WINES
BY
William Godman
ATTORNEY 2,954,731

ELECTRONICALLY CONTROLLED HIGH SPEED PRINTER

Daniel C. Durand, Jr., and Warren R. Wines, Norwalk, Conn., assignors to Sperry Rand Corporation, New York, N.Y., a corporation of Delaware Filed Sept. 17, 1958, Ser. No. 761,630

36 Claims. (Cl. 101—93)

This invention relates to printing devices, and more particularly, to a high speed printer which is suitable as an output device for electronic computers.

Electronic information processing systems such as computers have found their place in the scientific and business worlds, and each year more and more of these systems are placed into active use. Although digital computers, as a general rule, do not perform any functions not within the realm of human effort, they have proved useful because of their extremely high speeds, which have enabled the solution of problems heretofore not attempted due to the great length of time involved in solving them by other means. The very speed which has proved to be the major asset of the information processing systems themselves has resulted in few, if any, input or output devices which are efficiently matched to their electronic systems. At this time the input and output equipment auxiliary to the computer itself is still the weakest link in the information processing chain and the one which requires the greatest amount of development. The apparatus described in this specification is an output device developed specifically for the use with electronic information processing systems.

In scientific use, the number of manipulations performed by an information processing system is large with respect to either the amount of information supplied to the system or obtained therefrom. Therefore, generally speaking, scientific computers will operate satisfactorily with comparatively slow input and output equipment. However, business use of information processing systems results in the output of voluminous printed matter, and the requirements for input and output equipment are much more demanding.

One of the greatest problems in business has been the maintenance of inventories and large file systems and the searches through the inventory lists or files which must often be made, and an information processor which will perform these searches is designed more for business than for scientific use. In addition to normal internal operating circuits (register and arithmetic units) such file computers also include enormous high speed memory systems, preferably of the random access type. The high speed memory systems comprise the actual files of the device, and rapid searching may readily be made therethrough. Such search is invariably aided if different types of information may be supplied with identifying indicia readily recognized by the searching portion of the system. The outputs of these searches usually result in the transcription of an entire file, and it is quite evident that output equipment for file computers must be capable of high speed printing operation, for the output of computers in business use is desirably in printed form. A high speed output device of this nature should also be able to print information obtained from the computer in a desired format or form which may be made to correspond to inventory or file forms used in the business. In addition, such an output device should be selectively capable of operations either under the direct control of the computer itself or under indirect control of the computer by means of intermediary storage mediums such as magnetic tape, punched tape, punched cards, or the like.

An output device of this general character has been developed for a general purpose electronic information processing system and has proved highly successful. The rate of printing information is extremely high, being of the order of 130 characters per line and 400 to 600 lines per minute. In addition, this high speed printer is capable of reproducing the 26 letters of the alphabet, 10 numerals, and the ordinary symbols and 15 punctuation signs used in every day business, and is illustrated and described in more detail in patent applications S.N. 486,206, "High Speed Printer," filed February 4, 1955, in the names of John P. Eckert, Jr., et al.; S.N. 514,629, "Comparator," filed June 10, 1955, in the names of John P. Eckert, Jr., and Albert W. Reickord; S.N. 514,630, "Code Generator," filed June 10, 1955, in the names of John P. Eckert, Jr., and Marvin Jacoby; S.N. 514,852, "High Speed Printer," filed June 13, 1955, in the name of Marvin Jacoby; and S.N. 514,628 (now abandoned), "Condition Responsive Apparatus," filed June 10, 1955, in the names of Albert P. Lang et al. The high speed printer described in these patent applications is of the general purpose type and has proved remarkably successful for a device of its type. However, as is true of all such machines, it has its disadvantages, and it is, therefore, an object of this invention to provide a new and improved high speed printer.

It is another object of this invention to provide a new and improved high speed printing device suitable for use as output equipment for high speed electronic information processing systems.

A further object of this invention is to provide a new and improved high speed printing device capable of operation directly under the control of an electronic information processing system.

Still another object of this invention is to provide a new and improved high speed printing device capable of proper operation under indirect control of an electronic information processing system and also operating through the medium of an intermediate storage member.

Other objects and advantages of this invention will become apparent as the following description proceeds, which description should be considered together with the accompanying drawings in which.

Figure 5A:
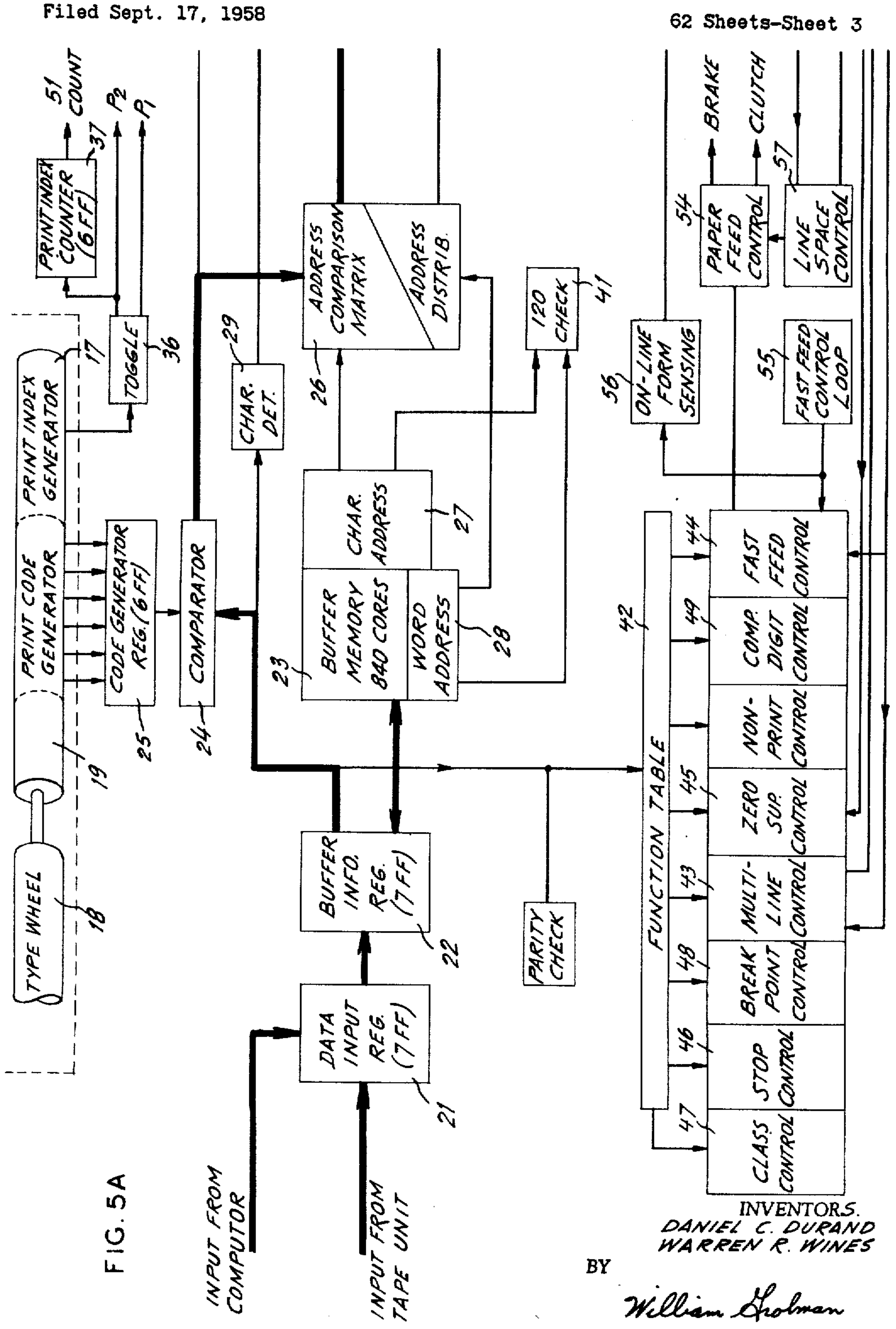
Figure 6:
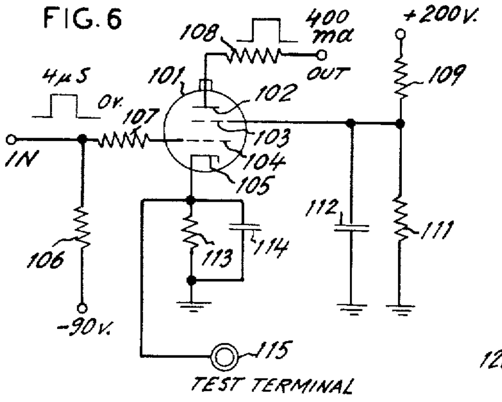
Figure 7:
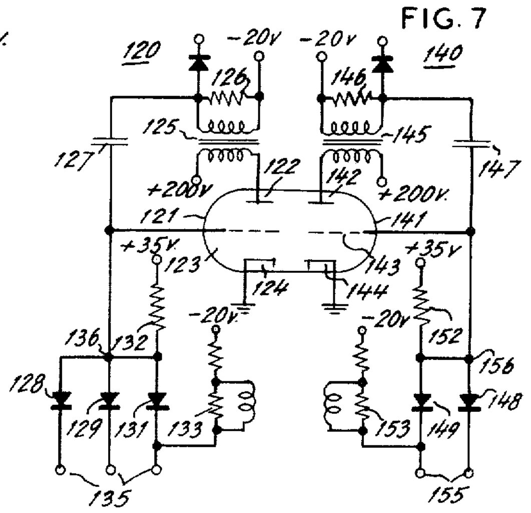
Figures 7A, 8, 8A:
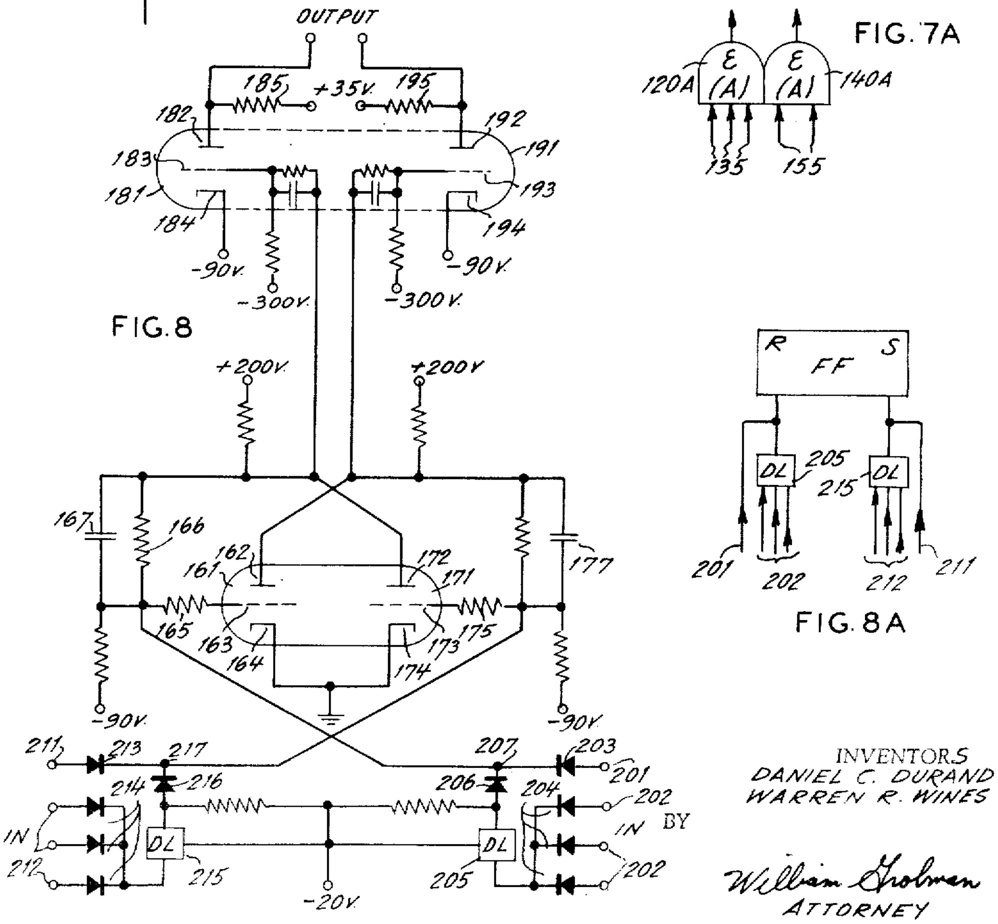
Figure 9:
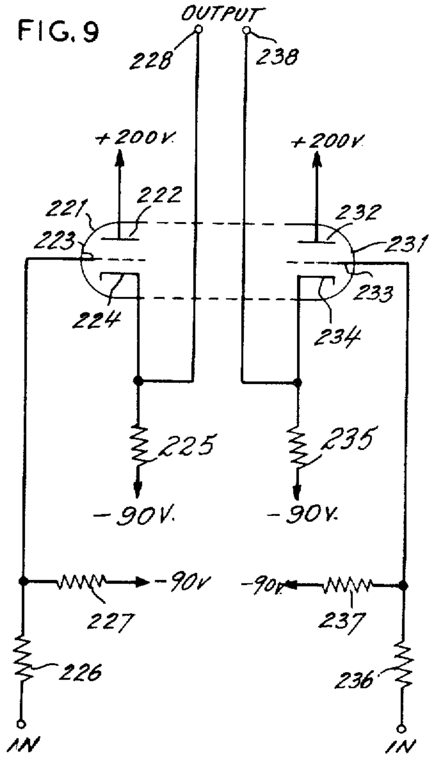
Figures 10, 10A:
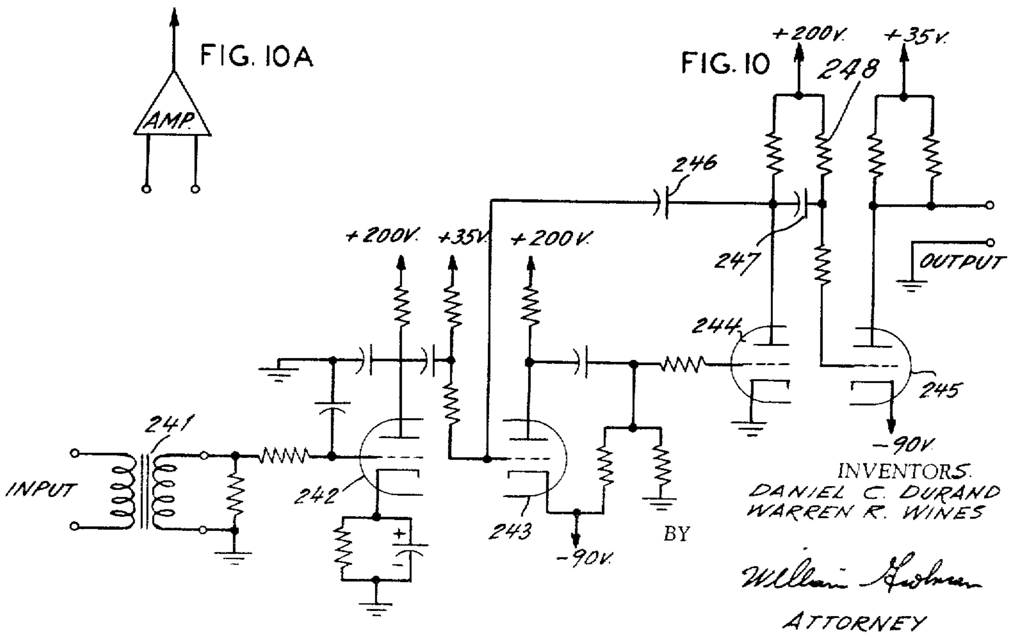
Figure 11:
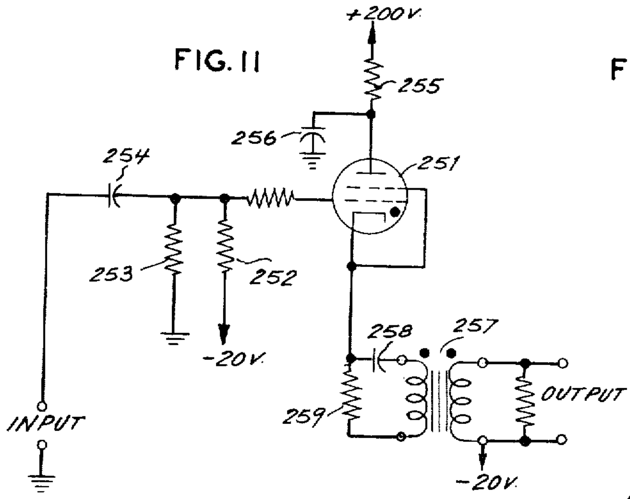
Figure 12:
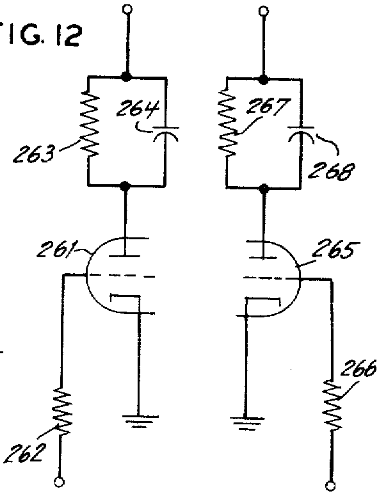
Figure 13:
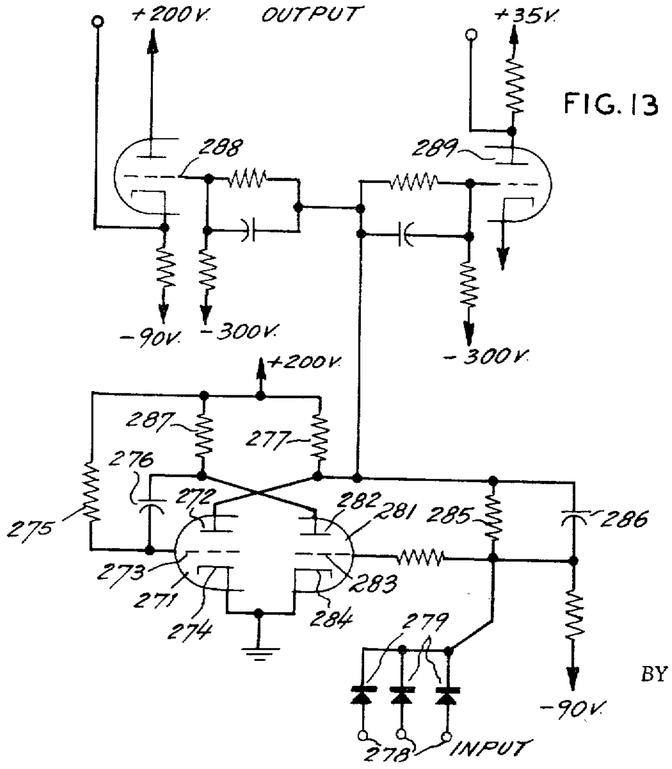
Figure 14:
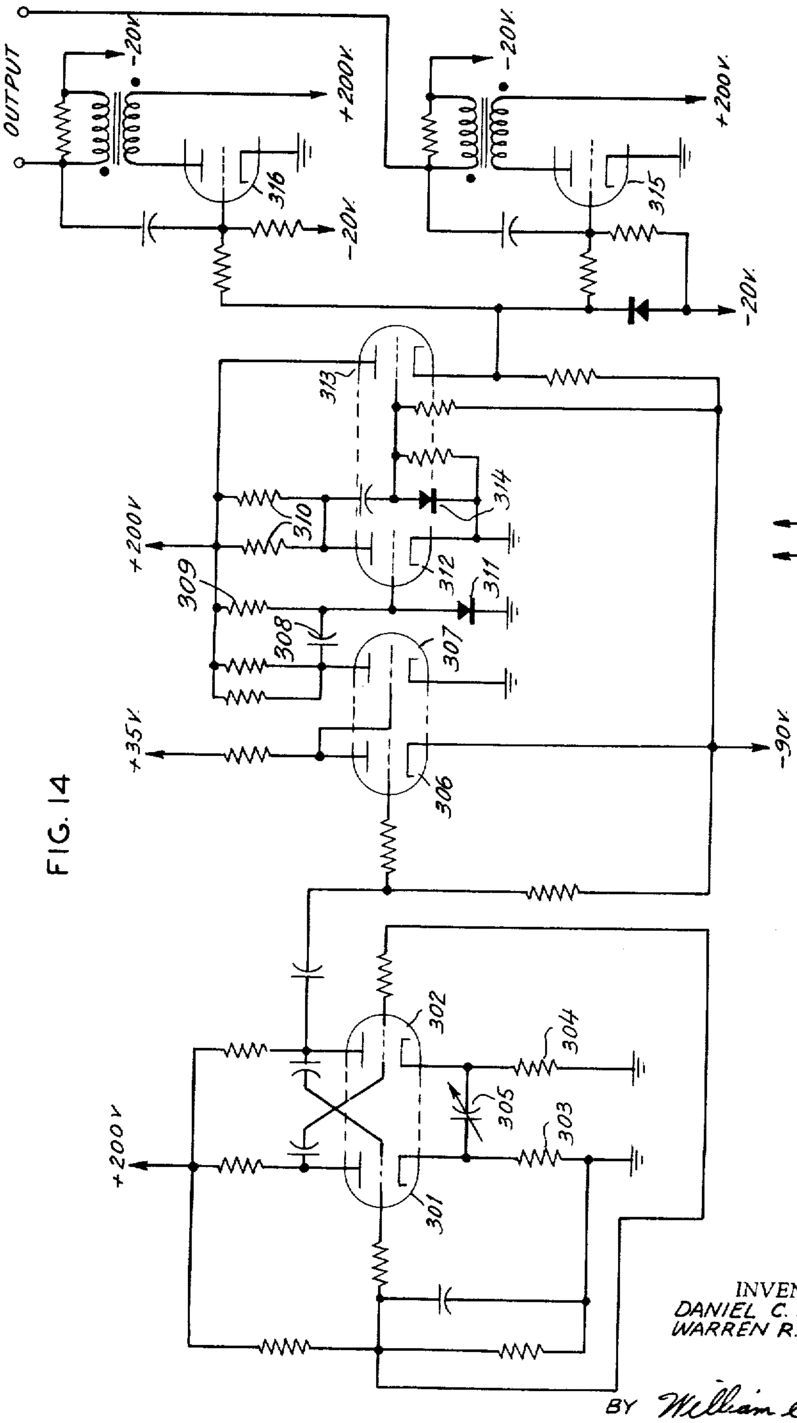
Figures 15, 15A:
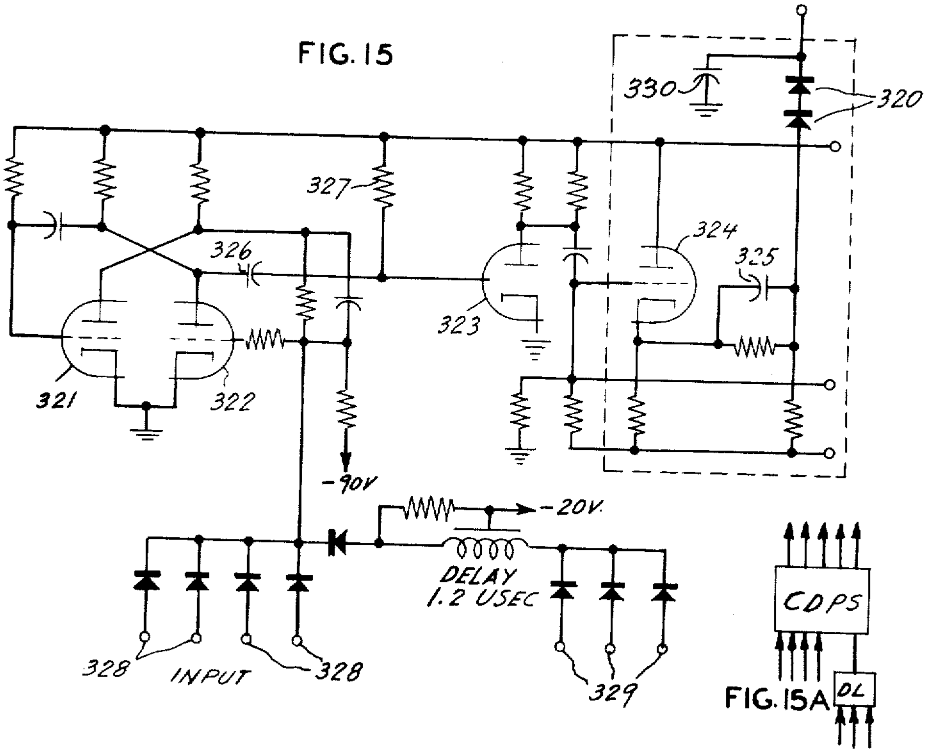
Figure 17:
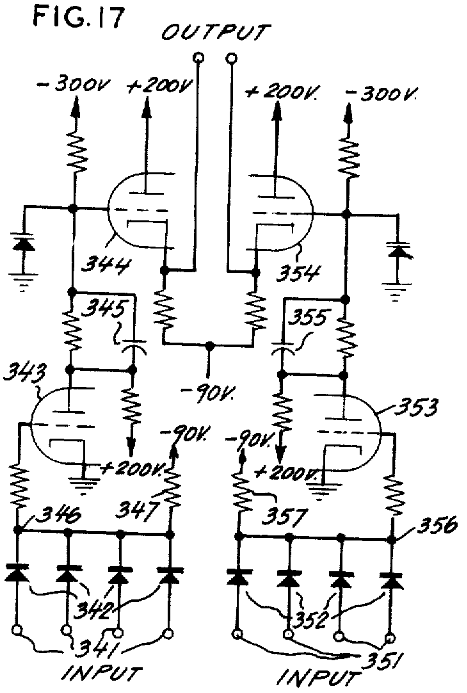
Figures 18, 18A, 19, 19A, 20, 20A:
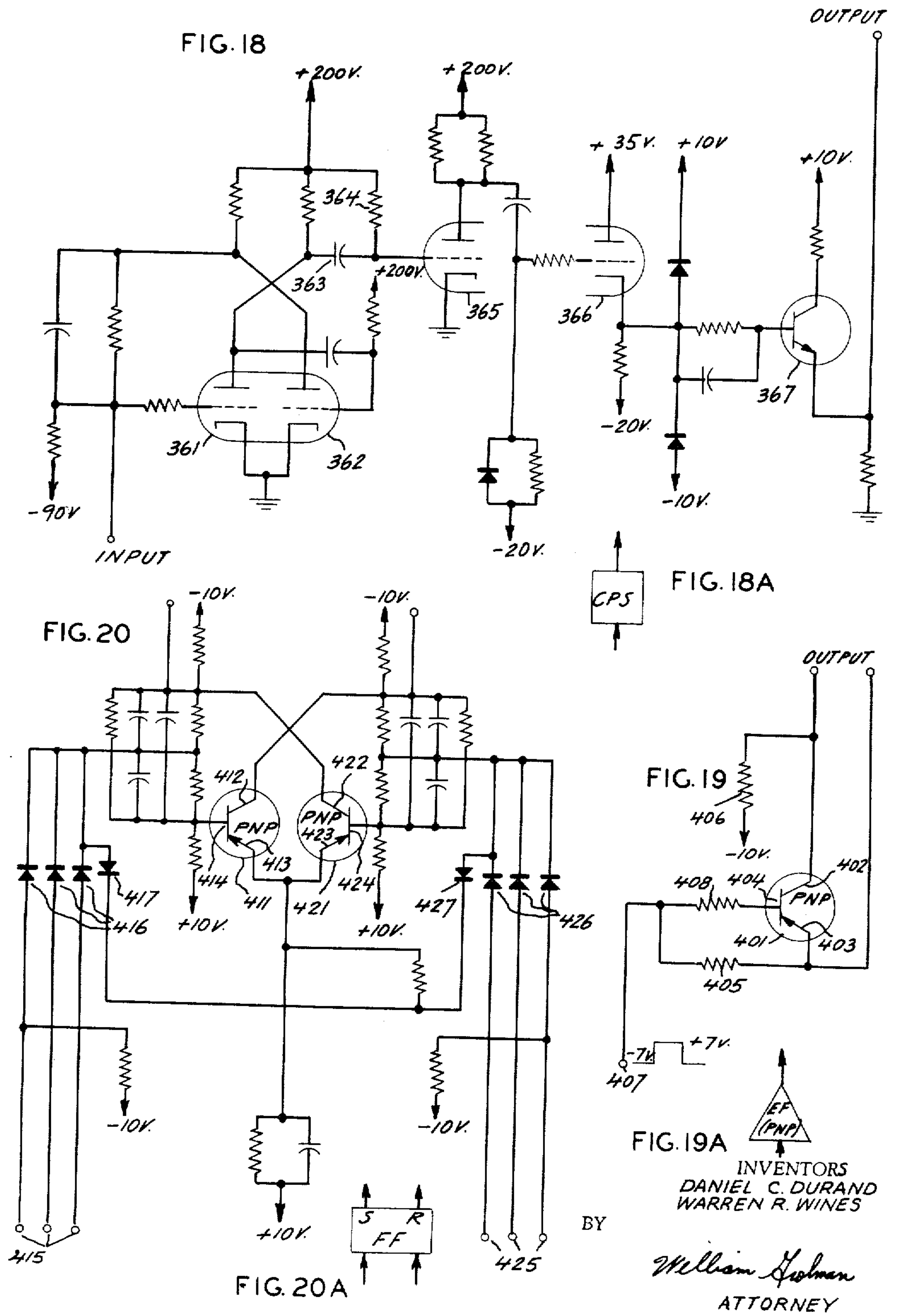
Figure 21:
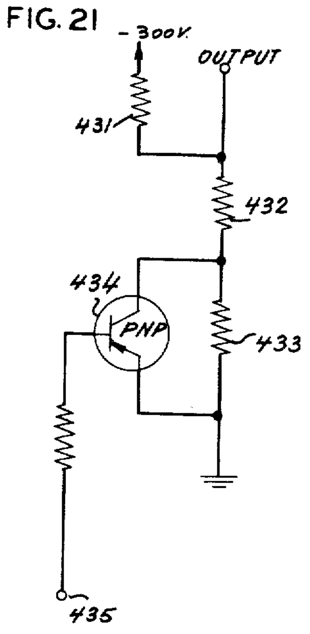
Figure 22:
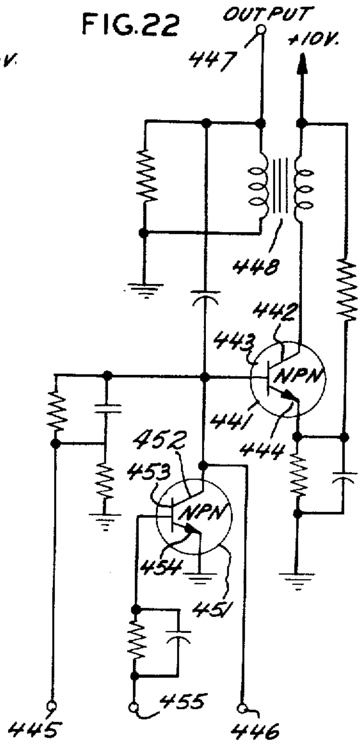
Figure 23:
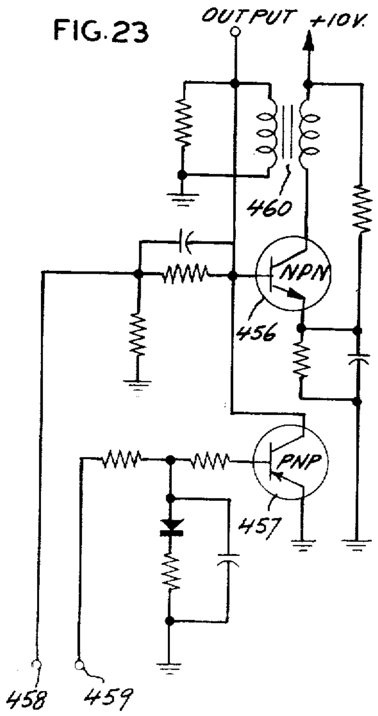
Figure 24:
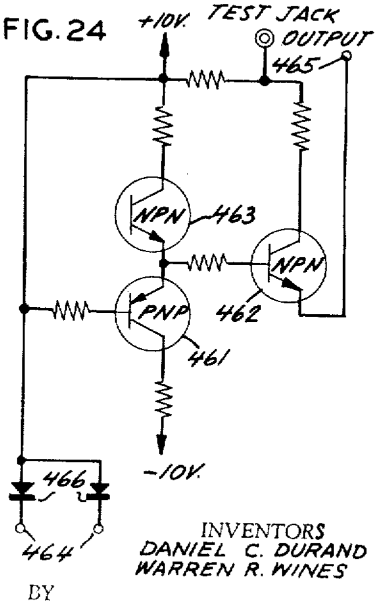
Figures 25, 25A:
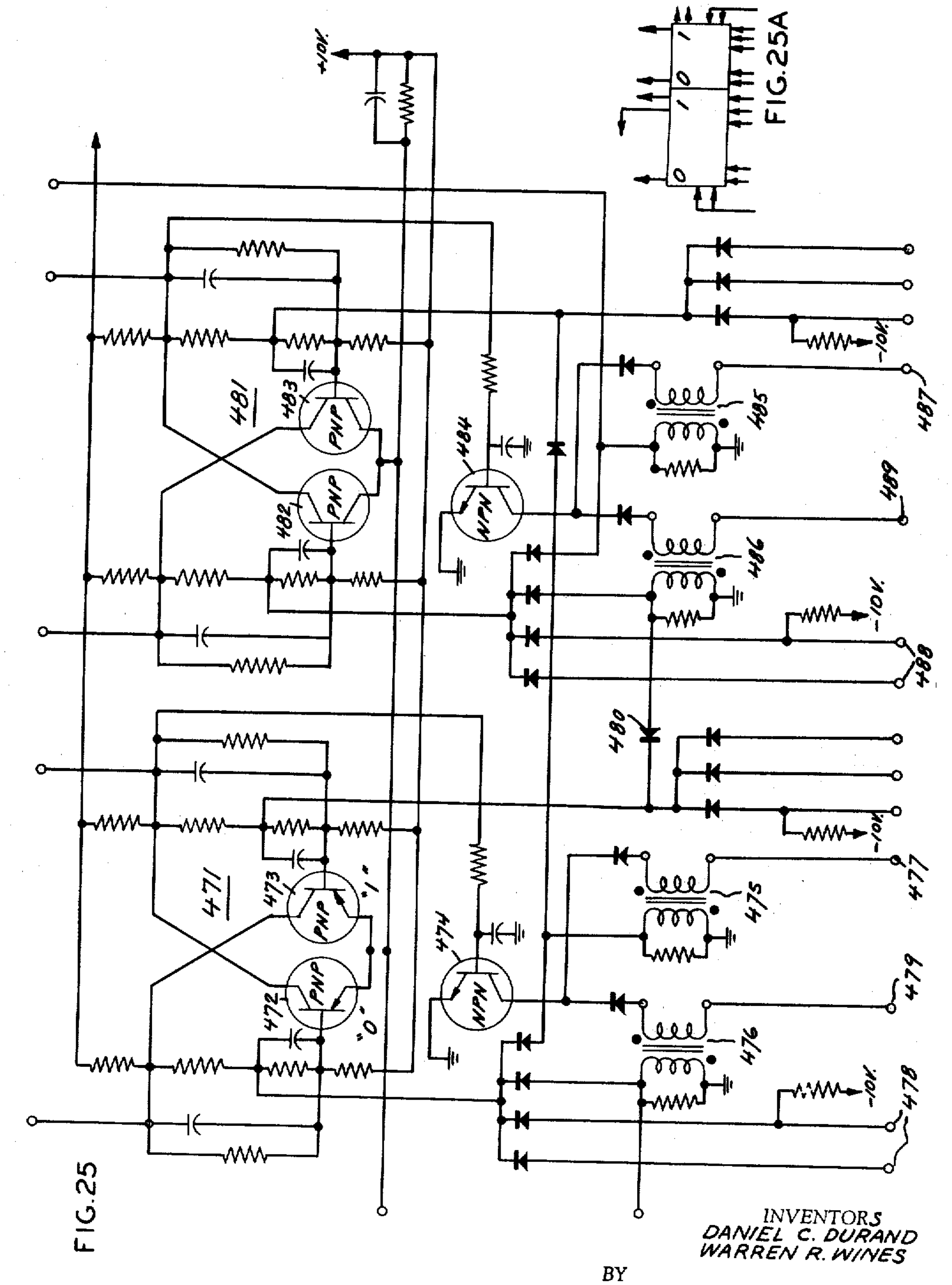
Figure 26:
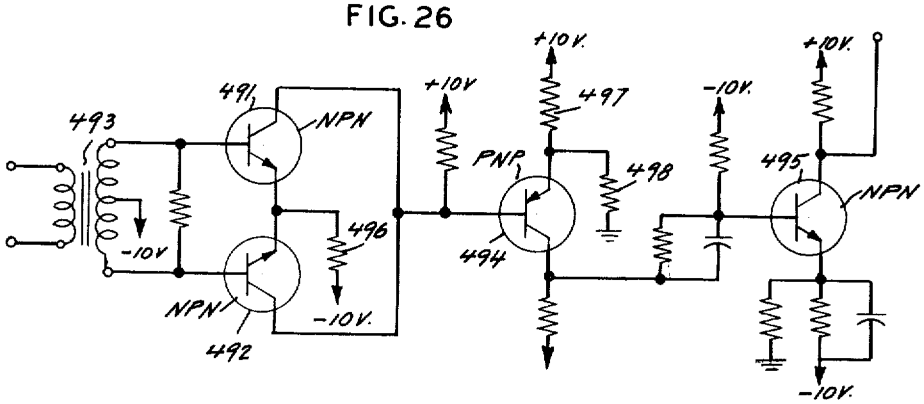
Figure 27:
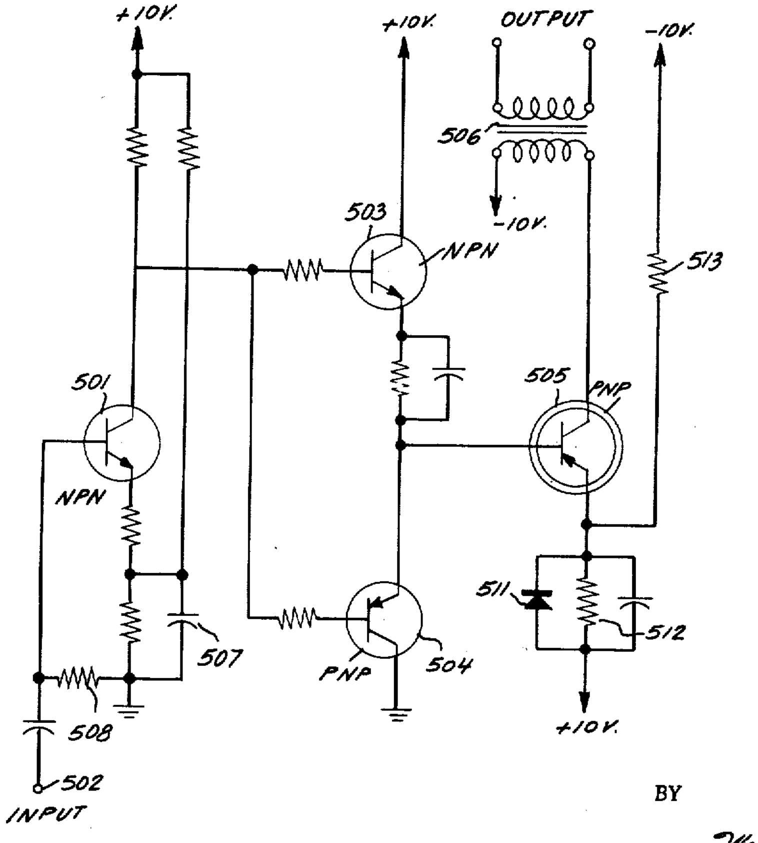
Figure 28:
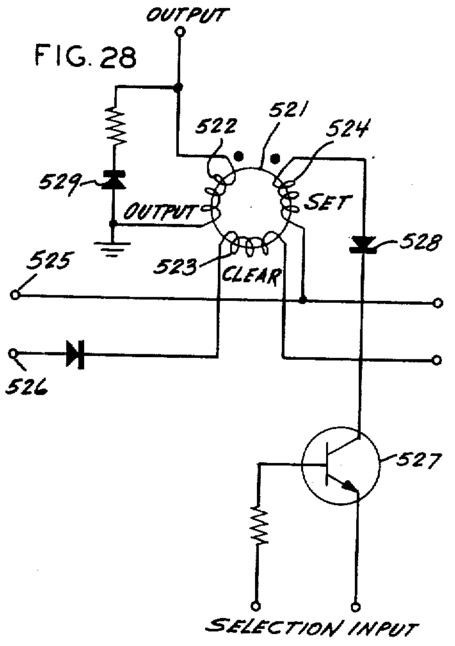
Figures 29, 30A:
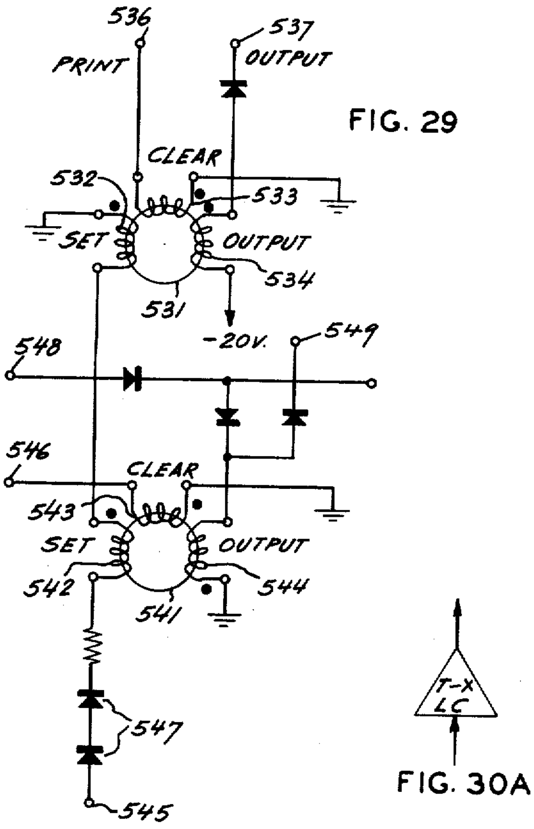
Figure 30:
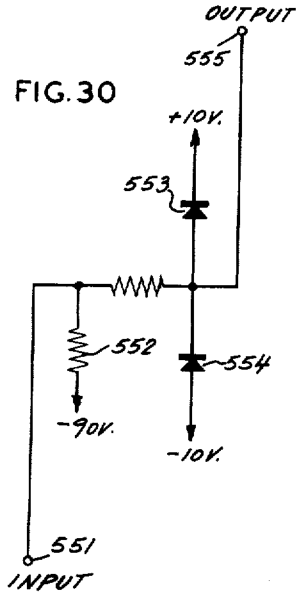
Figures 31, 31A:
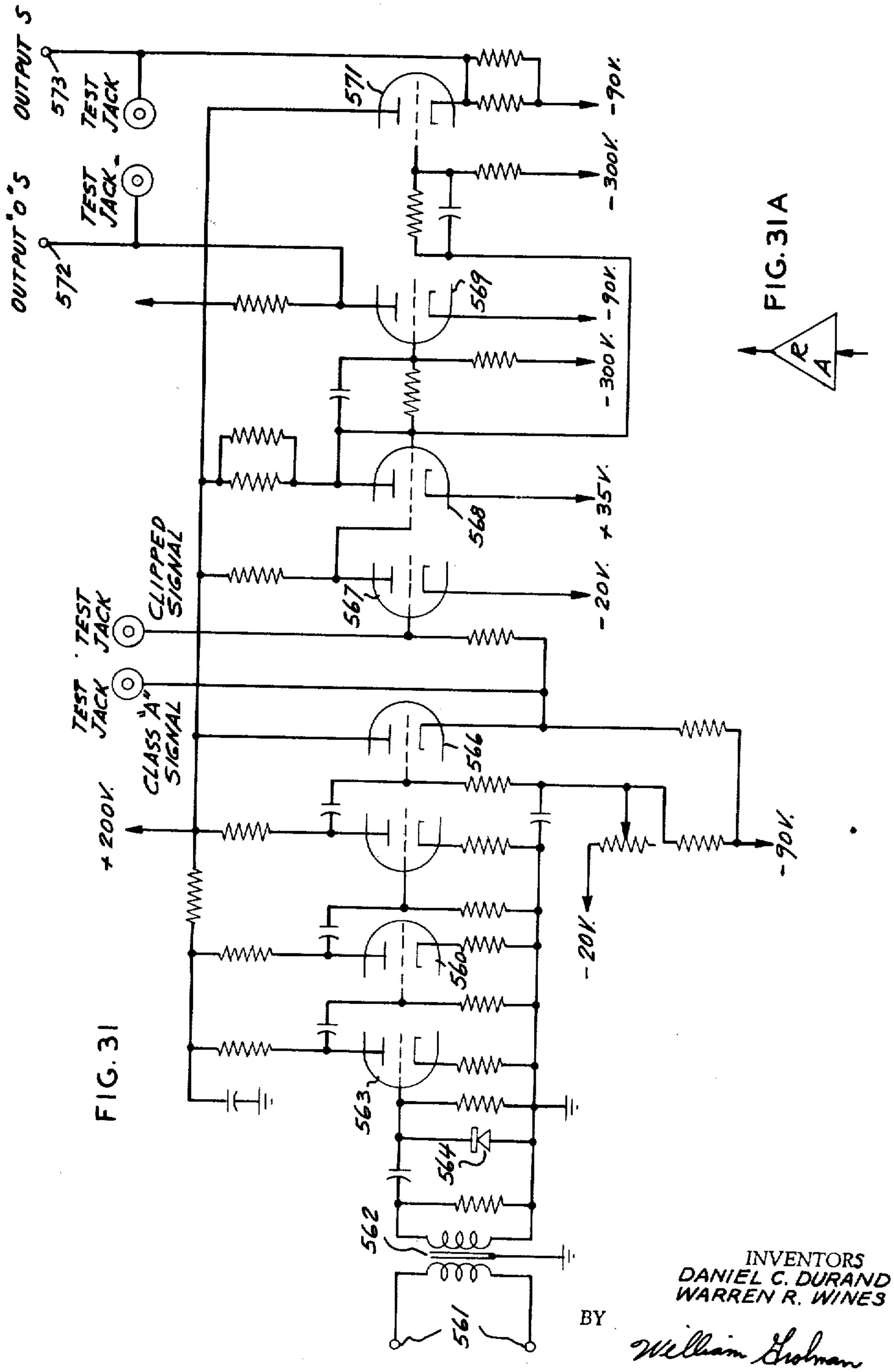
Figure 32:
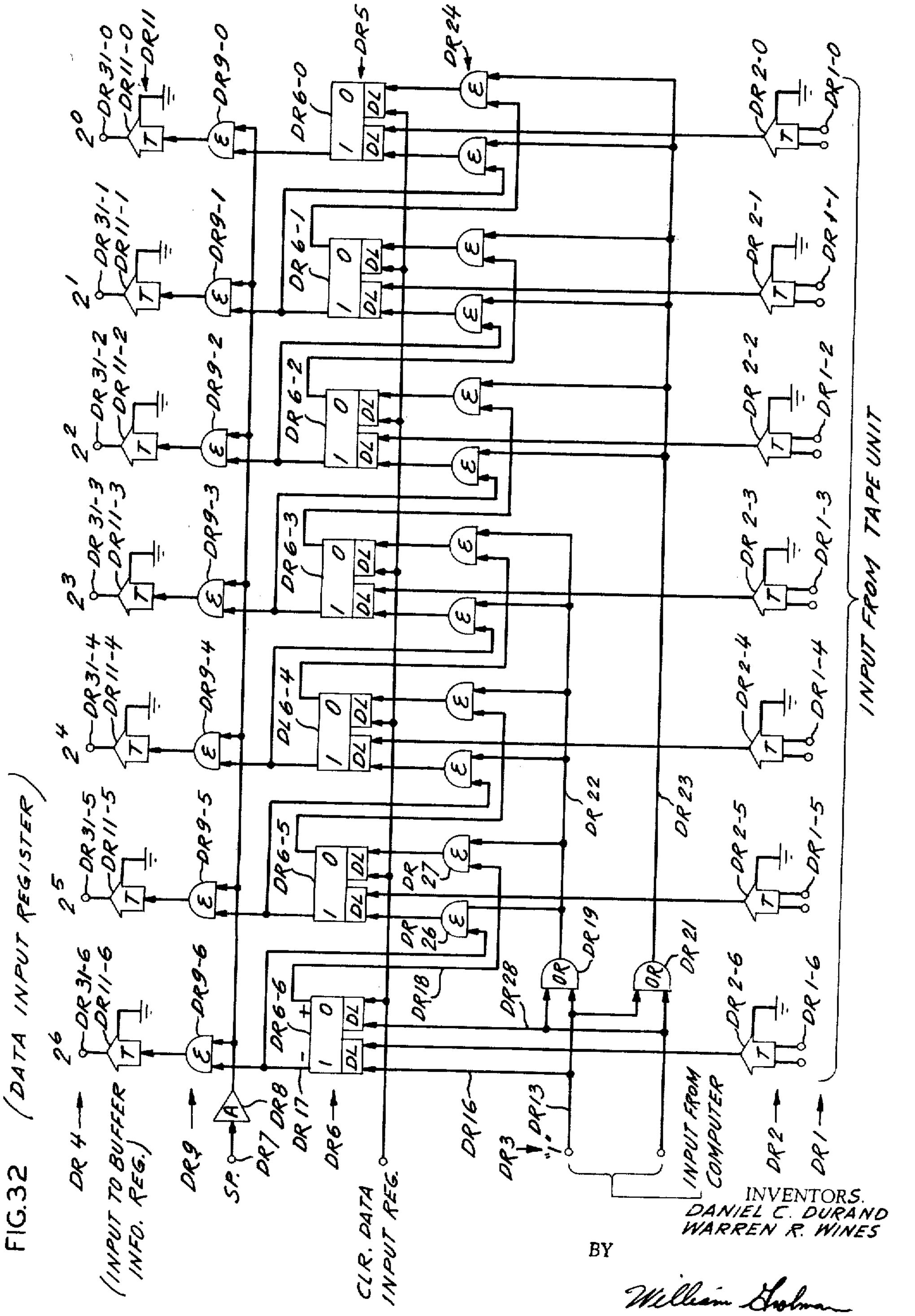
Figure 33A:
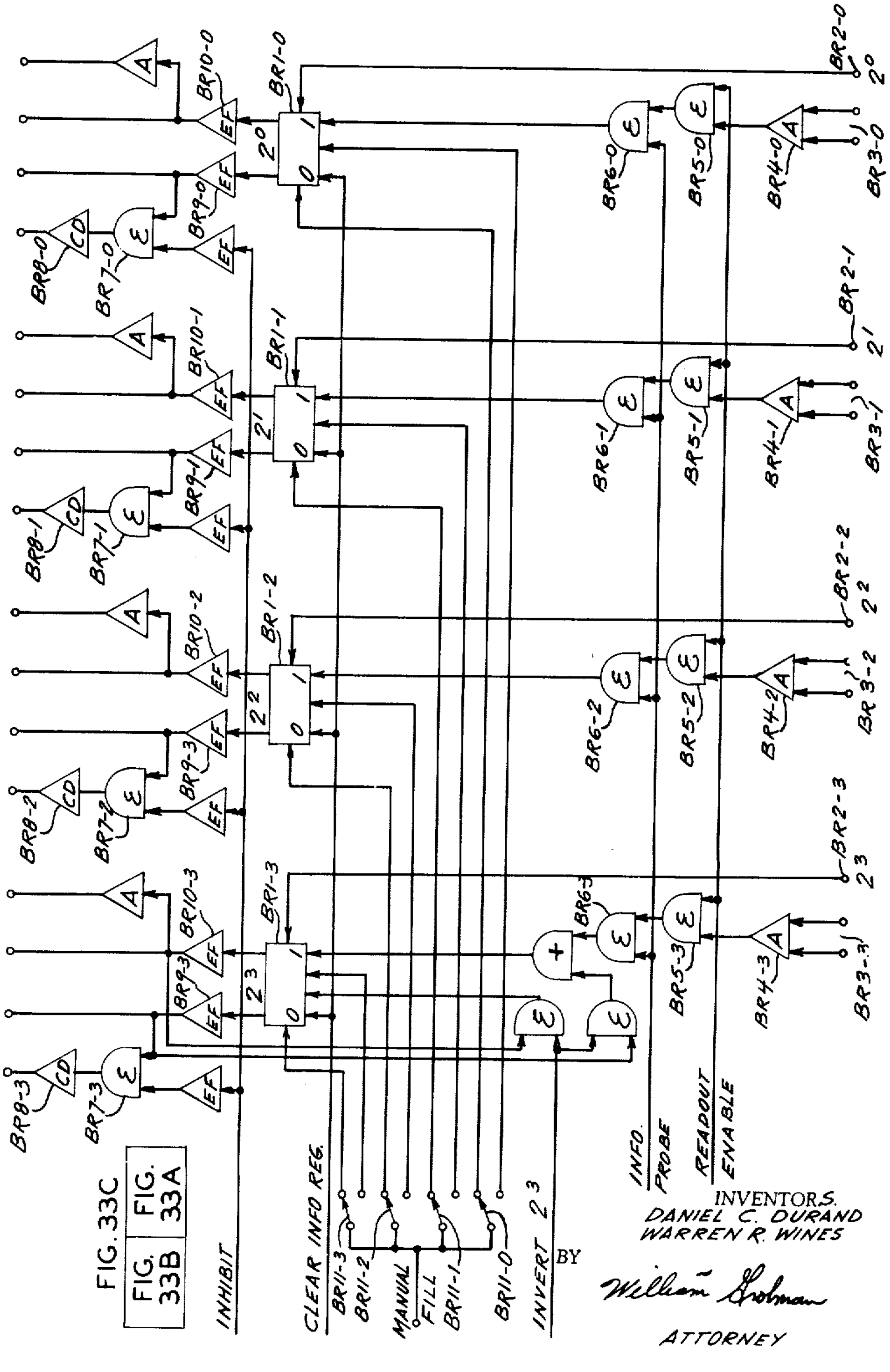
Figure 33B:
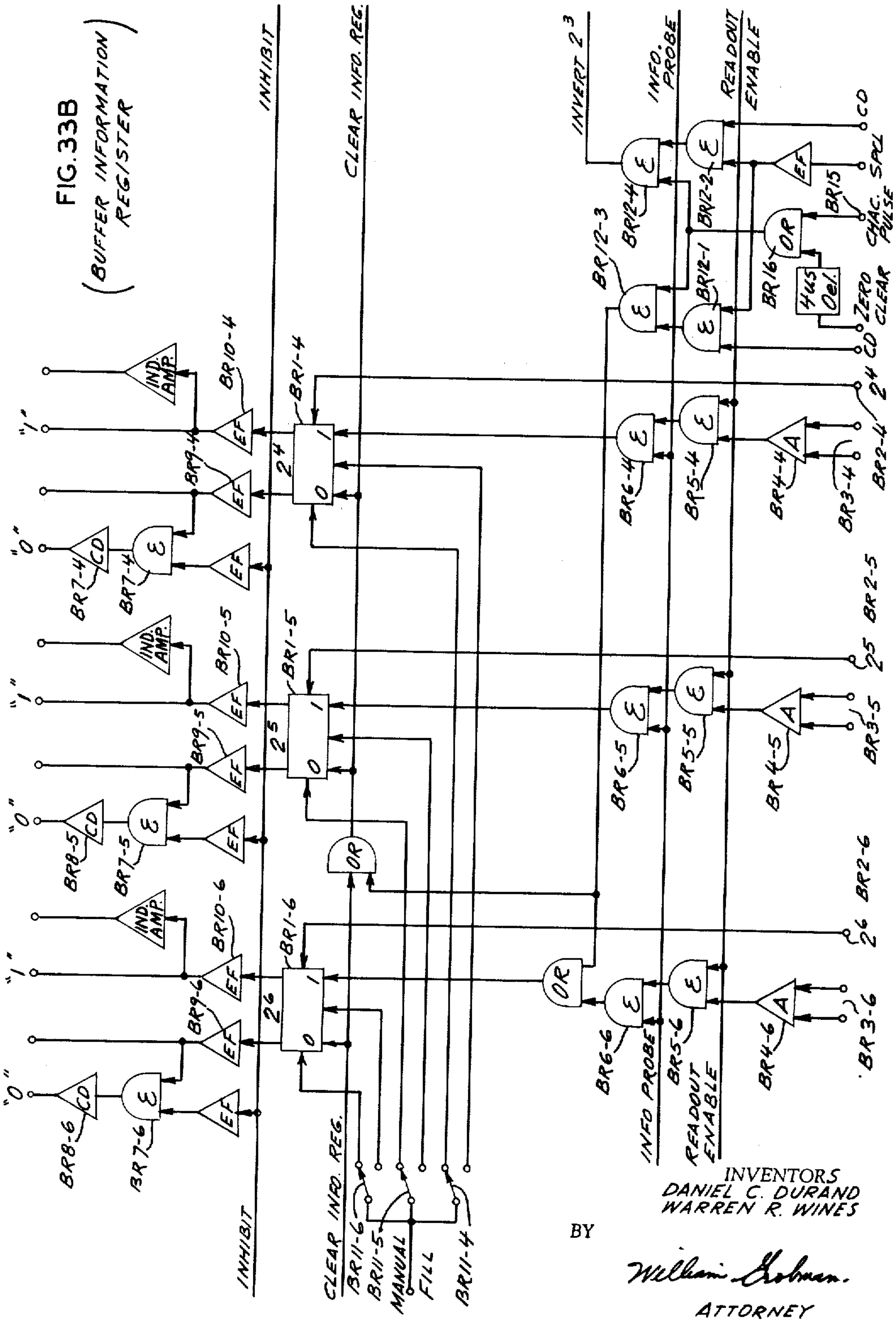
Figure 34:
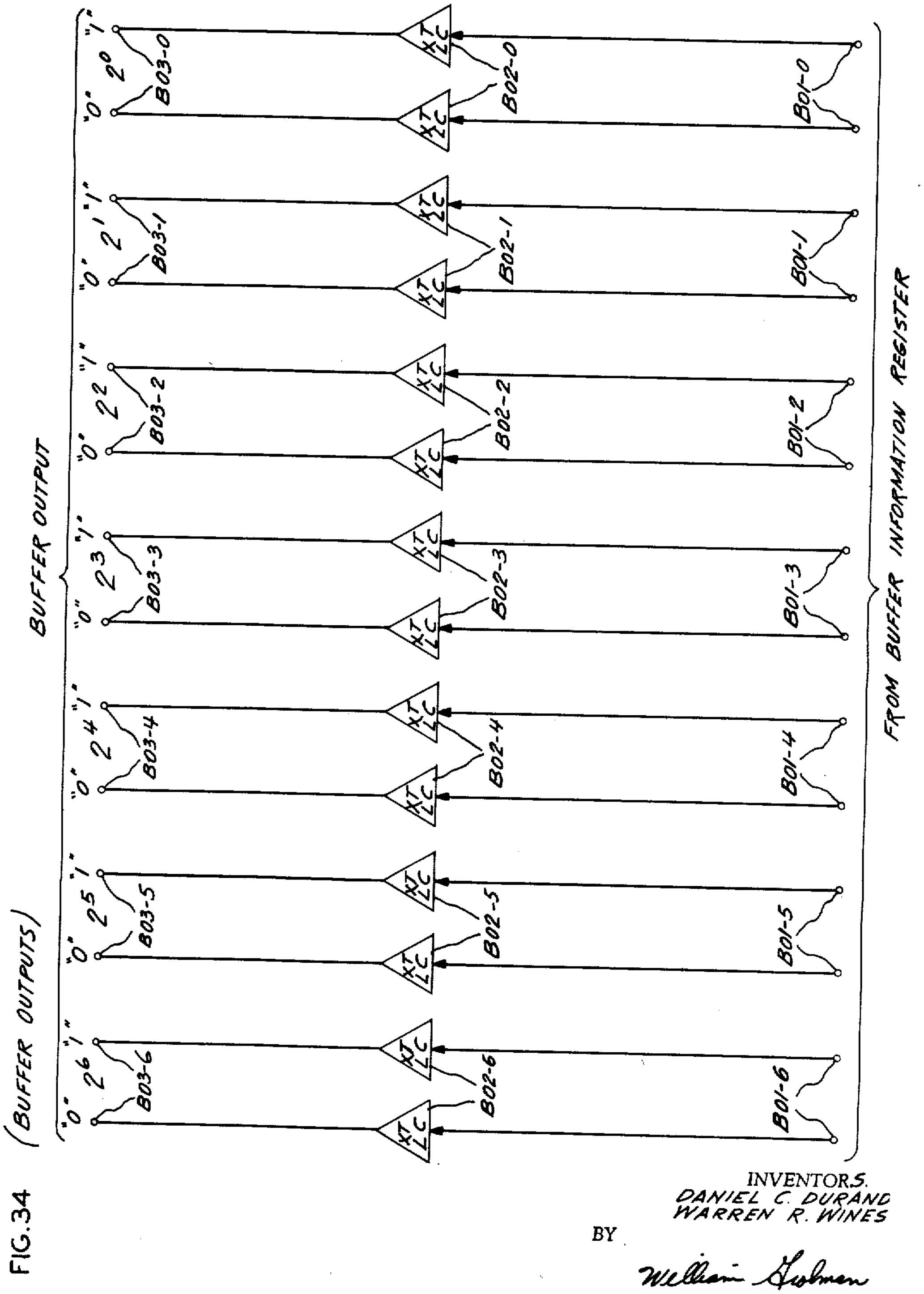
Figure 35:
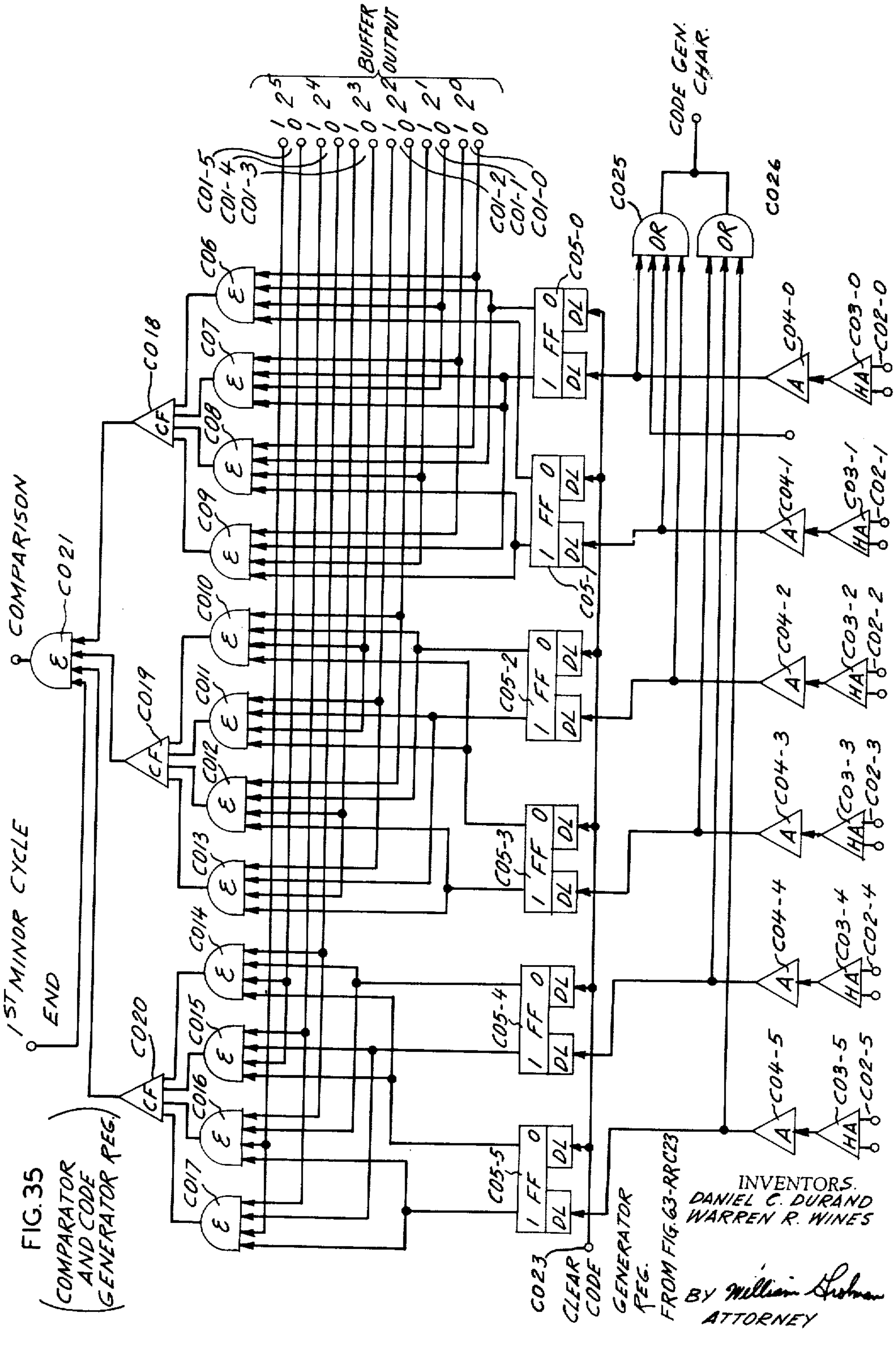
Figure 36:
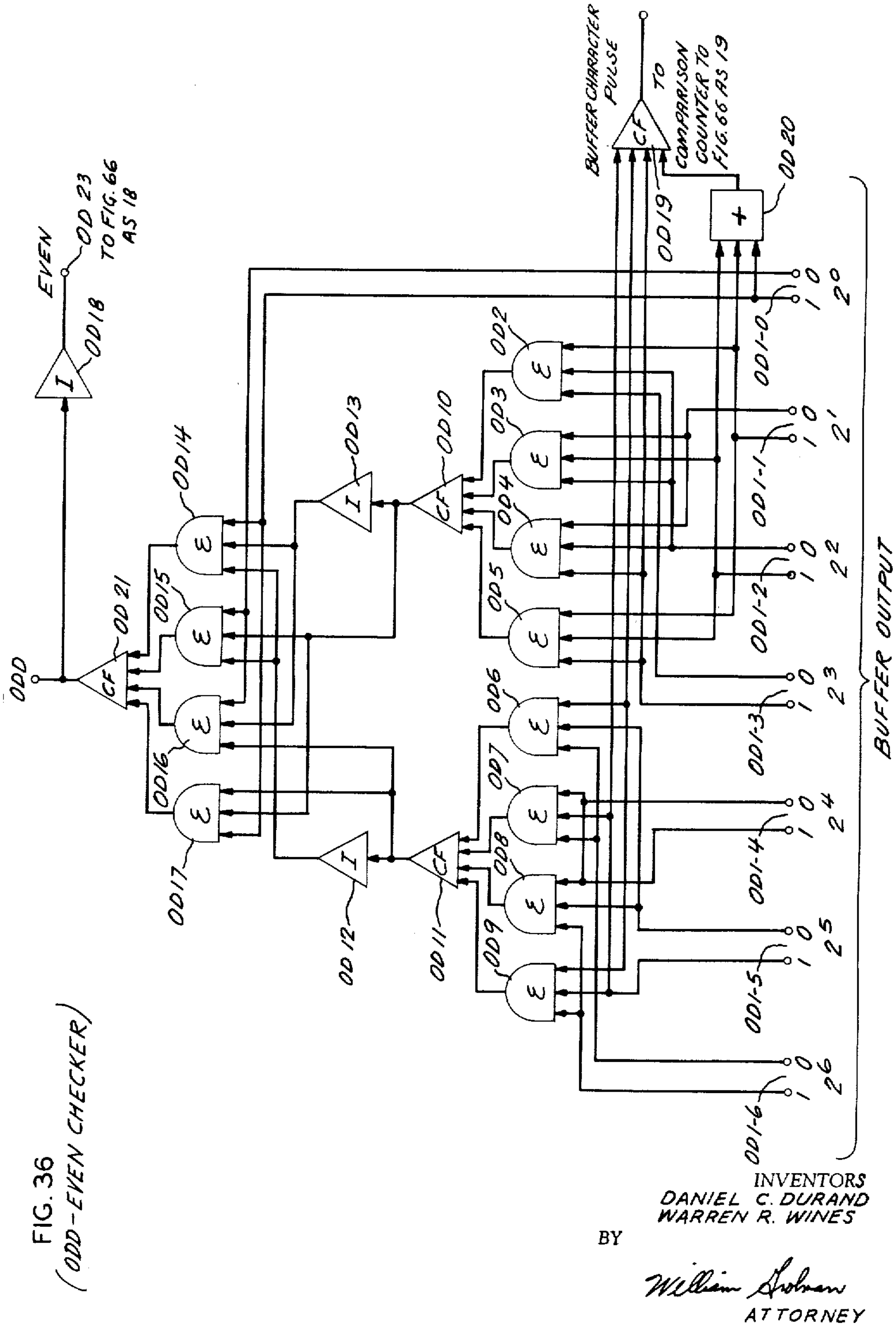
Figure 37:
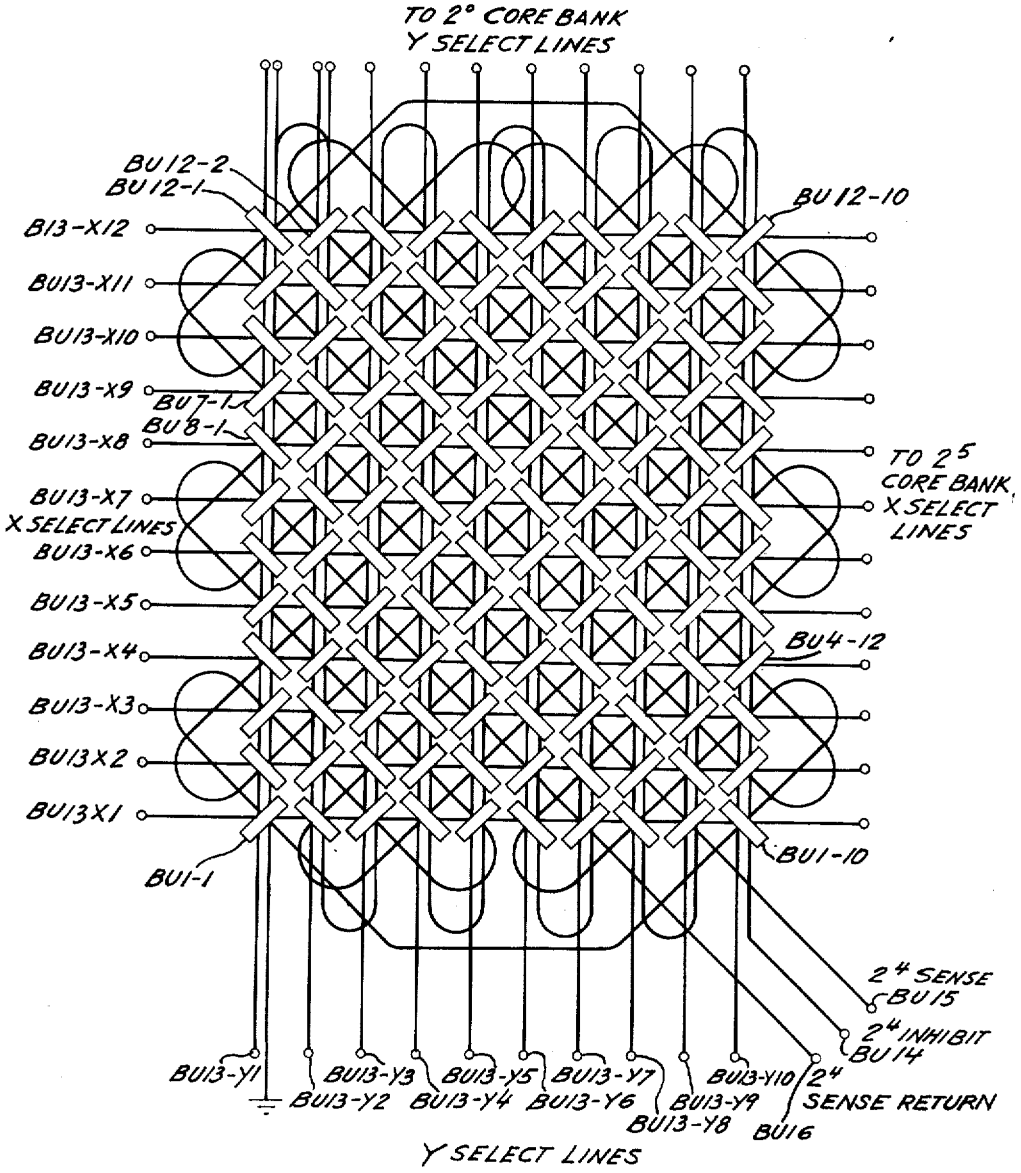
Figure 38:
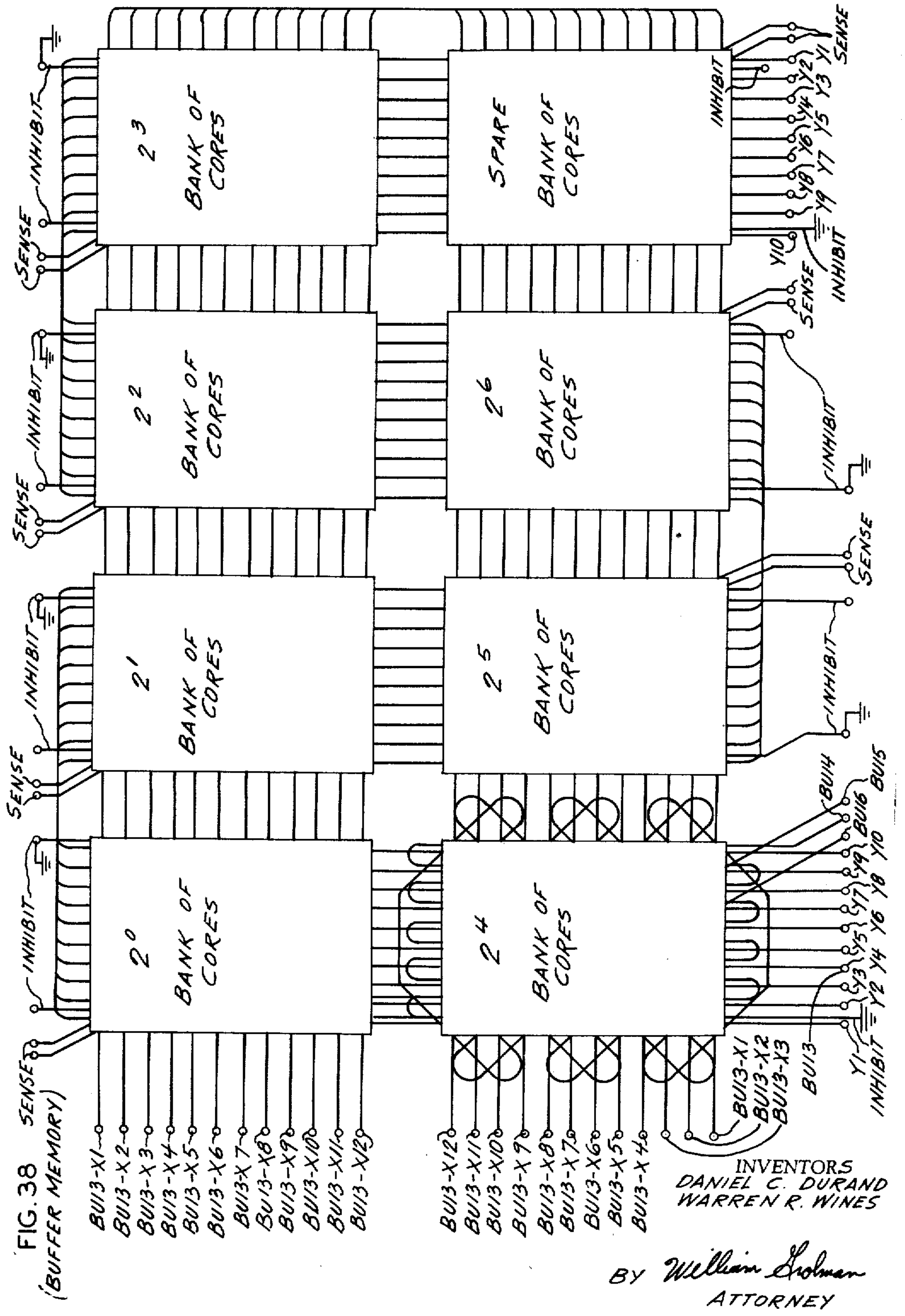
Figure 39:
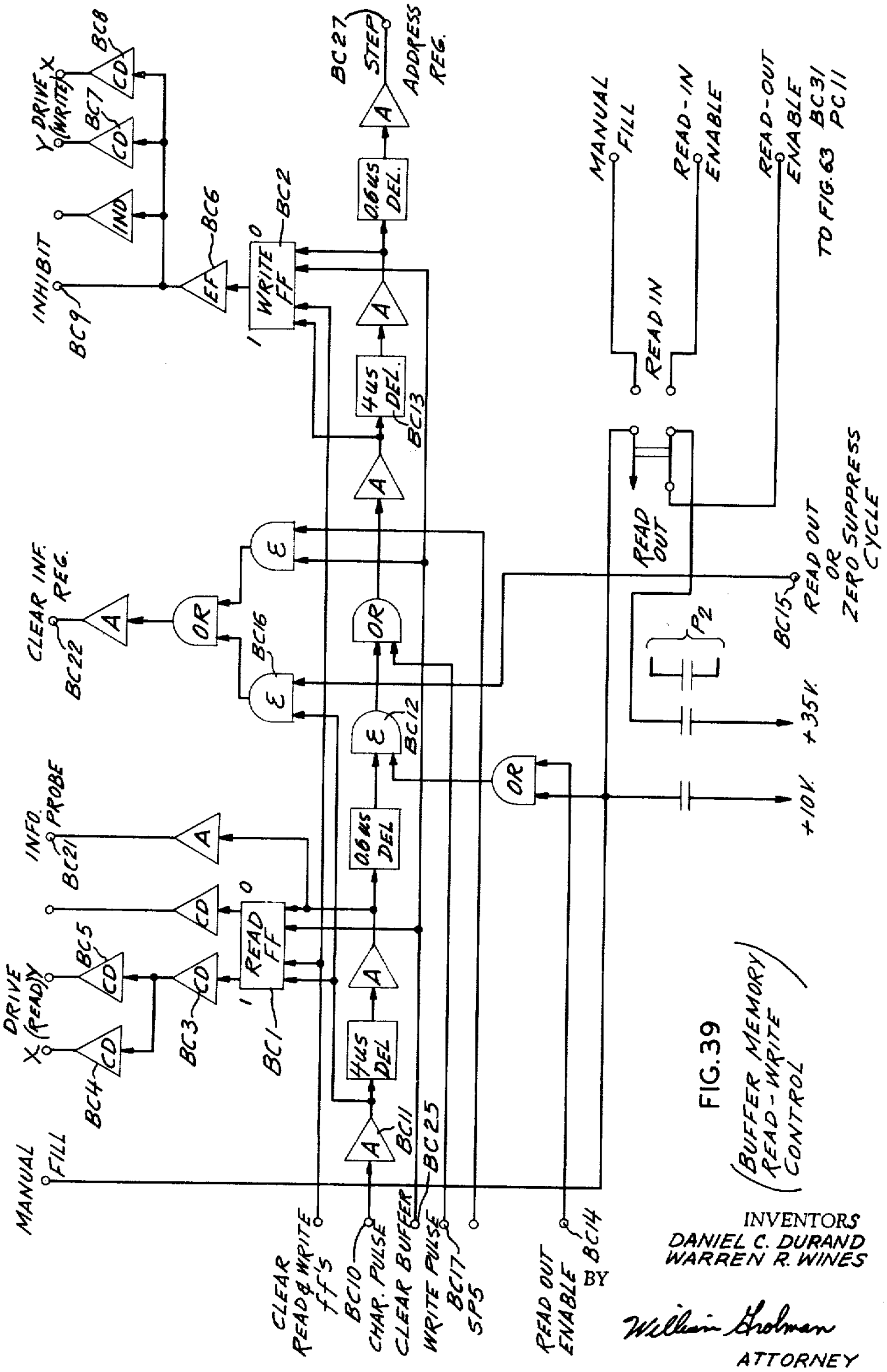
Figures 40A, 40C:
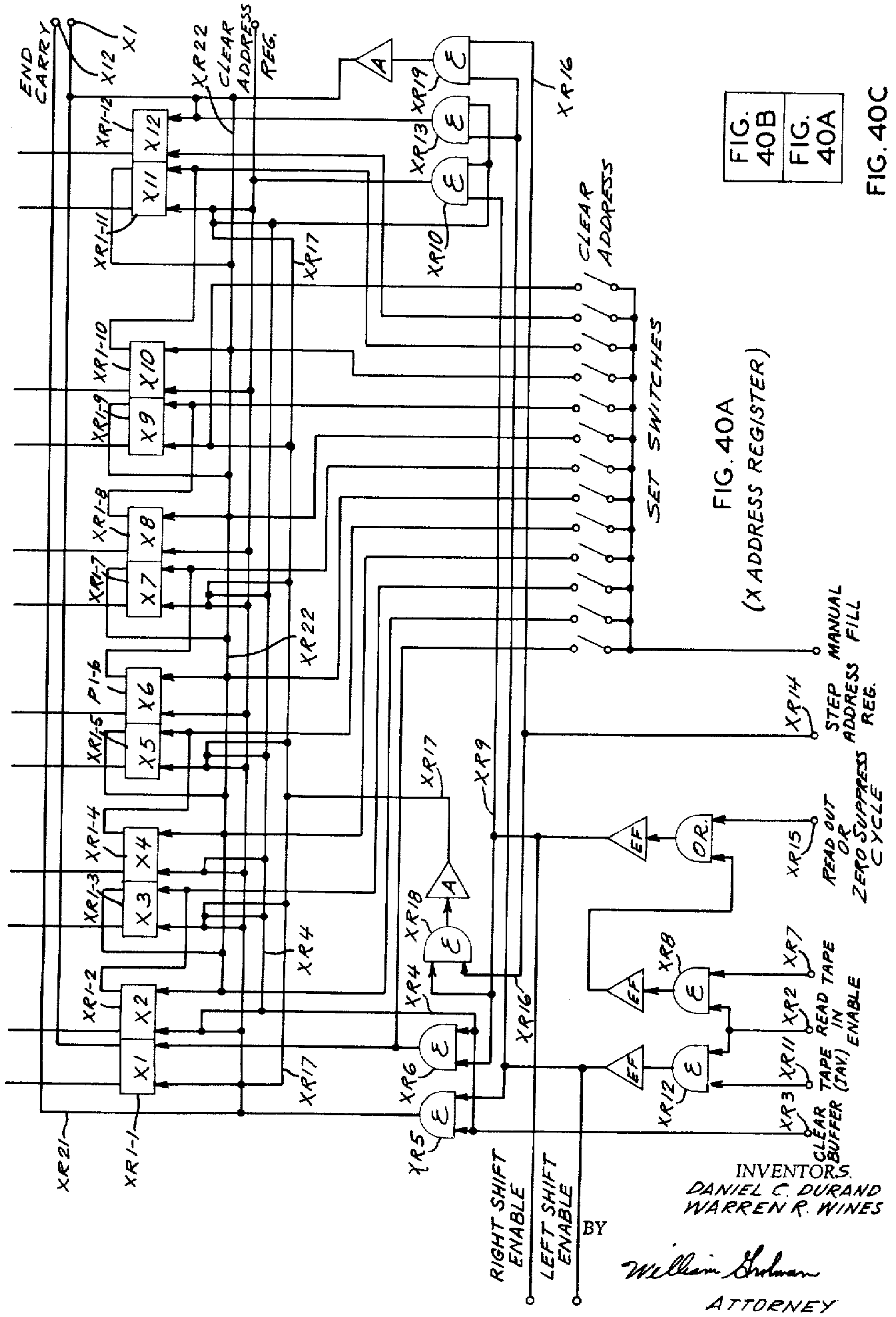
Figure 41:
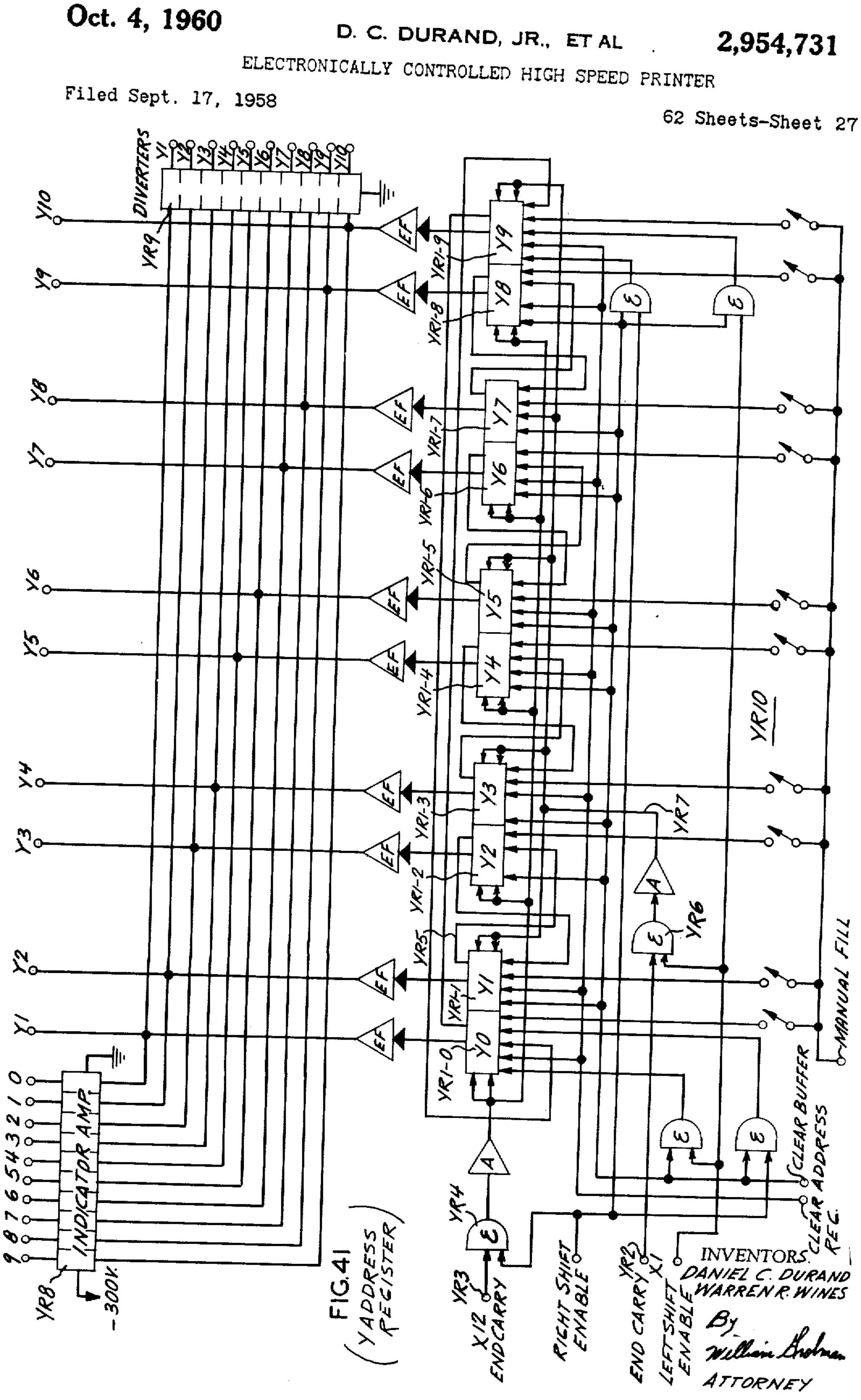
Figure 47:
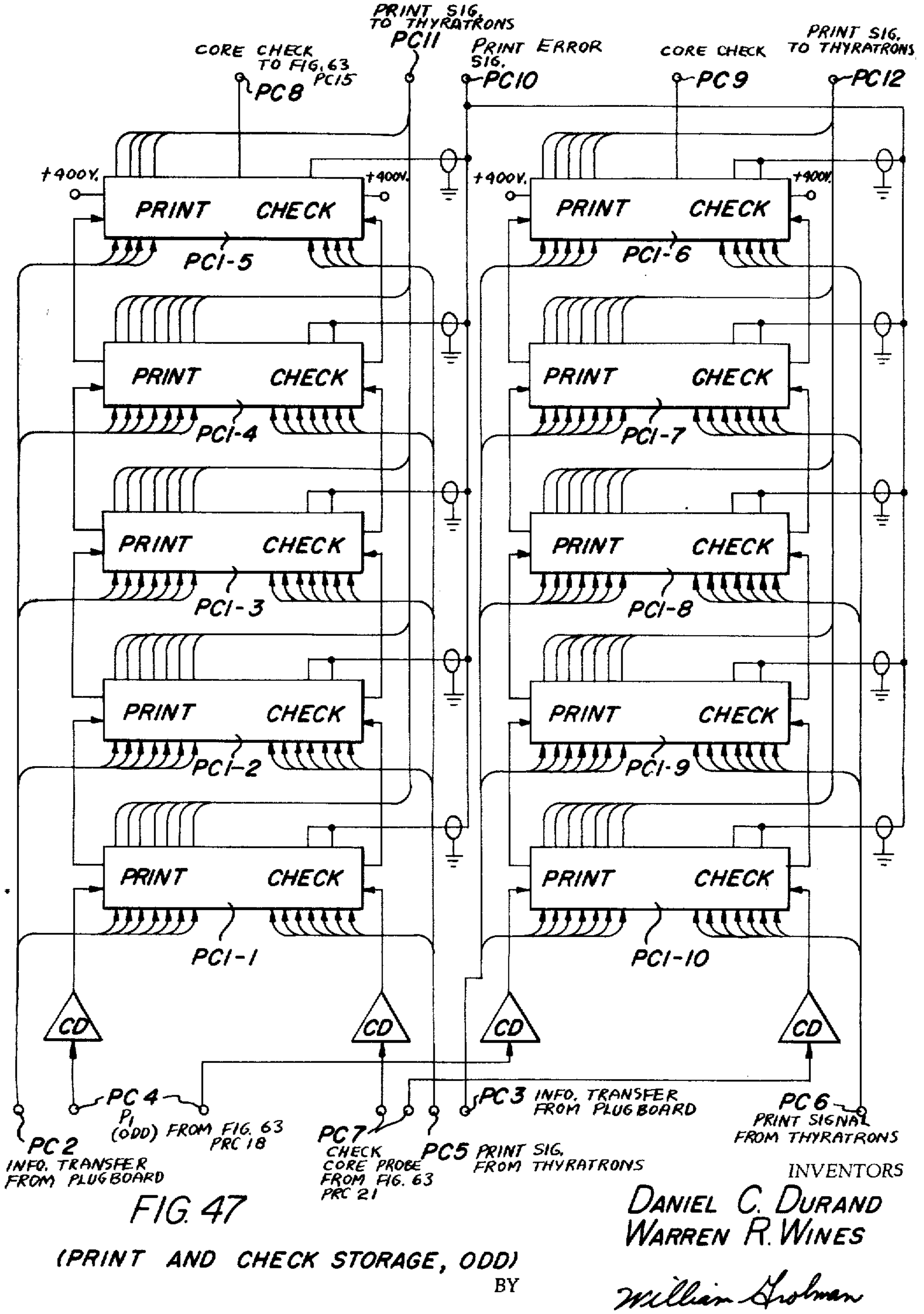
Figure 48:
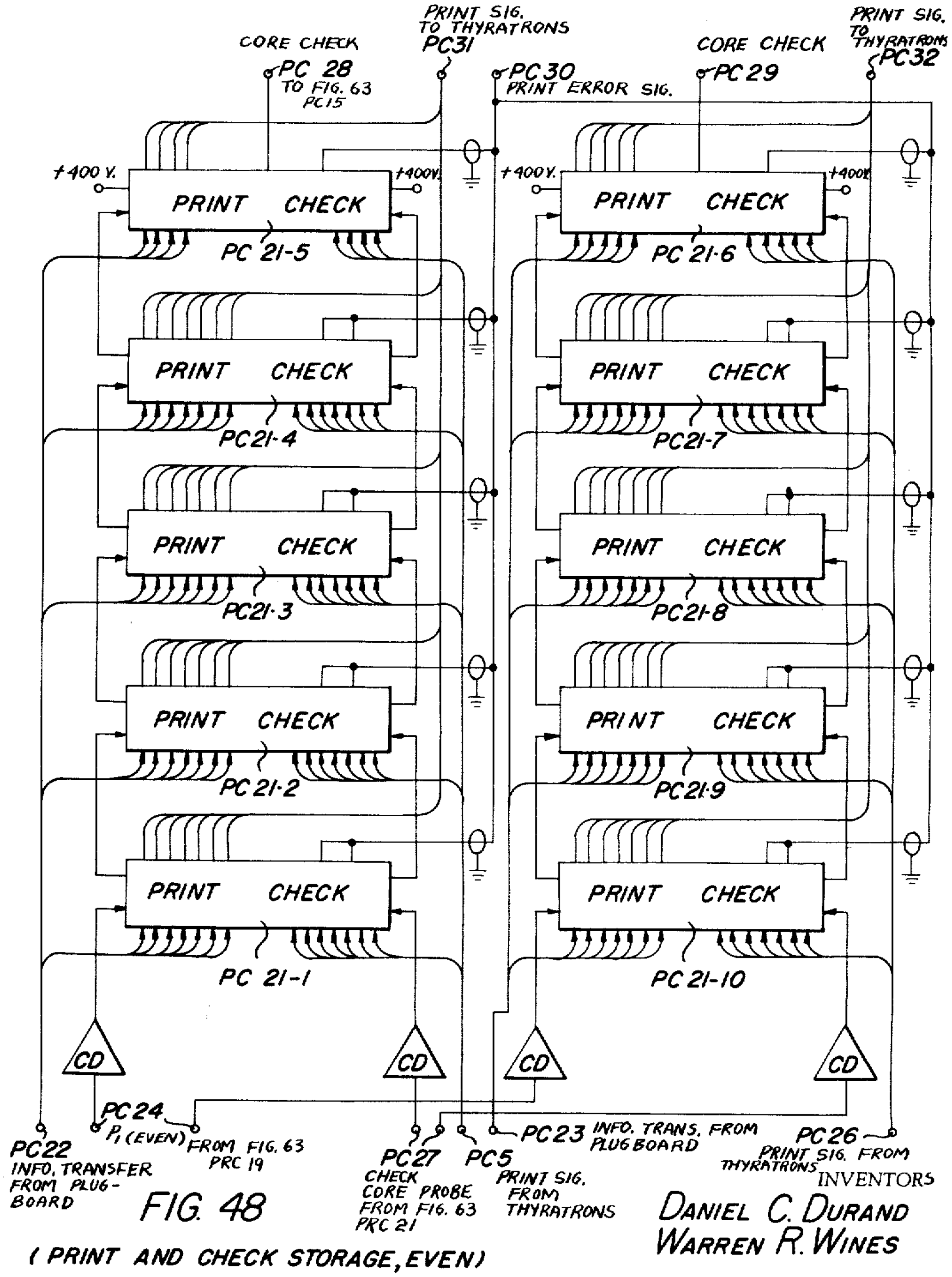
Figure 49:
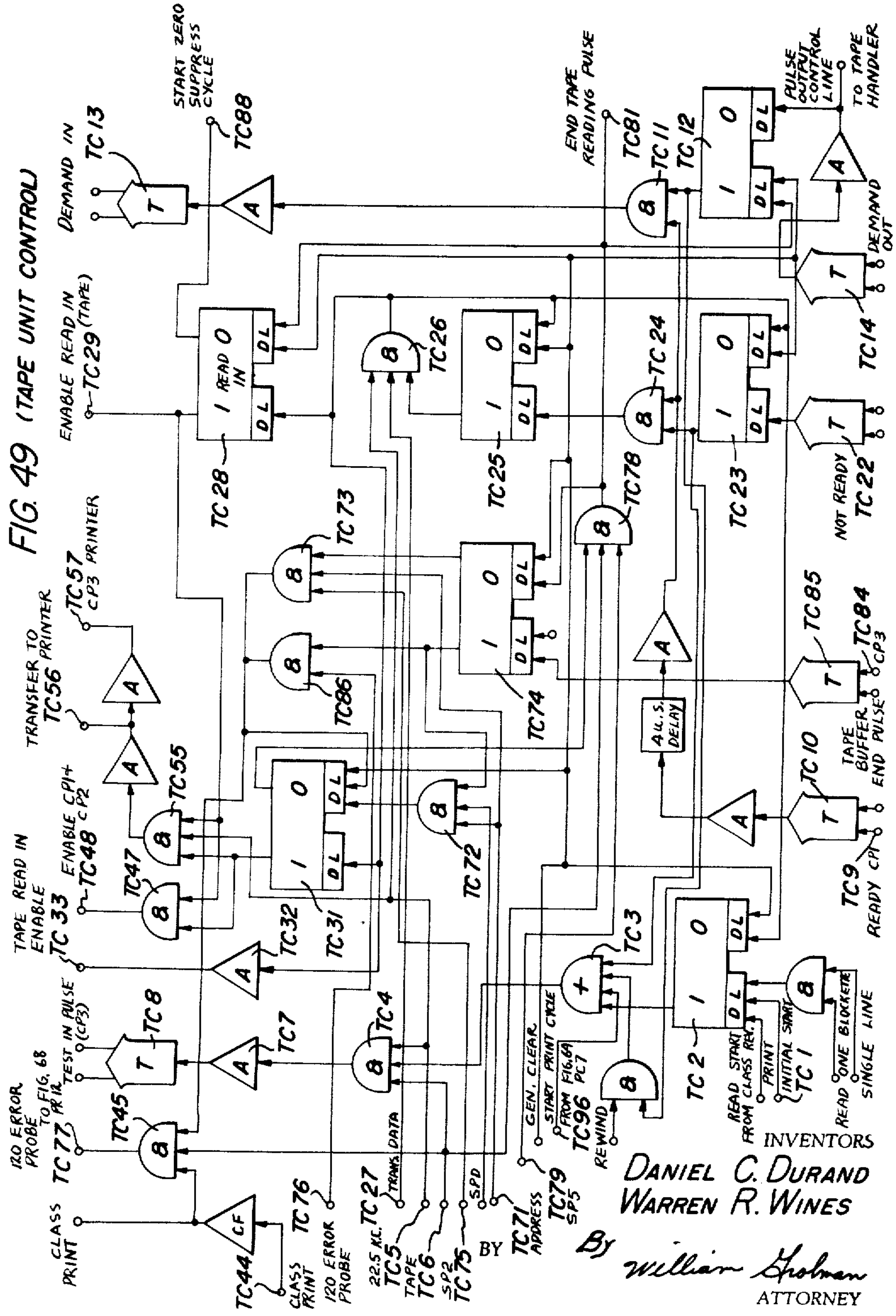
Figure 50:
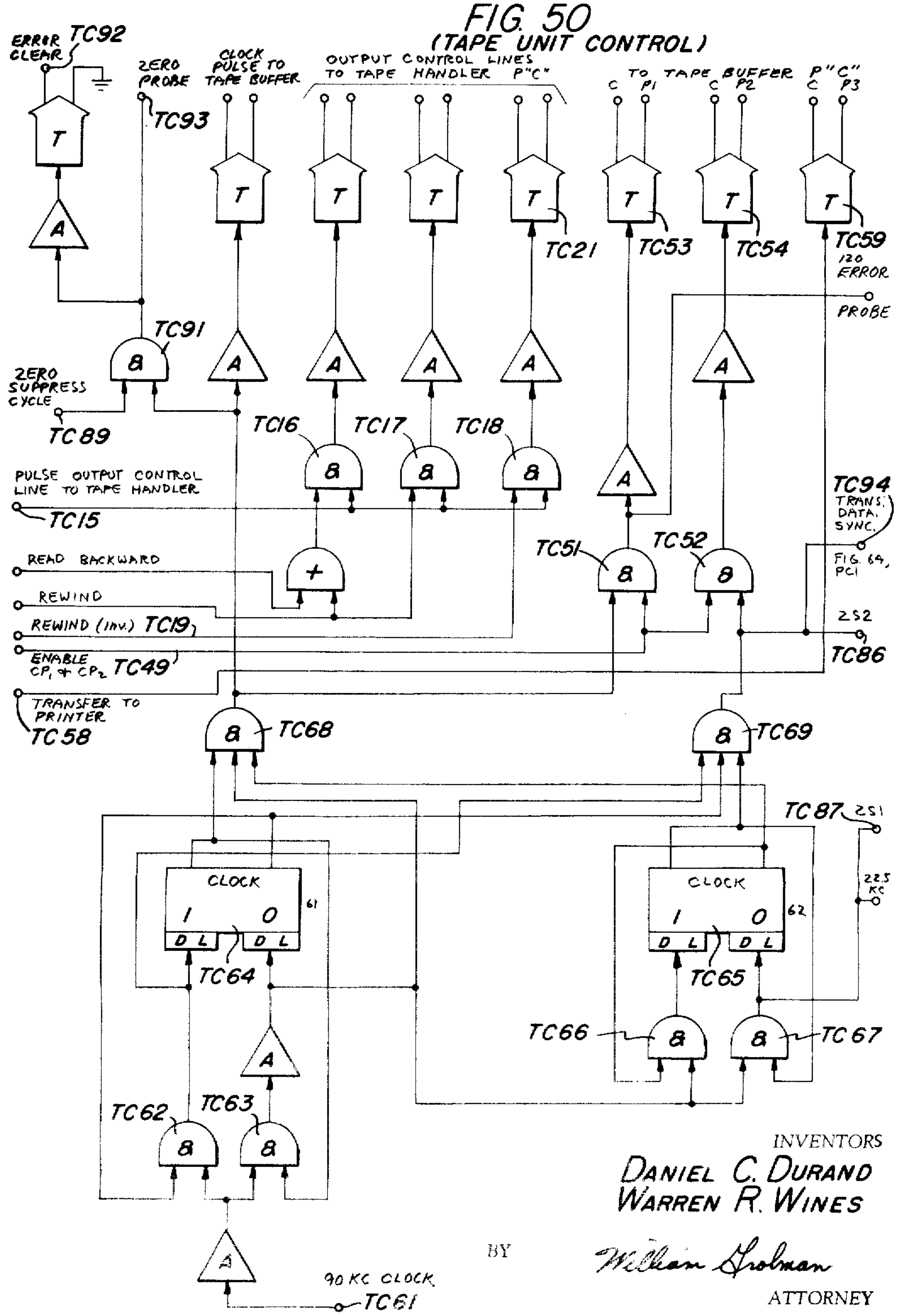
Figure 51:
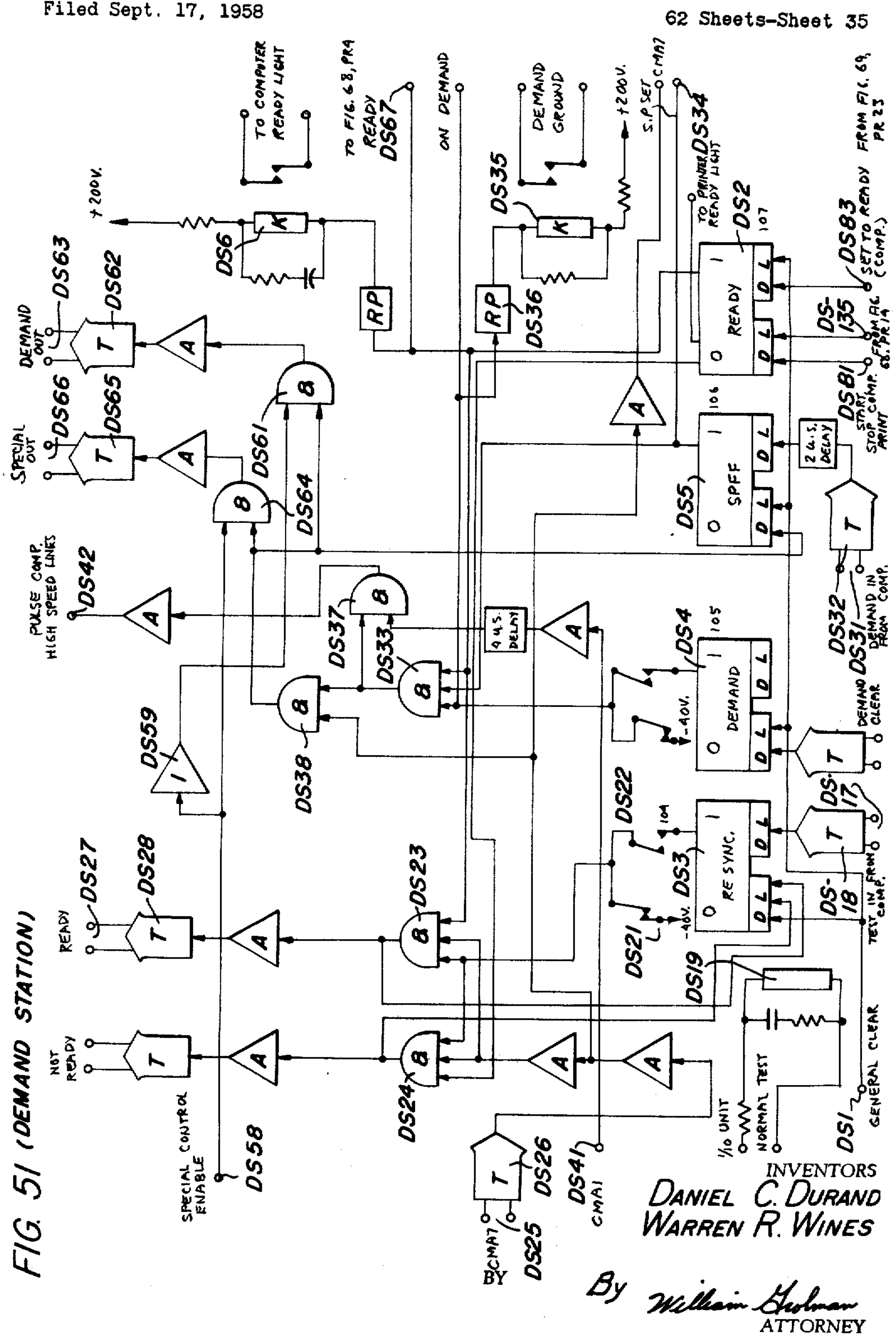
Figure 52:
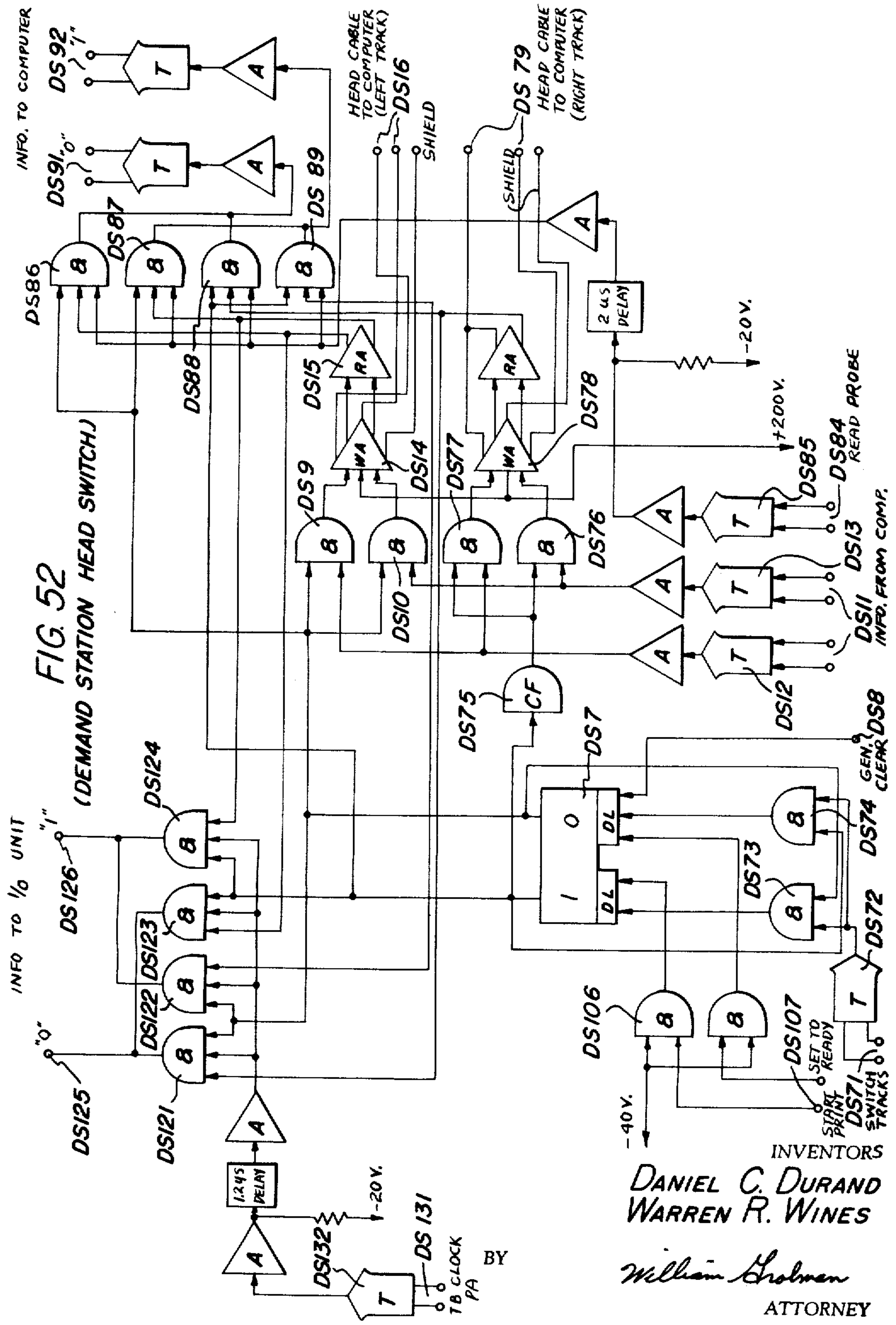
Figure 53:
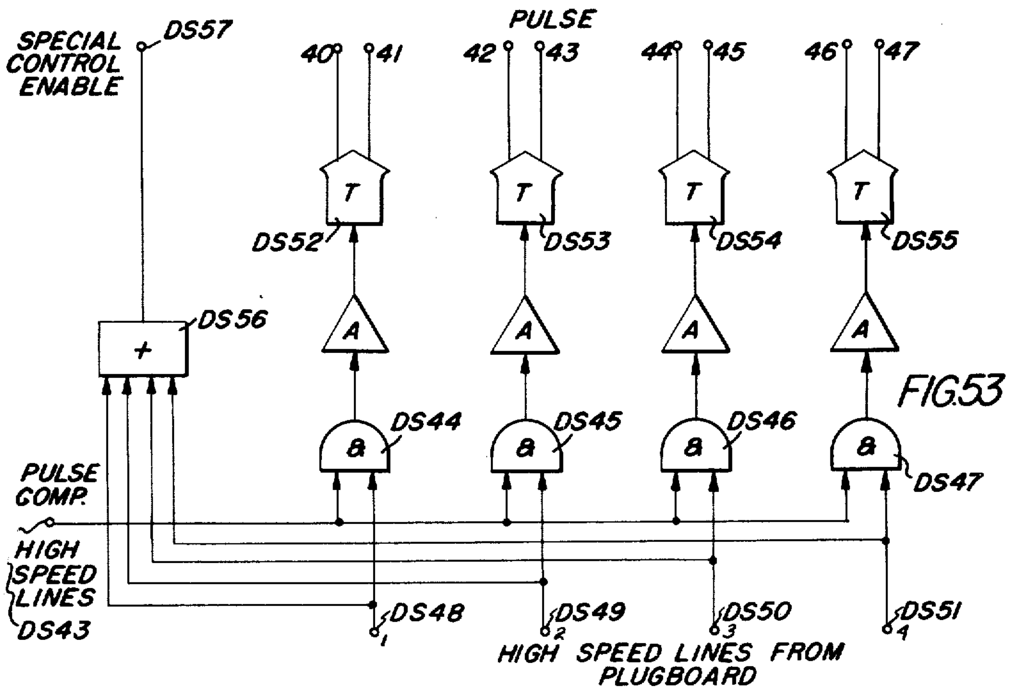
Figure 54:
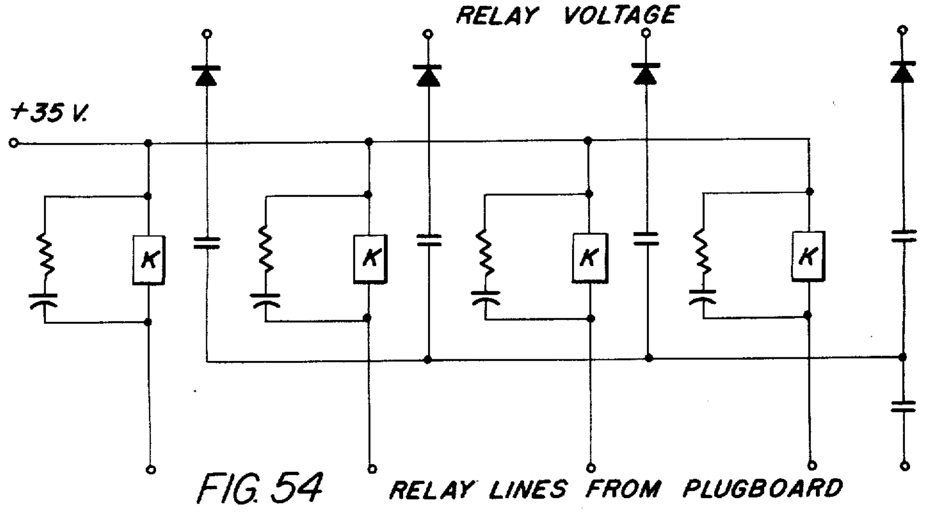
Figure 55:
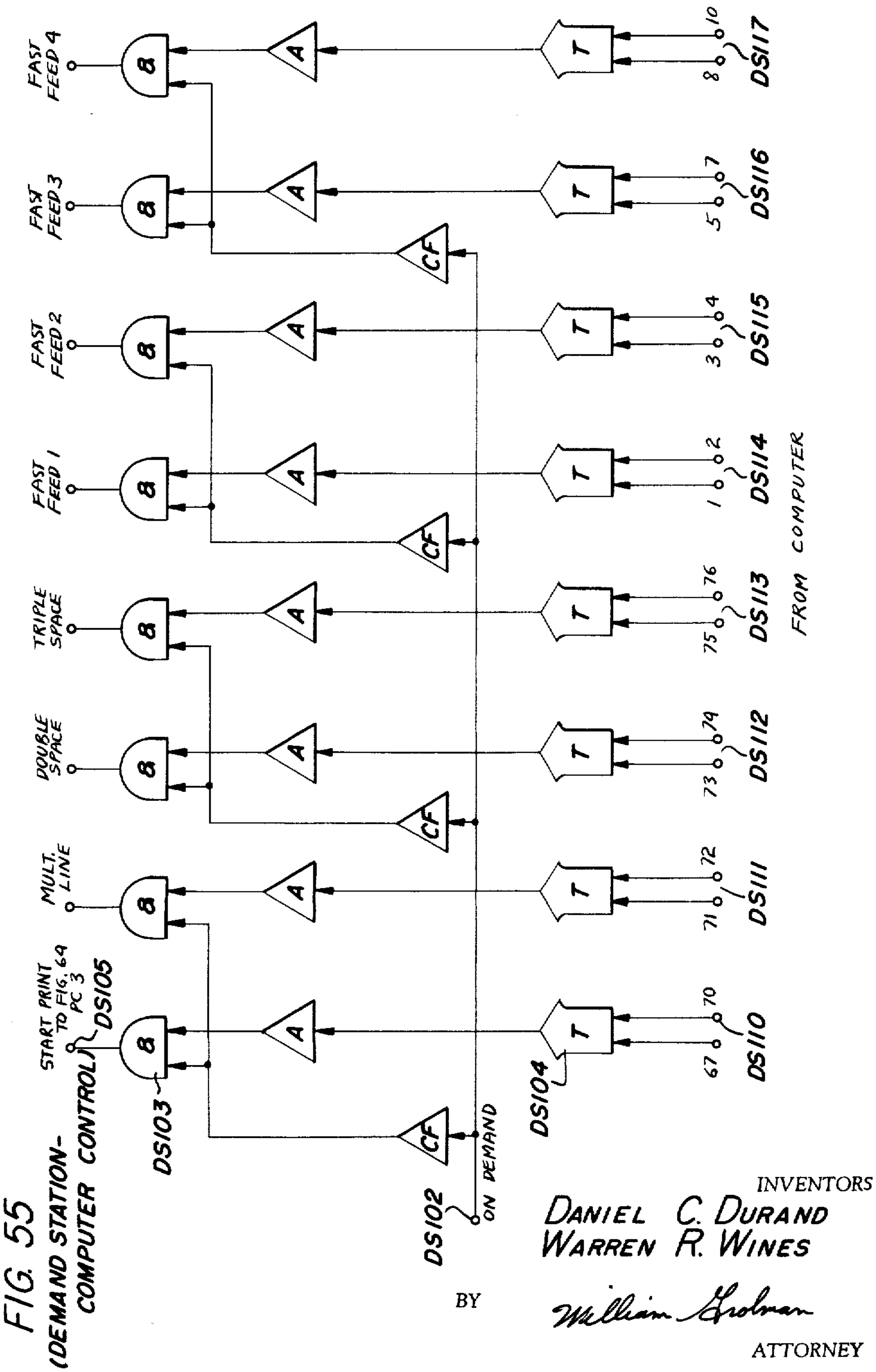
Figure 56A:
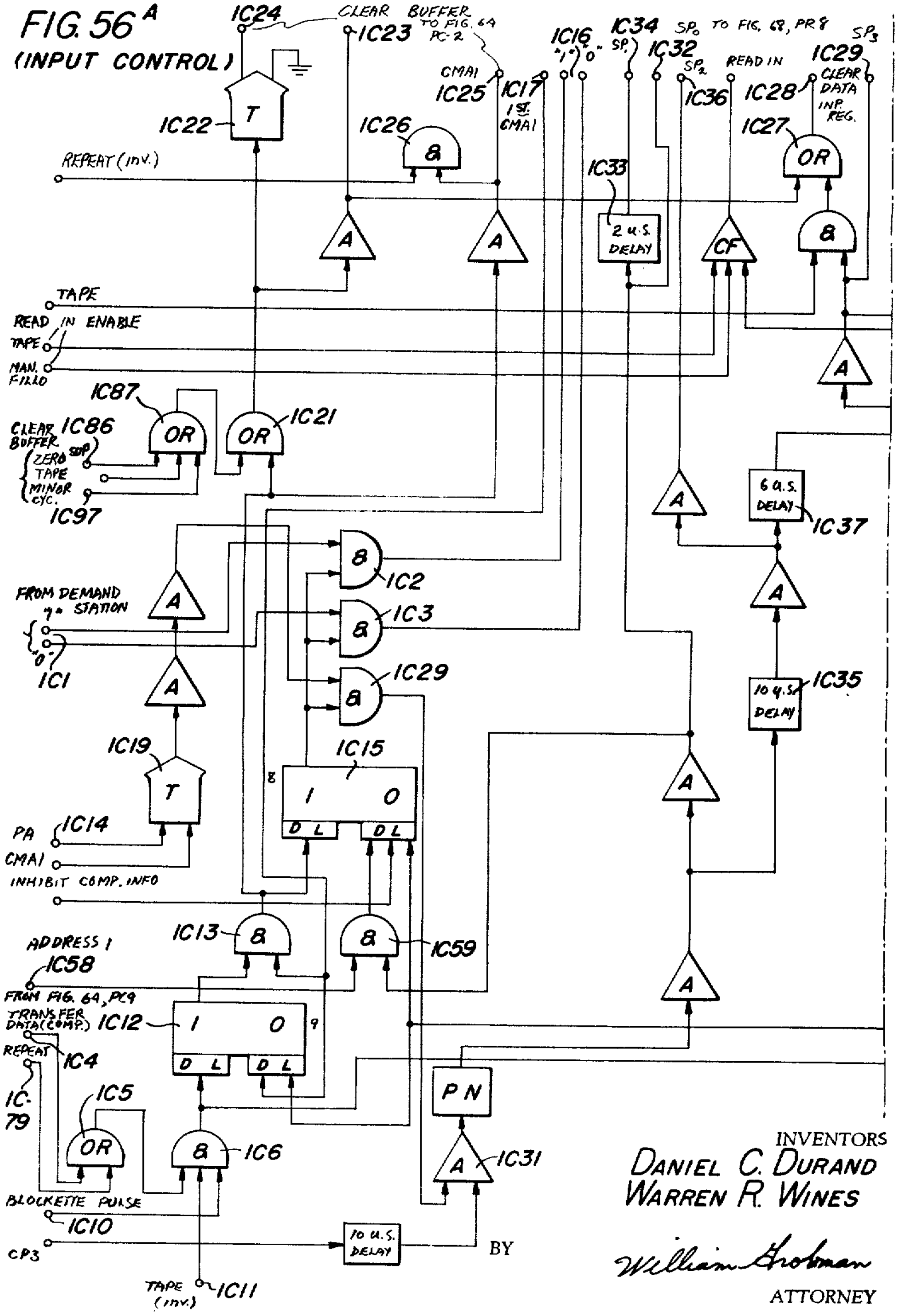
Figure 59:
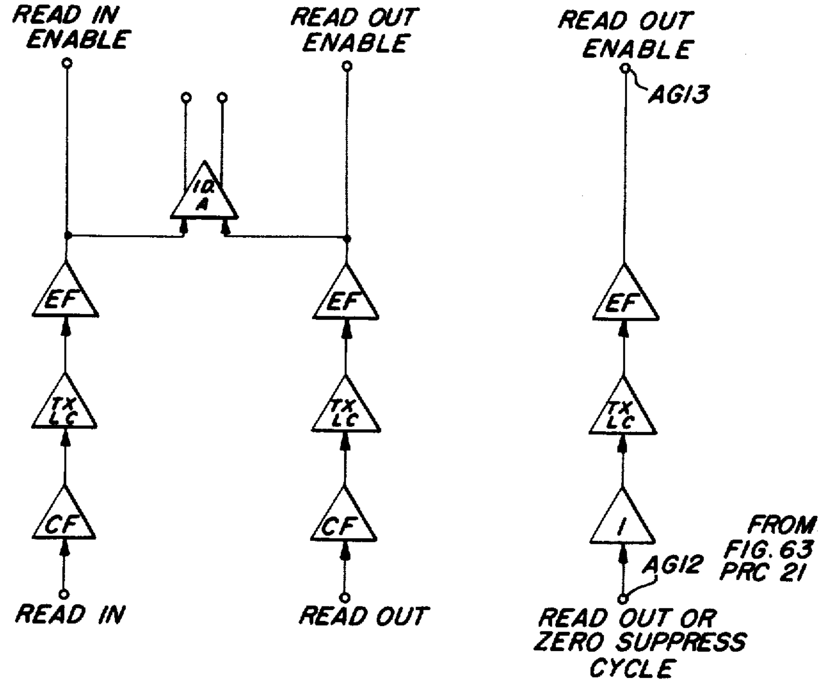
Figure 58:
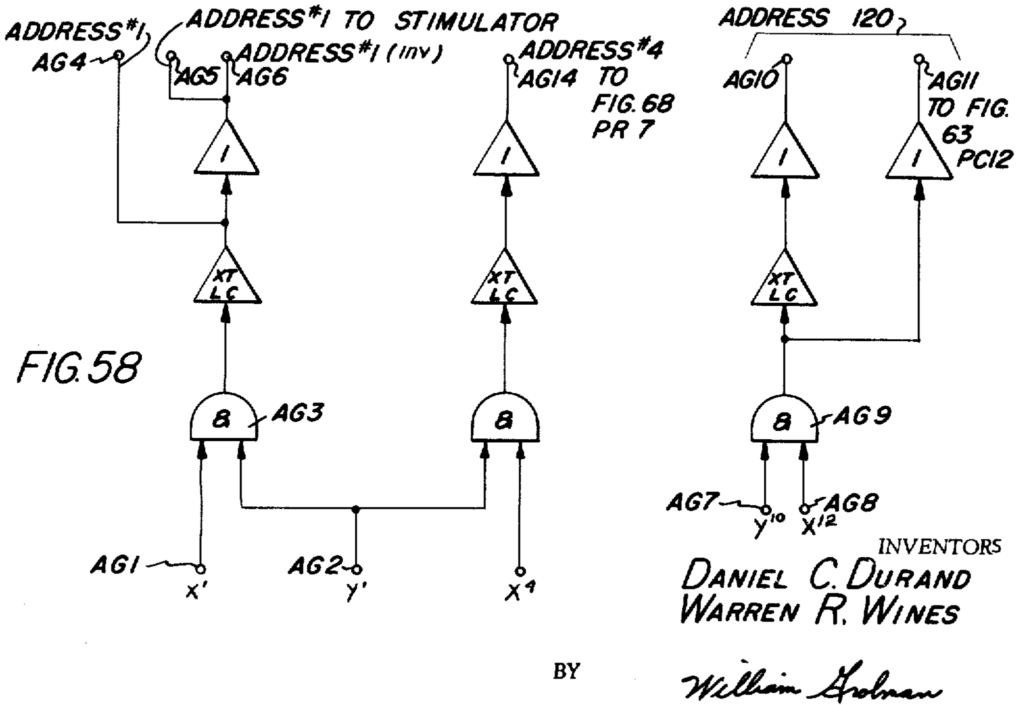
Figure 61:
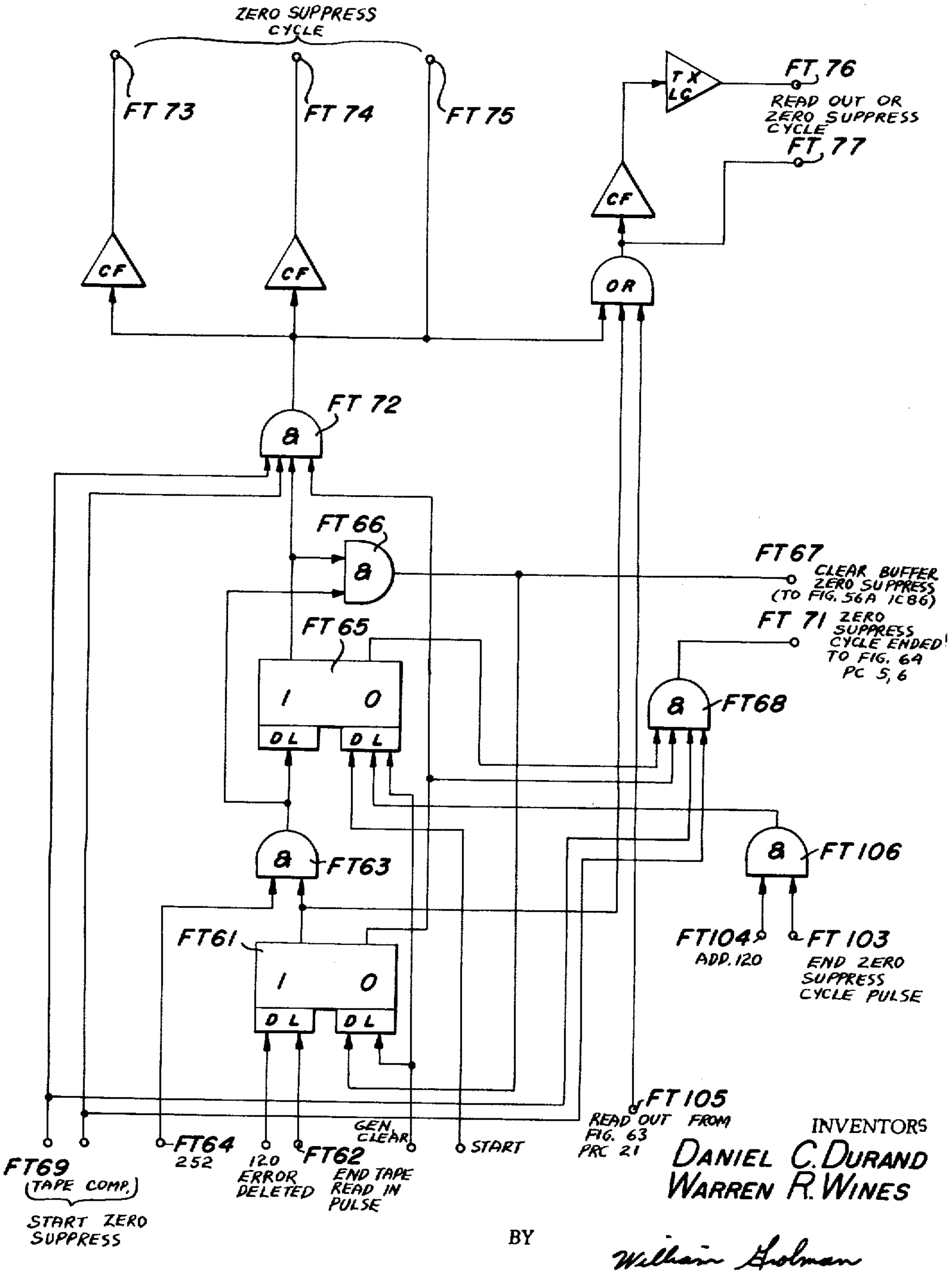
Figure 63A:
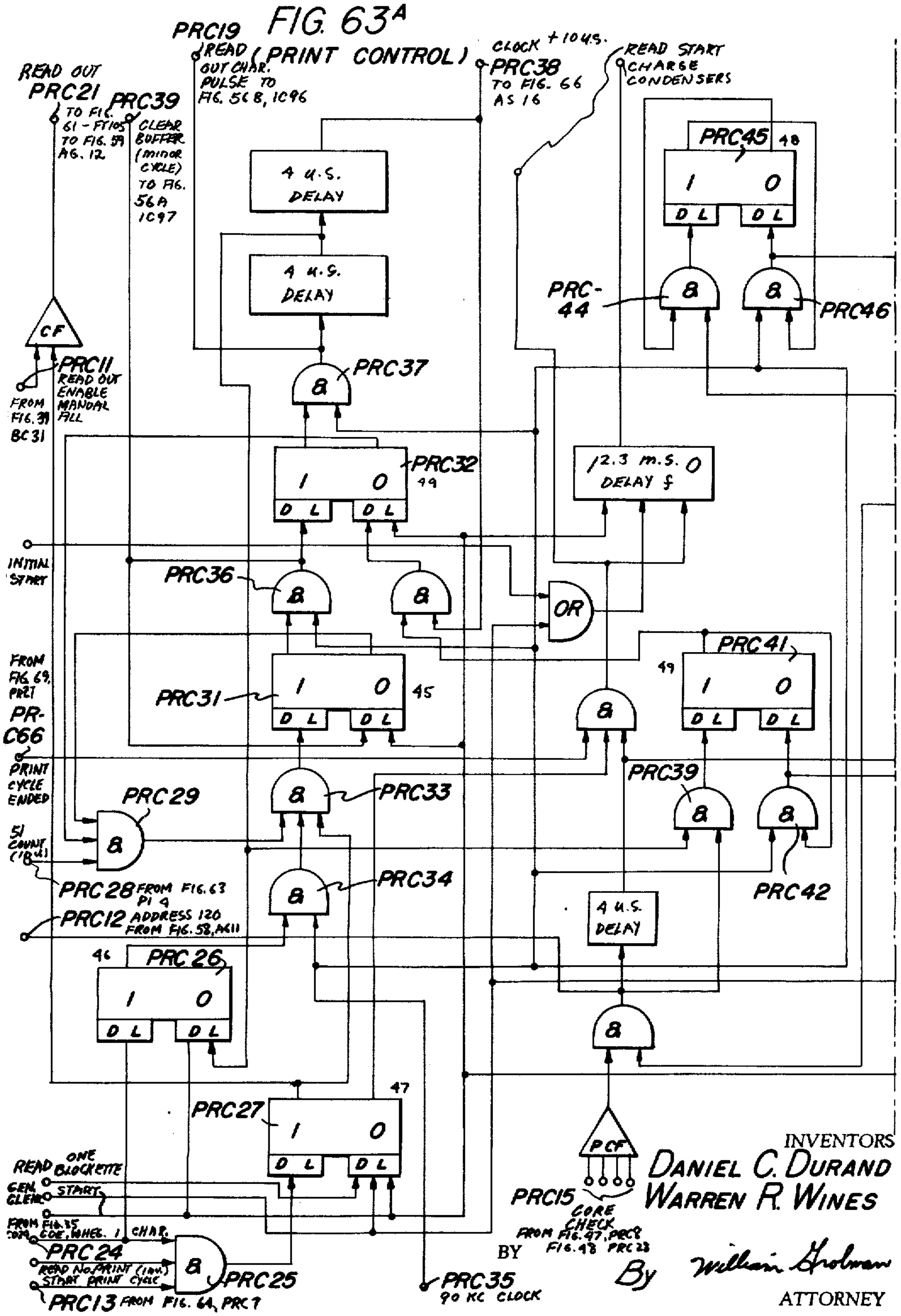
Figure 63C:
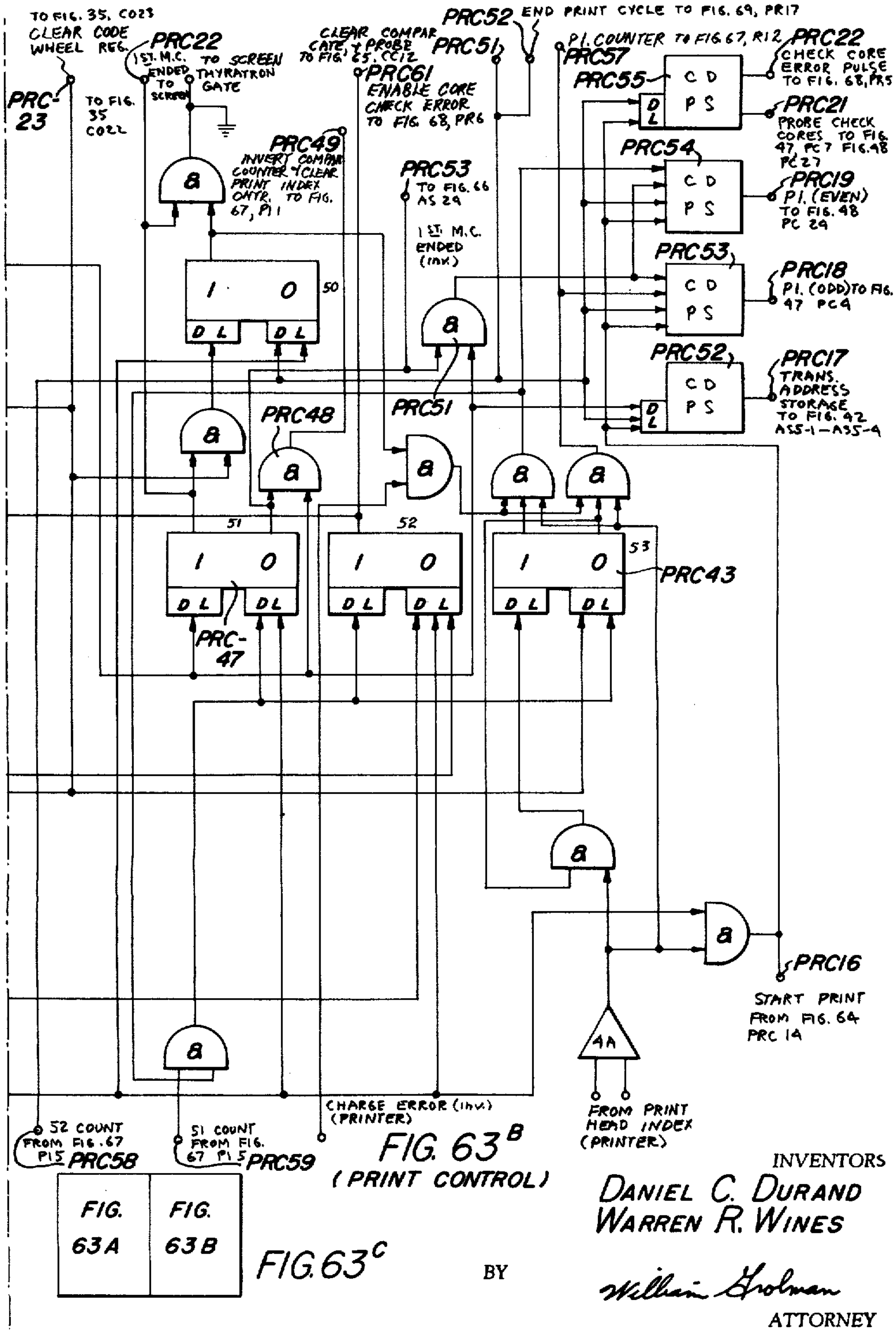
Figure 65:
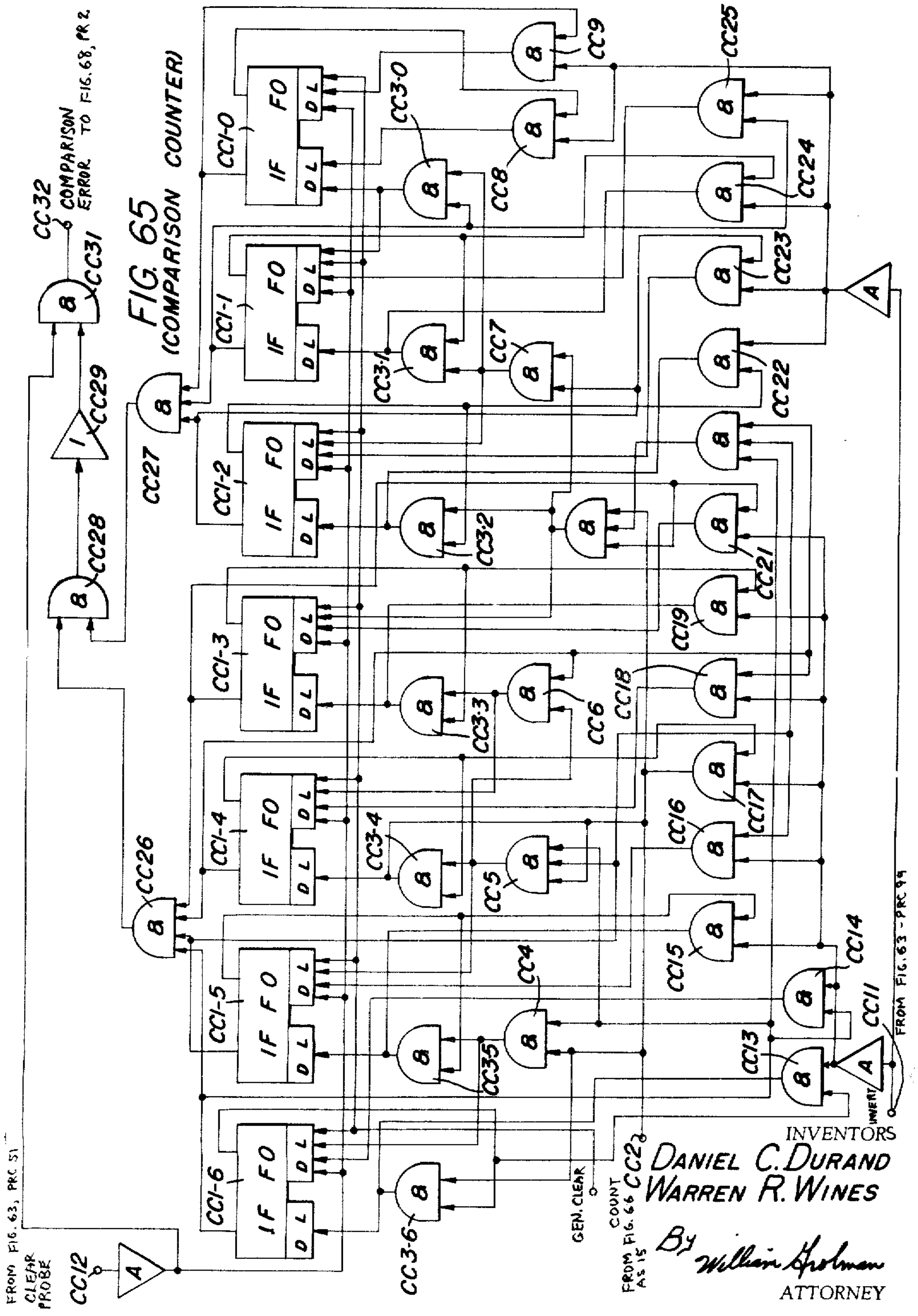
Figure 66:
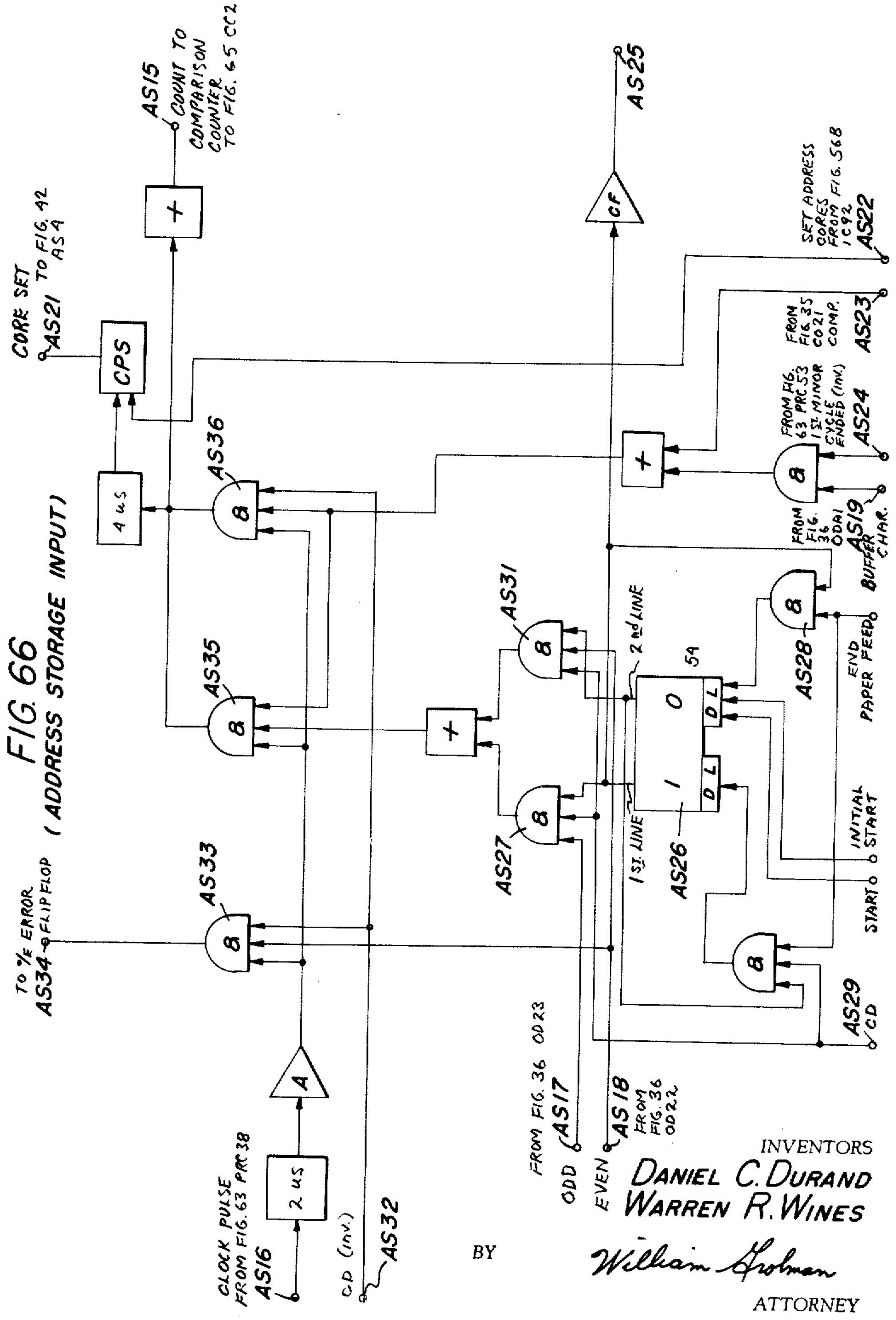
Figure 67:
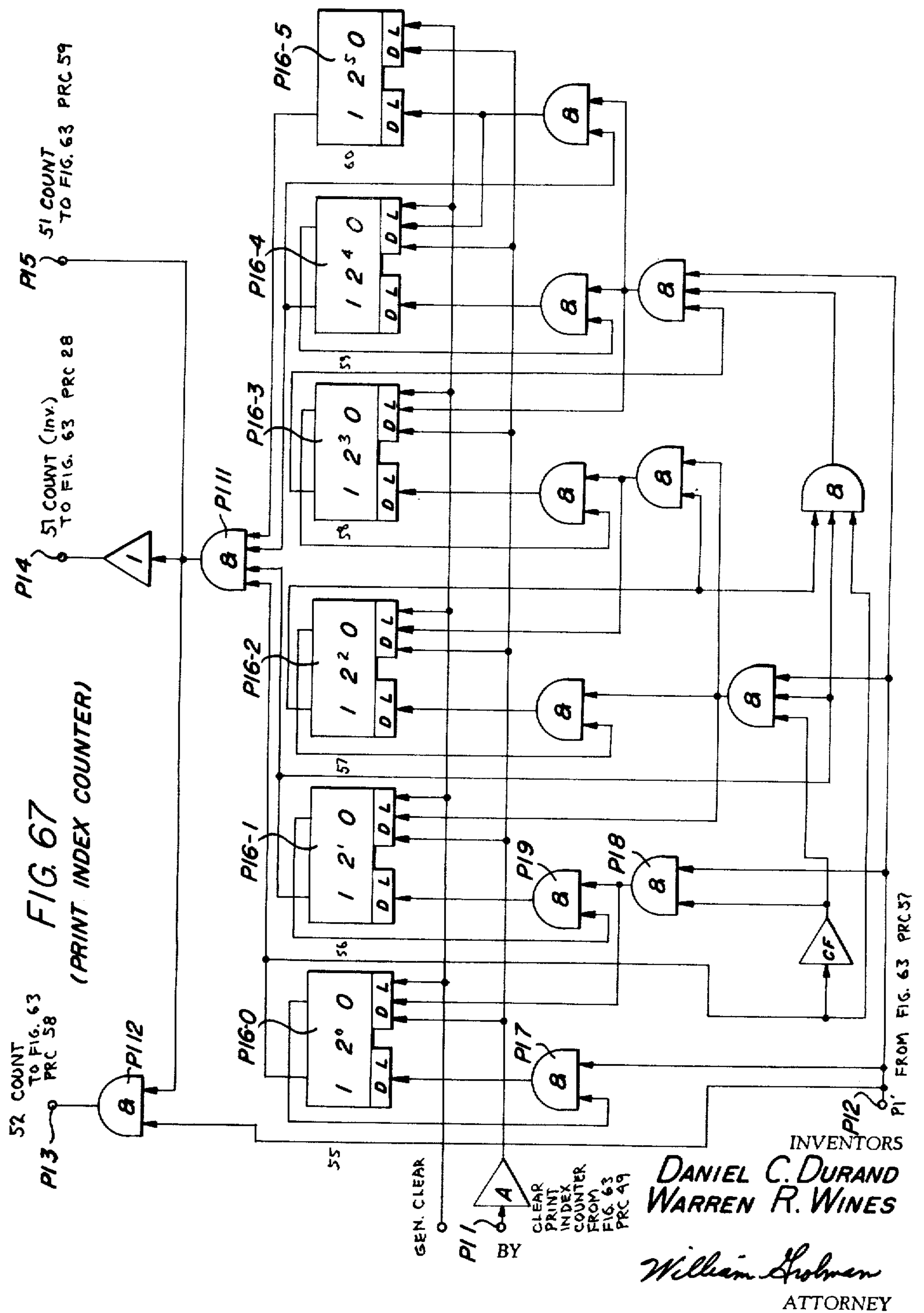
Figure 68:
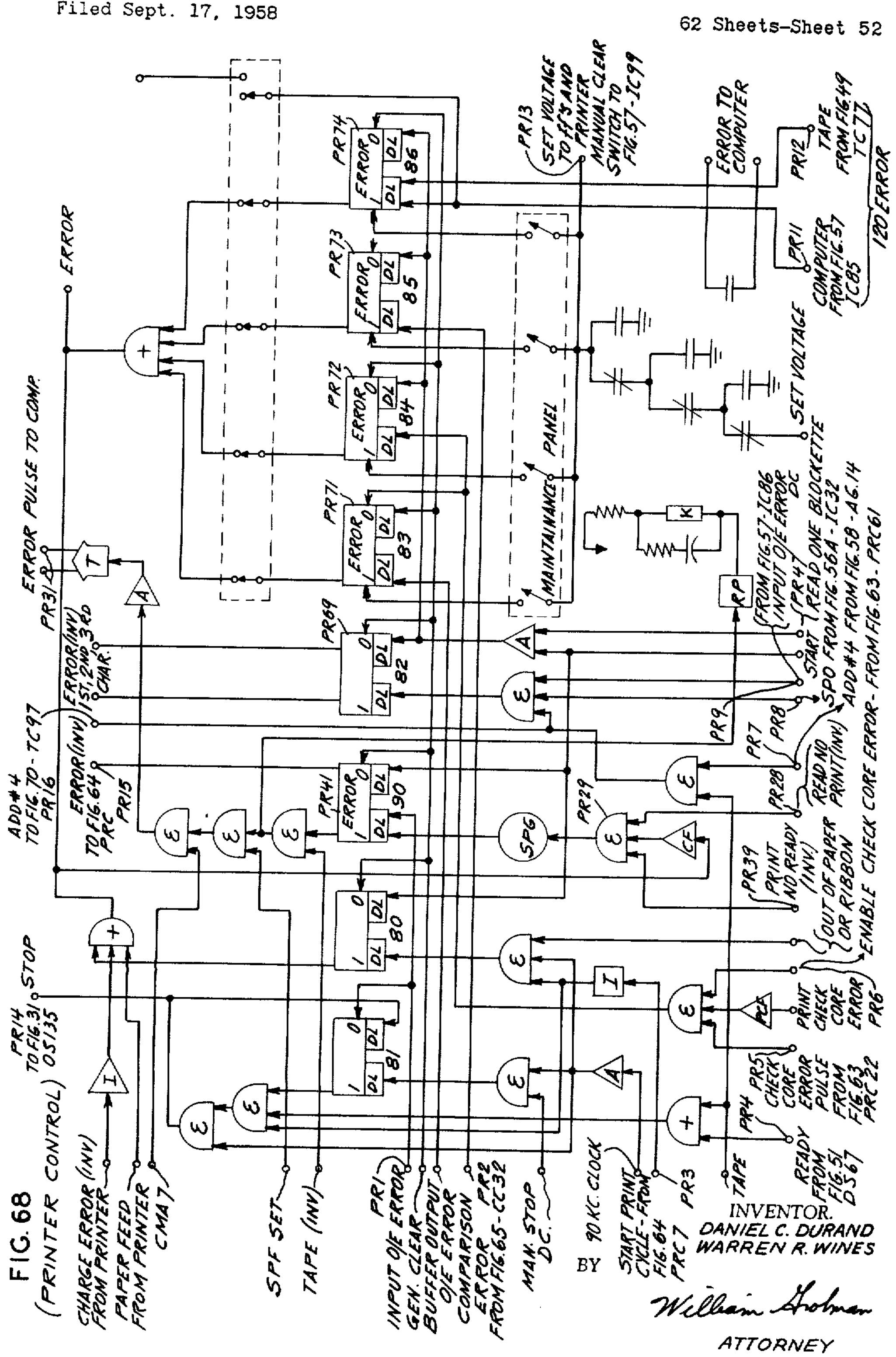
Figure 69:
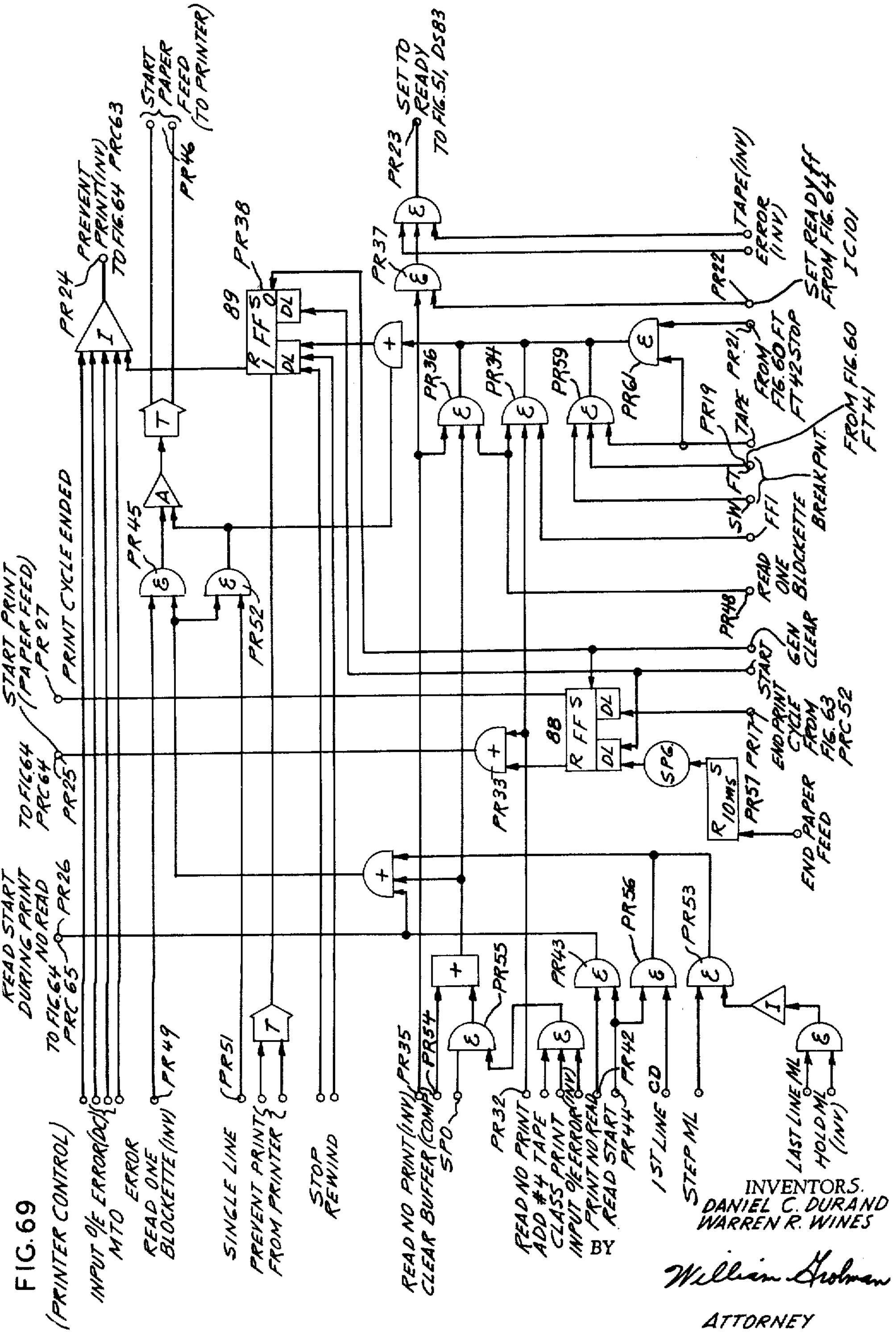
Figure 72A:
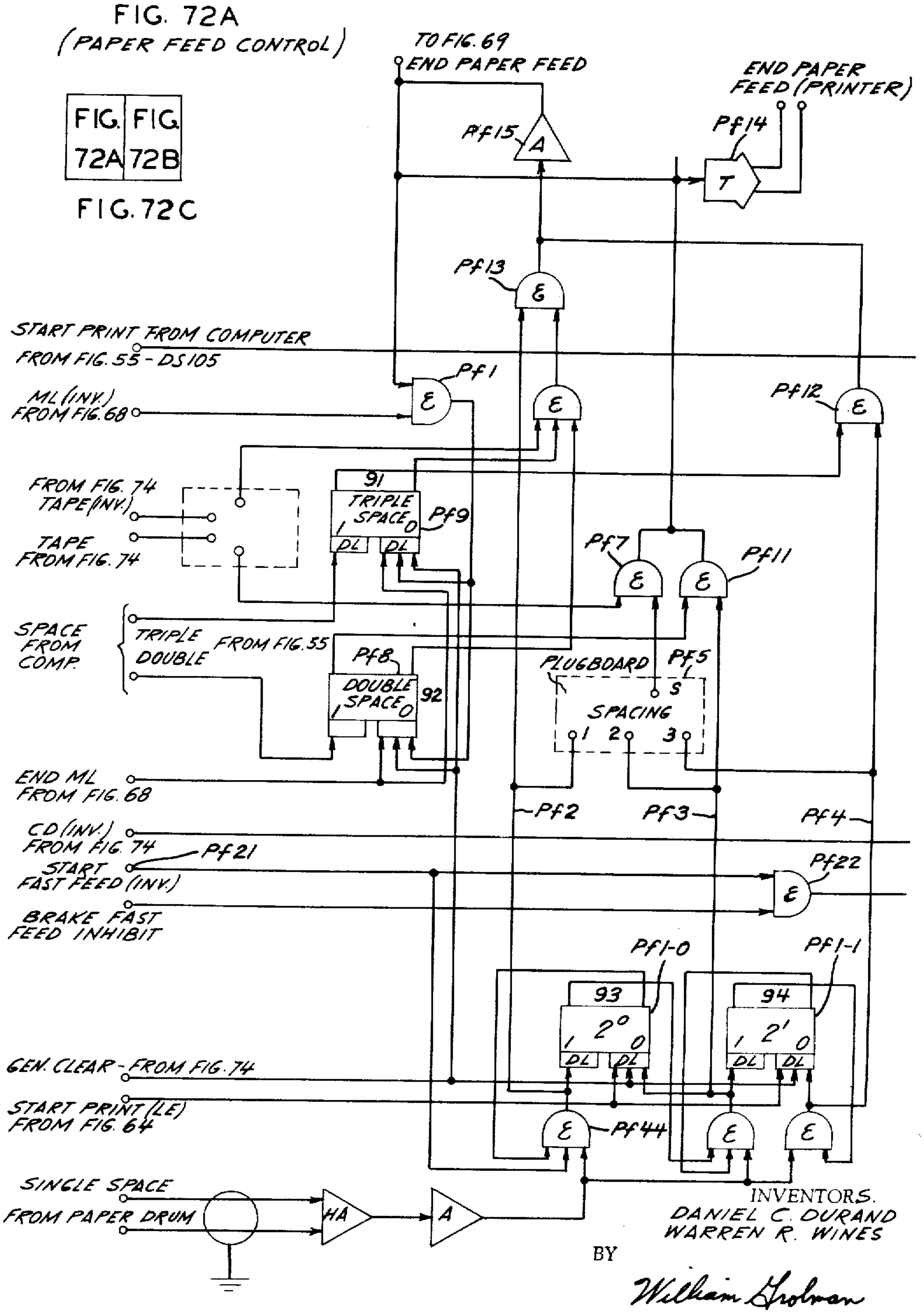
Figure 73:
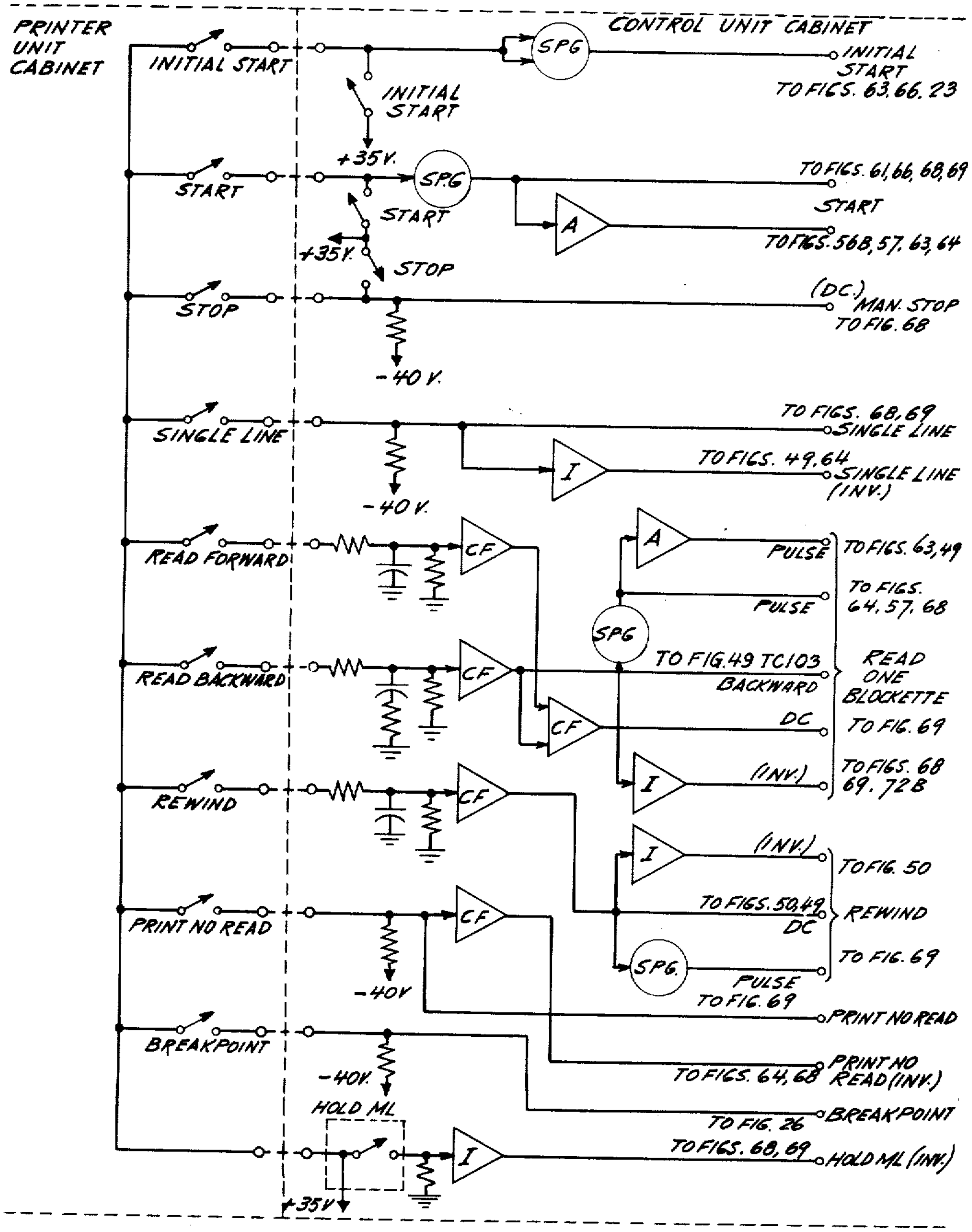
Figure 74:
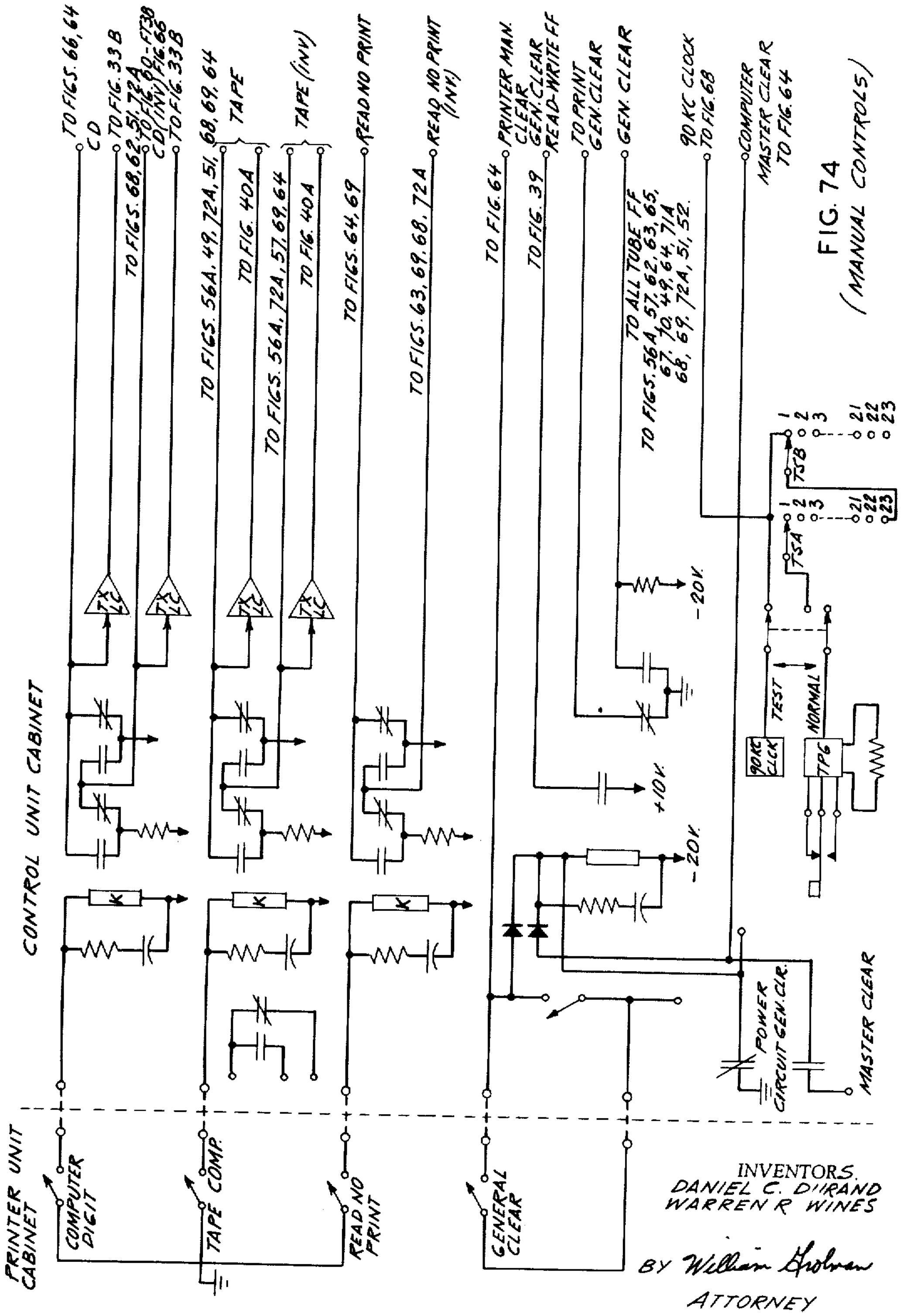
Figure 75:
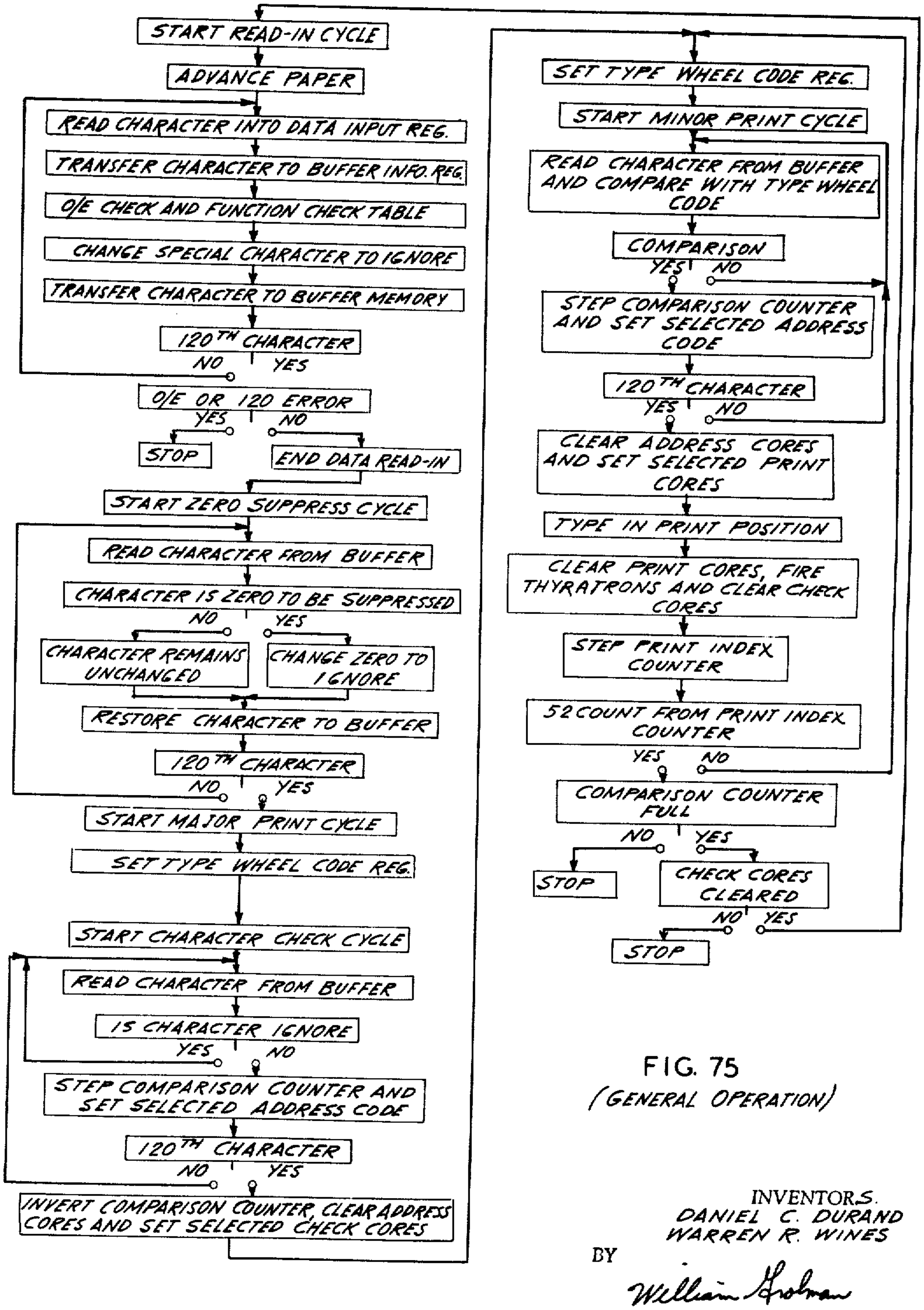
Figure 76:
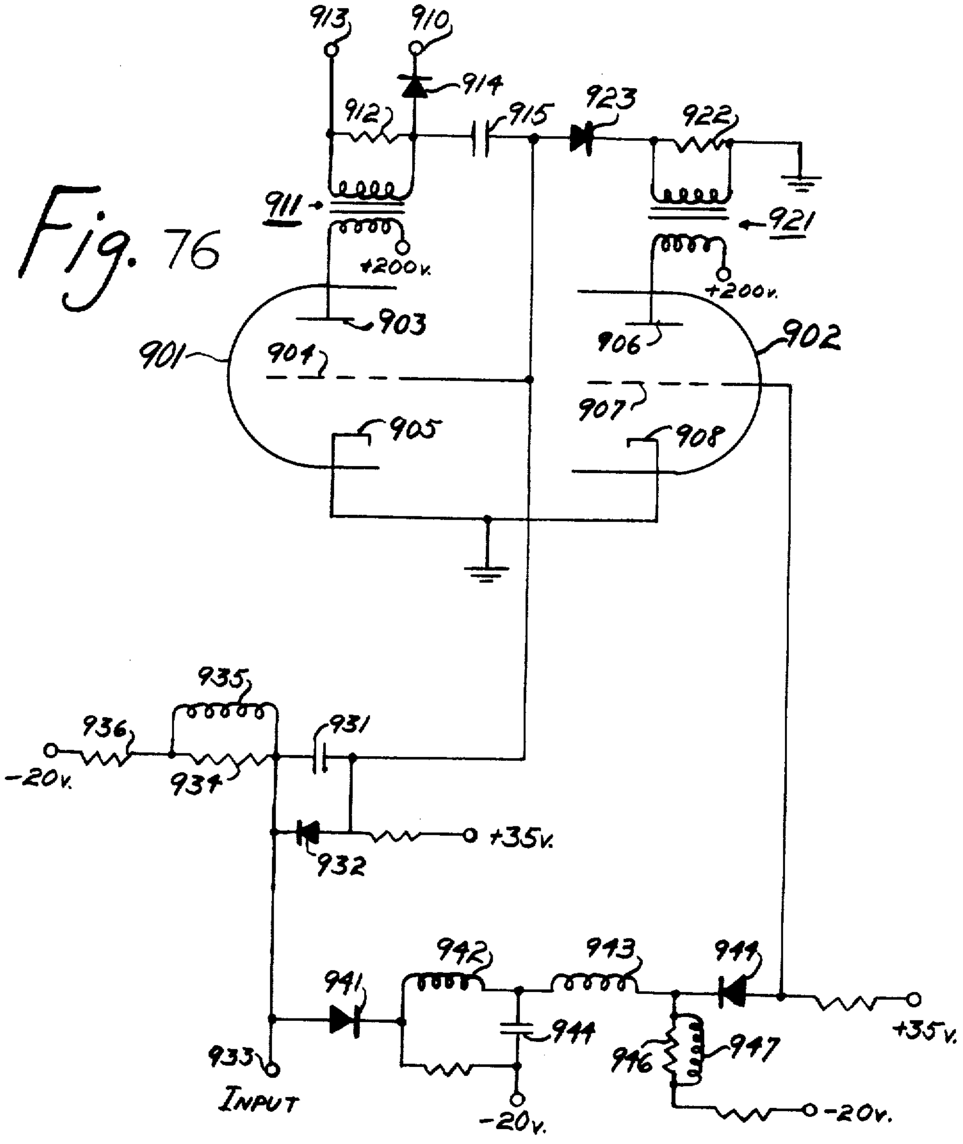

Figs. 5A and B are an overall block diagram showing the basic components of the system of this invention and the flow of information therethrough;

Figs. 6 through 31 are circuit diagrams of the typical individual circuits used in the system of this invention and illustrate the following:

Fig. 6 shows a core driver circuit;
Fig. 7 shows a pair of "and" gates;
Fig. 8 shows an electron tube flip-flop;
Fig. 9 shows a pair of cathode followers;
Fig. 10 shows a head amplifier circuit;
Fig. 11 shows a single pulse generator;
Fig. 12 shows a relay puller;
Fig. 13 shows a one-shot multivibrator having "or" gate inputs;
Fig. 14 shows a clock pulse generator;
Fig. 15 shows a core driver and pulse shaper circuit;
Fig. 16 shows a transistor-to-tube level changer;
Fig. 17 shows a pair of cathode followers with gate inputs;

Fig. 18 shows a core pulse shaper;
Fig. 19 shows an emitter follower circuit;
Fig. 20 shows a transistor flip-flop;
Fig. 21 shows an indicator amplifier circuit;
Fig. 22 shows an inverter and "and" gate;
Fig. 23 shows a transistor "and" gate;
Fig. 24 shows a transistor "and" gate and core driver;
Fig. 25 shows two stages of a transistor shifting register;
Fig. 26 shows a sense detector and amplifier;
Fig. 27 shows a transistor impedance matching circuit;
Fig. 28 shows a magnetic core memory element;
Fig. 29 shows a magnetic core circuit for the print and check address storage;
Fig. 30 shows a tube-to-transistor level changer;
Fig. 31 shows a read amplifier circuit;
Figs. 32 through 75 illustrate in block form, the major components of the system incorpating this invention and respectively illustrate the following;
Fig. 32 shows the data input register;
Figs. 33A and B show the buffer information register;
Fig. 34 shows the buffer outputs;
Fig. 35 shows the comparator and code generator register;
Fig. 36 shows the odd-even checker;
Fig. 37 shows one bank of buffer memory cores;
Fig. 38 shows the buffer memory;
Fig. 39 shows the buffer memory read-write control;
Figs. 40A and B show the X address;
Fig. 41 illustrates the Y address register;
Fig. 42 illustrates the address storage;
Fig. 43 shows the upper section of the plugboard;
Fig. 44 shows the lower section of the plugboard;
Fig. 45 illustrates pictorially a plugboard connector for single connections;
Fig. 46 illustrates pictorially a plugboard connector for double connections;
Fig. 47 shows the odd portion of the check and print core storage;
Fig. 48 shows the even portion of the check and print core storage;
Fig. 49 illustrates a portion of the tape unit control circuits;
Fig. 50 illustrates another portion of the tape unit control circuits;
Fig. 51 shows the demand station portion of the demand control circuits;
Fig. 52 shows the head switching portion of the demand control circuits;
Fig. 53 illustrates the computer high speed instruction lines of the demand control circuits;
Fig. 54 shows the demand control relay lines;
Fig. 55 illustrates the computer control portion of the demand control circuits;
Figs. 56A and B show one portion of the input control circuits;
Fig. 57 shows another portion of the input control circuits;
Figs. 58 and 59 illustrate special address gates;
Fig. 60 illustrates the decoding function table;
Fig. 61 shows a portion of the zero suppress circuitry;
Fig. 62 shows another portion of the zero suppress circuitry;
Fig. 63 shows a portion of the circuits controlling the print cycle;
Fig. 64 shows another portion of the circuitry controlling the print cycles;
Fig. 65 illustrates the comparison counter;
Fig. 66 shows the address storage input circuits;
Fig. 67 illustrates the print index counter;
Figs. 68 and 69 illustrate the printer control circuits;
Fig. 70 illustrates another portion of the tape unit control circuitry;
Figs. 71A and B show the multiline control counter and relays;
Figs. 72A and B illustrate the paper feed control circuits;
Figs. 73 and 74 illustrate the manual controls;
Fig. 75 is a flow chart of a typical operating cycle; and
Fig. 76 is a schematic diagram of a pulse narrower used in the illustrative device of this specification.

Figure 1:
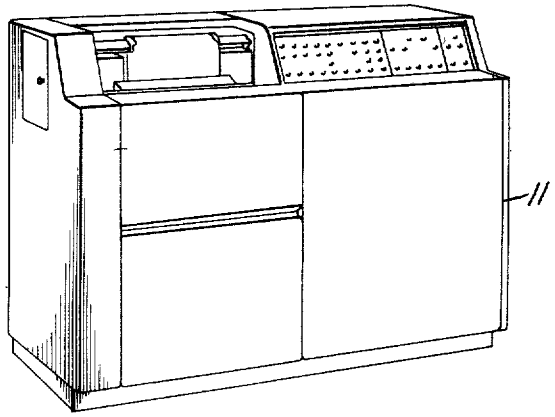
Figs. 1 and 2 are pictorial representations of one of the forms the apparatus of this invention may take.
Figure 2:
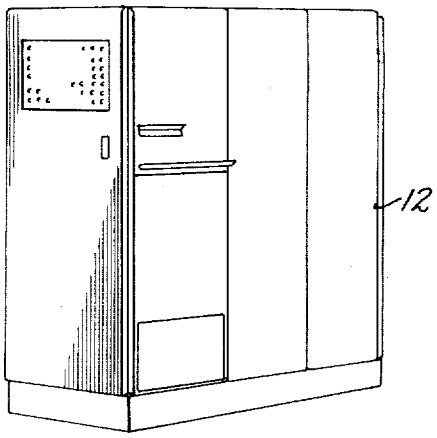

Referring now to the drawings in more detail, Figs. 1 and 2 pictorially illustrate the basic components of the printer of this invention. The printer unit cabinet 11 is illustrated in Fig. 1 and in Fig. 2 the control unit cabinet 12 is shown. In operation both units cooperate with each other to produce the final product.

Figure 3:
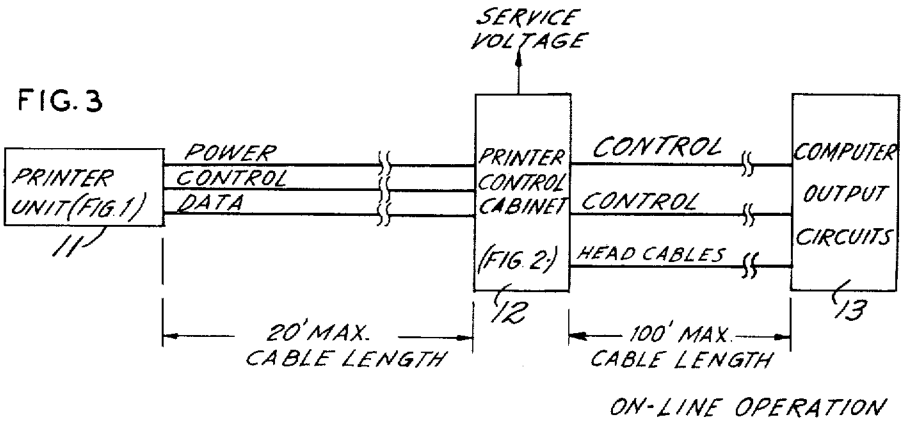
Figs. 3 and 4 are block diagrams illustrating broadly on-line and off-line operation of the device of this invention.
Figure 4:
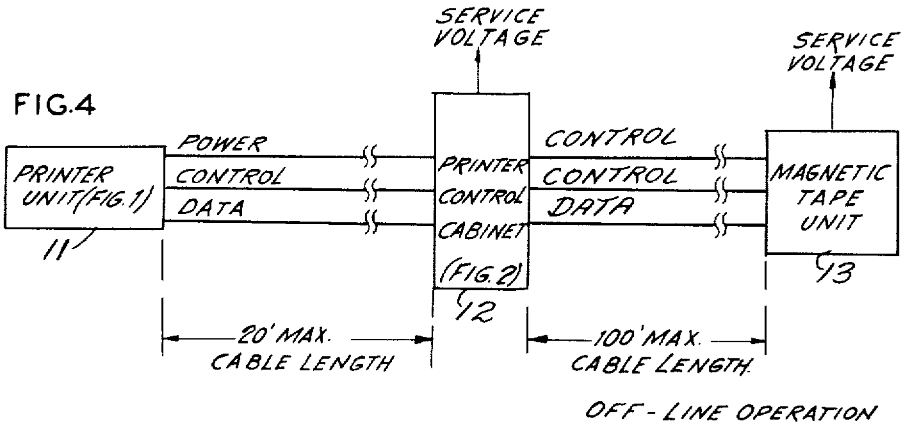

Figs. 3 and 4 illustrate, in a very general manner, how the printer unit of Fig. 1 and the printer control cabinet of Fig. 2 are connected together for operation. In Fig. 3 the printer unit 11 is shown connected to the printer control cabinet 12 by cables for the transmission of power, control signals, and data. The arrangement illustrated in Fig. 3 is for on-line operation where the high speed printer of this invention is controlled directly by the computer output circuit 13. The printer control cabinet 12 is shown connected to the computer output circuits 13 by means of cables for control, and data signals. The arrangement of Fig. 4 is similar to that of Fig. 3 but shows the general connections for off-line operation where the printer is controlled through an intermediate storage medium. The printer unit 11 is connected to the printer control cabinet 12 by cables for power, control purposes, and data transfer. In turn, the printer control cabinet 12 is connected to a magnetic tape unit 14 by cables for control and data transfer purposes. Although off-line operation is normally considered as operation under the control of a magnetic tape unit where the tape was prepared previously by the computer, there is no reason why such control could not just as well be maintained by a punched tape apparatus, punched card apparatus, or other such temporary storage medium.

Figure 5B:
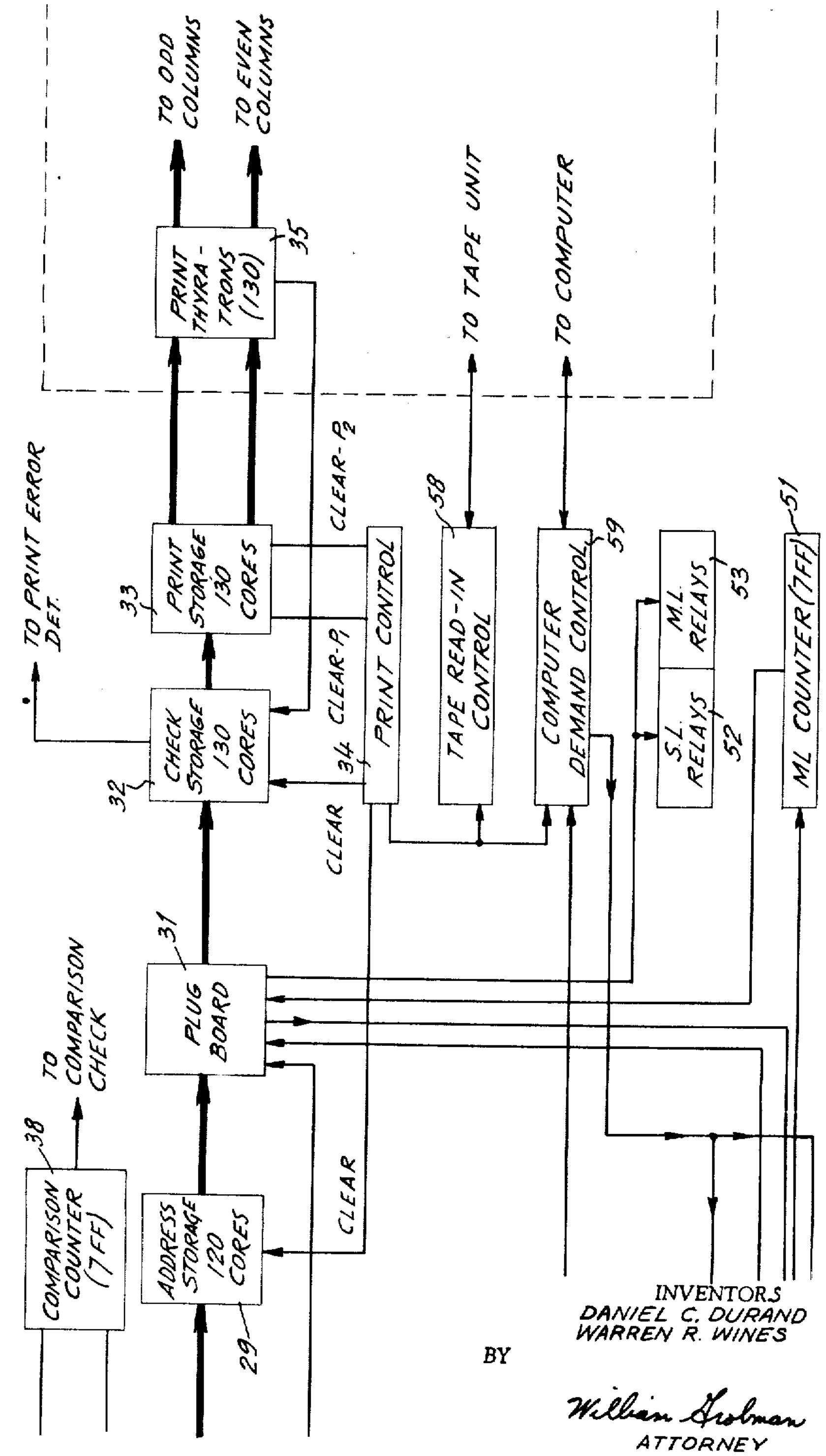

Fig. 5 is an overall block diagram showing the general interconnection of the major components of the printer of this invention. Most of the equipment shown on Fig. 5 is actually contained in the printer control cabinet 12, but, in the upper left hand of the drawing, a type wheel 18, print code generator 19, and print index generator 17 are shown set apart by a dashed line, and in the right hand portion of the drawing there are other components, such as the print thyratrons 35, which are also set apart by dashed lines from the larger portion of the drawing. These two portions of the apparatus are some of the components which are contained in the printer unit 11. Generally speaking, the printer mechanisms such as the type wheels, the print hammers, the operating actuators, and other such mechanical structures which actually perform the printing itself, along with the paper feed devices and the paper control devices, are contained in the printer unit cabinet 11 and are essentially the same as those described in the patent applications mentioned above.

It should be noted that Fig. 5 is an information flow chart which does not show actual connections, and there are often substantially duplicate input or output lines which are considered necessary on the drawing to indicate the different inputs and output required by operation on-line or off-line. On the left hand portion of the drawing the input from the tape unit and the input from the computer are represented. These two inputs feed into a Data Input Register 21 which is comprised of seven flip-flops. The information fed into the data input register 21 is in the form of groups of electrical pulse positions, each group comprising 7 positions in which, at any instant, a pulse may or may not appear. The presence and absence of the pulses in various combinations serve to identify the alphabetic, numeric, and symbolic information which is to be printed by the printer. In each character of seven pulse positions, four positions represent the numerically significant portions of the character itself. Two following pulse positions are termed zone positions and are used to identify alphabetic and symbolic information; and the seventh, or last, pulse position is a check pulse position and is provided to ensure that the total number of pulses in each character always is odd. The arrangement of pulses in these seven pulse positions and the code by which the information is represented is explained in greater detail in a copending patent application S.N. 279,710, entitled "Information Handling System," and filed on March 31, 1952, in the names of Eckert et al. The basic code combinations by which the ten numeric characters are represented may be termed the excess three (XS—3) system. The XS—3 system of representing decimal numbers can be considered as the representation in binary digits of a decimal number which is three less than the binary number represented. Thus, using the four basic pulse positions of the word, the decimal number 1 may be represented by the binary combination 0100, which literally is translated into 4. This XS—3 coding has its advantages particularly in complementing and in the fact that when a decimal carry occurs, an actual carry also occurs from the fourth binary bit position. The four XS—3 positions provide 16 possible combinations of pulses. Two zone positions increase the number of possible combinations by the factor of four resulting in 64 usable pulse combinations of which the printer actually recognizes 62 including, in addition to the 51 characters being printed, some control instructions.

Information supplied to the data input register 21 shown in Fig. 5 is applied from the tape unit with the seven binary bits in parallel disposition in time, and with the characters succeeding each other serially in time, whereas information coming from the computer is introduced as pulse trains entering the data input register 21 with the binary bits in serial disposition in time and the characters also serially in time. For ease of explanation the information applied to the printer unit will be considered in complete characters, that is, each group of 7 pulse positions will be dealt with as a unit. Actually, however, most computers handle information in groups of characters generally called words. One large popular computer system utilizes words which comprise 12 characters in series and space for a thirteenth character, which space is a space-between-words and occupies the same amount of time as a character but which contains no information.

The input register 21 is a static type of register which comprises seven flip-flops, and the information applied to the register determines the individual condition of each of the flip-flops in accordance with the presence or absence of a pulse in each position. After the information has been stored in the data input register, it is transferred to the buffer information register 22 which is a register similar to the data input register and comprises 7 flip-flops. The character is then transferred in parallel form from the buffer input register 22 into the buffer memory 23 which is a magnetic core type of memory. The buffer memory 23 contains 840 cores and can store 120 individual characters. The high speed printer may print up to 130 characters per line but normally only 120 characters are introduced into the buffer memory for printing. The buffer memory 23 stores the equivalent of a full line of information at any instant. When the buffer memory 23 has been filled, and it is filled with the characters arranged in sequence in accordance with prescribed addresses, the information is then transferred, character-by-character, back to the buffer information register 22 for application to the comparator 24.

The comparator 24 receives and individually compares each character stored in the buffer memory 23 with an equivalent character representation generated by the code wheel 19, which is connected to the type wheel 18 of the printer 11 and stored in the code generator register 25. A word in explanation of the type wheel 18 is in order at this time. The type is arranged in longitudinal rows on the face of a rotating cylinder, each row comprising 130 type faces of the same character in staggered relation, one up, one down. When the proper characters have been selected and the time for printing arises, hammers located behind the paper and individual to each type face of a line are caused to move forward and force the paper to strike the type faces at the proper time to make an impression thereupon. At any instant there are 130 identical characters in printing position (A's for example) and a short time later, there are 130 B's in printing position, and so forth. Actually, the type is staggered so that identical letters are arranged in two lines of 65 each. Each letter position on the cylinder is assigned an address, and the information stored in the buffer memory 23 is compared with the letter arriving at the print position at any instant. As a row of letters approaches printing position during the rotation of the type wheel 18, its particular code is generated by a code generator 19, which is rigidly connected with the type wheel 18 and rotates in synchronism therewith, and is stored in a code generator register 25. The print code generator 19 comprises a magnetic drum and appropriate reading heads. Since there is no need for check pulses in the information stored on the magnetic drum of the print code generator, only six tracks, and six reading heads are used, and the code generator register 25 contains only 6 flip-flops. This code is identical with the code used to represent the same characters in the computer and on the tape. The character stored in the code generator register 25 is applied to one side of the comparator 24. Then, in sequence, each of the 120 characters which are stored in the buffer memory 23 is individually compared with the code generator register character, and, when there is coincidence, a signal is generated which is applied to an address comparison matrix 26. This signal indicates which address of the buffer memory 23 contained a character identical with that character presently arriving in print position on the type wheel 18. Thus, assuming for the discussion that the type wheel 18 is rotating so that the letter "A" is now approaching printing position, the print code generator 19 generates the pulse combination for the letter "A," which pulse combination generated by the generator 19 is 01 0100, or 01 in the zone positions and 0100 in the XS—3 positions, and applies the zone and XS—3 position pulses to the code generator register 25 which then applies the static potentials representative of this pulse combination to the comparator 24. The pulse combination for "A" exists in the code generator register 25 long enough for the characters stored in the buffer memory 23 to be transferred individually through the buffer information register 22 to the comparator also, where a one-for-one comparison is made. As the letter "A" row on the type wheel 18 approaches printing position the aforementioned operations take place, the comparison is made and the comparator 24 discovers, for example, that there is identity between the code generator register character and that coming from the buffer information register 22 in the first, the third, the fifth and the seventh addresses. When each identity is established, a signal is transmitted to the address comparison matrix 26 which identifies the address as the first, the third, the fifth and the seventh position. The same operation is repeated as each line of the type wheel approaches printing position.

Connected to the buffer memory 23 are two address generators, namely a character address generator 27 and a word address generator 28. Each generator is formed of a shift register, the character address register 27 being a 12 position register and the word address register 28 being a 10 position register, and is operated by the transfer into and out of the buffer memory of the individual characters. As a character is transferred into the buffer memory 23, the character address generator 27 is shifted one position until its capacity of 12 is reached. After its capacity has been reached, the character address generator 27 generates a carry which steps the word address generator 28 one position and returns the character address generator 27 back to zero. Thus, each address in the buffer memory can be identified by the position of the count of these two address generators.

The outputs of the character address generator 27 and the word address generator 28 are applied to the address comparison matrix 26 which is comprised of 120 "and" gates. As each word is transferred from the buffer memory 23 to the comparator 24, the address of that word is applied to the address comparison matrix 26, and, when the comparator 24 sends a signal to the address comparison matrix 26 indicating that an identical comparison has been determined, that particular address in the matrix is enabled and the signal is transferred therethrough to the address storage 29 which comprises 120 magnetic cores, one core for each address position. The information maintained in address storage 29 is transferred through a plug board 31 to a check storage 32, which comprises 130 cores, and to a print storage 33 which also comprises 130 cores. At the appropriate time a print control device 34 sends out signals which clear the storage devices and utilize the output signals from the print storage 33 to enable the appropriate print thyratron 35.

Also mounted with the type wheel 18 on the same shaft as the print code generator 19 is a print index generator 17 which comprises magnetically stored spots. These spots, when they are sensed, control the actual printing. Connected to the output of the print index generator 17 is a toggle 36, which is actually a flip-flop requiring overlapping input potentials for switching from one stable condition to the other. The toggle 36 is placed in each of its two conditions by adjacent sensed spots on the print index generator 17, there being two such spots for each print row. At the appropriate time the output of the toggle 36 through the set print storage cores 33 causes appropriate print thyratrons 35, all of which had previously been enabled, to fire, and these, in turn, energize the hammer actuators which serve to drive the paper and ribbon against the appropriate type face in the positions indicated by the information brought into the buffer memory 23.

The above minor cycle of operation takes place 51 times during one rotation of the type wheel 18 and while the same 120 characters are stored in the buffer memory 23. Connected to one output of the toggle 36 is a print index counter 37 which comprises six flip-flops and is so arranged that when it has counted 51 counts, the print index counter 37 generates an output signal, signifying the end of a major print cycle and initiating the beginning of the next major print cycle. Clearing of the buffer memory 23 is automatically accomplished upon read-in of the next blockette. Described above, broadly, is the basic major print cycle in the normal operation of the printer circuits.

For a high speed printer to be suitable for use as an output device operated from a computer, it must be accurate and versatile. To ensure accuracy many check devices have been incorporated in the printer circuits. One such check ensures that as the printable characters are repeatedly transferred from the buffer memory 23, to the buffer information register 23 for application to the comparator 24, and back into the buffer memory 23, no comparison will be overlooked. The comparison counter 38 has two inputs, one of which is an output of the comparator 24 and counts whenever a comparison is made and the other is from the buffer information register 22 through a character detector 30 and indicates whenever a printable character is transferred out of the buffer memory during the first minor cycle.

In addition, there is a 120 check circuit 41 which is fed from the character address generator 27 on one input and from the word address generator 28 on a second input and which serves to ensure that all of the 120 addresses in the buffer memory 23 are properly identified and filled.

So that a check can be maintained on the number of addresses to be printed in a major cycle, a check storage 32 is also incorporated in the system. When characters to be printed are transferred out of the buffer memory 23 during the first minor cycle, address cores in the address storage 29 are set in accordance with the addresses of the printable characters so transferred. This information is then transferred from the address storage 29 to check storage 32. As the comparisons are made during subsequent minor cycles, the address of each printable character is again transferred to the address storage 29 in preparation for printing. This second address determination is subsequently transferred to the print storage 33 and the output of the print cores set thereby enables a print thyratron to fire. The resulting thyratron pulses clear the appropriate check cores, and by the end of the major print cycle, all check cores should have been cleared. A clear pulse is then used to probe the check cores, and if any has not been cleared in normal operation, an error signal is generated by the print error detector and printing is halted.

It is desirable in the output equipment of business information handling systems to provide a printing element which can have programmed formats to correspond with the forms generally used in the business. To accomplish changes in formats and for other printer-control reasons, a function-table 42 and individual control circuits have been provided. In addition, the controls are operated through a plugboard 31 so that the format may be manually varied thereby. By way of illustration, at the lower left-hand portion of Fig. 5 the controls for the printer are shown in block form. These controls receive control signals from a function table 42 which, in turn, receives pulse combinations from the buffer information register 22. These characters can be called "unprintable characters" and they are used primarily for control purposes. However, as will be discussed later, these characters may result, in special situations, in printed letters.

One of the more important format controls for the printer is the multi-line control 43 which determines the number of lines upon which a particular blockette of 120 characters will be printed. Two other important controls are the fast feed control 44 which allows the rapid feeding of paper through the printer so that portions of the paper upon which no printing is to take place may rapidly be moved past printing position, and the suppressed zero control 45 which allows the suppression of non-significant zeros in any line. In addition, there are controls for stopping (46) the printing operation for a period of time, controls which determine the class (47) of printing desired, a break-point control (48), and a control (49) for a test procedure called, "computer digit operation."

Multi-line operation allows the printing of a blockette, which is 120 characters, on from one to six lines either with or without repetition of the same information from line-to-line. Multi-line operation of the printer is initiated by a special multi-line character code which is supplied either by the computer during on-line operation or by the tape during off-line operation. Control of the multi-line operation to fit a particular format is established by the plugboard 31 and a multi-line counter 51, which may be adjusted from two to seven counts. The plugging, or patching, of the plugboard 31 determines the type of operation as the counter 51 sequentially renders the various plugboard connections operative. The output of the plugboard controls, in turn, any of a group of relays which are for single line or multi-line operation. These relays 52 and 53 serve to vary the connections of the addresses of the information lines from the address cores in the address storage 29 to the check storage 31, and may thereby control which information in these addresses are printed on each of the multiple lines. In addition, the relays 52 and 53 may also reconnect some of the same information so that it is printed on more than one line. This procedure continues until the multi-line counter 51 returns to zero, at which time the multi-line operation ceases until it is again initiated by a suitable order.

The paper feed control 54 allows a choice of single, double, or triple line spacing. The spacing of the paper is actually accomplished by means of pulses which are recorded on the paper drive shaft magnetic drum (not shown) so that they are located in a position to stop the paper properly for single space operation. One, two, or three paper stop pulses are counted while the paper is in motion for single, double, triple spacing respectively, and it is the last pulse counted that stops the movement of the paper. As with the other controls, the computer determines paper spacing during on-line operation operating through the line space control 57. In off-line operation, the paper spacing is preselected by plugboard arrangements. The initiation of paper feed occurs just prior to the reading of the first character into the data input register 21 and, unless there is a specific space instruction to the contrary, the paper is fed at the rate of single spacing. However, the occurrence of a space instruction overrules single spacing and causes the paper to be moved the required number of lines. In addition, to the use of character instruction supplied by the computer, fixed spacing may be established by plugboard wiring if desired.

A fast feed operation 44 is also provided to allow paper to be moved continuously for from two to 132 spaces. This operation saves considerable operating time for the printer and provides additional flexibility in the format arrangement. For any given format arrangement as many as five different fast feed gaps in the printing may be provided. Of the five fast feeds which are provided, four are initiated by the sensing of instruction signals introduced either from the computer during on-line operation or from the tape during off-line operation. The other fast feed may be initiated by predetermined index points arranged on the fast feed control loop to start the fast feed when the printed form reaches a predetermined length or when the printing reaches a predetermined location on a printed form, and ceases upon the beginning of the next form to be printed. The fast feed instructions operate by inhibiting the paper stop pulses derived from the magnetic drum until the paper has been advanced the desired length. This length is determined by the sensing of a hole in the paper control loop which is an endless loop of paper driven in synchronism with the paper feed and which is used to control the paper feed. The paper control loop operates to repeatedly establish a format for the forms which are prepared by the printer. Thus, the fast feed instruction initiates a fast feed, but it is the paper loop control which stops it and thereby establishes the length of paper which will be moved at a high rate of speed. The paper loop is arranged as to be divided into seven columns which are called channels. The four fast feed controls which are initiated by either the computer or the tape are terminated by holes placed in four of the seven channels and sensed by the loop control switch. The holes are placed in these four channels by the programmer to determine the length of paper upon which no printing will take place during each major print cycle. A fifth channel on the paper control loop 55 is used as the index to begin the fast feed which terminates upon the sensing of a hole in the sixth channel indicative of the end of the form. The space between the sensing of the holes in channels five and six provides the bottom margin at the end of the form. Channel seven is used to establish the homing position or the beginning of a form. A control hole is punched in channel seven at the point which corresponds to the beginning of the paper form, and upon the initiation of a home paper operation by the operator, the paper will be moved until the hole in channel seven is sensed. The paper is then in proper position for the start of printing. If the printer stops at any time during normal operation because of an error or for other reasons, the operator may advance the paper to a home position so that printing can be immediately resumed at the beginning of a new form when the error has been cleared or the printer otherwise again started.

One other feed control is an on-line form sensing control 56. When the printer is operating on-line, the first four paper loop channels may be used to indicate to the printer that a particular portion of the form is to be printed upon, but only if these channels are not used for fast feed operations. This operation may take place only when the plugboard 31 has been wired to indicate the particular portion of the form intended, and is useful for continuing the printing of information from form to form.

One other form control which is of great value is the zero suppression 45 in the non-significant positions. This operation causes non-significant zeros in the buffer memory 23 to be replaced with ignores. An ignore is a non-printable character. The zero suppression cycle starts at the end of the read-in when each character is read from the buffer memory 23 into the buffer information register 22 for comparison purposes. As this operation proceeds, address storage cores are set, and this causes the address core to generate a pulse which can start a zero suppression field if the plugboard has been so connected as to connect the associated address hub to the start zero field hub. The function table 42 determines whether or not that particular character in the buffer information register 22 is a zero. If the character is not a zero it is read back into the buffer memory 23 from the buffer information register 22, and zero suppression for that particular field is ended. If the character is a zero, the same circuits which are used to prevent special characters from entering the buffer 22 during read-in cause an ignore character to be read into the buffer 22 in place of the suppressed zero. Each successive character in that particular zero suppressed field will then be suppressed until a non-zero character is decoded or a pulse from an address hub which is connected to an end-zero field hub terminates the operation. In this manner it is possible to indicate by particular addresses on any line whether the addresses adjacent each other should or should not contain zeros.

The tape read-in control 58 and the computer demand control 59 connect the print unit to the tape unit and to the computer respectively. In on-line operation, when the computer decides that a print operation should next take place, the computer generates a test signal which is applied to the printer. If the printer is otherwise occupied, a not-ready signal is generated and returned to the computer. Printing is then postponed. A second test signal is generated by the computer and applied to the printer. If the printer is not performing a print operation, or a special test function, or is not stopped because of an error, the printer then returns a ready signal to the computer, and in response, the computer generates a demand-in pulse which it applies to the computer demand control 59. In response to the demand-in pulse the printer, in turn, generates a demand-out signal which indicates to the computer that print operations may then proceed. A similar operation is carried out by the printer in off-line operation with the tape unit and the read-in control 58.

Other unprintable characters are the stop control 46 which is operated by a code designation for stopping the printer. When the stop signal is detected, the printer continues to transfer the rest of the blockette containing that stop character into the buffer memory 23, but the blockette is not printed and the printer stops. The break point operation through the break point control 48 is similar to the stop operation except that it will stop printing only when a particular break point switch on the supervisory control of the printer is placed in break point position. This gives the programmer or operator an additional control for stopping the printer. Computer digit is a special form of printing for test purposes in which the 120 characters inserted in the buffer memory to be printed on any line are divided by the machine into two groups, one of which comprises the printable characters and the other of which comprises the non-printable characters. In this operation the printable characters are printed in immediately succeeding sequence on the line where normal printing would ordinarily occur. The non-printable characters are represented by preassigned characters printed on the next following line. Thus, the entire blockette of information which was fed into the printer has been divided into two lines of printed matter, the first representing only printable characters and the second representing the instructions or non-printable characters. Class print control 47 is a means for identifying and printing only preselected types of information. There are actually four different class control characters which may be sent to the printer. Upon the identification of one of the class control characters in a particular blockette, the printer will store that blockette but will skip the print cycle and go on to the next read-in cycle. This operation takes place only if the plugboard has been wired so that the printer may recognize that particular class character. In this manner certain types of information may be overlooked and not printed on a particularly type of printing operation and separate tapes or separate types of operations are not required for different kinds of information.

The operation of the overall print device of this invention has been described in general terms to provide a broad view of the purpose and functioning of the various major components in the system. The remainder of the description will be organized to first describe and illustrate schematically the typical circuits which are used in this machine, to secondly describe the logical organization of each of the major components utilizing logical block diagrams, and finally a review of the general operation of a typical cycle. In this manner the construction and operation of the invention will be described completely and in such terms that any one skilled in the art will be able to follow without the necessity of illustrating and describing in great detail each circuit parameter. It is only necessary for anyone desiring the complete and detailed description of a major component to substitute the circuit diagram of an element for its shorthand symbol, both of which will be described hereinafter.

*Typical circuits*

Fig. 6 shows the schematic circuit of a core-driver for converting a voltage input pulse into a current output pulse suitable for driving a magnetic storage core. The core driver comprises an electron discharge tube 101 having an anode 102, a screen grid 103, a control grid 104, and a cathode 105. The control grid 104 is biased to cut-off by the application of −90 volts through a resistor 106 and has the input signal applied through a series resistor 107. The screen grid has a +200 volt source connected to it through a resistor 109 and provides decoupling by means of a resistor 111, which is connected between the screen grid and ground and is shunted by a decoupling capacitor 112. The cathode 105 is connected to ground through a cathode resistor 113 which has a by-pass capacitor 114. Connected to the cathode end of the resistor 113 is a test terminal 115. Parameters and operating potentials of this core driver circuit have been so designed that the application of a 4 microsecond positive pulse, which has a minimum positive amplitude of zero volts, to the control grid 104, will cause the tube 101 to become conductive, and an output pulse of at least 400 ma. will flow through the anode load resistor 108 for the duration of the input pulse. The 400 ma. output pulse is then applied to the coil of the core to be driven.

Figure 6A:
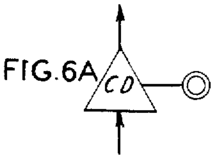

The shorthand symbol for the core driver circuit shown in Fig. 6 is illustrated in Fig. 6*a* as a triangle having an input at the base and an output at the vertex. The letters CD in the triangle designate a core driver and the concentric circles connected to the block at one side designate the test terminal. In the following logical block diagrams of the larger components of this device, the test terminal may be omitted from the core driver shorthand symbol.

Fig. 7 is a schematic diagram of two "and" gates, one of which has three inputs and the other of which has two. The "and" gate labeled generally 120 comprises a triode 121 having an anode 122, a control grid 123, and a cathode 124. The cathode 124 is connected directly to ground and the output from the tube 121 is taken from the anode 122 through a transformer 125 and a resistor 126. A capacitor 127 connects one side of the output transformer 125 to the control grid 123 to provide regenerative feedback. A potential divider comprising a resistor 132 and a resistor 133 connected in series between a +35 volt source and a −20 volt source provides biasing potential for the control grid 123. The control grid 123 is connected to the junction point of the resistors 132 and 133 and also through diodes 128, 129, and 131 to input terminals 135.

In operation, the voltage divider between the −20 volts and the +35 volts applied to the grid at junction point 136 of the resistors 132 and 133, places a −16 volt bias on the control grid 123 of the amplifier 121. When a positive-going pulse is applied to any of the input terminals 135, the particular diode affected is momentarily cut-off, allowing the potential at the junction point 136 to rise toward +35 volts for the duration of the pulse. This results in conduction of the tube 121, causing a negative pulse to appear on the anode 122. The negative pulse at the anode 122 is inverted by the transformer 125 and appears at the output as a positive-going pulse. The capacitor 127 connected between the output terminal and the control grid 123 serves to provide regeneration and thereby reduce the rise time of the pulse and maintain the general pulse form. The resistor 126 which is connected across the secondary of the output transformer 125 serves to dampen oscillations produced by the back swing due to the return of the output signal to zero. To disable the gate 120, a negative potential is applied to any of the terminals 135. The absence of any potential on a particular terminal 135 serves to disconnect its respective diode from the control grid 123, and that terminal has, in effect, no control over the conduction of the tube 121. As stated before, the application of a positive-going pulse (having a minimum positive potential of zero volts) serves to turn the tube on and to cause conduction of the triode 121.

The "and" gate 140 is, in essence, identical with the "and" gate 120 having a triode 141 which comprises an anode 142, a control grid 143 and a cathode 144, which cathode is connected directly to ground. A transformer 145 serves to couple the output from the anode 142 to the output terminal and has a resistor 146 across its secondary. A capacitor 147 connects one side of the secondary of the output transformer to the control grid 143 to provide regenerative feed back. A voltage divider comprising resistor 152 and resistor 153 connects between −20 volts and +35 volts to apply a net −16 volts on the control grid 143. Input terminals 155 are connected to the control grid 141 through diodes 148 and 149 which meet at a junction point 146. The operation of the "and" gate 140 is identical to that of the "and" gate 120, the only difference being that there are but two input terminals to the gate 140 whereas the gate 120 has three such input terminals.

Fig. 7*a* shows the shorthand symbol for the "and" gates, the "and" gate 120 being illustrated as a D-shaped block 120A having three input terminals 135 and the "and" gate 140 being shown as a D-shaped block 140A having two input terminals 155.

The circuit illustrated in Fig. 8 is illustrative of one form of the flip-flops which are used in this device. The flip-flop itself is a standard Eccles-Jordan device and comprises a triode 161 having an anode 162, a control grid 163, and a cathode 164, and a second triode 171 which has an anode 172, a control grid 173, and a cathode 174. Cathodes 164 and 174 are connected together and to ground. The control grid 163 of the triode 161 is connected through resistors 165 and 166 to the anode 172 of the triode 171; and by the same token, the control grid 173 of the triode 171 is connected through resistors 175 and 176 to the anode 162 of the triode 161. Resistor 166 is by-passed by a capacitor 167 and the resistor 176 is by-passed by a capacitor 177, capacitors 167 and 177 being provided to compensate for stray capacitance among the electrode and between the electrodes and power supplies. The outputs from the anodes 162 and 172 are applied to the inputs of power triodes 181 and 191. Anode 162 is connected by way of suitable resistors and capacitors to the control grid 193 of a triode 191 which also includes an anode 192 and a cathode 194; and the anode 172 is connected to the control grid 183 of a second triode 181 which further comprises an anode 182 and a cathode 184. The cathodes 184 and 194 each have a negative bias of 90 volts and the control grids 183 and 193 have negative biases of −300 volts applied to them. The outputs of the power stages are taken across resistor 185 connected between the anode 182 and a +35 volt source and resistor 195 connected between the +35 volt source and the anode 192. The input to the flip-flop is applied, by way of illustration only, through a combination of "and" and "or" gates. The terminal 201 is connected to a junction point 207 through a diode 203, and the junction point 207 is connected to the control grid 163. Second groups of input therminals 202 are connected through input diodes 204 and a delay line 205 to the junction point 207 by way of a common diode 206. In addition, an input terminal 211 is connected through a diode 213 to a junction point 217 connected to the control grid 173 of the triode 171; and input terminals 212 are connected through diodes 214 and a delay line 215 to the junction point 217. A common diode 216 connects the output of the delay 215 to the junction point 217. The terminals 201 and 211 serve as direct inputs to each of the control grids 163 and 173 respectively, but the input terminals 202 and 212 are inputs to "or" gates, and the outputs of the "or" gates are applied to the control grids 163 and 173 respectively. The delays 215 and 205 are provided to allow the use of the input pulse to enable gates to which the outputs of the flip-flop are connected before the condition of the flip-flop is changed.

The operation of the device is essentially the same as that of all flip-flops, which are bi-stable devices. Assuming that both triodes 161 and 181 are conducting at any instant, then the application of a positive-going pulse to the input terminal 211 or 212 will cause the triode 171 to become conductive and will lower the potential on the anode 172. This lowered potential results as a negative-going pulse which is applied to the control grid 163 of the triode 161 tending to cut-off the triode 161. As the current flow through 171 increases, the size of the negative pulse applied to the control grid 163 also increases and the action becomes cumulative, until the triode 161 is completely cut-off and the triode 171 is conducting at saturation. The decrease in potential at the anode of 172 applies a negative-going pulse to the control grid 183 of the triode 181, also tending to cut-off the triode 181 and applying a positive pulse across the resistor 185 to the output terminal. At the same time the reduction in current flow through the triode 161 raises the potential at the anode 162 and applies the positive-going pulse not only to the control grid 173 of the triode 171, but also to the control grid 193 of the output triode 191. This causes the triode 191 to conduct, reducing the potential at its anode 192 and applying a negative-going potential at the output terminals. Thus, the flip-flop illustrated in Fig. 8 is able to apply two static potentials at any time, one of which is high with respect to the other and the condition of which may be inverted by changing the stable condition of the flip-flop itself. The use of the output amplifiers serves to decouple the flip-flop from the load circuit and to make the action of the flip-flop itself more positive. As shown in Fig. 8 the input terminals 201 and 202 have been arranged in the position shown because a positive-going pulse applied to these terminals will produce a positive output pulse from the anode 192 of the triode 191, and the same is true of the other half of the circuit utilizing input terminals 211 and 212.

The shorthand symbol for the flip-flop is illustrated in Fig. 8*a* and comprises a rectangle labeled FF having one terminal marked R and one terminal marked S. The R and S stand respectively for the restore and set inputs and outputs, which terms will become more evident as the description proceeds, but which may have "1" and "0" substituted for them when appropriate. The inputs are shown in Fig. 8*a* to correspond with the inputs shown in Fig. 8, but in use the symbol will comprise only those inputs which are actually used in the particular configuration shown on the logical block diagrams. Although the flip-flop circuit normally comprises a pair of output amplifier stages, these stages are combined in the single symbolic block and will be considered as an integral part of the normal flip-flop circuit.

Fig. 9 is a schematic diagram of a pair of cathode follower circuits as they are used in this invention. A cathode follower comprises a triode 221 having an anode 222, a control grid 223 and a cathode 224. The cathode 224 is connected through a resistor 225 to a source of −90 volts. The junction between the cathode and the resistor 225 is connected to an output terminal 228. The control grid is connected through a resistor 226 to an input terminal and through a resistor 227 to a source of −90 volts. The other cathode follower circuit shown in Fig. 9 comprises a triode 231 havinging an anode 232, a control grid 233 and a cathode 234. The cathode 234 is connected through a resistor 235 to a source −90 volts and the junction between the cathode and one end of the resistor 235 is connected to an output terminal 238. An input terminal is connected through a resistor 236 to the control grid 233 which is also connected to a source of −90 volts through a second resistor 237. The voltage dividers and the input circuits comprising resistors 226 and 227 and resistors 236 and 237 provide properly balanced outputs when a number of stages are cascaded. A positive-going signal of about −20 volts applied to the input terminal drives the control grid 223 more positive, causing the triode 221 to conduct and drawing current through the cathode resistor 225. In normal operation a −20 volt signal on the input terminal will produce an output signal of approximately −16 volts at the output terminal 228, and an input signal of approximately +35 volts on the input terminal will produce an output signal at terminal 228 of approximately +38 volts. The two cathode followers illustrated in Fig. 9 are identical and both are shown since, to save tubes, the cathode followers are generally connected in pairs, as shown here, utilizing a single envelope for the two stages.

Figure 9A:
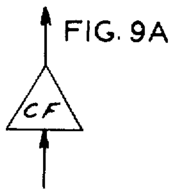

Fig. 9*a* illustrates the shorthand symbol for the cathode follower of Fig. 9. The symbol is the triangle used to represent amplifiers containing the letters CF, and is shown having a single input and a single output. Fig. 9*a* is intended to represent only a single stage such as that of triode 221 or triode 231.

Fig. 10 illustrates a schematic circuit for a head amplifier. The input to the head amplifier is normally a sign wave which is applied through an input transformer 241 which inverts the signal so that the negative portion of the sign wave appears first at the first triode amplifier 242, a class A connected amplifier. The initial output of the amplifier 242 is, therefore, positive and is applied to the input of a second triode 243 through a normal A.C. coupling. Amplifier 243 is normally conducting and only the negative portion of the full cycle has any effect on it. When the negative portion of the cycle cuts off amplifier 243, a positive pulse is applied through an A.C. coupling to a third amplifier stage 244. The output of the amplifier 244 is a negative output pulse which is fed back through feed-back capacitor 246 to the control grid of the amplifier 243 to provide additional gain and to decrease the rise time of the pulse. At the same time, the negative output of the amplifier 244 is applied through a capacitor 247 to the input of an output amplifier 245. The combination of the capacitor 247 and a large resistor 248 serves to differentiate the output of the amplifier 244, applying a steep signal to the amplifier 245. The output is taken from the anode circuit of the amplifier 245 as a reformed pulse.

The shorthand symbol for the head amplifier is shown in Fig. 10*a* as a triangle having a pair of input terminals, which in this case show that the input is not grounded, and having a single output. The head amplifier will be shown in this manner in the logical block diagrams which follow in the overall discussion of the entire apparatus.

A single pulse generator is illustrated in Fig. 11 and comprises a thyratron 251. The thyratron is normally biased beyond cutoff by a −20 volt source applied to its control grid through a voltage divider comprising a resistor 252 and a resistor 253. Input signals are applied through a differentiating capacitor 254. When the thyratron 251 is triggered on, its conduction through anode resistor 255 is sufficient to reduce the anode voltage to a point below that required to maintain the ionization of the tube. Therefore, the tube cuts off when the capacitor 256, which is connected between the anode of the tube 251 and ground, fully discharges through the tube 251. The output is taken from an output transformer 257 across a cathode resistor 259 through a capacitor 258. The combination of the transformer 257, the capacitor 258, and the resistor 259 serves to shape the output pulses. This device may be readily connected to the outputs of flip-flops, cathode followers, gates, and so forth, and is useful in reshaping pulses. A positive pulse applied to the input terminals results in rapid conduction of the thyratron 251 which is self-quenching. The reshaping units in the cathode circuit ensure that the output pulse is of proper form for transmission to following equipment.

Figure 11A:
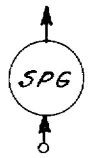

The shorthand symbol for this circuit is shown in Fig. 11*a* and comprises a circle having a single input and a single output and identified by the letters SPG (single pulse generator).

A pair of relay pullers (operators) are illustrated in Fig. 12. Each relay puller comprises a triode, such as 261, having in its anode circuit a parallel arrangement of a resistor 263 and a capacitor 264. The input potential is applied to the control grid through a resistor 262. In the tube 265, the input signal is applied to its control grid through a series grid resistor 266, and the anode circuit of the tube 265 comprises a parallel resistor 267 and capacitor 268. The anode-cathode circuit of either triode is connected in series with the coil of a relay, and, upon the application of a positive potential to the control grid, the respective tube conducts, allowing current to flow through the path 263 (and 264 at the initiation of the current flow) and the tube 261 to ground. The use of the capacitor in the anode circuit provides a low impedance path for the initial surge of current to enable the relay to operate more quickly when initially energized.

Figure 12A:
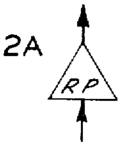

The shorthand symbol for the relay puller is illustrated in Fig. 12*a* and comprises a triangle having a single input and a single output. This symbolic representation may be recognized by the letters RP contained in the triangle.

A one-shot multi-vibrator (also known as a delay flop) is illustrated in Fig. 13 and comprises a triode 271 having an anode 272, a control grid 273 and a cathode 274; and a second triode 281 having an anode 282, a control grid 283, and a cathode 284. The cathodes 274 and 284 are connected together and to ground. The anode 272 of the triode 271 is connected by means of a resistor 285 and a parallel capacitor 286 to the control grid 283 of the triode 281, and the anode 282 of the triode 281 is connected by means of a parallel combination of a capacitor 276 and two resistors 275 and 287 to the control grid 273 of the triode 271. The input to the circuit is applied from terminals 278 through diodes 279 to the control grid 283 of the triode 281. The output is taken from the anode 272 and is applied simultaneously to the control grid of a cathode follower stage 288 and to the control grid of an anode follower stage 289, providing a simultaneous positive and negative output signal. In operation, the triode 271 is normally conducting and the triode 280 is normally non-conducting. The application of a positive pulse to either or all of the input terminals 278 triggers on non-conducting triode 281, reducing the potential at the anode 282 and effectively coupling a negative-going pulse to the control grid 273 of the triode 271 through the capacitor 276. The negative-going pulse applied to the control grid 273 tends to cause the normally conducting triode 271 to cut off and raises the potential at its anode 272, effectively driving a positive-going pulse to the control grid 283 and increasing the speed with which the tube 281 conducts. The control grid 283 is normally biased negatively by the source of −90 volts. Thus, in the absence of any positive-going pulse applied to the control grid 283, the tube 281 is cut off. Control grid 273 is driven negative by an amount nearly equal to the change in potential at the anode 282. Since at that time, tube 271 is fully cut off, tube 281 is held conducting by the divider action of resistors 277 and 285 and diodes 279. However, the capacitor 276 at control grid 273 will immediately begin to charge to +200 volts, the time constant being governed by capacitor 276, resistor 275 and the equivalent resistance of the circuit of tube 281. When the potential of control grid 273 returns to a value which allows tube 271 to conduct, the regenerative action described above takes place in reverse and the circuit assumes its stable state. Therefore, it can be seen that the time of conduction of tube 281 is dependent upon the time constant of the resistor 275 and capacitor 276. In this manner the time constant of the one-shot multi-vibrator may be varied over a wide range of times, and in the circuits of this invention, several such one-shot multi-vibrators having different time constants will be used.

Figure 13A:
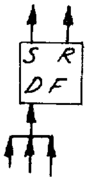

The shorthand symbol for this circuit is shown in Fig. 13*a* as a rectangle having two outputs which are the outputs from the cathode follower 288 and the anode follower 289 and three inputs having a common input point.

Fig. 14 represents a pulse generator which is used as a clock for the printer control unit. Two triodes 301 and 302 are connected as a free running multi-vibrator, the frequency of which is determined by the cathode resistors 303 and 304 and the interconnecting trimmer capacitor 305. The output of the free running multivibrator, which for this description can be considered to be 100 kc., is applied to the input of a triode amplifier 306. The output of the amplifier 306 is directly connected to the input of a second amplifier and pulse shaper 307, the output of which feeds a pulse shaping circuit which is primarily comprised of the differentiating capacitor 308 and resistor 309. The reshaped pulse is then applied to the control grid of a triode 312 across a rectifier 311. The rectifier 311 helps divert the positive grid current from the control grid of tube 312, and the anode resistors 310, which are connected in parallel essentially as a single resistor, serve to decrease the rise time of the potential at the anode of triode 307. The output of the amplifier 312 is then applied through a coupling capacitor and across a diode 314, which limits the positive swing of the pulse, to a cathode follower 313. The output of the cathode follower is simultaneously applied to two output stages 315 and 316 which produce positive output pulses. The clock pulse generator of Fig. 14 is designed to be stable and to produce properly shaped positive and negative pulses at the same time.

Figure 14A:
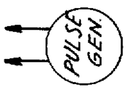

The shorthand symbol for the pulse generator is illustrated in Fig. 14*a* which comprises a single circle having two output leads. The pulse generator may be recognized by the terminology contained within the circle.

Fig. 15 illustrates a core driver pulse shaper circuit. The large number of magnetic cores used in this apparatus requires special driving circuits which ensure that the pulses applied to the cores are of proper amplitude and shape. A one-shot multivibrator comprised of triode 321 and a triode 322 is triggered into its unstable state by the application of a positive-going pulse on any of the inputs 328 or 329. The output of the one-shot multi-vibrator is applied as a negative step potential to the control grid of a normally conducting triode amplifier 323 by way of pulse shaping capacitor 326 and resistor 327. The subsequent positive pulse at the anode of the tube 323 is connected through coupling capacitors simultaneously to the inputs of five cathode follower stages, one of which, 324, is illustrated in this figure. The output of the cathode followers are applied through rectifiers 320 to the appropriate core drivers. The rise time of the pulse is improved by the insertion in the output circuit of the cathode followers of capacitor 325. To prevent ringing in the cores when the drive current is turned off rapidly, the decay time of the pulse applied to the core driver is slowed by capacitor 330 when the core driver is isolated by rectifiers 320 from the triode 324.

The shorthand symbol for core driver pulse shaper circuit is illustrated in Fig. 15*a* which indicates the circuit illustrated in Fig. 15. This shorthand symbol, in essence, comprises a single block having five outputs and a plurality of inputs and identified by the letters CDPS contained in the block. However, the number of outputs and the number of inputs may be varied to suit the particular application of the core driver.

In addition to magnetic cores and vacuum tubes the printer circuits also include a plurality of transistors. When vacuum tubes are to be operated from transistors, very often the potential level must be changed so that the tubes may be properly driven. A transistor-tube level changer is illustrated in Fig. 16 and comprises an amplifier stage 331 having an input signal from a transistor applied to its control grid. The tube 331 with its anode load resistor and a resistor 335 forms a potential divider between a source of −300 volts and ground. Connected to the junction of the resistor 335 and the anode load resistor of the tube 331 is a diode 333 and the control grid of a cathode follower stage 332. In operation, the application of a negative-going pulse of about −7 volts or greater to the control grid of the tube 331 results in an output at the cathode of tube 332 of approximately +10 volts due to the clamping action of the diode 333 and the current flow through the voltage divider circuits comprising resistor 335. When a positive input signal of zero volts or greater is applied to the input of the tube 331, the output of the tube 332 appearing at its cathode is approximately −35 volts due to the increased current through the tube 331 and the larger voltage drop across the resistor 335.

Figure 16A:
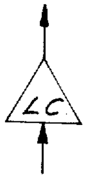
Figure 16:
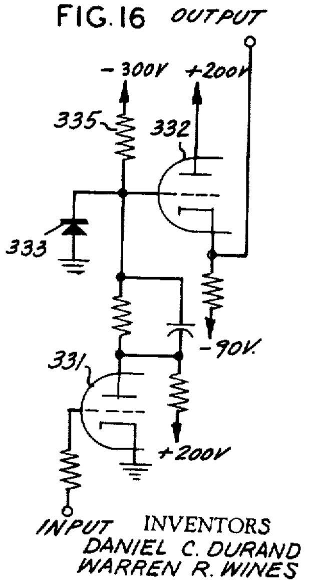

The shorthand symbol for the lever changer illustrated in Fig. 16 is shown in Fig. 16*a* and comprises a single triangle having one input and one output and identified by the lettering contained therein.

Fig. 17 illustrates the schematic circuit for an "or" gate, inverter, and cathode follower combination. A plurality of inputs 341 and 351 are applied to a pair of identical circuits through respective diode gates 342 and 352. The effect of the signal upon the control grid of the tubes 343 or 353 is determined by the relative potentials applied to the input terminals 341 and 351 respectively. Tubes 343 and 353 serve to invert the input signal and, in turn, apply them to the control grids of cathode follower stages 344 and 354. The outputs are taken from the cathodes of these tubes. A capacitor 345 is connected across the anode load resistor of the tube 343 and a similar capacitor 355 is connected to the resistor of the tube 353, these capacitors serving to increase the speed of operation of the circuit. In operation, the inverter tubes 343 and 353 are normally cut off and a positive potential at the junction point of the diodes 342 or 352 will serve to cause an inverter tube to conduct, allowing its anode to go less positive and causing the output of the cathode follower stages 344 or 354 to drop from a slightly positive potential to a negative potential.

Figure 17A:
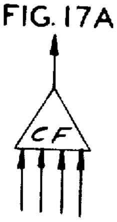

The shorthand symbol for the inverter-cathode follower circuit is shown in Fig. 17*a* and comprises a single triangle having a plurality of inputs and a single output and identified by the appropriate lettering in the triangle.

The circuit illustrated in Fig. 17 actually comprises a combination of three separate circuits, each of which have separate utility and may be connected with other such circuits and combinations. The diodes 342 and 352 are connected in a typical "or" gate with the junction points 346 and 356 normally maintained at approximately −90 volts by the negative source when the diodes are not conducting. This places a negative bias on the control grid of the inverter tubes. However, on the application of a positive-going pulse to any of the input terminals 341 or 351, the diodes begin conducting and the voltage at the junction point 346 or 356 immediately increases due to the voltage drop across the resistors 347 and 357. A positive-going pulse is then applied to the control grid of the inverter tube. The inverter tube 343 or 353 serves merely to invert the pulse, and, as such, operates as a typical amplifier. When a positive-going pulse is applied to its control grid it begins conducting, reducing the output voltage at its anode and passing on a negative-going pulse to the next stage. The cathode follower tubes 344 and 354 are also typical and merely amplify without inverting. They may be used in circuits for any of several reasons, such as impedance matching, conversion of voltage gain to current gain, and for whatever other use a cathode follower circuit is normally applied.

A pulse shaper for use with the address cores is illustrated in Fig. 18 in which pairs of tubes 361 and 362 are connected together to form a one-shot multi-vibrator. The output of the multi-vibrator is taken through a capacitor 363 and across a resistor 364, which serve to differentiate the output before application to the control grid of the normally conducting tube 365. Tube 365 is cut-off by the negative-going pulse applied to its control grid, and its anode voltage goes positive, transmitting a positive-going pulse to the control grid of a cathode follower stage 366. A transistor 367 receives the output of the cathode follower 366 and clips the output signal to a voltage which ranges between +10 volts and −10 volts.

The shorthand symbol for the core pulse shaper is illustrated in Fig. 18*a* and comprises a single block having one input and one output and identifiable by the appropriate lettering contained therein.

An emitter follower transistor circuit is illustrated in Fig. 19 in which a PNP transistor 401 comprises a collector electrode 402, an emitter electrode 403, and a base electrode 404. The base electrode 404 is connected to an input terminal 407 through a limiting resistor 408. Power is supplied to the collector electrode 402 from a source of −10 volts through a current limiting resistor 406. The output is taken across an emitter load resistor 405 and appears between the emitter electrode 403 and the collector electrode 402. This circuit is arranged to follow a transistor flip-flop circuit where the voltages range from −7 to +7 volts. The application of −7 volts to the input terminal 407 causes the base to draw current and the output of the emitter follower approximates −7 volts. This circuit is analogous to a cathode follower circuit and has a gain of less than unity. The emitter load resistor 405 is of high value and allows only a limited drive when the flip-flop input potential goes positive, thereby permitting a faster flip-flop rise time by decreasing the loading.

The symbolic block diagram of this circuit is illustrated in Fig. 19*a* and comprises a triangle having a single input and a single output and recognized by appropriate characters therein.

A flip-flop circuit comprised of transistors is illustrated in Fig. 20 and comprises two transistors 411 and 421. Transistor 411 comprises collector electrode 412, emitter electrode 413, and base electrode 414. The transistor 421 comprises collector electrode 422, emitter electrode 423, and base electrode 424. The transistors are connected in typical flip-flop fashion, the collector electrode 412 of the transistor 411 being connected through appropriate resistors and capacitors to the base electrode 424 of the transistor 421, and the collector electrode 422 of the transistor 421 being connected through appropriate resistors and capacitors to the base electrode 414 of the transistor 411. The inputs to the flip-flop are applied through two groups of terminals 415 and 425. The input pulses applied to the terminal 415 pass through diodes 416, which comprise normal "or" gates, and are applied to the base electrode 414 of the transistor 411, while pulses applied to the terminals 425 pass through the diodes 426, which form another "or" gate, and are applied to the base electrode 424 of the transistor 421. Diodes 417 and 427 are connected between the emitter line and the base electrodes 414 and 424 respectively of the two transistors and provide for a much higher flip-flop speed. The diodes 417 and 427 clamp the base electrodes to approximately +10 volts to prevent an over-charge of the resistor-capacitor networks connected between the base electrodes and the opposite collector electrodes of the other transistor, thus allowing the resulting pulse to decay sooner than without the diodes 417 and 427. A positive pulse applied to a terminal 415 will drive the base electrode 414 of the transistor 411 in the positive direction, causing holes to flow from the collector electrode 412 and causing a drop in potential in the collector electrode 412. This transmits a negative-going pulse to the base electrode 424 of the transistor 421. As the pulse is applied to the base electrode 424, hole-flow from the collector electrode 422 decreases, causing a positive-going pulse to be applied to the base electrode 414 of the transistor 411 and enhancing the action of the original positive-going pulse applied thereto. A positive pulse applied to one of the terminals 425 effects the same type of action, except that the base electrode 424 of the transistor 421 is driven in a positive direction and results in a negative-going pulse being applied to the base electrode 414 of the transistor 411.

The shorthand symbol for this flip-flop circuit is illustrated in Fig. 20*a* and is a typical flip-flop rectangle. This rectangle has a pair of inputs and a pair of outputs and can be identified by the characters FF contained therein.

To indicate on a display panel for maintenance purposes the particular cores which are set, or which other circuits are operative at any instant, requires, in addition to the indicator lamps on the panel itself, a circuit which controls those lamps. Such a circuit is illustrated in Fig. 21 and is essentially a voltage divider formed of resistors 431, 432, and 433 which connect −300 volt source to ground. In parallel with the resistor 433 is a PNP transistor 434. The collector electrode and the emitter electrode are connected to either end of the resistor 433. Signals are applied to the base electrode of the transistor 434 by means of an input terminal 435. When the signal applied to the terminal 435 drives the base electrode of the transistor 434 below ground potential, current flows through the base-collector circuit shunting the resistor 433. This reduces the potential at the output terminal to a point below that at which a glow tube will remain conductive, and the indicator goes out. However, if the potential applied to the input terminal 435 is positive, current flow through the transistor is interrupted, and the potential between the output terminal and ground increases above 45 volts, enabling a glow tube indicator to fire and indicate the condition of the circuit.

Figure 21A:
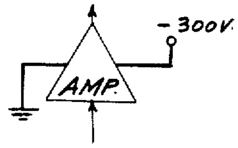

The shorthand symbol for this indicator amplifier is illustrated in Fig. 21*a* and comprises a single triangle having one input and one output. In addition a ground connection is shown connected to the triangle on one side, and on the other side is a terminal indicated by −300 volts.

Fig. 22 illustrates the schematic circuits for a combination transistor "and" gate pulse inverter. The pulse inverter comprises an NPN transistor 451 having a collector electrode 452, an emitter electrode 454, and a base electrode 453. The base electrode 453 is connected to an input terminal 455. The collector electrode 452 is connected to the base 443 of an NPN transistor amplifier 441 which also includes a collector electrode 442 and an emitter electrode 444. The junction of the base electrode 443 of transistor 441 and of the collector electrode 452 of the transistor 451 is connected to input terminals 446 and 445. The output of the transistor amplifier 441 is taken through a pulse transformer 448 and applied to an output terminal 447. In operation the two input terminals 445 and 446 may be used together with the transistor amplifier 441 as an "and" gate. If, however, a pulse is applied to the system which should be inverted for application to the "and" gate, or if it is necessary to utilize a pulse of the same polarity as those applied to the terminals 445 and 446 for inhibiting the gate 441, then the inverter 451 is inserted in the circuit. A positive pulse applied to the terminal 455 causes transistor 451 to conduct and makes amplifier 441 insensitive to pulses applied to terminals 445 and 446. Thus, a positive input applied to the terminal 455 may inhibit the gate 441.

Figure 22A:
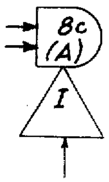

The shorthand symbol for the inverter gate of Fig. 22 is illustrated in Fig. 22*a* and comprises the combination of the symbol for an "and" gate having two inputs and a single output and the symbol for an inverter having a single input and having its output applied to the "and" gate.

Another form of transistor "and" gate is illustrated in Fig. 23 and comprises an NPN transistor stage 456 and a PNP transistor stage 457. The pulse input is applied to a terminal 458 which is connected to the base of the transistor 456, and the enable input passes through terminal 459 which is connected to the base of the transistor 457. The output is taken from the collector electrode of transistor 456 through a transformer 460 and appears at an output terminal. The application of a positive-going potential to terminal 459 cuts off the emitter electrode-collector electrode current flow in the transistor 457 raising the potential at the base of transistor 456 and allowing an input pulse at terminal 458 to draw current through the transistor 456. Electron flow through the emitter-collector circuit of transistor 456 produces a positive-going output pulse on the output terminal through the step-up and inversion characteristics of the transformer 460.

Figure 23A:
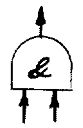

The symbol for the "and" gate is illustrated in Fig. 23*a* and comprises a standard "and" symbol which is a D-shaped block, having a pair of inputs and a single output. The gate is identified as an "and" gate by the appropriate symbol contained in the block.

Illustrated in Fig. 24 is a combination of "and" gates and core driver amplifiers. The amplifiers comprise a PNP transistor 461, an NPN transistor 462, and an NPN transistor 463. The "and" gate comprises a pair of diodes 466 which are connection between input terminals 464 and the base electrodes of the transistors 461 and 463. The output is taken from a terminal 465 which is connected to the emitter electrode of the transistor 462. The application of two negative pulses to the terminal 464 produces sufficient conduction in the circuit to cause current to flow through the base-collector circuit of the transistor 461. The base-collector current flow through 461 is amplified by the transistor and serves to produce an emitter current flow for transistor 462. This causes the current to flow out to the terminal 465 and through the winding of the core which is driven thereby.

Figure 24A:
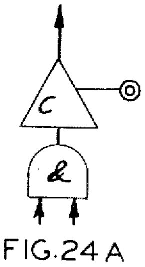

The symbol for this circuit is illustrated in Fig. 24*a* wherein the "and" gates are shown as the D-shaped block having two inputs and a single output which is connected to the triangle representative of the core driver.

A basic two stage shift register is illustrated in Fig. 25 and comprises two transistor flip-flops which are identical to the flip-flop illustrated in Fig. 20. Since the flip-flops are the same as those described earlier, only the interconnecting circuitry which transforms these two flip-flops into a shift register will be described in detail. The shift register comprises flip-flop 471 which includes a transistor 472 and a second transistor 473; and a flip-flop 481 comprising a first transistor 482 and a second transistor 483. A transistor 474 has its base connected to the collector electrode of transistor 472 and its conduction is determined thereby. Input signals may be applied to terminals 478 which are connected through diodes to the base electrode of transistor 472 and through terminal 479 to the primary of the transformer 476, the secondary of which is also connected through a diode to the base electrode of transistor 472. Another input terminal 477 is connected to the primary of a transformer 475, the secondary of which is connected by a fourth diode to the base electrode of the transistor 472. If the flip-flop 471 is the "zero" condition, the potential at the collector electrode of the transistor 472 is low and the potential on the base electrode of transistor 474 is also low, disabling this transistor. Since the primaries of both transformers 475 and 476 are connected to the collector electrodes of the transistor 474, when this transistor is disabled, no pulse applied to the terminal 477 or 479 will pass, and no shift action will take place. However, if a flip-flop 471 is in the "one" state, then the transistor 474 is enabled and a pulse applied to terminal 477 or 479 will be transmitted by the secondaries of the transformers 475 and 476 and diodes connected thereto to the base electrode of the transistor 472. This clears the flip-flop 471 and causes the flip-flop 481 to change its condition due to the transmission of a pulse through a diode 480 to the base electrode transistor 482. Thus, for a right shift operation, input signals are applied to terminals 477, 478 or 479; for left shift operations, input signals are applied to corresponding terminals 488, 487, 489, and the operation of the device for a left shift is essentially identical to that described above.

The shorthand symbol for the two stage shift register is illustrated in Fig. 25*a* and comprises two adjacent flip-flop rectangles containing appropriate information therein and having a plurality of inputs and a plurality of outputs including the carry input and output and the shift inputs.

In Fig. 26 a sense detector and amplifier stage is illustrated. A pair of transistors 491 and 492 are connected in push-pull across an input transformer 493 to which the output signals from a memory core are fed. A resistor 496 in the emitter electrode circuits of the push-pull transistors 491 and 492 serves to provide degeneration and minimizes the differences in the operational characteristics of the two transistors. The output signal from the push-pull circuit is negative in nature because of the rectifying of the transistors 491 and 492 and is applied to a clipper transistor 494. A voltage divider circuit comprised of resistor 497 and resistor 498 has its junction point connected to the emitter electrode of the transistor 494 and serves to limit the output voltage of signals from the transistors. The output is taken from the collector electrode of the transistor 494 and is applied to the base electrode of an output amplifier 495. A voltage divider circuit in the emitter electrode circuit of the amplifier transistor 495 serves also to clip this signal and limit it to a negative-going pulse having a maximum negative amplitude of −6 volts. This circuit takes a very weak signal emanating from the memory cores, detects that signal, and amplifies it to the point where it can be transmitted to subsequent circuits. From the generalized sign wave which is generated by the memory core, the circuit illustrated in Fig. 26 creates a well formed rectangular pulse.

Figure 26A:
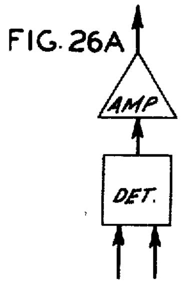

The shorthand symbol for the detector and amplifier circuit illustrated in Fig. 26 is shown in Fig. 26*a* and comprises a rectangular block having two inputs and a single output for the detector and a triangle having its input connected to the output of the detector and having a single output for the amplifier.

A combination of transistors which are used as amplifiers, pulse shapers, and impedance matching networks for receiving a small pulse and producing an amplified pulse of the proper shape for driving inter-unit cables and for vacuum tube circuitry is illustrated in Fig. 27. This circuit comprises an amplifier transistor 501 having a terminal 502 connected to its base electrode. A pair of parallel connected transistors 503 and 504 are connected to the collector electrode of the amplifier transistor 501. The transistor 503 is an NPN type and the transistor 504 is a PNP type. Since transistors 503 and 504 are connected as emitter followers, the outputs will be in opposite phase upon the reception of identical input signals. Connected to the parallel emitter follower amplifiers 503 and 504, is a transistor switching device 505 having its emitter electrode connected to a source of +10 volts through a diode 511 and one resistor 512 of a voltage divider which includes a second resistor 513. The output of the switch 505 is taken through an output transformer 506. With no input signal, there is no change in current flow through the transformer 506, and the only current flowing through the circuit is leakage current. The application of a positive pulse to the input terminal 502 makes the base electrode of the transistor 501 positive with respect to the collector electrode. This causes current to flow in the collector-emitter circuit. The output of the transistor 501 is applied simultaneously to the bases of the transistors 503 and 504. The negative pulse applied to the base of transistor 504 causes this transistor to conduct and to connect the base of the transistor switch 505 to ground through the resistor 509 and the transistor 504. This produces current flow through the collector-base circuit of the switch 505, establishing a change in current flow to the primary of the transformer 506, and generating an output pulse in its secondary. The emitter of the transistor 504 is positive because of the positive potential applied to the emitter of the transistor switch 505 due to the diode action of the gating transistor 505. Since the emitter of the transistor 504 is positive with respect to its base, the incoming pulse causes the transistor 505 to conduct. To ensure rapid cutoff of the switching transistor 505 and to ensure that a symmetrical pulse is thus created at the output, the emitter-follower transistor 503 operates when the input pulse decays. The decay of the input pulse causes the amplifier transistor 501 to stop conducting, putting its collector electrode at a +10 volts. When the base of the transistor 503 goes to +10 volts, this transistor conducts. The emitter of the transistor 503 is then negative with respect to its base, since the switching transistor 505 is also conducting, and this puts the emitter of the transistor 505 at −5 volts and connects the emitter of the transistor 503 to the same potential. When the positive drive of the transistor 503 has turned off the gating transistor 505, the potential at the emitter of the transistor 503 rises to almost the +10 volts of the source because of the increased impedance of the gating transistor 505. This positive potential maintains the transistor 505 off until the next input pulse is applied to the input terminal 502.

Figure 27A:
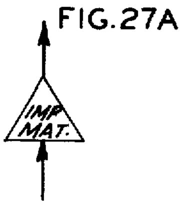

The shorthand symbol for the combination transistor circuit illustrated in Fig. 27 is shown in Fig. 27*a* as the normal amplifier triangle having a single input and a single output and being identified by appropriate lettering within the triangle.

Figure 28A:
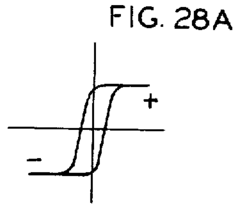

A typical address-core circuit is illustrated in Fig. 28 and comprises a magnetic core 521 of generally annular construction having wound thereon an output winding 522, a clear winding 523, and a set winding 524. The output winding 522 is connected to output terminals through a diode 529 and a current limiting resistor. The clear winding 523 is connected between an input terminal 526 and ground, and the set winding 524 is connected between an input terminal 525 and the collector of transistor 527 through a diode 528. The core 521 has a substantially rectangular hysteresis loop such as is illustrated in diagrammatic form in Fig. 28*a*. The application of a pulse to the terminal 525, through the set winding 524, the diode 528 and the transistor 527 drives the core material 521 to saturation in a positive direction as indicated on Fig. 28*a*. When the set pulse decays or is removed, the material of the core 521 remains in a positive saturation condition. The subsequent application of a pulse to the terminal 526, which pulse passes through the clear winding 523, drives the material of the core 521 to saturation in a negative direction as is shown in Fig. 28*a*. The change in flux in the core material 521 induces a positive potential across the output winding 522 which is applied to the output. If the core is set from a cleared condition, that is, when the material of the core 521 is in a negative saturation condition, then a negative output pulse is induced in the output winding 522. Which core in a bank of cores is to be set by an incoming pulse applied simultaneously from terminal 525 to the entire bank of cores is determined by the condition of the transistor 527. Connected between the base electrode and the emitter electrode of the transistor 527 are a pair of input terminals to which the enabling potential is applied. Therefore, although the pulse to set the cores is applied to the entire bank of cores at the same time, it will pass only through those coils 524 which are connected to enabled transistors 527. In this manner, a particular memory address may be selected from a plurality of such addresses. In the same manner, all of the cores of a bank of cores are cleared simultaneously by the application of a clear pulse to the terminal 526. Diode 528 is inserted in the path between the set core 524 and the collector electrode of the transistor 527 to prevent unwanted current flow through the collector-base circuits of the transistor when it has not been enabled. Such leakage current flow would provide a spurious path for a set pulse when that core is not to be set. The diode 529 is inserted in the output circuit to prevent the setting of the core due to print and check noises coming from other cores and other portions of the output circuits.

Figure 28B:
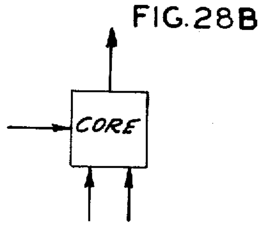

The shorthand symbol for an individual core storage is illustrated in Fig. 28*b* and comprises a block having a pair of inputs, a single output and a selection input connected into the side of the block. The memory is identified by appropriate characters contained within the block itself.

In addition to the cores used for the address memory, cores are also used for both the address check and the print storage. Fig. 29 illustrates a pair of such magnetic cores, the check and print storage cores being utilized in pairs. The circuit comprises a print magnetic core 531 having wound thereon a set winding 532, a clear winding, 533, and an output winding 534; and a magnetic check core 541 having wound thereon a set winding 542, a clear winding 543, and an output winding 544. A set input terminal 545 is connected through a pair of diodes 547 to one side of the set winding 542, the other side of which is connected to one side of the set winding 532, and the circuit is completed through ground. The diodes 547, which are connected in series with the set windings, are present to provide a sufficiently long diode forward recovery time to prevent noise signals from affecting the set winding. When the set signal is originally applied to the input terminal 545, a clear signal is simultaneously applied to the terminal 536 of the clear winding 533 on the print core which biases the core 531 and prevents the set pulse from setting the print core. Therefore, when the first set pulse is applied, only the check core 541 is set. The cores 531 and 541 have generally rectangular-shaped hysteresis loops as is illustrated in Fig. 28*a*, and the function of the respective windings is the same as that described with respect to the address cores illustrated in Fig. 28. When a set pulse is next applied to the terminal 545, it sets the print core 531, the check core 541 not being affected since it is already at positive saturation. Subsequently, a clear signal is applied to the terminal 536 of the clear winding 533 of core 531 to clear the core and to develop an output pulse which is applied to the output terminal 537. The output pulse from the print core 531 is, by means not shown on this circuit, applied to terminal 549 and to the output winding 544 of the core 541 and clears core 541. At a later time all of the check cores have a clear signal applied to the terminal 546 to clear any core which had not previously been cleared by the output pulse from its associated print core, and if such a core has not been cleared, an output signal is developed across the output winding 544 and is applied to the output terminal 548. In this manner, a check of the setting and of the printing of the appropriate address cores is provided. The diode connected between the terminal 549 and the output winding 544 of the core 541 is provided to isolate this winding from other circuitry to avoid spurious clearing of the check core 541. The diodes connected between the output winding 544 and the output terminal 548 are inserted to increase the output impedance of this circuit since the output windings of a plurality of such cores are connected in parallel.

The shorthand symbol for each of the core storage devices is the same as that illustrated in Fig. 28*b* and will not be repeated at this time.

In addition to circuits for changing the level of the energy when going from transistors to vacuum tubes, there is also a need for potential level changers for circuits which go from electron tubes to transistors. Such a circuit is illustrated in Fig. 30 and comprises an input terminal 351 connected to a source of −90 volts through a resistor 552. A pair of diodes 553 and 554 are respectively connected to a source of +10 volts and to a source of −10 volts and act as diode clamps. The junction of the diodes 553 and 554 is connected to an output terminal 555. Due to the action of the clamping diodes, an input signal having a level of approximately +35 volts applied to the input terminal 351 produces an output signal at terminal 555 having an amplitude of approximately +10 volts, and an input signal applied to the terminal 551 having an amplitude of approximately −40 volts produces an output at terminal 555 of approximately −10 volts. The potential swings from electron tubes are much greater than those required for application to transistors, and it is for this reason that a level changer circuit as illustrated is required.

The shorthand symbol for the level changer is illustrated in Fig. 30a and is the same as that shown in Fig. 16a, except for the identifying legends within the triangle.

The reading amplifier used to amplify the electrical signals obtained from reading magnetic spots recorded on tape or drums is illustrated in Fig. 31. Signals from the reading head are applied through terminals 561 and a transformer 562 to the control grid of a triode amplifier 563. A diode 564 is connected between the control grid of triode 563 and ground to improve the rise time of the input pulses. A.C. connected triode amplifiers 560, 565, and 566 are cascaded with triode 563 to form a four-stage amplifier. The output of the four-stage amplifier is clipped and applied to the input of a two-stage cascaded D.C. connected amplifier comprising triodes 567 and 568. The output from triode 568 is simultaneously applied to an anode follower 569 and a cathode follower 571. A positive input pulse at terminals 561 results in a positive pulse on a "1" output terminal 573 and a negative pulse at a "0" output terminal 572; whereas, a negative pulse at terminals 561 results in a positive pulse at the "0" output terminal 572 and a negative pulse at the "1" output terminal 573. In this manner each polarity magnetic recording (denoting a "1" and a "0") results in its own positive pulse for application to the circuits of the printer.

The shorthand symbol for the read amplifier is the triangle used to denote amplifiers with the appropriate characters contained therein, and is illustrated in Fig. 31A.

Fig. 76 is a schematic circuit diagram of a pulse narrower as used in the circuits of this invention. The pulse narrower comprises two triodes 901 and 902. Triode 901 comprises an anode 903, a control grid 904, and cathode 905; and the triode 902 comprises an anode 906, a control grid 907 and cathode 908. The cathode 908 is connected to cathode 905 and both are directly connected to ground. Anode 903 of the triode 901 is connected through the primary of a transformer 911 to a source of +200 volts, the secondary of the transformer 11 having resistor 912 connected across it and being connected to output terminals 913 through a diode 914. Anode 906 of the triode 902 is connected through a transformer 921 to a source of +200 volts; its secondary having a resistor 922 connected across it and having one end connected directly to ground. The control grid 904 of the triode 901 is connected to one end of a capacitor 915, the other end of which is connected to one end of a secondary of the transformer 911 and to one end of a diode 923 the other end of which is connected to the ungrounded end of the secondary of transformer 921. The control grid 904 of the triode 901 is also connected through a resistor to a source of +35 volts and across a parallel arrangement of a capacitor 931 and a diode 932 to the input terminal 933. The input terminal 933 is also connected to a source of −20 volts through a high impedance combination of resistor 934 and a choke 935 and a limiting resistor 936. Also connected to the input terminal is a diode 941 feeding a delay line having a first section 942 and a second section 943. A shunt capacitor 944 is connected between the midpoint of the two sections 942 and 943 and a source of −20 volts. The other end of the delay line is connected through a diode 944 to the control grid 907 of the triode 902 which is also connected to a source of +35 volts. A source of −20 volts is connected through a limiting resistor 945 and a high impedance comprising a resistor 946 which has a choke 947 wrapped thereabout.

In operation, a pulse is applied to the input terminal 933 and through the interconnecting circuitry to the control grid 904 of the triode 901 to turn the triode on. This produces a positive output pulse at the output terminal 910. In the meantime, the leading edge of the input pulse applied to the terminal 933 is delayed in the two section delay line 942 and 943 and is applied to the control grid 907 of triode 902. If the pulse applied to the control grid 904 has not yet decayed, the leading edge of the delayed pulse will then reach the control grid 907 of the triode 902 to turn on that triode, generating a negative pulse at the diode 923, which passes therethrough and is applied to the control grid 904 to turn off the tube 901. Thus, the period of time during which the triode 901 is conductive is controlled by the time required for the leading edge of the input pulse to be applied through the delay line 942 and 943 and the triode 902 to the control grid of 904 of the triode 903.

*Data input register (Fig. 32)*

Referring to Fig. 32, the data input register 21 of Fig. 5 is illustrated therein in detailed, logical block form. As previously indicated, the function of the data input register is to receive information selectively from the high-speed computer (on-line operation) or from a separate storage unit (off-line operation) independently of the computer. This information is received in the form of seven bit characters for transfer into the buffer information register 22. The seven bits are received from a tape unit in parallel from the storage unit along seven separate two-wire line circuits to input terminals DR1–0 through DR1–6. From these terminals, the pulses from the tape reading heads pass through suitable pulse transformers DR2–0 through DR2–6 to the respective left-hand inputs of a group of trigger units or flip-flops of the type shown in detail in Fig. 8. There are seven of these flip-flops (one for each binary order) which are respectively labelled DR6–0 to DR6–6. Each flip-flop has two inputs, corresponding to the respective trigger sides of each flip-flop. A 1.2 microsecond delay line DR5–0 through DR5–6 is interposed before each input terminal of every flip-flop DR6 for a purpose which will be described below. The left hand output of each flip-flop is connected to one input of an "and" gate DR–0 (identified as DR9–0 to DR9–6 respectively), of the type shown in Fig. 7, and therefore serves as the operative output for the flip-flop. In the normal or "0" output condition of the flip-flop, the left hand output terminal is down (minus sign) and the right hand terminal is at its high voltage level (plus sign). In this condition, a positive signal to the left hand input from a transformer DR2 will reverse the output voltage levels so that the left hand output terminal of the flip-flop will now be at its high voltage level and the right hand terminal at its low voltage level. In this condition, the "and" gate DR9 associated with the particular flip-flop will be conditioned so that a positive input pulse (SP1) on terminal DR7, passing through amplifier DR8, will activate the condition "and" gate DR9 to pass the pulse signal through its associated transformer DR11 to its output terminal DR4. This action will occur at each output terminal DR4 if an input signal has been received on the corresponding input terminal DR1; in any order which receives no such input signal, there will be no output signal and the "and" gate of that order will not be conditioned by setting its associated flip-flop.

A clear circuit is provided from clear input terminal DR12 to the right hand input of each flip-flop, whereby a positive input clear signal will re-set all of the flip-flops, which have been set as above described, back to their initial condition. Any flip-flop which has not been set by an incoming signal will, of course, not be effected by the clear voltage since it already is in the initial condition.

In the event that it is desired to supply input data to the printer from a high speed computer, the situation is somewhat different, since the computer data are not in the form of parallel signals on seven separate lines as above described, but instead are available in serial form on only two lines, the pulses on one of these lines representing "1" and pulses on the other of these lines representing "0." The arrangement is such that when the "1"

line is positive, the "0" line is negative, and vice versa, so that even when a positive pulse is not available on the "1" line, it is available on the "0" line. When the DR3 terminals are used as inputs, the series of flip-flops DR6 operate, in effect, as a shift register, as will now be described. Assuming that the character to be stored in the flip-flops DR6 is, for example, 0011001, as these are delivered in serial form with the lowest order first, the first character will be a 1, therefore a positive pulse will be supplied to line DR13, while the corresponding negative pulse on line DR14 can be ignored, as the flip-flops respond only to positive pulses. The positive pulse on line DR13 will proceed on line DR16 to the left hand input of flip-flop DR6–6, and will flip this flip-flop so that its output voltages are reversed from those shown in the figure. Although the voltage on line DR17 is now positive, no signal can pass through gate DR9–6 because no input pulse appears at terminal DR7 at this time.

Positive voltage on line DR13 also passes through "or" gates DR19 and DR21, and therefore also appears on lines DR22 and DR23, so that it is also applied to each of the series of "and" gates DR24, which are shown in detail in Fig. 7, associated with the respective flip-flop inputs. It should be noted that when the input terminal DR3 is receiving a zero, a positive impulse will appear on line DR14, which will also pass through both of the "or" gates DR19 and DR21, so that, at every pulse time, there is always a positive pulse available at each of gates DR24. However, in the condition shown, these positive pulses will do nothing to change the conditions of the respective gates DR6–0 to DR6–5.

Considering for example flip-flop DR6–5, at the moment the first positive pulse appears on line DR22, it cannot get through gate DR26, because at this time line DR17 is negative, and therefore a left hand input to gate DR26 blocks passage of the pulse. The purpose of the time delay DR5 will now be evident, because the pulse from line DR16 to DR6–6 cannot be effective to flip-flop DR6–6 until the action above described is completed, that is, the blocking action of "and" gate DR26. After the flip-flop DR6–6 has changed its state, there is a positive voltage on line DR17, and a positive pulse on line DR22 will now be passed, but this is after the duration of the pulse has expired. It will be noted that before the flip-flop DR6–6 has changed its state, which is the time now under consideration, there is a positive voltage on line DR18, and therefore "and" gate DR27 will pass its positive pulse from line DR22, but this would only tend to put flip-flop DR5–5 into the state which already exists, and, therefore, nothing happens. The same is, of course, true of all of the other flip-flops DR6–0 to DR6–4. Thus, the first positive pulse has been effected to change the stage of flip-flop DR6–6, but has not effected any of the other flip-flops.

The second digit of the number given in our example is a 0, which now arrives as a positive pulse on line DR14. This appears via line DR28 at the right hand terminal of flip-flop DR6–6 and, after the delay, flips it back to its initial or "0" state. This same pulse, after passing through "or" gate DR19 is now passed through "and" gate DR26, because line DR17 is at this time positive, as described above, and therefore triggers flip-flop DR5–5 into the "1" condition. All of the other flip-flops remain unchanged for the same reason as before, since the situation with respect to these flip-flops has not been altered.

The last two digits of our number are now stored in flip-flops DR6–6 and DR6–5 as 0 and 1 respectively. It will be apparent that as successive succeeding pulses appear on lines DR13 and DR14 respectively, the value of the most recent pulse will always be registered in DR6–6, while all of the perceding stored values will be shifted down one order, and this process will continue until the entire number 0011001 is stored in the respective flip-flops. After this has been accomplished, a pulse at terminal DR7 will transfer the stored number in the same fashion as previously explained in connection with parallel operation from the tape unit. After this has been done, a clear pulse coming in at terminal DR12 will restore all the flip-flops to their original condition for reception of the next digit or character.

*Buffer information register (Figs. 33A and B)*

The buffer information register (22 on Fig. 5) fulfills a plurality of functions. It receives the character input from the data input register (21 on Fig. 5) and, in turn, transfers that information, character-by-character, into the buffer memory (23 on Fig. 5). It also receives information from the buffer memory, character-by-character, and holds that information for application to the comparator (24 on Fig. 5) during the comparisons with the information from the character code register (25 on Fig. 5). The buffer information is illustrated in Figs. 33A and B and comprises seven flip-flops, labeled respectively BR1–0 through BR1–6. (BR stands for buffer register, the "1" stands for the flip-flop, and the last numeral defines the binary order in which the flip-flops appear.) There are several inputs to each flip-flop, one set of which inputs, labeled BR2–0 through BR2–6, comes from the output terminals DRB1 of the data input register. A second group of inputs, labeled BR3–0 through BR3–6, each comprises a pair of terminals which are connected to the outputs BO3 of the buffer memory (Fig. 34) and are connected into an input amplifier and detector which are respectively labeled BR4–0 through BR4–6 and which are of the type shown in Fig. 26. The outputs of the amplifiers BR4–0 through BR4–6 are each connected into an "and" gate, BR5–0 through BR5–6, which requires, in addition to the amplifier output an input signal from the Read-Out Enable line, identified as such on the drawings. The outputs of the "and" gates BR5–0 through BR5–6 are applied to a second group of "and" gates BR6–0 through BR6–6, of the type shown in Fig. 22, which require, in addition to the output from the BR5 gates, an information probe signal from the Information Probe line. The outputs of the BR6 gates are then fed into the flip-flops BR1 to place them in the "1" condition. When the flip-flops are to be cleared, a pulse is applied to the Clear Information line which provides inputs for the "0" side of each of the flip-flops, restoring all of them to the "0" condition.

The outputs of the flip-flops BR1–0 through BR1–6 are taken from the "0" side through "and" gates BR7–0 through BR7–6 and fed into core drivers BR8–0 through BR8–6, which gates and core drivers are illustrated on Fig. 24. The "and" gates are not enabled unless an inhibit signal from the Inhibit line is present. The clear information register, information probe, and the inhibit signals are applied from output terminals BC22, BC21 and BC9 respectively, of Fig. 39. The core drivers BR8 are connected to the inhibit coils on the buffer memory cores (see Figs. 37 and 38) and serve to supply information thereto. The "and" gates BR7–0 through BR7–6 are driven by appropriate emitter followers BR9–0 through BR9–6 as shown in Fig. 19. Another output is taken from the emitter followers BR9 before the input to the "and" gates BR7 and is connected through the transistor-tube level changers, illustrated in Fig. 34, to be applied to the comparator. A second set of emitter followers BR10–0 through BR10–6 are fed from the "1" output of each of the flip-flops BR1–0 through BR1–6 and drive indicator amplifiers, shown in Fig. 21, which serve to operate indicating lamps on the supervisory control panel of the printer unit to show the condition of the buffer register at any time.

In addition to the input from the data input register BR2–0 through BR2–6 and the inputs from the buffer memory BR3–0 through BR3–6, the buffer register also has a group of switches for the manual input of information. These switches, labeled BR11–0 through BR11–6, have both a "0" and a "1" contact to place the designated flip-flop into the appropriate condition.

In operation, information is transferred from the data input register outputs DR4–0 through DR4–6 (Fig. 32) through the input terminals BR2–0 through BR2–6, respectively, directly to the flip-flops BR1–0 through BR1–6, placing these flip-flops in the same condition as were the flip-flops BR6 in the data input register and thereby effectively transferring the character from the data input register into the buffer register. The flip-flops BR1–0 through BR1–6, when once set, remain in that condition until changed and apply static potentials to the emitter followers BR9–0 through BR9–6 and BR1–0 through BR10–6. This information is applied through the "and" gates BR7–0 through BR7–6, at the time a pulse appears on the Inhibit line, and through their corresponding core drivers BRS–0 through BRS–6 to the inhibit lines of the appropriate buffer memory cores to prevent setting these cores. The cores are set by X and Y signals as is explained below, unless setting is inhibited. Information is thus transferred from the buffer register to the buffer memory.

In addition to receiving information from the data input register and transferring this information to the buffer memory cores, the buffer register may also receive information from the buffer memory cores for application to the comparator. Information is supplied from the buffer memory cores to terminals BR3–0 through BR3–6 and through the appropriate amplifiers BR4–0 through BR4–6 to the "and" gates BR5–0 through BR5–6 passing the "and" gates BR5 only when a read-out enable pulse is present on the Read-out Enable line. When both the information pulse and the read-out enable signal are available, the information pulse passes through the appropriate "and" gate BR5 and is applied to the "and" gate BR6. To pass the gates BR6, an information probe pulse from the information probe line is also required on each gate. If the two signals are present, the "and" gate BR6 open and the information is applied to the flip-flops BR1 to set them in accordance with the information received from the particular address in the buffer memory. In this case, the output from the buffer register to the "and" gate is inhibited since no inhibit signal is on the inhibit line, and the information is applied only to the output terminals which are connected to the transistor-tube level changers of Fig. 34 and therethrough to the comparator circuits.

As explained earlier the character entering the buffer register is inspected by the function table for non-printable characters, and, when one is found, the character is replaced with an ignore signal unless the printer is in computer digit operation. The same situation exists when zeros are to be suppressed. When either a zero or a non-printable character is to be suppressed and replaced by an ignore, a zero clear pulse is applied to a 4 microsecond delay at one input of an "and" gate BR12–3 such as that of Fig. 23. At the same time a special signal is applied from the zero suppress circuits to the same "and" gate BR12–3 to apply a clear signal to the clear information register line, clearing flip-flops BR1–0 through BR1–5 and putting the flip-flop BR1–6 in the "1" state. With only BR1–6 in the "1" state and all of the other flip-flops in the "0" condition, ignore is represented by the buffer register.

The sources of the read-out enable, the zero clear, the character pulse signal, the special, and the computer digit signals, will be explained in more detail hereinafter.

*Buffer outputs (Fig. 34)*

The output of the buffer information register, before it is applied to the comparator for comparison purposes, passes through a bank of transistor-to-tube level changers. The array of output circuits from the buffer information register is illustrated in Fig. 34 and comprises six pairs of input terminals BO1–1 through BO1–6. Each input terminal is connected to an appropriate "0" or "1" output terminal of the buffer information register. The terminals BO1 are each connected to the input of a transistor-to-tube level changer BO2–0 through BO2–6, which are of the type shown in detail in Fig. 16. The output of each of the level changers BO2 is connected to an output terminal BO3–0 through BO3–6, which are arranged in pairs, with one terminal of a pair representing a "1" output and the other terminal of a pair representing a "1" output.

*Comparator and code generator register (Fig. 35)*

The comparator 24 of Fig. 5 has two sets of inputs, one set CO1–0 through CO1–5 is equivalent to the buffer output and is connected to the output terminals of the buffer output BO3–0 through BO3–5 as shown in Fig. 34. The other input to the comparator is from the code generator register 25 which receives its input from terminals CO2–0 through CO2–5 from the reading heads associated with the magnetic drum 19 upon which the character code has been recorded and through head amplifiers CO3–0 through CO3–5. The outputs of the head amplifiers CO3 are applied to the input of amplifiers CO4–0 through CO4–5, the outputs of which are each applied to the "1" input of a group of six flip-flops CO5–0 through CO5–5. The flip-flops CO5 store the code combination for the particular character which is approaching printing position on the type wheel 18 of Fig. 5. The presence of a pulse is indicated by the "1" condition of the flip-flop CO5 and the absence of a pulse in any position is represented by the "0" output of the corresponding flip-flop CO5. The "1" and the "0" outputs of the flip-flop CO5 are applied to the input of the comparator 24 of Fig. 5. The comparator itself comprises 12 "and" gates CO6–CO17 each of which has four inputs. The gates, which may be any suitable diode "and" gates, requiring the coincidence of inputs to produce an output signal, are arranged in three groups of four each, and their outputs are fed through three cathode followers CO18, CO19 and CO20 to the input of another "and" gate CO21. When a signal appears at the output of gate CO21, a direct comparison is made between the character represented on the input terminals CO1–0 through CO1–5 from the buffer outputs and the character stored in the flip-flops CO5–0 through CO5–5 of the code generator register. To illustrate the operation of the comparator, assume that a signal is present on the input terminal CO1–5 from the buffer output which represents a "1" in the fifth bit position of that character. This signal is applied to the input of gates CO17 and CO16. If flip-flop CO5–5, which represents the fifth position in the code generator register and corresponds to the fifth position in the buffer information register, is the "1" condition, then a similar input signal is applied to the inputs of CO16 and CO17 also. If there also appears in the fourth position of the character in the buffer information register and in the character stored in the clear code generator register a "1," then the "1" input terminal CO1–4 will apply a signal to the input of gates CO15 and CO17 and the flip-flop CO5–4 will apply a signal to the gate CO15 and CO17. At this time, the gates CO15 and CO16 each have two signals applied to their inputs, but the gate CO17 has four coincidence signals and it will generate an output which will be applied through the cathode follower CO20 to an input of the final output gate CO21. This output signal indicates that the characters stored in both the code generator register and in the buffer information register contain "1" in the fifth and in the fourth position. If the character stored in the code generator register contains a "0" in the third position, signals will be applied to the inputs of gates CO7 and CO10, but if the character stored in the buffer information register has a "1" in the third position, then signals will be applied from those input terminals CO1–3 to the inputs to gates CO12 and CO13. Since the signals from the third position do not coincide at the inputs of any gates, none of the middle group of "and" gates CO10 through CO13 will pass a signal through its cathode follower CO19 to an input of the final output gate CO21, and the comparator will not indicate that a comparison has been made. This procedure can be followed through for those characters which coincide in the code generator register and in the buffer information register, and it will be seen that the comparator will produce an output from gate CO21 only when there is an actual one-to-one comparison or coincidence of signals between the two.

*Odd-even checker (Fig. 36)*

As can be seen from Fig. 5, when information is transferred into the buffer information register 22 for application to comparator 24, it is at the same time applied to a parity, or odd-even, checker. This odd-even checker is illustrated in block form in detail in Fig. 36 and comprises a plurality of pairs of input terminal OD1–0 through OD1–6 which are connected to the buffer outputs BO3 of Fig. 34. Through terminals OD1 the seven pulse positions of the characters in the buffer information register are applied to a plurality of "and" gates OD2 through OD9. Each of these "and" gates OD2–9 require three simultaneous input signals for the passage of a signal therethrough. The "and" gates OD2 through OD9 are considered in two separate groups which comprise OD2–5 and OD6–9. The outputs from the first group, OD2 through O5, are applied to a cathode follower "or" gate OD10, the output of which is applied through an inverter OD13 to gates OD14 and OD16, and directly to gates OD15 and OD17. Gates OD6 through OD9 have their outputs applied through a cathode follower "or" gate OD11 directly to gates OD16 and OD17 and through an inverter OD12 to gates OD14 and OD15 to check the three highest order positions for an odd number of pulses. The input from the terminals OD1–4 through OD1–6 are applied in pairs to the gates, for example the "1" terminal of OD1–6 is connected to an input of both OD9 and OD8, and the "0" input of OD1–6 is connected to an input of gate OD6 and of gate OD7. In this manner the signals are so combined by the gates OD6–9 that if one or three "1"s appear simultaneously in the first three positions of the character, the output from the cathode follower OD11 will be positive, but if there are no "1"s or if the total number of "1"s is even in the highest three positions of the character, then the output of cathode follower OD11 will be negative. To illustrate this, suppose we consider a "1" in the highest order. This means that a positive signal will be applied from the "1" terminal OD1–6 to the extreme left hand input of gate OD9 and OD8. Simultaneously therewith a positive signal will be applied from the "0" terminals OD1–5 and OD1–4 to the middle input of gates OD8 and OD6, and to the right hand input of OD8 and OD7. Only OD8 will have three simultaneous inputs and a single positive pulse will be applied to the cathode follower OD11 to be passed thereby. If however, we consider a "1" in both the highest order and in the second highest order of these three positions, then the "1" terminal of OD1–6 will apply a positive signal to the left hand inputs of gates OD8 and OD9, the "1" terminal of OD1–5 will apply a positive signal to the middle inputs of OD9 and OD7, and the "0" terminal OD1–4 will apply an input signal to the right hand side of OD8 and OD7. None of the four gates OD6 through OD9 will have three simultaneous inputs and no output will be applied to cathode follower OD11, which will then remain in a negative position. The three next positions of a character are checked in a similar manner by the other groups of gates OD2 through OD5 and if there is either one or three "1"s in these three positions, the output of the cathode follower OD10 will be positive, but if the next three positions contain either no "1"s or an odd number of "1," then the output of the cathode follower OD10 will be negative. The least significant pulse positions represented by terminals OD1–0 are connected to the "and" gates OD14 through OD17 directly. If both groups of three pulse positions contain an odd number of pulses, then the output of cathode followers OD10 and OD11 will both be positive and a positive signal will be applied to the gate OD17, OD16, and OD15. For a character to have an odd number of pulses under these conditions, the least significant position must also be a "1," and this will result in an input signal being applied to gates OD14 and OD17. OD17 will then have a signal from cathode follower OD10, a signal from cathode follower OD11, and a signal from the "1" terminal of OD1–0, enabling the gate and passing a positive output signal to cathode follower OD21 which then produces an indication that this character has an odd number of input pulses. If, however, the checker determines that the total number of pulses in a character is even, the output of cathode follower OD21 will be negative and this will be inverted by the inverted OD18 to produce a positive indication at the even terminal.

In ordinary operation the non-printable characters which are used for control purposes are replaced in the buffer information register by an ignore. If, however, the device is to be checked in computer digit operation, the normally addressed printable characters are printed-out on the normal line in which they would ordinarily appear, and the non-printable characters are represented by printed indications on the next following (even) line. The fourth position is normally inverted for the non-printable characters during computer digit operation, and this results in an even number of pulses in a character. For this reason, the even output which appears at the output of inverter OD18 is important, and it is this signal which controls the printing of the non-printable information on the so-called even line.

*Buffer memory (Figs. 37 and 38)*

The buffer memory 23 comprises 840 separate magnetic cores, each of which stores one binary bit of information or the information contained in a single pulse position. The cores are arranged in seven banks of 120 cores each. Each bank represents a different binary order, there being one bank of 120 cores for the pulse position $2^0$, one bank for the pulse position $2^1$, and so forth for each pulse position up to $2^6$.

A sample arrangement of 120 cores is illustrated in Fig. 37 which represents a single one of the seven banks. The cores in this bank, which stores the $2^4$ pulses of each of the 120 characters stored by the memory, are arranged in a single plane comprising ten vertical columns of 12 cores each. The vertical columns are each represented by an appropriate Y number, and the horizontal rows of cores are each represented by an appropriate X number. The cores themselves individually may be identified by combining the X and Y numbers, for example, the core shown in Fig. 37 at the upper left of the bank is labeled BU12–1 where BU stands for the Buffer Memory, 12 stands for the X row 12 and the number 1 indicates the first Y column. Four wires pass through each magnetic core; a vertical Y wire, a horizontal X wire, a diagonal S or sense wire, and a vertical or inhibit I wire. Generally, the "1" state is produced in a core when the resulting magnetizing force of the coincident current pulses on the X and Y wires is of a first polarity, and the "0" is produced when this resultant current on the X and Y wires is of the polarity opposite to that first polarity. When information is read out of a core, the core is forced into the "0" condition, and if the core was originally in the "0" state, then a very small output signal is generated because there is only a very small flux change in the remanent condition of the core. However, if upon read out the core was initially in the "1" state, then a large output signal is generated because the remanent condition of the core is changed from a negative saturation condition to the positive saturation condition as was explained above in connection with Figs. 28 and 29. Essentially, the cores in the buffer memory operate the same as the cores in Figs. 28 and 29 except that the cores in the buffer memory, instead of having windings wound thereon, having windings which are constituted by single wires passing through the core itself.

Upon read-out, the "1" output signal passes through a conditioned "and" gate and sets a related flip-flop in recognition of the stored "1." Thereafter, even though the original information was destroyed during the core read-out, that information may be restored to the core from the flip-flop register if this is desired. In the write operation, the memory core previously interrogated by a read operation is left in the "0" condition or is driven to the "1" condition dependent upon the information to be stored in that core. Two current pulses applied simultaneously to the X and Y wires force a core from the "0" state to the "1" state. These pulses must be of such an amplitude that both are required at the same time to produce a change in the state of the core. If the associated flip-flop BR1 of the buffer information register, Fig. 33, is in the "0" state, then the two coincident current pulses applied to the X and Y wires are cancelled by the presence of an inhibit pulse from the inhibit wire. The inhibit pulse is opposite in phase and occurs simultaneously with the X and Y wire drive pulses, and is equal in amplitude to the pulses on the X and Y lines but exists for only one half of their duration, reducing the effect of the X and Y magnetizing forces sufficiently to prevent writing a "1" in that core by changing its state. If the flip-flop BR1 associated with that core is in the "1" state, then no inhibit signal is generated, and the core changes its condition.

In Fig. 37, and the X and Y input terminals are identified by the characters BU13 and the particular X or Y terminal intended; for example, the lowest left hand terminal is identified as BU13–Y1 which indicates that it is an input terminal labeled BU13 and that it is the particular input terminal for the Y1 line. If the lines connected to the X terminals are individually followed across the drawing to the cores, it can be seen that they terminate in terminals which are connected to the succeeding banks of cores and the same is true of the lines connected to the Y terminals. Considering an individual core BU1–1 which is in the lower left hand corner of the bank, it is in a "0" condition after a read-out, and if it is desired to store a "1" in this core, then the terminals BU13–Y1 are simultaneously energized with a positive pulse. During this energization of the two lines, no signal is applied to the inhibit terminal BU14, and the simultaneous application of positive currents through those two lines is sufficient to set the core BU1–1 in the "1" state. This is true for only the core BU1–1 even though the pulse applied to the input terminal BU13–Y1 is applied simultaneously to the cores BU1–1, BU2–1, BU3–1, and so forth through BU12–1; and the pulse applied to the terminal BU13–X1 is simultaneously applied to the ten cores in the X1 row BU1–1, BU2–1, and so forth through BU1–10. Only the core having the two lines which simultaneously carry pulses is set from one state to another. If, however, it is desired to store a "0" in the adjacent core BU1–2, then a pulse is simultaneously applied to the input terminals BU13–X1, BU13–Y2, and to the inhibit terminal BU14. Since the pulse applied to the inhibit input terminal BU14 is negative and the pulses applied to the terminals BU13–X1 and BU13–Y2 are positive, no change in the state of core BU1–2 takes place and that core stores a "0."

When reading information out of the cores, the appropriate cores are selected by gating means and negative pulses are simultaneously applied to the appropriate X and Y lines had been in a "1" state, it is then driven to the "0" state, producing a large output pulse in the sense winding which passes diagonally through the cores as they are shown in Fig. 37 and appears at the terminals BU15 and BU16. If, however, the core selected by the X and Y lines was initially in the "0" state, then a negligible output appears at terminal BU15 and BU16 for application to an output flip-flop BR1.

The flip-flops BR1 above referred to are those contained in the buffer information register which both supply the information to the buffer memory on read-in, and which receive information from the buffer memory during other minor cycles in the operation of the equipment.

The overall memory is illustrated in Fig. 38 in block form where each of the core arrays such as shown in Fig. 37 is represented by an appropriate block. There are eight banks of cores which store the information in each character in the orders represented by $2^0$, $2^1$, $2^2$, $2^3$, $2^4$, $2^5$, and $2^6$, and provide one spare array which may be used should any of the others fail. Fig. 38 shows more clearly how the X and Y lines are connected from one bank to another so that input signals need be applied only to individual input terminals to select the appropriate cores in all seven banks. Fig. 38 illustrates how the X lines pass through the cores of the bank $2^4$ and then subsequently enter the banks of cores $2^5$, $2^6$, to the spare bank, and then are passed upwardly into the $2^3$ bank, $2^2$ bank, $2^1$ bank, and $2^0$ bank where the output terminals are used to complete the circuit. In a similar manner the Y lines are continuous from the input terminals up through the $2^4$ bank, $2^2$ bank, and then simultaneously applied down through $2^1$ bank, $2^5$ bank, where they are then sent to the $2^6$ bank up through the $2^2$ bank into $2^1$ bank and down into the spare bank to the output terminals. In this manner, merely by energizing two input lines, one X line and one Y line, all of the seven cores of a single character are simultaneously energized. Each bank of cores has its own individual inhibit and sense lines so that it is possible, by the application of an inhibit pulse to the selected bank, to prevent an individual core of the seven energized by the X and Y lines from changing its state when writing, and again, since each bank has its own sense line, when reading from the cores, the simultaneous energization of all of the seven cores of the character produce individual output signals from the separate banks.

*Buffer memory read-write control (Fig. 39)*

The basic read-write control for the buffer memory is comprised of two flip-flops, a read flip-flop BC1 and a write flip-flop BC2 of the type shown in more detail in Fig. 20. Setting the read flip-flop BC1 to the "1" state produces a pulse output which is transmitted through an emitter follower BC3 and appropriate core drivers BC4 and BC5 to respectively produce output signals on the X and Y drive terminals for reading purposes. The setting of the read flip-flop BC1 also produces an output signal from the "0" side which is transmitted through an indicator amplifier to control a light on the control panel of the unit. Setting the write flip-flop BC2 to the "1" condition produces an output pulse which is transmitted through an emitter follower BC6 and appropriate core driver circuits BC7 and BC8 for application to the X and Y write drive terminals. In addition, the setting of the write flip-flop BC2 to the "1" condition creates a pulse which is transmitted to the inhibit output terminal BC9.

The read flip-flop BC1 is set to the "1" state by the application of a character pulse from the input control circuits, which are described in more detail below, to the character pulse input terminal BC10 for application through an amplifier BC11 for application to the "1" input of the read flip-flop BC1. The character pulse, after leaving amplifier BC11, is applied through a 4 microsecond delay and subsequent amplifier to the "0" input of the read flip-flop to restore it to its original condition. When the character pulse is applied to the "0" inputs of a read flip-flop, it is also applied to the inputs of a 0.6 microsecond delay which then applies it to the input of an "and" gate BC12 of the type shown in more detail in Fig. 23. The setting of the read flip-flop BC1 to its "1" state generates the X and Y drive current which cause the cores selected by the appropriate X and Y registers to be returned to their "0" state and read out any information stored therein. Four microseconds after the generation of the X and Y read current, the pulse applied to set the read flip-flop BC1 is applied to its "0" input and restores the read flip-flop in its "0" condition. Simultaneously with the restoration of the read flip-flop BC1 to its "0" state, the character pulse is applied through an amplifier as an information probe signal, which is applied to the information probe input of the buffer information register as that is shown in Fig. 33B to probe the "and" gates BR6–0 through BR6–6 as explained above in connection with the explanation of Fig. 33. When the information probe signal is applied to the BC6 gate, the outputs of the buffer cores are inserted into the buffer information register by application to the respective flip-flops BC1–0 through BC1–6.

After passage through the following 0.6 microsecond delay and the gate BC12, the character pulse is applied to the "1" input of the write flip-flop BC2 to set that flip-flop to the write condition. This generates the X and Y write drive signals and the inhibit currents which restore the original contents of the addressed cores by applying the inhibit signal to the "and" gates BR7–0 through BR7–6 in the buffer information register illustrated in Fig. 33 to allow the output of the flip-flops BR1 of that register to pass into the buffer information register, and, together with the application of the write drive signals generated by the output of the write flip-flop, to restore the information read out of the buffer memory back into the buffer memory. The character pulse is delayed an additional 4 microseconds by a delay BC13 and is then applied to the zero input of the write flip-flop BC2 to restore that flip-flop and remove the inhibit and the write drive X and Y signals. After a subsequent 0.6 microsecond delay, that pulse is applied to the registers to set the X and Y address registers of the buffer memory to the next address.

Before the information can be read out of the buffer memory into the buffer information register, the buffer information register must be cleared. A read-out enable signal is applied to terminal BC14 and through an "or" gate to the input of the "and" gate BC12, while, at the same time, the read-out signal is applied to the read-out terminal BC15 for application to the input of "and" gate BC16. BC16 also receives the character pulse which sets the read flip-flop BC1 to the "1" state before it is delayed at all and transmits that pulse as a clear information register pulse to the clear information register line of the buffer information register in Fig. 33. To write, a write pulse is applied to the write input terminals BC17 and is applied directly to the "1" input of the write flip-flop BC2 without any delays. As explained above, this sets the write flip-flop to the "1" state to generate the proper X and Y write drive signals and the inhibit signals.

*X address register (Figs. 40A, B, and C)*

The X address register, labeled Character Address 27 in Fig. 25, comprises six pairs of flip-flops XR1–1 through SR1–12 connected in a shift ring counter such as is illustrated in more detail in Fig. 25. When information is read into the buffer register, a read-in enable pulse is generated in the read-in control circuits to be described hereinafter and is applied to the read-in enable terminal XR2 of Fig. 40A, and a clear buffer pulse is generated by the read-in control circuits and is applied to the clear buffer input terminals XR3 of Fig. 40A. The clear buffer pulse applied to the XR3 terminal probes the "and" gates XR5 and XR6, and if the information is coming in from tape, a pulse appearing on the tape input terminal XR7 is applied through the "and" gate XR8, which is enabled by the read-in enable signal, through an "or" gate, and through an emitter follower to the "and" gate XR6 to enable that gate. The clear buffer signal is also applied to the gate XR6 and, when information is read in from tape, the XR1–1 register is placed in the "1" state. At the same time, the clear buffer signal, which is applied to the input terminal XR3, passes along line XR4 and is applied simultaneously to the "0" inputs of all of the registers XR1 except XR1–1. When XR1–1 is placed in the "1" state by a signal passing through the gate XR6, the same tape signal which passes XR8 is also applied through line XR9 to gate XR10, and this gate is enabled by the clear buffer signal from line XR4 to set the register XR1–12 to the "0" state. When, however, information comes in from the computer, a signal is applied to the tape inversion input terminal XR11 and passes through gate XR12, which has been enabled by the read-in enable signal, to gate XR5, which also receives the clear buffer signal from the terminal XR3. The output of gate XR5 sets the XR1–1 register to the "0" condition. At the same time, the output of gate XR12 is applied to the input of gate XR13 which receives the clear buffer pulse from the line XR4 to set the XR1–12 register to the "1" condition. Thus, when information comes in from tape, the X address registers are cleared to "0" except for the register XR1–1 which is set to the "1" condition, and when information comes from the computer, then the X address registers are cleared to the "0" condition except for the register XR1–12 which is set to the "1" condition.

The pulse which sets the write flip-flop BC2 in Fig. 39 to the "0" condition passes through a 0.6 microsecond delay and an amplifier to become the step address register pulse, and this is applied to the step address register input terminal XR14 of the X register in Fig. 40A. Thus, during the read-in operation, the read-in enable signal is present on the input terminal XR2 and is applied to the two gates XR8 and XR12 to enable these gates. If information is coming from tape, then the signal is applied to terminal XR7 to pass through the gate XR8 and is applied from the line XR9 to the gate XR18. Whenever a pulse from the read-write control circuits is applied to the terminal XR14 to step the address register, this pulse is applied through line XR16 to the input of gate XR18, and passes therethrough to line XR17. Line XR17 then applies the pulse to the "0" input of the registers XR1–1, XR1–3, XR1–5, XR1–7, XR1–9, and XR1–11. As explained in the description of Fig. 25, if XR1–1 is the "1" condition, an input pulse will cause it to change its condition and transmit a pulse through internal circuitry to XR1–2, causing register XR1–2 to shift to the "1" condition. Thus, if XR1–1 was initially in the "1" condition, the application of a pulse to its input shifts it to the "0" condition and causes XR1–2 to assume the "1" condition, its output applies a potential to the input of the register XR1–3 enabling that register to receive the next address set pulse to change its condition to the "1" state. When XR1–3 shifts into the "1" condition, its output is applied to the input of XR1–2 to cause that register to revert to its "0" condition. Thus, with the information coming from the tape, the register shifts to the right, and with XR1–1 initially in the "1" state, subsequent step pulses applied to the input terminal XR14 will cause the register to shift step-by-step down to XR1–12. When XR1–12 is placed in the "1" state, it produces a potential on the end carry line XR12 which is applied to the input of the register XR1–1 to condition that register for the application of subsequent stepping pulses. In addition, the output of the end carry line XR12 is applied to the input YR–3 of the Y address register, as will be explained in more detail hereinafter, to step that register.

When reading from the computer, the register shifts from XR1–12 down to XR1–1 and for this reason, XR1–12 is placed initially in the "1" condition. Then, when stepping pulses are applied to the input terminal XR14, these pulses are also applied through the line XR16 to one input of gate XR19 which has been enabled by the output of gate XR12, and pulses are therethrough applied to line XR22. The stepping pulses which appear on line XR22 are simultaneously applied to the registers XR1–12, XR1–10, XR1–8, XR1–6, XR1–4, and XR1–2. In this manner the shifting registers are conditioned for shifts to the left which proceed in a manner analogous to that above described with respect to the right shift.

At any time, the outputs of the registers XR1–1 through XR1–12 are applied to the inputs of the emitter followers XR23–1 through XE23–12. The outputs of these emitter followers are connected both to indicator amplifiers and to the diverters which serve to condition the selected cores in the buffer memory. The operation of the diverters in conjunction with the core memory is explained in the description of the address cores and diverter circuits which are illustrated in detail in Fig. 28. In Fig. 40B the diverters are illustrated merely as a bank of blocks and are labeled XR24. The outputs of the X address register are also applied to the inputs of the address storage as explained below.

*Y address register (Fig. 41)*

The Y address register is of the same general construction as the X register and comprises a plurality of transistor shift registers YR1–0 through YR1–9, such as are illustrated in detail in Fig. 25. The Y address register is stepped by the carry from the X address register. For receiving information from tape, the Y register, just as the X register, shifts to the right, but for information which is received from the computer, the Y register shifts toward the left. Since these shifts are identical to the X register also, there are two end carry lines which emanate from the X register and are applied to the Y register. One carry line which is produced by the left shifts of the X register is generated by the register XR1–1 and is called the X1 end carry and is applied to the input terminal YR2 of Fig. 41. The other carry pulse from the X register results from a right shift to the capacity of the register and is generated by the register XR1–12 and is applied to the input terminal YR3 of Fig. 41. Considering first the read-in of information from tape, the X register shifts to its capacity towards the right, and when it is filled, it generates an X12 carry pulse. This end carry pulse is applied to the input terminal YR3 of the Y register and passes through gate YR4 when a right shift enable signal is also present to place the register YR1–0 in the "1" condition. At the same time that the register YR1–0 receives a pulse, the end carry pulse is also applied to the registers YR1–2, YR1–4, YR1–6, and YR1–8. These registers cannot utilize the X12 end carry pulse unless they are conditioned. The conditioning takes place in the Y address register in a manner similar to that in which it takes place in the X address register and, by way of illustration, the "1" output of the Y register YR1 is applied by line YR5 to the input of register YR1–2 to condition that register. Thus, when a pulse applied to register YR1–0 places that register in the "0" state and changes the condition of register YR1—1 to the "1" state, a conditioning signal is applied to the input of register YR1–2. This operation continues with each additional pulse applied to the input terminal YR3.

When the X register stores by shifting toward the left, the Y register also shifts toward the left, and the end carry pulse X1 is applied from the X address register to the input terminal YR2 of the Y address register. The X1 carry pulse is applied through an "and" gate YR6, which also requires a left shift enable signal, and is applied by line YR7 to the inputs of registers YR1–1, YR1–3, YR1–5, YR1–7, and YR1–9. When the Y register is initially cleared by a clear buffer pulse, if information is coming from the computer and a left shift operation is to follow, the register YR1–9 is placed in the "1" state. The subsequent application of an end carry pulse to input terminal YR2 applied to the register YR1–9 causes this register to change its condition and to drive register YR1–8 into the "1" condition. The output of register of YR1–8 applies a conditioned signal to the input of register YR1–7, and subsequent X1 end carry pulses applied to the terminal YR2 cause the change in state of the registers, until the quantity has been shifted from the register YR1–9 down to YR1–0. The output of the individual registers YR1–0 through YR1–9 are applied simultaneously to the indicator lamps on the control panel through indicator amplifiers YRS, through a bank of diverters labeled YR9, each of which provides a path through the Y wire of a particular selected group of cores in the buffer storage, and to output terminals which are connected to the address storage in a manner which will be discussed later. Provision is also made in the Y address register as in the X address register for filling the registers with particular addresses manually. This means comprises a series of switches labeled generally YR10.

*Address storage (Fig. 42)*

The address storage comprises 12 banks of address cores each bank having ten cores. The banks are labeled respectively, AS1–2 through AS1–13 and are arranged in four columns of three banks each. The Y inputs are applied through diverters such as those described in detail in the description of Fig. 28. There are ten Y inputs, and the ten associated diverters are labeled respectively AS2–1 through AS2–10. Considering the energization of the diverter AS2–1, this results in the energization of the three lines, AS6–1, AS7–1, and AS8–1. Each line is connected to the vertical or Y line of the number one core in the particular horizontal rows of banks of cores. For example, the line AS6–1 energizes vertically the number one core in the bank AS1–2, in the bank AS1–5, in AS1–8, and also in AS1–11.

The action of the twelve X address lines AS3 is to individually select the bank of cores to be energized. Thus, the appearance of a pulse on the X address line number 1 labeled AS3–1 provides an energizing pulse for all of the cores simultaneously in the bank AS1–2. The X address line, then, individually energizes all ten cores of a bank, and the Y address lines individually energize an individual core of all the banks. In this manner, when a single Y address line and a single X address line have been selected there is only one core in all of the 120 cores of the address storage which is simultaneously excited by two coincident signals. When it is now desired to set the core selected by the appropriate X and Y address, an input signal is applied to the address core set terminal AS4 and passed through all of the cores in the address storage. Three simultaneous signals are required to set a core and these signals are derived from the X address signal, the Y address signal, and the address core set signal. When it is necessary to transfer information from the address core to the plugboard hub for application to the print and check storage, signals are applied to the transfer address storage terminals labeled AS5–1, AS5–2, AS5–3 and AS5–4. Each of the transfer address storage lines is connected through a core driver to a column of three core banks and passes through all of the cores in those three banks. Taking, for example, transfer address storage terminal AS5–1, a signal applied to this terminal will pass through the core driver AS9 and appear on line AS10 which carries this pulse into the cores of the three banks AS1–4, AS1–3, and AS1–2. Actually, although the signals are applied to four input terminals, the output terminals AS11 each represents a group of individual output lines. As can be seen from Fig. 42 the outputs of the ten cores in the bank AS1–2 are combined into a cable as are the output lines from each of the other banks. These lines are then connected to individual address hubs on the plugboard which is illustrated and described below.

*Plugboard (Figs. 43, 44, 45, and 46)*

The plugboard of the high speed printer is divided into two sections, an upper section and a lower section. Each section comprises a panel of insulating material having mounted therein 816 conducting hubs. Each of the hubs is connected behind the plugboard to an appropriate lead from those components which operate through the plugboard connections. An electrical connection may be made between any two of these hubs by the use of a jumper which is a simple wire conductor having plugs at either end as is illustrated in Fig. 45. In addition to the straight jumper, a Y-shaped connector as illustrated in Fig. 46 is also available for joining two hubs to a common connection.

Considering first the upper section of the plugboard as illustrated in Fig. 43, various groups of hubs are set apart from each other on the drawings by lines as shown in Fig. 43. The section farthest to the left comprising five vertical columns of 24 hubs each is labeled "From Memory." These are the hubs to which the output lines represented by the terminals AS11-1, AS11-2, AS11-3, and AS11-4 of the address storage of Fig. 42. are connected. Each address represented by an individual core in the address storage has its transfer storage lead connected to an individual hub PB1-1, PB1-2 . . . PB1-20 of the left section of the plugboard as shown in Fig. 43. The next group of hubs immediately to the right of the "From Memory" hubs are arranged in 130 pairs of hubs which are internally connected together as shown in 11 columns of 12 pairs each and are connected to the single line relays 52, of Fig. 5, for single line operation during printing. Immediately to the right of the "Single Line" hubs and comprising the largest group of hubs are 180 pairs which are connected to the multiline relays 53, in Fig. 5. Also shown, in the upper right hand portion of the lower section of the plugboard, are a group of plugs which are connected to the mutliline counter 51, of Fig. 5, to control the count of that counter. The remainder of the hubs on the upper section of the plugboard as shown in Fig. 43 are used during multiline operation.

At this time the operation of the plugboard will not be explained in detail, since it is a standard type of plugboard, but only sufficiently to illustrate the general operation of its individual sections. Considering Fig. 43 which illustrates the upper section of the plugboard, the hubs which are connected to the outputs of the address cores are shown to the extreme left and are labelled PB1-1 through PB1-20. To complete the connections from the output of the address cores, a conductor such as illustrated in Fig. 45 has one end inserted into an appropriate hub of the memory group and the other end inserted into the appropriate hub of the single line group. Thus, for single line printing if it is desirable to print those characters contained in addresses 1, 2, 3, 4, and 5 of the memory into the print positions 50, 51, 52, 53, and 54 of the actual printed line, a jumper will have one end plugged into hub PB1-1, which is the 1 address hub in the memory hubs and the other end plugged into hub labelled PB2-50. In the same manner, using the jumpers illustrated in Fig. 45, the second address of the memory hub will be connected to the 51 hub of the single line panel, the number three memory hub will be connected to the single line hub, 52, and so forth. Then, when the address cores are energized and an output pulse is transmitted from the output of the first address core to the hub PB1-1, it will be transmitted by the jumper to the hub PB2-50 and the character stored in the memory address number one will be printed in the fiftieth position on the printed line.

If it is desirable to utilize the same character stored in the single memory address for printing at more than one position on a line, the other hub of the single line group is used. Suppose, for example, it is intended that the character stored in the first address in the buffer memory shall be printed not only in the fiftieth position on the line, but also in position 70, then a single jumper is used to connect the hub PB1-1 to the hub PB2-50. A second jumper has one end plugged into the other hub of the pair PB2-50 and its other end plugged into one hub of the pair PB2-70, or the seventieth hub of the single line group. If triplication is desired, another jumper may be used in the other hub of the pair PB2-70. In this manner, it is possible to arrange the information in the 120 memory locations so as to be printed in any desired arrangement in line.

In the same manner, the multiline relay hubs may be connected to the individual multiline counter counts for controlling multiline operation, class operation for selecting the types of information to be printed may be established by plugging from the appropriate hubs PB3-1, PB3-2, PB3-3 or PB3-4 into hubs PB3-5, and zero suppress operation and connectors. Many of these operations are explained in greater detail below.

*Print and check storage (Figs. 47 and 48)*

As shown in Fig. 5, the transfer of information from the address storage 29 to the check and print storage 32 and 33 is accomplished through the plugboard 31. The print and check storage, the individual circuits of which have been illustrated in Fig. 29 and explained in conjunction therewith, are operated together and are subdivided into two groups, the odd check print and storage cores and the even check and print storage cores. The odd group of cores is illustrated in Fig. 47 and the even group is illustrated in Fig. 48.

Considering the odd group of print and check storage cores shown in Fig. 47, these cores are grouped into ten banks PC1-1 through PC1-10. Each bank except PC1-5 and PC1-6 comprises seven print cores and seven check cores; the PC1-5 bank containing four print cores and four check cores and the PC1-6 bank comprises five print and five check cores. Information from the plugboard is applied to input terminals schematically represented on the drawings as the single terminal PC2 for the bank of cores PC1-2 through PC1-5 and the single terminal PC3 which conveys information to the cores of PC1-6 through PC1-10. Actually, the terminal PC2 comprises 32 terminals each of which has an individual input line connecting from the appropriate hubs PB4 on the plugboard to the individual cores of the print and check storage, and the terminal PC3, in a like manner, represents 33 individual terminals each having its own separate line. Information is transferred through the plugboard hubs PB4-1 through PB4-120 of Fig. 44 and the input terminals PC2 and PC3 from address storage when the address storage cores are cleared. The first such transfer of information is during the first minor cycle when the information contained in the buffer memory is probed for printable characters. At that time the address of each character which is to be printed is transferred to the address storage to set an appropriate core therein. The subsequent clearing at the end of that minor cycle of all of the address cores transfers the information contained therein to the print and check core storage. However, during this initial transfer of information, a signal is also applied to the clear input terminal PC4 of Fig. 47 and PC24 of Fig. 48 which prevents the setting of the corresponding print cores. Thus, during the first minor cycle, after read-in, only check cores are set and there is a single check core set for each print column in which a character is to be printed. During subsequent minor cycles when the information contained in the buffer memory is compared in the comparator 24 with the code signals generated by the code generator, the address storage cores are again set in accordance with the information to be printed. The clearing of these address cores again transfers this information to the print and check cores of Figs. 47 and 48. At this time no pulse appears on the clear terminals PC4 and PC24, and the appropriate print cores are set, but since these check cores had already been set they are not affected. When the information to be printed is finally printed, the print thyratrons, shown in Fig. 5 at 35, in addition to generating the pulse which actuates the print hammer actuators, also generates the print signal which is applied to the "print signal from thyratron input terminals" PC5 and PC6. This print signal coming from the individual print thyratrons are applied to individual check cores to clear the corresponding check cores. Thus, when an individual print core is cleared to fire the corresponding print thyratrons causing the hammer to drive the type against the paper, the firing of that thyratron returns what can be considered the output of the print core to the corresponding check core to clear it. At the end of a major print cycle, which corresponds to 51 minor cycles, and after all the information stored in the buffer memory has been printed, a check core probe signal is applied to each of PC7 and PC27 terminals and passes through all of the check cores to clear any core which had not been cleared previously by the thyratron signals.

To summarize this operation, the information stored in the buffer memory is initially scanned to determine the addresses of all printable characters, and these addresses are stored in the address storage 29. Clearing of the address storage subsequently transfers this inforation through the plugboard 31 to the appropriate input terminals PC2 and PC3 of the print-check cores. At this time a pulse appears on the PC4 terminals to inhibit setting of the print cores, and, as a result, only the check cores are initially set by this entire transfer of information from the address storage. The subsequent setting and clearing of the print cores upon printing generates a thyratron signal which is applied to the individual check cores as the corresponding print position is printed, clearing that check core. Thus, all of the check cores which were initially checked should have been cleared by the printing of the character at that address, and when a final check core probe signal is applied to the terminals PC7 and PC27, no check core should remain set. If such a core has remained uncleared, the check core probe signal will clear it and generate an output signal at the core check terminals PC8, PC9, PC28 and PC29 which serves as an error signal to halt printing.

The even bank group of check and print cores illustrated in Fig. 48 are arranged identically and operate the same as those discussed in connection with Fig. 47. The print characters are arranged on the type wheel 18 in staggered relation, an odd print face being up and an even print face being down. The print and check cores are also divided into odd and even groupings to correspond with the staggered relation of the type so that there are two groups of 65 cores each, but their structure and operations are the same as if they had been arranged in a single, solid bank of 130 print and 130 check cores.

The terminals to which information is applied from the plugboard are labeled PC22 and PC23 in Fig. 28 and connect by means of individual wires within the tables shown with the separate cores in each of the banks PC21-1 through PC21-10. The arrangement of the cores is the same as that of Fig. 47, there being seven print and seven check cores in each bank except for the bank labeled PC21-5 which contains only four print and four check cores and bank PC23-6 which contains five print cores and five check cores. The print error signal appears at terminals PC10 and PC30 and the core check terminals are PC28 and PC29. When the print cores are cleared, establishing a signal which is applied to the appropriate thyratron, the outputs of the print cores are applied through the terminals PC11, PC12, PC31, and PC32, for application to the individual thyratron grids. Although each of these terminals are shown as a single terminal they actually represent a plurality of such output terminals, there being one from each print core.

*Tape unit control circuits (Figs. 49 and 50)*

The controls in this printing device are primarily established by flip-flops which when placed in appropriate stable states, generate static potentials for controlling the various components of the system. Rather than go through a detailed explanation of the arrangement of parts which can be readily seen from the drawings, the normal operation of the parts will be discussed as the control is passed from element to element.

When information is to be fed from tape into the printing system, the entire unit, including the tape handler, is cleared to put the apparatus in an initial condition. Then, the manual switch on the printer supervisory control entitled "Initial Start Switch" is closed and an input signal is applied to the initial start terminal TC1 of Fig. 49. This initial start pulse sets flip-flop TC2 into the "1" state. When the flip-flop TC2 is placed in the "1" state, a pulse is transmitted through the "or" gate TC3 and applied to the "and" gate TC4. Immediately thereafter, a 22.5 kc. clock pulse is applied to the terminal TC5 and probes the "and" gate TC4. Since the tape switch on the supervisory control had initially been set to the tape position, an enable signal is present on the tape input terminal TC6, enabling the gate TC4 which then allows the clock signal to pass through an amplifier TC7 to an output transformer TC8. The output of the pulse transformer TC8 is the test-in pulse CP3 which is applied to the tape unit. CP3 indicates that the test pulse occurs during the clock pulse time 3. If the tape is prepared to feed information into the printer, it returns a ready pulse to input terminals TC9 of an input pulse transformer TC10 at a time CP1. The output of the pulse transformer TC10 passes through an amplifier and a 4 microsecond delay and is applied to the input of a gate TC11. The general clear signal which was initially applied to the input controls has placed flip-flop TC12 in the "1" state, placing a conditioning signal on the end gate TC11 to allow the ready input signal to pass therethrough. The output of the "and" gate TC11 is applied through an amplifier to a pulse transformer TC13, the output of which becomes the demand-in signal which is applied to the tape unit. To show that the tape unit is in condition to transmit information to the printer, it generates a demand-out signal in response to the demand-in signal and applies it at clock time to the input of a pulse transformer TC14. The signal passing through the transformer TC14 is amplified and applied to the flip-flop TC12 to place it into the "0" state removing the conditioning pulse from the "and" gate TC11, and is also applied to the pulse output control line TC15 shown in Fig. 50. The input terminal TC15 pulses gates TC16, TC17, and TC18. At the beginning of a minor cycle the rewind inverted line to the terminal TC19 is energized and enables gate TC18 to allow the pulse output control line input TC15 from the pulse transformer TC14 of Fig. 49 to pass to a pulse transformer TC21. The output of the transformer TC21 is applied to the tape unit as an instruction to that unit to start reading one blockette forward. The test impulse generated in pulse transformer TC8 applied to the tape handler after a demand-in pulse has been applied, results in the generation by the tape unit of a not-ready signal which is applied to pulse transformer TC22 (Fig. 49) to set flip-flop TC23 to the "1" state. The "1" state of flip-flop TC23 applies an enable signal through the "or" gate TC3 to the "and" gate TC4, allowing test impulses to continue to pass to the pulse transformer TC8. During the time that the tape unit is reading information from the tape it will return to the tape unit control not-ready pulses applied to the input to the pulse transformer TC22.

When the tape unit has finished reading a blockette, it generates a ready signal which it applies to the pulse transformer TC10 and, after a 4 microsecond delay to the input of the "and" gate TC11, and to gate TC24 which is enabled by the "1" condition of the flip-flop TC23. The resulting pulse which passes through the gate TC24 sets flip-flop TC25 to the "1" condition and applies an enabling potential to an "and" gate TC26. This gate is also enabled by the transfer data signal which is applied to the input terminal TC27. The subsequent 22.5 kc. pulses applied to the input terminal TC5 probe "and" gate TC26 to pass a signal therethrough. This signal sets the read-in flip-flop TC28 to the "1" condition, applying a potential to the enable read-in terminal TC29. In addition, the output of the "and" gate TC26 is applied to the "1" input of of the flip-flop TC31 and is applied through an amplifier TC32 to the tape read-in enable output terminal TC33. Also, the output of the gate TC26 sets TC25 to the "0" condition, sets TC23 to the "0" condition and sets TC2 to the "0" condition. The tape read-in enable pulse from terminal TC33 is applied to terminal TC34 of Fig. 51 to set the flip-flop TC35 to the "0" condition also. The pulse which entered input terminal TC34 of Fig. 31 to set the class flip-flop TC35 to "0" is also amplified and applied through a pulse transformer TC36 to a pair of output terminals TC37 by means of which it is applied to the tape unit to clear the tape buffer. This pulse is also amplified by an amplifier TC41, and, after being delayed 10 microseconds, is applied through a pulse transformer TC42 to a pair of output terminals and thereby to the tape unit to set the buffer to the number 1 address. The "0" output of the class flip-flop TC35 of Fig. 51 is applied through its output terminal TC43 which is connected to the input terminal TC44 of Fig. 49. Terminal TC44 applies its input signals through a cathode follower to enable the "and" gate TC45. The read-in flip-flop TC28, which was placed in the "1" condition by the output of gate TC26, applies its output signal to the output terminal TC29 to eventually form the enable read-in signal for the printer buffer. The output from the gate TC26 is also applied through other circuits to remove the transfer data signal from terminal TC27 of Fig. 49 and to inhibit TC26. At the same time the driving of the flip-flop TC25 into the "0" state removes the enable potential from the "and" gate TC26 to further inhibit it. The flip-flop TC23 was also placed in the "0" state by the output of gate TC26, and this removed the enable signal from the "and" gates TC24 and TC4 to inhibit these two gates. The inhibition of the "and" gate TC4 stops further generation of test impulses to the tape unit.

The "1" output of the read-in flip-flop TC28 and of the flip-flop TC31 produce two signals which are simultaneously applied to an "and" gate TC47 and allow an enable pulse at times CP1 and CP2 to pass to a terminal TC48. The enable output CP1 and CP2 from the output terminal TC48 of Fig. 49 is applied to an enable CP1 and CP2 input terminal TC49 of Fig. 50. This applies an enable signal simultaneously to two "and" gates TC51 and TC52.

90 kc. clock pulses are applied to an input terminal TC61 in Fig. 50 and through an amplifier simultaneously to one input of each of two gates TC62 and TC63. These gates require two simultaneous inputs for the passage of a signal, and the second input to gate TC62 comes from the "0" side of a clock flip-flop TC64, while the second input to the gate TC63 comes from the "1" side of the same flip-flop. A second clock flip-flop TC65 is fed from two "and" gates TC66 and TC67, each of which also requires two simultaneous inputs for the passage of a signal. One of the inputs to each of the two gates TC66 and TC67 is connected through an amplifier to the output of the "and" gate TC63, and the other input to the "and" gate TC66 comes from the "0" side of the clock flip-flop TC65, while the second input to the "and" gate TC67 comes from the "1" side of the same flip-flop. The output signal from the two clocks are applied alternately to either of two "and" gates TC68 or TC69, each of which requires three inputs to pass an output signal. The input to TC68 originates from the "1" side of the clock flip-flop TC64, from the output of the "and" gate TC63, and from the "0" output side of the clock flip-flop TC65. The output of gate TC62 is applied to one input of the gate TC69 along with the signal from the "0" side of the clock flip-flop TC64 and the "1" side of the flip-flop TC65. When the 90 kc. pulses are applied simultaneously to the "and" gate TC62 and TC63 in any condition of the clock flip-flop TC64 one of these gates will open and a signal will be passed there-through. Assuming, for the sake of this discussion, that the clock flip-flop TC64 is in the "0" condition, then the application of a 90 kc. clock pulse to the input terminal TC61 drives a signal through the "and' gate TC62 and this is applied to through the delay line to the "1" side of the clock flip-flop TC64. The pulse passing through the gate TC62 is applied first, however, to an input of the gate TC69 along with the "0" output of the flip-flop TC64. The flip-flop TC65 is in the "1" condition and this supplies the third input to the gate TC69 to pass a signal therethrough to the gate TC52. After a suitable delay the signal which passed through the gate TC62 causes the clock flip-flop TC64 to change condition, and it now moves into the "1" state. The next subsequent 90 kc. pulse is now able to pass through the "and" gate TC63 and is applied through the delay to the "0" input of the flip-flop TC64. This signal is also applied simultaneously to an input of the "and" gate TC68 along with the "1" signal from the flip-flop TC64 and the output of the "and" gate TC63 is also applied simultaneously to the "and" gate TC66 and TC67. This signal may pass through the "and" gate TC67 since the flip-flop TC65 is in the "1" state. The output signal from TC67 is used as a 22.5 kc. clock pulse and the zero suppress 1 signals also. Since, however, the clock gate TC65 is in the "1" condition, no third signal is applied to the "and" gate TC68 and no signal passes there-through. After suitable delays the output from the "and" gate TC63 drives the clock flip-flop TC64 back into the "0" condition, and the output of the "and" gate TC67 drives the clock flip-flop TC65 into the "0" condition also. In this manner, the clock flip-flop TC64 is driven through an entire cycle at the rate of 45 kc. a second and the clock flip-flop TC65 is driven through a complete cycle at the rate of 22.5 kc. per second. The "and" gates TC51 and TC52 are simultaneously energized by the enable CP1 and CP2 pulses applied to the terminal TC49 and the second input to each of these gates is passed through either "and" gate TC68 or TC69. These clock pulses then pass through one of the two gates TC51 or TC52 and are applied from gate TC51 through an appropriate amplifier to a pulse transformer TC53 to become tape buffer signals. The output of gate TC52 is applied through an amplifier to a pulse transformer TC54 to become clock pulse CP2. In addition, the output of the gate TC69 is used as the suppressed zero 2 signal and as the transfer data synchronize signal. The output of the gate TC51, in addition, is used as the 120 error probe. Referring back to Fig. 49, the "1" output of the flip-flop TC31 is also applied to an input of an "and" gate TC55, which receives the "1" output signal from the read-in flip-flop TC28 also. The output of the 22.5 kc. clock pulses, which are applied from Fig. 50 to terminal TC5 of Fig. 49, are also applied to the third input of the gate TC55 to pass a signal therethrough which is applied to an output terminal TC56 as the transfer to printer signal and after amplification, to a second output terminal TC57 to become the CP3 printer signal. The transfer to printer signal appearing on the output terminal TC56 of Fig. 49 is applied to an input terminal TC58 of Fig. 50 and thereby to the input of the transformer TC59, which generates the CP3 signal to be applied to the tape buffer in the tape unit. This CP3 signal transfers the first character, seven bits in parallel, to the data input register 21 of Fig. 5. This is further amplified and delayed in other control circuits to become and SPO signal to gate the character from the data input register 21 into the buffer information register 22.

*Demand station and computer control (Figs. 51, 52, 53 and 54)*

In addition to operation from tape, this printing system may also be operated under the direct control of a computer. For this purpose computer demand stations and computer control apparatus 59 in Fig. 5 have been provided. The devices specifically described herein are for use with a computer of the general nature of the Univac File Computer, but it should be understood that other such computers and other such computer control devices are feasible with the printer of this invention.

For operation from the computer the computer-tape switches in Figs. 74 and 73 are placed into the computer position and the entire apparatus is then generally cleared by the application of a general clear pulse from Fig. 74. The general clear signal is applied to the terminal DS1 of Fig. 51 sets flip-flop DS2 to the "0" state and flip-flops DS3, DS4, and DS5 to the "1" condition. Flip-flops DS2 through DS5 are of the type more specifically illustrated schematically in Fig. 8. The "0" output of flip-flops DS2, which is the ready flip-flop, is applied to a relay coil DS6 through an appropriate relay puller which is of the type illustrated in Fig. 12. The relay DS6 turns on the ready light in the computer. The general clear signal is also applied to an input terminal DS8 of Fig. 52 and sets the flip-flop DS7 to the "0" condition. The "0" output of flip-flop DS7 applies a signal simultaneously to enable "and" gates DS9 and DS10 of Fig. 52. The gate DS9 and DS10 are of the type illustrated in detail in Fig. 7. Information from the computer is applied at this time to terminals DS11 and therethrough to transformers DS12 and DS13, the transformer DS12 receiving "0" information and the transformer 13 receiving "1" information. The information from the computer is in serial form and is applied from the transformers DS12 and DS13 to the gates DS9 and DS10. Since the gates are enabled by the "0" output from the flip-flop DS7, these gates DS9 and DS10 pass appropriate information which is then applied through two right output terminals DS16 for application to appropriate magnetic heads on the output magnetic track of the computer which drive the printer itself. The writing of the information on this track causes the computer to generate a test-in signal which is applied to terminals DS17 of Fig. 51 for passage through a pulse transformer DS18 to set the flip-flop DS3 to the "0" condition. The input-output normal test switch in the computer itself, when set in the proper normal position and when all of the operating potentials are normal, energizes the relay coil DS19, opening contacts DS21 and closing contacts DS22 to apply the "0" output of the flip-flop DS3 to "and" gates DS23 and DS24. A CMA7 pulse which is a computer timing pulse, applied to terminals DS25 through a transformer DS26 opens the gate DS23 which has applied to it as an enabling signal the output of flip-flops DS3 and DS2. The output of gate DS23 results in a ready signal on the ready terminals DS27, which are connected to the output of a pulse transformer DS28. The output of the gate DS23 is also applied back through the "1" input of the flip-flop DS3 to set that flip-flop to the "1" state. This removes one of the enable signals from the gates DS24 and DS23. In response to the ready signal, the computer generates a demand-in signal which is applied to the input terminals DS31 of Fig. 51. This signal passes through a pulse transformer DS32, and after a 2 microsecond delay, restores flip-flop DS5 to the "0" condition. The "0" output of the flip-flop DS5 is applied to an "and" gate DS33 to enable that gate and also appears at an output terminal DS34 as a single pulse set signal. The operation of the relay DS19 removes the negative potential applied to the gate DS33 and allows the relay DS35 to operate through a relay puller DS36. Operation of relay DS35 completes the demand ground circuit in the computer and also operates to light the demand light on the computer control panel. The third enabling signal applied to gate DS33 comes from the "0" sides of the ready flip-flop DS2, and the output of the gate DS33 enables gates DS37 and DS38. A CMA1 pulse applied to the input terminal DS41 is amplified, and after a 4 microsecond delay, passes through enabled gate DS37 to become the pulse for the computer high speed lines on DS42 of Fig. 51 and is connected to the input terminal DS43 of Fig. 54 to probe four "and" gates DS44, DS45, DS46, and DS47 which are of the type illustrated in detail in Fig. 7. If any of these gates DS44 through DS47 is enabled by potentials on the high speed lines from the plugboard DS48, DS49, DS50 and DS51, the appropriate gate of the group DS44 through DS47 is enabled to apply a signal to the respective pulse transformer DS52 through DS55. The outputs of the pulse transformers DS52 through DS53 are sent to the computer to alert the computer for special operation. At the same time that the "and" gates DS44 through DS47 are enabled by signals on the appropriate lines, signals are also applied through the "or" gate DS56 and appears on terminals DS57 as a special control enable signal. The special control enable signal from output terminal DS57 of Fig. 54 is applied as an input signal to input terminals DS58 of Fig. 51. This signal is inverted by an inverter amplifier DS59 and is applied to a gate DS61 to inhibit that gate. When DS61 is not inhibited, it passes the output from the gate DS38, which in turn passes the CMA7 signal, to a pulse transformer DS62 to generate the demand-out signal applied to terminal DS63. The special control enable signal applied to DS58 appears at the input gate DS64 inverted and passes through that gate to a pulse transformer DS65 to appear as a special-out signal for the computer on output terminal DS66 of Fig. 51. The computer performs its special operations and then generates a switch track signal which is applied to terminals DS71 of Fig. 52. The switch track signal passes a pulse transformer DS72 and is applied simultaneously to probe gates DS73 and DS74. Gate DS73 is enabled by the "0" output of the flip-flop DS7 and gate DS74 is enabled by the "1" output of the same flip-flop. If none of the high speed lines DS48 through DS51 of Fig. 53 were energized, then gate DS61 is enabled and a demand output signal is generated and applied to the output terminals DS63 of Fig. 51 as described above.

When the computer receives the demand-out pulse, it returns a track switch signal pulse which is applied to terminals DS71 of Fig. 52. Flip-flop DS7 was placed in the "0" condition by the general clear signal applied to terminal DS8, and the application of a switch track signal to the input terminal DS71 then passes through gate DS73 to place flip-flop DS7 in the "1" condition. The "1" output of flip-flop DS7 is applied through cathode follower DS75 simultaneously to the "and" gates DS76 and DS77. Information from the computer appearing on terminals DS11 passes through gate DS76 to the write amplifier DS78 for application to output terminals DS79. In addition to generating the switch track signal, the computer also generates the start print signal which is applied to input terminal DS81 of Fig. 51 to restore flip-flop DS2 to the "1" condition. This places the printer in the not-ready condition in which it remains until a printing operation has been completed.

Testing-in by the computer is not required, the computer can actually demand-in without testing-in. If upon the application of a demand-in pulse by the computer to the printer applied to terminal DS31, the printer is already in operation, the ready flip-flop DS2 will be in the "1" state. When flip-flop DS2 is in the "1" state, gate DS33 of Fig. 51 is inhibited, and no signals are applied either to gate DS37 or to gate DS38 for the generation of a pulse for the computer high speed lines or for the generation of a demand-out pulse on terminals DS63. The computer must then wait until the printer has completed its print cycle before a demand-out signal can pass gate DS33 and appear on the out-put terminal DS63. When the printer has stopped operating, and if the error flip-flop has not been set, then it generates a signal at the same time as CMA7, which is applied to input terminal DS83 of Fig. 51, to indicate that the printer is ready, and this sets ready flip-flop DS2 to the "0," or ready, state. The placing of the ready flip-flop DS2 into the "0" state enables gate DS33 to allow either a special out pulse or a demand-out signal to be applied to the computer through terminals DS66 or DS63.

The computer, and it is assumed that the computer under discussion has a magnetic drum storage, uses at least two tracks for the application of information to the printer. It may be programmed to recover information once it has been sent to an input-output track for delivery to the printer. Information from the input-output track switched to the computer may be recalled at any time by the computer by sending a read probe pulse to input terminal DS84 of Figure 52. The probe pulses pass through pulse transformer DS85 and, after amplification and a delay of 2 microseconds is applied to probe the "and" gates DS86, DS87, DS88, and DS89, simultaneously. If the computer is operating on one of two tracks, the right hand track for example, then gates DS86 and DS87 are enabled, whereas if the computer is operating on the other track, left hand track for example, then gates DS88 and DS89 are enabled, to pass the information, coming from the computer and applied to input terminal DS11, through the write amplifier DS14 or DS78 for application through the appropriate gates DS86 through 89 to the write heads on the magnetic drum recorder of the computer. The "0" output pulses appear at output terminal DS91 and the "1" out pulses appear at output terminals DS92.

When the computer demands-in the operation of the printer, it applies a potential to the on-demand terminal DS102 of Fig. 55. At the same time the demand-out signal applied by the printer to the computer energizes lines connected to input terminals DS101 of Fig. 55. This signal passes through a pulse transformer DS102 and is applied to a gate DS103. When both signals applied to input terminals DS101 and DS102 are present, the start print signal appears at output terminal DS105. The generation of the start print pulse results in several operations in the printer. One of these is the setting of the ready flip-flop DS2 to the "0," or ready state. In addition, the start print pulse probes gate DS106 of Fig. 52 after application to input terminal DS107. Since the printer has been designed for operation with several computers, the flip-flop DS7 has been provided for utilization in such operations. For example, if it is customary for one computer to use one particular memory address for operating into the printer, the flip-flop DS7 may not be used. As explained above, the particular state of the flip-flop DS7 controls the rewriting into the computer of the information the printer receives from the computer and determines which output terminal DS16 or DS79 will control the heads in the computer.

The printer may be controlled by instructions from the computer applied to the input terminals DS111, DS112, DS113, DS114, DS115, DS116, and DS117 together with the on-demand signal applied to terminal DS102 to control the spacing and the feeding of the paper in the printer as well as multiline operation. The signals from the computer appear on input lines on Fig. 55 to generate the appropriate output signal at the proper time.

*Input control (Figs. 56A and B and 57)*

The printing system of this invention is arranged to be used with a temporary storage such as magnetic tape or with a plurality of various computers for directing its operation. The individual controls for operation from any of these different input and control systems has been described above, but the consolidated input control for the printer which operates regardless the type of director used is illustrated in Figs. 56A and B and in Fig. 57. In Fig. 52, the output of the various write amplifiers DS14 and DS78 are also applied to the group of "and" gates DS121, DS122, DS123, and DS124. These "and" gates are enabled by the clock pulses which are applied to the apparatus of Fig. 52 at terminals DS131, a pulse transformer DS132, and a delay. The flip-flop DS7 also supplies enabling pulses which open gates DS121 through 124 to allow the appropriate write information to be presented on output terminals DS125 and DS126. The outputs of the terminals DS125 and 126 of Fig. 52 are applied to terminals IC1 of Fig. 56A and, from these terminals, are applied to "and" gates IC2 and IC3. A blockette pulse is applied to input terminals IC8 of Fig. 57 passing through a pulse transformer IC7 and applied to the output terminal IC9 of Fig. 57. This blockette pulse from the output terminal IC9 of Fig. 57 is applied to an input terminal IC10 of Fig. 56A to enable an "and" gate IC6. The "and" gate IC6 is also enabled by an inverted tape signal applied to an input terminal IC11 and by the output of an "or" gate IC5 which receives a transfer data signal from an input terminal IC4. The output of gate IC6 is applied to the "1" input of a flip-flop IC12. The "1" output of the flip-flop IC12 is applied to an "and" gate IC13 which is enabled by the PA signals applied to the input terminals IC8 of Fig. 57 to become the blockette pulse. The PA signals are applied to an input terminal IC14, passing through a transformer IC15, and, after appropriate amplification, to the gate IC13. The output of gate IC13 is applied to the "1" input of a flip-flop IC15, the "1" output of which enables the "and" gate IC2 and IC3 to allow the information from the computer control circuit of Fig. 52 to pass therethrough and to be applied to output terminals IC16. the output of the "and" gate IC13, in addition to being applied to an input of the flip-flop IC15, is also applied to an output terminal IC17 to become the first CMA1 pulse.

The PA blockette pulse applied to input terminals IC8 of Fig. 57 and passing through the transformer IC7, is also applied to the "1" input of a flip-flop IC21. In addition to setting the flip-flop IC12 to the "1" state, the output of the "and" gate IC6 is also applied to the "1" input of flip-flop IC18 in Fig. 56B to set that flip-flop to the "1" state also. Approximately 12 microseconds after this sequence of events a CMA1 pulse is applied to the input terminals IC14 of Fig. 56 and passes through the transformer IC15 to be applied to the "and" gate IC13 and to the "0" input of the flip-flop IC12, setting that flip-flop to the "0" state and removing the enable signal from the gate IC13. However, before the flip-flop IC12 has been placed in its "0" state, the first CMA1 output of the "and" gate IC13 passes to perform several functions. The output of gate IC13 is applied through an "or" gate IC21 to a transformer IC22 for application to an output terminal IC24 as the clear buffer signal. This clear buffer signal from the output terminal IC24 is applied to the clear buffer input terminal BC25 of Fig. 39 of the buffer memory read-write control circuits. In addition, the output of terminal IC24 is applied to the input terminal XR3 of Fig. 40A which is the X address register, and to the clear buffer input terminal YR15 of Fig. 41 which is the Y address register. The output of the "or" gate IC21 also appears on an output terminal IC23 for application to the print cycle control circuits which will be discussed hereinafter, and the output of the gate IC13 is applied to the input of an "and" gate IC26 which, when enabled by a received inverted signal, produces an output on terminal IC25 for application to the printer control circuits also to be discussed hereinafter. In addition to providing pulses for clearing the buffer, the output of the gate IC13 is also applied through an "or" gate IC27 to an output terminal IC28 for application to input terminal DR12 of Fig. 32, which is the data input register, for clearing that register. The output of the gate IC13 is also applied to the print cycle control circuits, which results in the removal of an input signal from the input terminal IC4 of Fig. 56A to remove the transfer data signal from the "or" gate IC15, and is applied to the print control circuits to start the paper feed.

4.2 microseconds after the generation of the first CMA1 pulse, which appears on the output terminal IC17 of Fig. 56A, the serial pulses from the computer through the demand station output circuits of Fig. 52 first appear on the input terminals IC1 to probe the gates IC 2 and 3 of Fig. 56A. The output of the gates IC2 and 3 of Fig. 56A. The output of the gates IC2 and 3 are applied through output terminals IC16 to input terminals DR3 of Fig. 32 to set flip-flop DR6–6 to the appropriate state, and thereafter pass through the "or" gate DR19 and DR21 to set the other flip-flops of the data input register DR6–0 through DR6–5. Thus, information from the computer enters through the input terminal DS11 of Fig. 52, which illustrates the demand stages, and, through the discussed circuitry therein, are applied to terminals DS125 and 126 of Fig. 52 to terminals IC1 of Fig. 56A of the input control for application through output terminals IC16 of Fig. 56A to input terminals DR3 to the data input register. These are the paths followed by the serial pulses from the computer. The parallel input from the tape unit enters by a different path.

About 1.8 microseconds after the seventh, or last, binary bit of the character is transferred through the output terminal IC16 into the data input register, a CMA1 pulse is applied to terminals IC14, passing through transformer IC19 to probe gate IC29. Since the flip-flop IC15 has been placed in the "1" condition, the gate IC29 is opened and the CMA1 pulse passes through to be amplified by an amplifier IC31 and applied to an output terminal IC32 as an SP0 signal. The output of amplifier IC31 also passes through a 2 microsecond delay IC33 and becomes an SP1 signal at terminal IC34. The SP1 signal appearing at IC34 is applied to the SP1 terminal DR7 of the data input register shown in Fig. 32 to probe the "and" gate DR9–0 through DR9–6. It is this signal which opens the "and" gate DR9 to transfer the information from the data input register into the buffer information register. The output of amplifier IC31 is also applied through a 10 microsecond delay IC35 to become an SP2 signal applied to the output terminal IC36. The SP2 signal is applied to the function table output gate. The output of the 10 microsecond delay IC35 is applied to a 6 microsecond delay IC37 of Fig. 56A through an amplifier IC38 to become SP3 at terminal IC39. The output of amplifier IC38 is also applied to an input of an "or" gate IC41 for application through a pulse transformer IC42 to output terminal IC43 as the character pulse to the buffer. The character pulse which appears at the output terminal IC43 of Fig. 56B is connected to an input terminal BC10 of the read-write control circuits of Fig. 39 and to the input terminal BR15 of the buffer information register of Fig. 33B for application to an "or" gate BR16, and to the and gates BR12–3 and BR12–4. Back at Fig. 56B, the output of the amplifier IC38, which is equivalent to the SP3 pulse, is applied to a 6 microsecond delay IC44 and amplified by an amplifier IC45 to become an SP4 pulse at output terminal IC46 and which is applied to the zero suppress circuit and thereafter is transformed into the write pulse. The output of the 6 microsecond delay IC44, which is the SP4 pulse, is also applied to a 4 microsecond delay IC47 for application to a 2 microsecond delay IC48 and through an amplifier IC49 to terminal IC51 as the SP5 pulse. Fourteen microseconds after SP5 another CMA1 pulse occurs, and during the 42 microseconds between each CMA1 pulse another 7 bit serial character is read into the printer from the computer.

If the read-in from the computer proceeds in a normal fashion, then the 119th SP4 from terminal IC46 of Fig. 56B steps both the X and the Y address registers to address X1Y1. The outputs of the X and Y registers for the X1 and Y1 address are applied to the input terminals AG1 and AG2 of the special address gates illustrated in Fig. 58. The application of these two signals to the input AG1 and AG2 enables the gate AG3 to allow an appropriate output pulse to appear on terminals AG4, AG5 and AG6. The signal appearing on the output terminal AG4 of Fig. 58 is applied to the input terminal IC52 of Fig. 57 and the signal appearing on the terminal AG6 is applied to the input terminal IC53. The address #1 signal applied to the input terminal IC52 enables gates IC55 and gates IC57. The address #1 signal is also applied to the input terminal IC58 on Fig. 56A to enables gates IC59. The inverted address #1 signal applied to input terminal IC53 serves to enable gate IC61 of Fig. 57. The blockette signal applied to input terminal IC8 of Fig. 57 which preceded the 120th CMA1 pulse sets flip-flop IC21 to the "1" state. The CMA1 pulse, which is also applied to the input terminals IC14 of Fig. 56A, passes through the transformer IC19, gate IC29, amplifier IC31 to probe gate IC59. Since the address #1 signal is also present on terminal IC58 the CMA1 signal passes the gate IC59 to restore flip-flop IC15 to the "0" state and to remove the enabling signal from the "and" gates IC2, IC3, and IC29. The blockette signal applied to terminals IC8 of Fig. 57 had set flip-flop IC21 to the "1" state, applying an enabling signal to gate IC57 which a following SP3 probes. Since the address #1 signal on terminal IC52 also enables gate IC57, the SP3 pulse passes therethrough to probe gate IC62. Assuming, as we have, that this is a normal read-in and there is no input odd-even error, there will be a signal applied from the inverter amplifier IC63 to an input of gate IC61 to enable that gate along with an enable read-in signal from terminal IC64. Therefore, when the SP3 signal from gate IC57 probes gate IC62, it passes therethrough to set flip-flop IC65 into the "1" state. The setting of the flip-flop IC65 to the "1" state enables gate IC66 so that a following SP5 signal applied to terminal IC67 passes through gate IC66 to appear at an output terminal IC68 as the end of the computer read-in pulse. The end of the computer read-in pulse appearing on the output terminal IC68 of Fig. 57 is applied to input terminal IC69 of Fig. 56B to restore flip-flop IC18 to the "0" state generating a start zero suppress which signal is applied to the output terminal IC71. Meantime, the SP5 pulse which passed through gate IC66 to form the end of computer read-in pulse has passed the delay on the input of flip-flop IC65 in Fig. 57 and restores that flip-flop to the "0" state, removing the enable signal from the gate IC66.

If, however, the read-in from the computer cycle was not a normal cycle but an odd-even error had been detected, then an odd-even error signal would be applied to input terminal IC72 on Fig. 57 to set flip-flop IC73 to the "1" state. The "1" output of the flip-flop IC73 appears as an odd-even error signal at the input of the inverter amplifier IC63 and this signal, after inversion, inhibits gate IC62 preventing the passage of an SP3 pulse therethrough to set the flip-flop IC65 into the "1" state. The output of gate IC57 cannot pass gate IC62, but it is also applied to gate IC74, which is enabled by the same signal which, when inverted, inhibits gate IC62. Therefore, the SP3 passing through gate IC57 passes gate IC74 to probe gate IC75, which is enabled by the "0" output of flip-flop IC76. The signal passing gate IC75 restores flip-flop IC73 to the "0" state and sets flip-flop IC77 to the "1" condition. The "1" output of IC77 generates a repeat signal which appears at the output terminal IC78. This repeat signal on terminal IC78 of Fig. 57 is applied to the input terminal IC79 of Fig. 56A for application through "or" gate IC65 to "and" gate IC6. The next blockette pulse applied to input terminal IC10 will again initiate a second read-in of the information which had indicated an error. The second blockette pulse passes through the gate IC6 to set flip-flop IC12 to the "1" state and the apparatus continues operating as described above.

If no odd-even error is detected during the second read-in of the same information, then the print cycle proceeds as in a normal read-in. But, assuming that there is an odd-even error during the second read-in, flip-flop IC73 has been set to the "1" state by the application of the odd-even error signal to the input terminal IC72. The blockette signal at the end of the second read-in sets flip-flop IC21 to the "1" state, being applied through terminals IC8 and transformer IC7 of Fig. 57. The 120th SP3 signal applied to input terminal IC56 probes an enabled gate IC57 to pass therethrough and probe gate IC74. The output of gate IC74 in turn, probes gate IC81. Flip-flop IC77 is in the "0" state and flip-flop IC76 is in the "1" state so that gate IC81 is enabled to pass the output of IC74. The output of the gate IC81 appears on output terminal IC82 as an error signal and is applied to the error flip-flop in Fig. 68 which will be described hereinafter, to stop the operation of the machine. In the meantime, the SP3 signal which passed through gate IC57 has restored flip-flop IC21 to the "0" condition, removing the enable signal from the gate IC57.

In addition to an odd-even error, a 120 error can be generated on read-in by having the blockette pulse either precede or follow the generation of the address #1 signal. If the blockette pulse precedes the generation of the address #1 signal then the read-in has not read 120 characters, but if the generation of the address #1 signal precedes the blockette pulse then too many characters have been read into the printer. Assuming first that the blockette pulse is generated after the address #1 signal, then the address #1 signal applied to input terminal IC52 of Fig. 57 will probe gate IC57 and gate IC55. At the same time the address #1 is applied to the input terminal IC58 of Fig. 56A and probes gate IC59. The SP0 of the last, or 120th, character appears at the output of amplifier IC31 on Fig. 56A, probes gate IC59 and, finding it enabled, passes through to restore flip-flop IC15 to the "0" condition, removing the enabling signals from the gates IC2, IC3, and IC29 to prevent the entrance of any additional information from the computer on terminals IC1. The following SP3 signal at input terminal IC56 of Fig. 57 probes gates IC57 and finds it closed, and probes gate ID83 and passes therethrough to probe gate IC75. Passing through gate IC75, the SP3 pulse sets flip-flop IC77 to the "1" state and restores IC73 to the "0" state. The setting of flip-flop IC77 to the "1" state generates the repeat signal on IC78, causing a second read-in of the same information. The next following blockette pulse initiates the read-in and the operation proceeds as explained above. If, however, the error repeats, then the 120th SP3 pulse appears on input terminal IC56 of Fig. 57 and probes gate IC83. The output of this gate is applied to the input of gate IC84, which is enabled by the "1" condition of the flip-flop IC76, to generate a 120 error signal on output terminal IC85 for application to an error flip-flop in Fig. 68 to halt the operation of the machine.

Assuming that the blockette pulse precedes the generation of the address #1 signal, the blockette pulse supplied to input terminals IC8 of Fig. 57 passed through transformer IC7 to probe gate IC61. There is no #1 signal, so the inverted address signal of terminal IC53 enables gate IC61 to allow the blockette signal to pass. The output of the gate IC61 probes gate IC75 which is enabled by the "0" output of the flip-flop IC76 to pass a pulse to the flip-flop IC77, setting it to the "1" state and generating the repeat signal. The repeat signal is applied to the input terminal IC79 of Fig. 56A setting flip-flop IC12 to the "1" state to prevent the reading in of any additional information. Then the complete read-in cycle is repeated, and, if there is no error, the operation continues as explained above. If, however, the error is repeated during the second read-in, then the blockette pulse at the end of the second read-in again probes enabled gate IC61, the output of which probes gate IC84 to generate the 120 error signal and set the error flip-flop to stop further operation of the apparatus.

The above discussion has been of the abnormal endings of a read-in cycle when information is being read from the computer. However, there also can be errors when information is read in from tape. If there is an odd-even error when information is read into the printer from the tape unit, the odd-even error applies a signal to the input terminal IC72 of Fig. 57 to set flip-flop IC73 to the "1" state. The output of this flip-flop is applied to the output terminal IC86 and to the printer circuits represent an odd-even error signal. The printer control circuit, in response to the signal appearing on output terminal IC86 of Fig. 57, generates a negative signal which inhibits the generation of a start signal in the print control circuits. The machine will stop operation at this point.

As in reading information from the computer, either of two 120 errors may be generated: one in which the 120 address precedes the tape buffer end pulse and the one in which the 120 address follows the tape buffer end pulse. The 120 address is generated by the application of the Y10 address to terminal AG7 and the X12 address to the terminal AG8 of the special address gates of Fig. 58. The two addresses, when they occur simultaneously, pass through gate AG9 to appear on output terminals AG10 and AG11 as the 120 address. When the 120 address precedes the tape buffer end pulse, the 120 address pulse will appear at terminal PC71 and enable gates TC72 and TC73 of Fig. 49. Flip-flop TC74 is in the "0" state and when an SP2 signal appears on the input terminal TC75, it is applied to the gate TC73 and passes therethrough to restore flip-flop TC31 to the "0" state to probe TC45. The output of gate TC45 appears at terminal TC77 as an indication of a 120 error. The "0" output of flip-flop TC31 is applied to gate TC78 to enable it along with the tape signal. Upon the occurrence of an SP5 at the input terminal TC79, it passes through the gate TC78 to restore flip-flops TC74 and TC28 to the "0" state. In addition, this pulse sets flip-flop TC12 to the "1" state and is applied through output terminal TC81 as an end tape readin pulse to the input terminal TC82 of Fig. 51 to set flip-flop TC83 to the "0" condition.

If the 120 pulse follows the tape buffer end pulse, the tape buffer end pulse is applied to input terminal TC84 of Fig. 49 and passes through transformer TC85 to set the flip-flop TC74 to the "1" state. A 120 error probe pulse which occurs at CP1 is applied to the input terminal TC76 to probe gate TC86 which is enabled by the "1" output of the flip-flop TC74. The 120 probe therefore passes gate TC86 and is applied to the gate TC45 to appear at terminal TC77 as an error signal. The output of the gate TC86 is also applied to the zero input of flip-flop TC31 to restore it to the "0" state. Subsequent actions are the same as those described in the above paragraphs.

*Function table and zero suppress circuits (Figs. 60, 61, and 62)*

As explained earlier, one of the important characteristics of this system is its flexibility in determining variations in format and its versatility in adapting to a large number of different forms which may be printed. One of the major circuit components for achieving this flexibility in control lies in the function table and zero suppress circuits. The function table, which is illustrated in detail block form in Fig. 60, receives information at input terminals FT1–0 through FT1–5 from the buffer information register during the read-in cycle before the information is transferred into the buffer memory. The function table comprises an "and" gate matrix which translates the six unit code in which the characters are represented in the printer into a single unit code.

The translator itself comprises two banks of "and" gates, the first bank comprising 10 "and" gates which are arranged in groups of four, two, and four. "And" gates FT2–1 through FT2–4 have their inputs connected to the input terminals FT1–4 and FT1–5, the "and" gates FT3–1 and FT3–2 have their input terminals connected to the input terminals FT1–2 and FT1–3, and the remaining four "and" gates of the first bank FT4–1 through FT4–4 have their inputs connected to the input terminals FT1–0 and FT1–1. The outputs of the first bank of "and" gates are again combined in a second group of 13 "and" gates FT5 through FT17 where they are combined to produce individual outputs from each combination of input signals. It should be pointed out that the first bank of "and" gates comprises two inputs for each gate whereas the second bank comprises three inputs: thus, the first bank combines two individual signals into a single output signal and the second bank combines in each gate three of the outputs of the first bank of gates, resulting in a composite combination of six input signals to produce a single output signal. As a general rule, the outputs of the second bank of "and" gates are individually applied to a third group of 12 gates which are used for timing purposes, the output signal indicating the recognition of a zero for use in zero suppression, appears at an output terminal FT31 for direct application to the zero suppress circuit. The zero output signal can be considered a control potential, whereas the signals appearing at the other 12 lines, which represent the other non-printable characters, can be considered pulse signals. Timing is accomplished by the application of the function table and odd-even probe applied to the input terminal FT32, which continuously probes the "and" gates to which the decoded ignore and class signals are applied. Since the function of the class symbol, if recognized, is to prevent printing of the blockette in which it is contained, the output of the class symbols are applied to other circuits for preventing the printing of the particular blockette containing them. Recognition of a class symbol for a suppression of the printing of that particular blockette is achieved through output terminals FT35 and the plugboard 31. To accomplish this, the lines from the output terminal FT35 of Fig. 60 are connnected to the back of the lower section of the plugboard as shown in Fig. 44. To achieve recognition of any of the four class symbols, it is necessary to apply a patch cord, such as shown in Fig. 45, from the hubs PB3–1—PB3–4 designating that particular symbol of any of the hubs PB3–5 which are connected from the back portion of the plugboard shown in Fig. 44 to the input terminal TC91, labelled suppress print, in the tape unit control circuits shown in Fig. 51. Since class control can be applied to a tape input only, the output of the hubs PB3–5 of the plugboard are connected only to the tape control circuits.

In addition to probing the "and" gates FT25 through FT29 continually, the function table and odd-even probe is also applied to function table "and" gate FT34. This gate is enabled by the application of the class print symbol to input terminal FT33, and when that signal is present, the function table probe passes through gate FT34 and is applied to the output gate FT18 through FT24 to transfer the decoded signal to the appropriate control line. In addition to the function table, there is also shown in Fig. 60 an additional gate FT36 having three inputs, one of which is the function table and odd-even probe signal. If, at the time that the function table and odd-even probe signal is applied, there also exists an output signal from terminal OD22 of the odd-even checker, illustrated in Fig. 36, and is applied to imput terminal FT37 of Fig. 60, and a computer digit invert signal is applied to input terminal FT38, then an odd-even error is generated and is applied to output terminal FT39 to indicate an odd-even error and to prevent printing of that particular blockette. This is true, since, unless a computer digit signal exists, any even signal generated by the odd-even checker indicates an odd-even error.

The output of the gates FT18 through FT 29 shown in Fig. 60 are applied to input terminals FT41 through FT53 of Fig. 62 for application to "or" gates FT54, FT55, and FT56. The outputs of the "or" gates are applied to flip-flop FT57 to set it in the "1" state, generating an output potential which is applied from the output terminal FT58 to the input terminal BR17 of Fig. 33B, which illustrates the buffer information register. The special character output potential from Fig. 52 is applied to the buffer information register to clear that register to the ignore combination since the special characters are not printable and must be replaced in the buffer memory with an ignore signal. This is accomplished in the buffer information register 22 by the application of the special character potential BR17 which enables the "and" gates BR12–1 and BR12–2. Since, during normal print operation but not during computer digit operation a computer digit inverted signal will be present at input terminal BR18, the gate BR12–1 applies an enable signal to gates BR12–3. When a character pulse applied to input terminal BR15 arrives at the "or" gate BR16, it is transmitted through the open gate BR12–3 for application to the register BR1-6 to place that register into the "1" state, and for application to the other registers BR1–0 through BR1–5 to place them in the "0" state, thus, generating an ignore signal in the buffer information register.

The zero suppress cycle is initiated by the setting of flip-flop FT61 in Fig. 61 to the "1" state. This is accomplished by the application of an end tape read-in pulse which occurs at the end of a normal tape read-in cycle applied to the input terminal FT62. The output of the "1" side of the flip-flop FT61 is applied to the "and" gate FT63 to enable that gate and allow a succeeding ZS2 pulse which is a zero suppress 2 pulse applied to input terminal FT64 from output terminal TC86 of Fig. 50, the tape unit control, to pass and to set flip-flop FT65 to the "1" state. The "1" output of flip-flop FT65 enables gate FT66 allowing a ZS2 pulse coming from gate FT63 to pass and to be applied to the output terminal FT67 as a clear buffer, zero suppress output signal. The signal appearing at the output terminal FT67 of Fig. 61 is applied to input terminal IC86 of Fig. 56A of the input control circuits, passing "or" gate IC87 for application to "or" gate IC21 to generate clear buffer signals at terminals IC24 and IC23. These signals are applied to the buffer to clear it as explained earlier. In addition to generating the clear buffer signal which is applied to output terminal FT67 the passage of a ZS2 signal to gate FT66 is also used to restore flip-flop FT61 to the "0" state removing the enable signal from the gate FT63. The restoring of flip-flop FT61 to the "0" state applies an enabling signal to gate FT72, which, when flip-flop FT65 is in the "1" state is opened, and allows the appropriate start zero suppress signals applied to the input terminal FT69 from either the tape or the computer unit to pass through the gate FT72 and appear at output terminals FT73, FT75, FT76, and FT77 as the output signals which initiate the zero suppress cycle. The start zero suppress signal applied to the tape input terminal FT69 of Fig. 61 is generated in Fig. 49 which illustrates the tape unit control circuits and appears at the output terminal TC88 of that figure. The start zero suppress cycle is generated by the restoration to the "0" state of the read-in flip-flop TC28. The start zero suppress signal applied to the computer terminal FT69 of Fig. 61 is transferred thereto from output terminal IC71 of Fig. 56B of the input control circuits. This signal is generated by the restoration of flip-flop IC18 to the "0" state.

The zero suppress signal appearing at the output terminal FT73 of Fig. 61 is applied to input terminal FT78 of Fig. 62 to pass gate FT79. The output of gate FT79 is applied to the input of gate FT81 to enable that gate, and, when inverted, inhibits gate FT82. The output of gate FT81 which is the zero probe, is applied to flip-flop FT57 to set that flip-flop into the "1" state for the generation of the special character signal which is applied from output terminal FT58 of Fig. 62 to input terminal BR17 of Fig. 33B. The zero suppress cycle signal from the output terminal FT74 of Fig. 61 is applied to an input terminal IC88 of Fig. 56B, which is the input control circuit, to allow ZS1 pulse to pass gate IC91 and appear on output terminal IC92 as a set address core signal. The signal applied to terminal IC88 and passing gate 91 is also applied through transformer IC42 to become a character pulse which is applied to the buffer memory through terminal IC43. The zero suppress cycle pulse signal appearing at the output terminal FT75 of Fig. 61 is applied to input terminal TC89 of Fig. 50, which illustrates the tape unit control. The signal appearing at TC89 terminal is applied to gate TC91 to enable that gate, and a clock pulse passing gate TC68 passes through gate TC91 to appear at terminal TC92 as zero clear signal and at terminal TC93 as a zero probe signal. The read-out or zero suppress cycle signal appearing at the output terminal FT76 of Fig. 61 is applied to the input terminal TC15 of Fig. 39, the buffer memory read-write control. The signal applied to terminal BC15 enables gate BC16, the output of which generates the clear information register pulse at output terminal BC22. The same signal appearing at terminal FT76 of Fig. 61 is also applied to input terminal XR15 of Fig. 40A to pass through an "or" gate and appear on line XR9. The signals appearing on XR9 operate as discussed hereinbefore. The read-out or zero suppress cycle signal appearing at the output terminal FT77 of Fig. 61 is applied to input terminal AG12 of Fig. 59 and, when inverted, serves as a read-out enable signal at terminal AG13.

After the generation and application of the zero suppress signals, the following ZS1 pulse generated in the clock distributor of Fig. 50 and applied to the output terminal TC87 of that figure to the input terminal IC93 of Fig. 56B passes the gate IC91, which was enabled by the zero suppress cycle signal coming from FT74 of Fig. 61, and is applied through output terminal IC43 to clear the buffer and through output terminal IC92 to set the particular address core of the address being read out of the buffer memory into the buffer information register. Setting the address core generates a negative pulse in the output windings of that particular core which may be connected by means of a plugboard to the zero suppress circuitry. Three portions of the plugboard have been diagrammatically shown on Fig. 62 to more clearly explain the operation of the zero suppress circuits. The overall operation of the plugboard will be made clearer by this explanation. Since the portions of the plugboard shown in Fig. 62 are only diagrammatic and are by way of illustration only, no attempt has been made to closely follow the actual layout of the plugboard, and, to further point up the distinctions, in Fig. 62 the plugboard element will carry function table numbers whereas in Figs. 44 through 46, the components carry plugboard or PB reference characters. In Fig. 62 three plugboard sections are outlined by dashed lines, the center section representing the bank of address hubs FT83, FT84, FT85, and so forth. To the left of the address hubs is a section containing the start zero suppress hubs and to the right of the address hubs is a section of end zero suppress hubs. Both the start and the end groups of zero suppress hubs FT86, FT87, FT89 and so forth, are schematically shown connected through suitable diode buffers to common connecting lines which terminate in single output hubs, FT91, FT92, FT93, and FT94. When a zero suppress field is to begin at a particular address, the hub of that address, assuming the terminal FT84 as an example, is patched by means of appropriate cords to a start field hub such as FT87 for example. Two such groups of hubs are utilized for this purpose, one group for single line operation and a second for multiline operation. In this case we shall consider single line operation. A second address must be chosen at which the field of suppressed zeros must end, and this address, assuming FT83, is patched to an appropriate terminal FT91 will be patched to its equivalent single line terminal which is immediately above, and terminal FT93 will also be patched to a single line terminal which is immediately above it. When the address core represented by hub FT84 is probed, a signal is transferred through the patch cord to the single line terminal FT87 and through the output terminal FT91 to gate FT95, which is enabled by a single input signal applied to terminal FT98. The output of gate FT95 sets flip-flop FT100 to the "1" state. This signal is then applied to gate FT81, the output of which sets flip-flop FT57 to apply a signal to the buffer input register to convert the information contained therein at that time into an ignore symbol. When the address represented by the hub FT83 is reached, then the signal from address hub FT83 is applied to the end zero field hub FT88, passes out through terminal FT93 to pass gate FT97, and restores flip-flop FT100 to the "0" condition, unless the flip-flop has been restored by a non-zero. This removes the enabling signal from gate FT81 and allows a subsequent SP4 to restore the flip-flop FT57 to the "0" state. After being set into the "1" state, flip-flop FT100 remains in that state until it is restored to "0," either by a general clear signal, the output from gate FT101, the output from gate FT97, or the output from gate FT82. Gate FT101 passes the signal from the end suppressed field to restore the flip-flop FT100 to the "0" state, but if the function table should stop detecting zeros by means of gate FT12 in Fig. 60 and no longer apply the zero signals to output terminal FT31 of Fig. 60 and to input terminal FT102 of Fig. 62, then gate FT79 no longer passes a signal. This results in the removal of the inhibition from gate FT82 allowing the next following SP2 or zero probe to pass and restore the flip-flop FT100 to "0." This causes a restoration of flip-flop FT57 to the "0" state as explained above. During this time ZS2*s* applied to input terminal IC94 of Fig. 56B of the input control circuit have been passing gate ICS9 to become end zero suppress cycle pulses at output terminal IC95. These end zero suppress cycle pulses have been applied to input terminal FT103 of Fig. 61 to probe the gate FT106. As long as gate AG9 of Fig. 58 did not pass an output signal because the 120 address had not yet been reached, no signal is applied to the input terminal FT104 of Fig. 61 and gate FT106 is not enabled. But upon the appearance of a signal at FT104, gate FT106 opens to pass the end zero suppress cycle pulse to restore the flip-flop FT65 to the "0" state and generate, through gate FT68, the zero suppress cycle ended signal at terminal FT71. This ends the zero suppress cycle and initiate the print cycle.

*Print control and print cycle control* (*Figs. 63 and 64*)

The two figures which represent the print control and the print cycle control will utilize the same types of reference characters. The print cycle is divided into 5 minor cycles, each of which is initiated by the appearance of a character from the print code generator into the code generator register. The print code generator, as explained above, is a magnetic drum on which are stored 51 six bit Univac code characters corresponding to the 51 type characters on the type wheel. Of course, it should be realized that the characters on the type wheel code drum need not be six binary bits and that the Univac code is used herein only for illustrative purposes. As a matter of fact, since the printer of this invention is of universal appeal, the code representing the individual characters may be of any standard type and yet fall within the logic of this invention. For different types of codes, some slight modification may be required in the circuitry, but at worst, a code translator can always be inserted in the input lines. The first minor cycle is a character count cycle during which the printable characters contained in the buffer memory are counted. The remaining 51 minor cycles are comparison and print cycles; during each of these cycles the contents of the buffer memory is compared with a character from the code generator register. At those positions of the type wheel and the print code generator where there is a bit-for-bit coincidence between the character in the code generator register and in the character from the buffer memory, a character is printed. At the end of the 52nd minor cycle, a check is made to ensure that all of the printable characters in the buffer memory have, in fact, been printed. When a character is read from the print code generator into the code generator register illustrated in Fig. 35, the six lines are also buffed together to provide a signal at the output terminal CO24 of Fig. 35 which is applied to the input terminal PRC24 of Fig. 63, being also applied to flip-flop PRC26 to set that flip-flop into the "1" state. The code wheel character signal also passes through gate PRC25 and is applied to flip-flop PRC27 to set that flip-flop also to the "1" state. The "1" output of flip-flop PRC27 is applied through an appropriate cathode follower to output terminal PRC21 as a read-out signal which is also applied from output terminal PRC21 to input terminal FT105 of Fig. 61 and also to Fig. 59 to the input terminal AG12. Since there has not yet been a 51 count indicating that 51 minor cycles have taken place, there is present a signal on the input terminal PRC28 which enables gate PRC29 of Fig. 63. Since flip-flop PRC31 is still in the "0" state, its "0" output also enables PRC29 as does the output of flip-flop PRC32, so that a signal passes through gate PRC29 to enable gate PRC33. PRC34 is enabled by the "1" state of flip-flop PRC26 and upon the occurrence of a 90 kc. clock pulse applied to the input terminal PRC35, the passage of the pulse through gate PRC34 also passes through gate PRC33 to place flip-flop PRC31 into the "1" state, removing the enable signal from gate PRC29 and enabling, in turn, PRC36. The next 90 kc. clock pulse appearing at input terminal PRC35 passes through the open gate PRC36 to place flip-flop PRC32 into the "1" state, removing an enable from the gate PRC29 and enabling gate PRC37 in turn. This allows the next following 90 kc. clock pulse to pass through gate PRC37 to become a character read-out pulse applied from output terminal PRC19 to input terminal FT96 of Fig. 56B. The output of gate PRC37 is also applied, after a delay of 4 microseconds, to the "0" input of flip-flop PRC26 to restore that flip-flop to the "0" state, removing the enable signal from the gate PRC34. Further, after a second delay of 4 microseconds, generating a total delay of 8 microseconds from the output of gate PRC37, the signal passing therefrom then appears at output terminal PRC38 as a clock +8 microsecond pulse. In the meantime, the output of the gate PRC36 has been applied to output terminal PRC 39 as a clear buffer pulse, to input terminal IC97 of Fig. 56 to clear the buffer, and also to the "0" iput of flip-flop PRC31 to restore that flip-flop to the "0" condition, removing the enable signal from gate PRC29. Thus, when the read-out character pulse from terminal PRC19 is applied to the input terminal IC96 of Fig. 56B to set the buffer, the buffer had already been cleared. In Fig. 35 the six pairs of lines coming in from the heads of the code generator are combined in "or" gates CO25 and CO26 to generate a code generator character signal at output terminal CO24. This signal is applied to input terminal PRC24 of Fig. 23 as the code wheel character pulse. A code wheel character signal is generated for any printable character since the only nonprintable character which is stored in the buffer is the ignore, and that comprises a pulse in the check pulse position only. No check pulse position signal is combined in "or" gates CO25 and CO26, therefore, only printable characters will generate a code wheel character signal. The character pulse generated is subsequently delayed an additional 14 microseconds, and, because of this, the address core to be set will be set at the next following address. For example, assuming that address 5 contains a printable character, the address core corresponding to 5 will be set by the character pulse generated by address 6. Address 120 is applied to input terminal PRC12 from output terminal AG11 of Fig. 58 as explained above and enables gate PRC39. The following character pulse, after a subsequent delay of 4 microseconds, passes through the enable gate PRC39 to set flip-flop PRC41 to the "1" state. The "1" output of flip-flop PRC41 enables gate PRC42 so that the next following clock pulse applied to input terminal PRC35 passes through gate PRC42 to restore the flip-flop PRC41 to the "0" condition. The clock pulse, which sets flip-flop PRC41 to the "1" state, also sets PRC32 to the "0" condition, removing the enable signal from PRC37 and preventing further transmission of character pulses from output terminal PRC19 to input terminal IC96 of Fig. 56B. The "0" output of flip-flop PRC32 enables gate PRC29, and the resulting signal passing therethrough enables gate PRC33. The next clock pulse from input terminal PRC35, which is the 121st clock pulse, passes gate PRC33 to set flip-flop PRC31 into the "1" state enabling gate PRC36. This clock signal which, when passing gate PRC42 sets flip-flop PRC41 into the "0" condition, also sets flip-flop PRC43 to the "0" condition and, passing through gate PRC44, sets flip-flop PRC45 to the "1" state, which, in turn, enables gate PRC46. The next clock pulse, the 122nd pulse, passes the enable gate PRC46 to set flip-flops PRC45 to the "0" state and flip-flop PRC47 to the "1" state. In the "1" state, flip-flop PRC47 signifies the end of the first minor cycle and produces an output potential on output terminal PRC22 which is applied to terminal CO22 of Fig. 35. The output of PRC46 is also applied to enabled gate PRC48, which generates a signal and applies it to the output terminal PRC49 for inverting the comparison counter and clearing the print index counter. This pulse also probes gate PRC51 which is enabled by the "0" output of flip-flop PRC47 to pass a pulse to the core driver pulse shapers PRC53 and PRC54, while the signal from gate PRC46 is directly applied to core driver pulse shaper PRC52. The output of PRC52 is applied to terminal PRC17 connected input terminals AS5–1 through AS5–4 of Fig. 42. The output of the core driver pulse shaper PRC53 appears at output terminal PRC18 which is connected to input terminals PRC4 of Fig. 47; and the output terminal of pulse shaper PRC54 is applied to terminal PRC19. The output of core driver pulse shaper PRC55 appears at terminals PRC22 and PRC21, PRC21 being connected to terminals PC7 of Fig. 47 and PC27 of Fig. 48. As a result of the output signal from the core drivers and pulse shapers, the address cores are cleared transferring signals to the check and print cores, but since the print cores have applied thereto signals from the output terminals PRC18 and PRC19 which inhibit them, only the check cores are set, not the printer cores. In the meantime, the signal which passed through gate PRC42 to set flip-flop PRC41 to the "0" state, also applied a signal from the output terminal PRC23 to clear the code generator register, this signal being applied to input terminal CO23 of Fig. 35.

The second minor cycle is the first print minor cycle and is initiated by the appearance of a character at the code generator register. The apparatus follows the same general pattern of operation as described above except that during this and subsequent minor cycles, 120 characters are read from the buffer and are compared with the character in the code wheel register producing an output signal when there is a bit-for-bit comparison.

*Comparison counter (Fig. 65)*

The comparison counter maintains a check to ensure that all of the address characters are printed. As explained hereinbefore, on the first minor cycle information is transferred from the buffer memory to the buffer information register, and the addressed characters are counted in the comparison counter.

The comparison counter, illustrated in Fig. 65, comprises a group of 7 flip-flops, labelled CC1–0 through CC1–6. The count which advances these flip-flops is applied to input terminal CC2 from the output terminal AS15 of Fig. 66. The count signal pulses are applied to gate CC3–6 which is enabled by the "0" output of flip-flop CC1–6. The count pulse, passing through gate CC3–6 sets counter CC1–6 to the "1" state, removing the enable signal from the gate CC3–6 and enabling in turn, gate CC4. The next count is applied simultaneously to the enabled gates CC4 and the disabled gate CC3–6, passing through gate CC4 to probe gate CC3–5. Gate CC3–5 is enabled by the "0" output of flip-flop CC1–5 and the second count pulse passes therethrough to set flip-flop CC1–5 to the "1" state. At the same time, the output of gate CC4 is applied to the flip-flop CC1–6 to restore that flip-flop to its "0" state. Thus, the first count is represented by flip-flop CC1–6 in the "1" state and the remainder of the flip-flops in the "0" state, and the second count is represented by flip-flop CC1–5 being in the "1" state with the remainder of the flip-flops in the "0" state. It can be readily appreciated that the third count applied to input terminal CC2 will then set flip-flop CC1–6 again into the "1" state. The third count, therefore, is represented by the counters CC1–6 and CC1–5 both being in the "1" state and the remainder of the counters being in the "0" state. As successive counts come in, they follow the normal pattern of binary counting, setting the appropriate flip-flops to the "0" and "1" states.

After the first minor cycle, when all of the addressed characters stored in the buffer memory have been counted by the comparison counter, an invert signal generated in Fig. 63 and appearing at the output terminal PRC49 is applied to the input terminal CC11 of Fig. 65. From the input terminal CC11 the invert signal is applied simultaneously to a bank of gates which may be called the invert gates CC8, CC9, and CC13 through 25. These gates are enabled by the respective "0" or "1" outputs of the individual flip-flops which they feed, the gate feeding the "1" input of a particular flip-flop being enabled by the "0" output of the same flip-flop. Thus, upon the application of an invert signal to terminal CC11, the signal passes through the enabled gates to set the flip-flops CC1–0 through CC1–6 of the comparison counter to the opposite state in which they were. This is equivalent to complementing the number stored in the register. If, as an example, the register contains the count representative of 120, when inverted it will contain the count representative 7. During the subsequent 51 minor cycles when the printable characters are printed, as each character is printed it is counted by the application of a count signal to the input terminals PC2. At the end of the major cycle, the register should be filled, with each of the flip-flops PC1–0 through PC1–6 containing all "1's." If this is the case, output gates CC26 and CC27 will have signals on all of their inputs producing two output signals which are applied to gate CC28. The output of gate CC28 is inverted by the inverter amplifier CC29 and applied to the input of gate CC31 to inhibit that gate. Therefore, when a subsequent clear and probe signal is applied to input terminals CC12 from Fig. 63 output terminals PRC51, gate CC31 is inhibited and no comparison error signal will be applied to output terminal CC32. If, however, any of the flip-flops CC1–0 through CC1–6 are not in the "1" state, one of the two gates CC26 or CC27 will not pass an output signal and nothing will pass gate CC28. There will then be present on output gate CC31 an enabling signal from the inverter CC29 and the probe signal from CC12 will pass therethrough to generate a comparison error signal on output terminal CC32. Thus, the comparison counter determines whether or not the number of characters originally counted were actually compared.

*Address storage input (Fig. 66)*

The address storage utilizes special input circuits since information may be printed all on a single line, or, when in computer digit operation, on two different lines. In normal operation, the printable characters stored in the buffer memory are printed only on the first line in any address. To this end, a flip-flop AS26 determines whether information will be printed on a first line or on a second line. When the flip-flop AS26 is in its "1" state, it provides an enabling signal to a gate AS27 and another gate AS28. In addition, the output of the "1" state of the flip-flop AS26 is applied through a cathode follower to an output terminal AS25 for connection to an input terminal PRC54 of Fig. 64. This is one of the many signals required in concert to pass the gates in Fig. 64 and produce the appropriate start print signals. The gate AS27 passes a signal when the computer digit signal applied to input terminal AS29 is present, when the Odd output signal from OD21 of the Odd-Even Checker is applied to input terminal AS17, and when the flip-flop AS26 is in the "1" state to produce an output signal at terminal AS21 for application to input terminal AS4 of Fig. 42, setting the cores for the odd characters. In computer digit operation, when a nonprintable character is to be printed, the even signal applied to input terminal AS18 from Fig. 36 output terminal OD22 enables a gate AS31 which will pass the CD signal applied to AS29 if the flip-flop AS26 is in the "0" condition to produce the output signal on terminals AS21 for application to terminal AS4 of Fig. 42 for setting the cores for the characters to be printed on the even line. If an even signal is present at terminal AS18 when no computer digit signal is present at terminal AS29, then a computer digit inverted signal is present on input terminal AS32, and a clock pulse applied to input terminal AS16 from the output terminal PRC38 of Fig. 63 passes gate AS33 to generate an odd-even error signal on output terminal AS34 to indicate an odd-even error. Also, during the computer digit operation the signals applied to output terminal AS21 to set the core are also applied to output terminal AS15 for application to the comparison counter, to the count input terminal CC2 of Fig. 65. Gates AS35 and AS36 pass the appropriate core set signals for the even and the odd lines at the appropriate times upon the receipt of clock pulses on input terminals AS16.

*Print index counter (Fig. 67)*

As mentioned hereinbefore, it is not necessary that the comparison between the information stored in the buffer memory and the information stored in the code generator register begin with any particular symbol, but this comparison may begin any place during the rotation of the print wheel. It is only necessary that for a complete operative major cycle, the first minor cycle be a check cycle and the remainder being comparison and print cycles. To determine the passage of individual minor cycles, the print index counter has been provided with six flip-flops PI6–0 through PI6–5. The print index counter is initially cleared by the application to input terminal PI1 from the output terminal PRC49 of Fig. 63 of a clear print index counter signal which sets all of the flip-flops PI6 to the "0" state. Pulses to be counted are applied to input terminal PI2 from output terminal PRC57 of Fig. 63 and are applied initially to gate PI7 which is enabled by the "0" state of the flip-flop PI6–0 to the "1" state. This inhibits PI7 from passing the second count pulse. The second count pulse is applied to gate PI8 which is enabled by the "1" output of the flip-flop PI6–0 to pass a pulse applied to gate PI9. Gate PI9 is enabled by the "0" output of flip-flop PI6–1, and the output thereof sets that flip-flop to the "1" state. Thus, the second count will be applied to flip-flop PI6–1 only when flip-flop PI6–0 is in the "1" state and flip-flop PI6–1 is in the "0" state. The output of gate PI8 is also applied to the "0" input of flip-flop PI6–0 to restore that flip-flop to the "0" condition. It can be seen that this counter operates in the same manner as the comparison counter discussed above. When the count of 51 has been reached, flip-flops PI6–0, PI6–1, PI6–4, and PI6–5 will be in the "1" state, and flip-flops PI6–2 and 3 will be in the "0" state. This will produce a group of simultaneous signals applied to gate PI11 which will pass therethrough to generate the 51 count on output terminal PI5 for application to input terminal PRC59 of Fig. 63, and will enable gate PI12 so that the next following count will pass therethrough to generate the 52 count signal on the output terminal PI3 which is applied to input terminal PRC58 of Fig. 63. Until the 51 count is reached, there is a signal present on output terminal PI4, the 51 invert signal which is applied to the input terminal PRC28 of Fig. 63.

*Printer control (Figs. 68 and 69)*

The printer circuits illustrated in Figs. 68 and 69 control the printer in such miscellaneous operations as read no print, print no read, read one blockette, and other such test operations. The apparatus is primarily for test purposes and contains in Fig. 68 two maintenance panels which comprise manual switches for setting appropriate flip-flops to the "1" state and for combining the outputs of these flip-flops in indicating errors. The read no print operation allows a continuous normal read-in during which there will be no printing. Setting the read no print switch on Fig. 74 places an inhibition on gate PRC25 preventing the initiation of a print cycle. The application of the print no read signal to input terminal PRC68 of Fig. 64 enables gate PRC69 to generate a transfer data signal at output terminal PRC9. The application of the transfer data signal to the input terminal IC4 of Fig. 56 allows a continuous, repetitive read-in from the computer even though the ready flip-flop DS2 of Fig. 51 is not set to the "1" state. In addition, the read no print signal applied to input terminal PRC68 enables gate PRC71 which will pass the leading edge of the start print signal applied to input terminal PRC6 from Fig. 61 and generated by the single pulse generator PRC72. The output of gate PRC71 will set flip-flop PRC73 to the "1" state, enabling the gate PRC74 to pass a signal which sets flip-flop PRC75 to the "1" state. The output of PRC76, which is enabled by the "1" output of gate PRC75, passes a signal to set flip-flop PRC76 to the "1" state, passing through gate PRC69 to generate both the computer and the tape transfer data signals at output terminals PRC8 and PRC9. Thus, the leading edge of the start print cycle signal acts as a read start signal to read the next blockette. The setting of the read no print switch removes a signal from the read no print invert input terminal PR28 of Fig. 68 to inhibit gate PR29. This prevents the passage of a pulse to indicate an error signal at output terminal PR31. The read no print signal is also applied to input terminal PR32 of Fig. 69, and passing an "or" gate PR33 results in a start print paper feed signal at output terminal PR25 to be applied to input terminal PRC64 of Fig. 64. The setting of the read no print switch removes the read no print inverted signal from input terminal PR35, inhibiting gate PR36 and preventing the read one blockette signal, the SP0, or the clear buffer signal from setting the prevent print flip-flop PR38 to the "1" state. The removal of the read no print signal also inhibits gate PR37 and prevents the generation of a set to ready signal at output terminal PR23 for transfer to DS83 of Fig. 31. In addition, the application of the read no print signal to input terminal PR32 enables gate PR34. After the signals have been established by the setting of the read no print switch, initiation of the operation is accomplished by the setting of the initial start switch. A normal read-in cycle follows as described above, and at the end of the read-in, a start print cycle is generated. However, the leading edge of the start print signal is used to initiate another read-in by the passage of the start print cycle signal through gate PRC71 of Fig. 64 as explained above. When the printer is operating off-line, a new blockette will be read in each time the read-in cycle is completed. Thus, this operation serves to check the tape and the input circuitry for errors. Whenever the printer operates with the computer, there will be repetitive read-in of any information on the input-output track currently connected to the printer.

During a print no read operation, the contents of the buffer memory is printed out continuously and no read-in takes place. Setting the print no read switch in Fig. 73 removes the signal from input terminal PRC77 of Fig. 64, inhibiting gate PRC78 and removing the enable signal from gate PR79 to prevent the normal passage of a read start signal applied to the input terminal PRC65 from the output terminal PR26 of Fig. 69. This prevents the transfer of data at the end of the print cycle. The setting of the print no read switch also removes the inverted signal applied to input terminal PR39 of Fig. 68, inhibiting gate PR29 to prevent the setting of the error flip-flop PR41 during this operation. The print no read signal is also applied to input terminal PR42 of Fig. 69 to enable gate PR43 for the passage of a read start signal applied to input terminal PR44. This generates a read start signal during the print no read cycle and appears on output terminal PR26 for transfer to input terminal PRC65 of Fig. 64. The read start signal appearing on output terminal PR26 initiates the next print cycle. In addition, the output gate PR43 is applied to gate PR45, and, after amplification, becomes the start paper feed signal at terminals PR46. The special read start signal appearing on output terminal PR26 is applied to input terminal PR25 of Fig. 64 to set the delay flop PRC81 to its unstable state. When the 17 millisecond delay flop PRC81 restores, it enables gate PRC82 and generates the start print cycle signal at output terminal PRC7 to start another print cycle. The print no read operation is initiated by setting the start switch in Fig. 73, after which a normal print cycle follows, ending with the generation of a read start signal. This read start, as described above, sets the delay flop PRC81 to generate the start print cycle signal. This operation will continue until the stop switch is set or an error occurs.

Another procedure which is suitable for testing purposes is the procedure known as read one blockette. This procedure is different when operating from tape than when operating from the computer. When the printer is operating off-line, each time a read one blockette switch is set, an instruction is issued to the tape unit to read one blockette from tape into the tape unit buffer. This is immediately followed by the transfer of the blockette from the tape unit buffer to the printer buffer memory. However, when the printer is operating on-line, the blockette presently on the particular input output track of the computer memory, will be read into the printer which will continually read this blockette until the read one blockette switch is opened. Either the read one blockette forward switch or the read one blockette backward switch may initiate the reading operation. When the read backward switch is set a signal is applied to the input terminal TC101 of Fig. 50 to enable the gate TC16 and pass a pulse output control signal to the tape handler. This will generate a read backward instruction on output terminals TC102, which are applied to the tape handler itself. The setting of either forward or backward read one blockette switch of Fig. 73 will set flip-flop TC2 of Fig. 49 through the application of a read one blockette signal applied by input terminal TC103 to gate TC102. The setting of the flip-flop TC2 to the "1" state enables gate TC4 to generate test impulses in transformer TC8 for application to the tape unit. A read one blockette signal will be applied to input terminal PRC82 of Fig. 64 passing through "or" gate PRC83 to pass gate PRC76 and set flip-flop PRC77 to the "1" state, generating transfer data signals on output terminals PRC8 and PRC9. In addition, the read one blockette signal will be applied to terminal PR47 of Fig. 68 to restore the four error flip-flops PR71, PR72, PR73, and PR74 to the "0" condition. The read one blockette signal is also applied to input terminal PR48 of Fig. 69 to enable gate PR34 and gate PR36. The appearance of a start paper feed signal at gate PR36 will pass therethrough to set the prevent print flip-flop PR38 to the "1" state preventing the print cycle and stopping the operation of the machine. The enabling of gate PR34 allows reading tape without printing until the FF1 signal is generated so that the tape is then in position to read the first line to be printed. Further, the setting of the read one blockette switch removes the read one blockette inverted signal from input terminal PR49, inhibiting gate PR45, and preventing generation of the start paper feed signal at output terminals PR46. And on Fig. 64, flip-flop PRC83 is set to the "1" state, enabling gate PRC69 and generating the computer transfer data signal at output terminal PRC9.

During single line operation, a single print cycle occurs. Setting the single line switch in Fig. 73 removes the single line invert signal from input terminal PRC34 of Fig. 64 to inhibit gate PRC35. This will prevent the read start signal applied to input terminal PRC86 from passing and starting a new read cycle. If the printer has been stopped by the setting of the normal stop switch, then the single line switch is set, and after that the start switch is set. This will allow time for the printer to print one line only. The single line switch, when set, applies a signal to input terminal PR51 of Fig. 69 to enable the gate PR52 and allow the passage of a signal applied to output terminal PR46 from starting the paper feed and is applied to the "1" side of flip-flop PR38 to set that flip-flop to the "1" state. The setting of the flip-flop PR38 to the "1" state generates at output terminal PR24 a prevent print signal which stops the machine before the line can be printed. Then, setting the start switch will permit that line to be printed.

*Multiline counter and relays (Figs. 71A and B)*

Multiline operation can be initiated by either computer of tape programming. If, assuming a tape operation, a multiline symbol occurs it will be recognized by the function table and will enable gate FT23 of Fig. 60. SP–2 will also probe FT23 and the output will probe gate MLC1 of Fig. 71B. If the symbol appears at address 1, 2, or 3, the pulse will pass gate MLC1 to probe gate MLC2. When the printer is operating with the computer, the multiline instruction will appear as a pulse at the output of transformer DS141 of Fig. 55. This pulse will probe gate DS142 which will be enabled by the output of the demand signal on terminal DS102. The output of gate DS142 will probe gate MLC2 of Fig. 71B.

If the printer is operating with the computer digit and read no print switches (Fig. 74) open, the pulse will pass gate MLC2 to set the 20 millisecond delay flop MLC3 to its unstable condition. This pulse will also set flip-flop MLC4 to the "1" state, and will become the first step multiline signal to the multiline counter, applied through line MLC29 to flip-flop MLC5–0. Setting flip-flop MLC4 to "1" enables gates FT96 and FT101 of Fig. 62, allowing the use of the multiline zero suppress configuration rather than single line.

The multiline counter contains seven flip-flops, MLC5–0 . . . MLC5–6, one of which, MLC5–6, controls the 11 single line relays, and the other six of which control the 15 multiline relays. The single line relays are permanently tied through a control relay MLC7 to the single line flip-flop MLC5–6. The 15 multiline relays are connected through plugboard leads to the 6 multiline flip-flops in any combination required by the particular format. When on normal operation, the single line relays only are energized. The 130 print and check cores are connected permanently to one side of the relay contacts. The 120 address output hubs are connected by plugboard leads to the other side of the relay contacts. Each address core can be connected to 3 print and check cores.

The purpose of multiline is to take one read-in, either from computer or tape and print up to 6 different lines before doing another read-in. The multiline operation is initiated by tape or computer, it is then controlled and ended by special plugging of the printer plugboard. When on multiline operation the single line relays are de-energized. Each side of the contacts of the multiline relays are connected permanently to 180 pairs of plugboard hubs. The address output hubs are connected to one side of the relays by plugboard leads. The other side is also connected to the print and check cores by plugboard leads. By energizing a different set of relays for each stage of multiline, the contents of the buffer can be routed to different print positions for each line of multiline operation.

The first step multiline pulse will set flip-flop MLC5–5 of Fig. 71A to the "1" state and set flip-flop MLC5–6 to the "0" state. Setting flip-flop MLC5–5 to the "1" state will pull in the first set of multiline relays. A normal print cycle will follow during which those characters at addresses connected by the relays will be printed. The "0" side of flip-flop MLC4 will inhibit gate PRC78 of Fig. 64, preventing the read start signal at the end of print cycle from starting a normal read cycle. It will also inhibit gate PF1 of Fig. 72A to prevent the resetting of the double and triple space flip-flops during computer multiline operation.

The read start will pass enabled gate MLC6 of Fig. 71B. The output of MLC6 will generate a new step multiline signal which will set the 20 millisecond delay flop MLC8. This step multiline signal will also set flip-flop MLC5–5 to the "0" state and flip-flop MLC5–4 to the "1" state. This signal will also pass amplifier MLC9 and enabled gate PR53 of Fig. 69 to start paper feed at the printer. The purpose of the 20 millisecond delay flop MLC8 is to allow time for the multiline relays to pull up.

At the end of the 20 milliseconds a new print cycle will be initiated with characters on these lines connected by the new set of multiline relays being printed. This operation will continue until flip-flop MLC5–0 of Fig. 24, or the last multiline counter flip-flop to be plugged, has been set. This flip-flop, in addition to pulling up its load of multiline relays, also generates the last line multiline signal which will inhibit gate PR53 of Fig. 69, thus inhibiting the start paper feed signal generated by the last read start. The read start signal following the last print cycle of the multiline operation will probe enabled gate MLC33 of Fig. 71B, thus setting flip-flop MLC5–6, the single line flip-flop to the "1" state and resetting flip-flop MLC5–0, or the last FF to be plugged, to the "0" state.

The output of gate MLC33 also becomes the end multiline signal from the multiline counter. This signal will pass gate MLC34 to generate the end multiline signal and set multiline flip-flop MLC4 to the "0" state. The end multiline signal will pass "or" gate PRC87 of Fig. 64, to initiate a new read cycle.

*Paper feed control (Figs. 72A and B)*

Unless the read forward or read backward switch, Fig. 73, has been thrown, a pulse probing enabled gate PR45 of Fig. 69 will produce a start paper feed signal to the printer. This signal will be generated by one of the following actions:

(1) The clear buffer pulse is present at terminal PR54 during computer read-in.

(2) SP0 during tape read-in passes gate PR455 which is enabled at address 4, if there has been no class prevent print and no odd-even error in the first three character positions.

(3) During a print no read operation the read start signal will pass enabled gate PR43.

(4) During computer digit operation, the read start generated at the end of the first line, computer digit will pass enabled gate PR56.

(5) During a multiline operation, and if the machine has not printed the last line of multiline, the step multiline signal will pass enabled gate PR53.

(6) During a hold multiline operation, the step multiline signal will pass enabled gate PR53.

(7) During single line operation, a pulse generated as above will pass enabled gate PR52.

The appearance of the start paper feed signal at the printer will set the printer paper feed flip-flop. This fires a thyratron, which in turn energizes a rotating magnetic clutch and brake assembly. The rotating clutch, upon energization, initiates the transport of paper. A magnetic drum which rotates as the paper is moved has signals recorded on it, each one corresponding to a single space on the paper. These space signals step the paper space counter PF1–0 and PF1–1 shown in Fig. 72A, unless a fast feed operation is in progress. Three lines, PF2, PF3, and PF4, from the paper space counter allow a choice of single, double or triple spacing of the paper. (See the copending applications referred to at the beginning of this specification for details of the paper feed structure.)

Figure 72B:
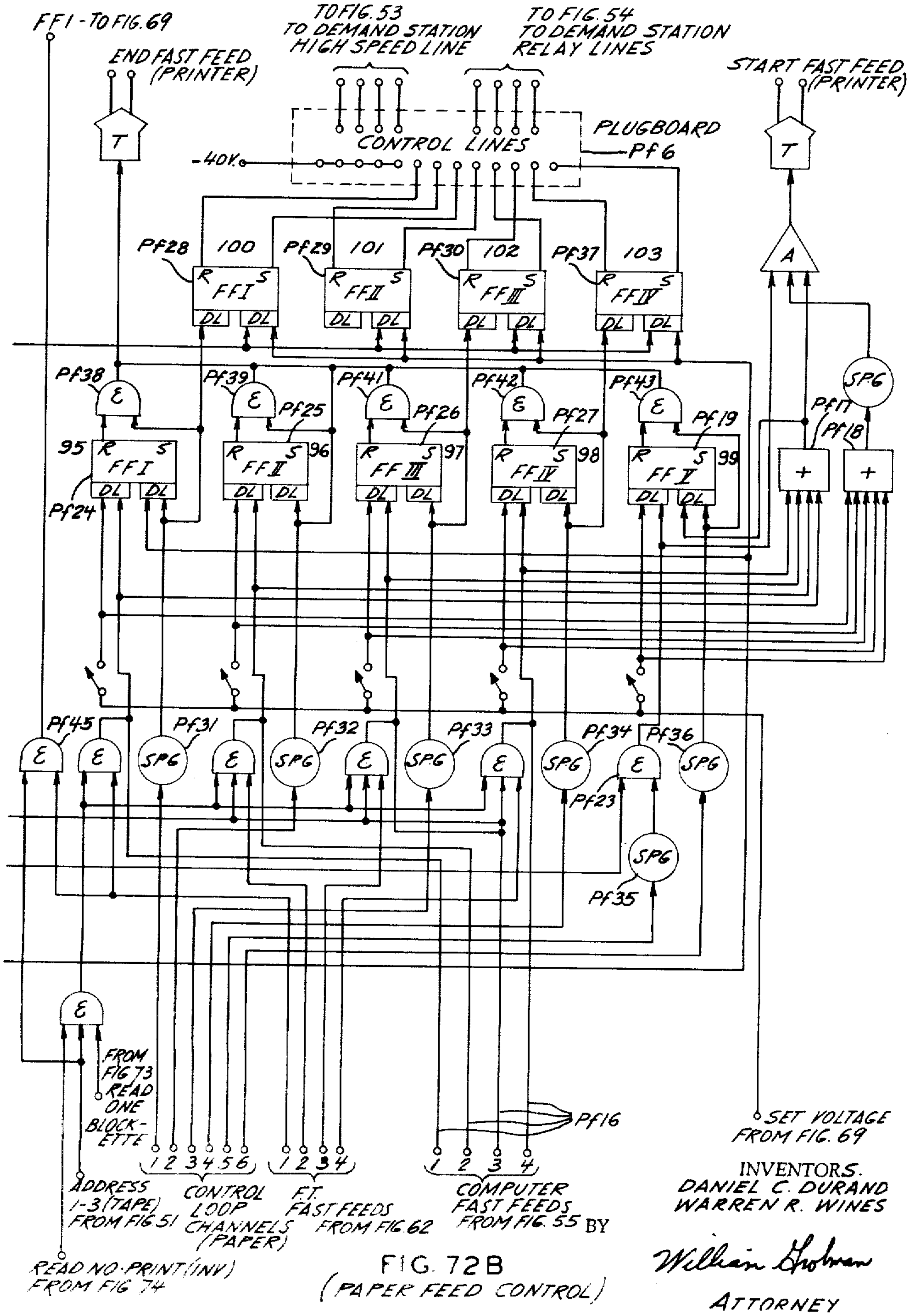

When the printer is operating with the tape handler, paper spacing is controlled by plugboard programming, a portion of the plugboard being illustratively shown at PF5 in Fig. 72A and PF6 in Fig. 72B. The selected spacing signal will probe enabled gate PF7 and provide the end paper feed signal to the printer.

If the printer is operating from the computer, although paper spacing can be controlled from the plugboard, the computer programming will usually determine the spacing required, and in case double or triple spacing is required, pulses on pulse lines DS112 or DS113 from the computer will probe gates DS143 or DS144 in Fig. 55. If the demand flip-flop DS4 of Fig. 51 has been set to the "1" state by a demand in from the computer, the output of gates DS143 or DS144 will set flip-flops PF8 or PF9 of Fig. 72A.

A pulse output from gate PF11 will stop the paper at double space or an output from gate PF12 will stop paper at the triple space position. Flip-flops PF8 or PF9 will be restored at this time. If neither flip-flop has been set, then gate PF13 will be enabled, and a pulse output from that gate will stop the paper at the single space position. The end paper feed signal is routed to the printer via transformer PF14. In the printer it will reset the paper feed flip-flop which will fire a thyratron, which energizes the brake in the rotating magnetic clutch and brake assembly. This will stop the paper movement. The end paper feed signal from amplifier PF15 will also set the 10 millisecond delay flop PR57 of Fig. 69 to its unstable condition. Ten milliseconds later the delay flop will return to its stable state, and the leading edge of its output will set flip-flop 58 to the "1" state and reset the paper spacing counter. This will enable gate PRC82 of Fig. 64. The purpose of the 10 millisecond delay flop PR57 is to allow time for the paper to stop moving and settle down before the print cycle begins. The time from the start paper feed signal, until the end paper feed signal, is approximately 8 milliseconds.

The fast feed circuitry of Fig. 72B is alerted from one of three sources:

(1) A fast feed signal from the function table, Fig. 60, during tape operation.

(2) A fast feed signal from the computer.

(3) A fast feed signal from channel 5 of the paper control loop. Paper feed is started by the start paper feed signal as described previously. However, the end paper feed signal is inhibited until a hole is sensed in the paper control loop, at which time the paper space circuitry resumes operation and an end paper feed signal occurs.

The paper loop contains seven channels; the first four channels are programmed to end fast feeds initiated by the four fast feed lines from the function table or the computer; the fifth channel is programmed to initiate a fast feed; the sixth channel is programmed to end a fast feed initiated by the fifth channel; the seventh channel is used to end the home paper instruction which was initiated by the home paper switch.

A pulse on one of the four computer or function table fast feed lines PF16 on Fig. 72B will pass "or" gates PF17 or PF18 and will set the fast feed flip-flop in the printer.

In addition, it will also set flip-flop PF19 to the "0" state if it had been previously set by a fast feed V. This allows the four electronic fast feeds to take precedence over fast feed V of the paper control loop.

The setting of the fast feed flip-flop in the printer will cause the start fast feed (inverted) line PF21 from the printer to go negative. This will prevent passage of the end paper feed signal.

The output of gate PF22 will inhibit gate PF23. The subsequent appearance of a channel V fast feed signal from the paper control loop will then be ignored. Thus, the first four fast feeds hold precedence over a subsequent channel V fast feed.

All fast feeds are stopped by the paper control loop. The sensing of a hole in any channel in which a fast feed has been initiated, will result in a pulse from single pulse generator PF31, PF32, PF33, PF34, PF35, or PF36 resetting that fast feed flip-flop PF24, PF25, PF26, PF27, PF19, PF28, PF29, PF30, or PF37 to the "0." The same pulse will probe the associated gate PF38, PF39, PF41, PF42, or PF43 and the output of the gate will be transmitted to the printer as an end fast feed signal. This resets the printer fast feed flip-flop, which removes the inhibition from gate PF44, and the next end paper feed signal will pass that gate and start the paper space counter to stop transport of paper.

During on-line operation channels I, II, III, and IV of the paper control loop may be used to indicate the position of a pre-printed form. For this purpose the outputs of the first four channels are used to set respectively flip-flops PF28, PF29, PF30, or PF37 of Fig. 72B. The outputs of these four flip-flops are connected through the plugboard PF6 to the demand station high speed lines or relay lines DS48, DS49 DS50, DS51, and DS145, DS146, DS147, DS148 shown on Figs. 53 and 54.

The output lines of the four flip-flops will be plugged to the demand station high speed lines so that the output of any of the four flip-flops will enable a corresponding gate DS44, DS45, DS46, or DS47 as shown on Fig. 53. The same output will pass "or" gate DS56 to enable gate DS64 in Fig. 51 and inhibit gate DS61. Setting the demand flip-flop DS4 will enable gates DS37 and DS38 if the printer is ready. A CMA–1 pulse, delayed 4 microseconds, will now probe gate DS37, and the output will probe the four high speed line DS44, DS45, DS46, and DS47 shown on Fig. 53. The outputs of these gates are sent to the computer to alert it for special operation. Next, a CMA–7 pulse will probe gate DS38 of Fig. 51, and the output will probe gate DS64, generating a special-out signal at terminals DS66 to the computer. This will start the special computer operation. If no high speed lines were alerted, gate DS61 will be enabled, and a demand out signal on terminals DS63 will start a normal computer operation. When the high speed printer is used with other equipment, the output lines of the four flip-flops PF28, PF29, PF30, and PF37 of Fig. 72B may be plugged to the demand station relay lines DS145, DS146, DS147, DS148 of Fig. 54 where one of four relays will be operated. Gates DS44, DS45, DS46, and DS47 of Fig. 53 will be inhibited by plugging them to —40 volts. When the demand flip-flop DS4 on Fig. 51 is set by the demand in pulse from the computer on terminals DS31, the output of this flip-flop will operate relay DS35, which will, in turn, apply the computer relay voltage to the four relay line contacts. Any of the four flip-flops which may have been set, will now operate their corresponding relays. They in turn will conduct the computer relay voltage back to the computer on their relay lines. The demand out signal in conjunction with these special lines will instruct the computer to do a special operation. The demand out signal alone will allow normal computer operation.

Prior to the loading of paper in the printer, the home paper switch (not shown) is thrown. This will set the printer paper feed and fast feed flip-flops. Gate PF44 of Fig. 72A will be inhibited by the fast feed (inv.) signal. The paper will now move until a hole in channel VII of the paper control loop is sensed. This will apply the signal to terminal PF21 to enable gate PF44. The paper space counter will now take over, and an end paper feed signal at transformer PF14 will be sent to the printer to reset the printer paper feed flip-flop which stops the movement of paper. The paper control loop is now aligned with the paper feed tractors, so that the head of the pre-printed form may be lined up with the index line on the back plate of the printer. This will bring the programmed paper control loop into coordination with the format of the pre-printed form.

If the read no print, and either the read forward or read backward switches of Figs. 73 and 74 are thrown, gate PR34 of Fig. 69 is enabled and gate PR36 is inhibited. The appearance of a fast feed I symbol at the function table Fig. 60 will generate a pulse which will pass gate PR34 and gate PF45 of Fig. 72B. It will set flip-flop PR38 of Fig. 69, the prevent print flip-flop, to the "1" state. Thus, with the two switches set the printer will follow a read no print operation until such time as a fast feed I symbol appears at the beginning of a blockette. At that time the operation will resemble a read one blockette cycle, and at the end of the read-in of this blockette, the printer will stop.

The fast feed I symbol is programmed into a tape as a signal to indicate the beginning of a particular sequence of blockettes and, under the conditions just described, the printer will search for this fast feed I symbol and stop when it has found the blockette containing it.

Breakpoint is a conditional stop function which is used only on tape operation. The breakpoint symbol will be recognized by the function table, Fig. 60, and will enable gate FT19. An SP–2 will probe gate FT29, and the pulse output will probe gate PR59 of Fig. 69. If the breakpoint switch has been thrown, this gate will be enabled and will pass the pulse to set the prevent print flip-flop PR38 to the "1" state. The machine will then stop at the end of the read cycle. If the breakpoint switch has not been thrown, gate PR59 will be inhibited, and the breakpoint symbol will be ignored by the machine.

The stop symbol will enable gate FT18 on Fig. 60, and the output will probe gate PR61 on Fig. 69. The output will set the prevent print flip-flop PR38 to the "1" state, and the machine will stop at the end of the read cycle.

*Simplified overall operation (Fig. 75)*

Before considering the overall operation of the printer of this invention, it must be clearly understood that this device has been arranged for operation (1) under the control of a computer and (2) controlling another type of intermediate storage device such as a magnetic tape unit. This means, that when the printer is operating on-line, it is a "slave" to the computer and all orders, instructions, and such originate in the computer itself. However, when the printer is operating off-line, then it, in effect, controls the unit from which it is receiving its information. One simple illustration of the manner in which this basic premise operates in the system is in the matter of signal pulses. CP pulses are those clock pulses which are generated by the 90 kc. clock in the printer. The CPs are transmitted to the tape unit where they perform functions and generate subsequent timing pulses in response thereto. Thus, the timing of the tape unit is under the control of the printer. However, when the printer is operating on-line, the timing pulses which initiate operations are CMA pulses and are generated by the computer and fed to the printer to control the operation thereof. In other respects also, the printer receives instructions, such as those which control the format, from the computer, but when operating off-line, the format is controlled by plugboard arrangements in the printer and also under the control of the tape.

In addition to the problems presented by the control of the printer when operating off-line or on-line the arrangement of information is different on tape from that in a computer. On tape, the seven bits which comprise a single character are arranged in parallel form and are fed simultaneously into the printer with the highest order character coming first and the character having the least significance being last. Information in the computer, however, is arranged in serial form with the seven bits of any one character following each other in time, and with the characters themselves arranged such that the least significant character appears first at the printer and subsequent characters are transferred into the printer with the most significant character being last. This means, that the input register of the printer must be able to receive characters in parallel arrangement from the tape and also in serial form from the computer. Further, since the order in which the information is transferred into the printer varies with the type of device feeding that information to it, the addressing of the information as it is received in the computer must be able to operate in either direction so as to assign the most significant character to the most significant address position in the buffer memory regardless of the order in which that information is being transmitted into the printer. From these characteristics of the transmission of information into the printer and the differences in the manner of control of the printer and of the information supplying device, different modes of operation, especially on read-in, are followed by the printer with the different types of information suppliers to which it may be connected.

Referring to Fig. 75, which is, in effect, a flow chart of the operation followed by the printer in a complete major print cycle, the first operation performed is the start of the read-in cycle.

Considering first read-in from tape, the first step is the clearing of the tape and printer unit by the closing of the general clear switch illustrated in Fig. 74. The general clear switch is a manual switch located on a control panel of the printer unit cabinet and generates pulses by the operation of a relay to generally clear the flip-flops in the printer to the "0" condition. Fig. 74 lists those figures to which the general clear signal is applied, and reference to the appropriate figures listed therein will disclose the general clear input terminals of the particular component illustrated therein. After the equipment has been cleared and is ready for operation, the initial start switch, another manual switch on the printer unit cabinet control panel, is closed to generate a single initial pulse as illustrated in Fig. 62. The initial start signal is applied to the initial start input terminal of Fig. 63 to set the 2.3 millisecond delay flop for charging the start condensers in the print unit. Also, the initial start pulse applied to Fig. 64, passes "or" gate PRC83 to set flip-flop PRC73 to the "1" state and eventually generate a signal which sets the ready flip-flop. The initial start signal also sets the address storage input control flip-flop AS26 in Fig. 66 to the "0" condition and is applied to input terminal TC1 of Fig. 49 to set flip-flop TC2 to the "1" state, enabling gate TC4 to allow a 22.5 kc. pulse from the clock entering at input terminal TC5 to pass gate TC4 and generate the test-in pulse at transformer TC8. If the tape unit is in condition to start reading, it returns a ready signal to the printer. The ready signal is applied to input terminals TC9 of Fig. 49, and, after a 4 microsecond delay, passes gate TC11 to generate a demand-in signal at output transformer TC13. The demand-in signal applied to the tape unit results in a demand-out signal from the tape unit if the tape unit is ready to read information. The demand-out pulse then enters transformer TC14 of Fig. 49 and passes through an amplifier to become a control signal to the tape unit to start moving tape. Since the ready signal indicates that the tape unit is ready to read tape, once it starts reading tape it then returns not ready signals which will continue to be returned to the printer until the tape unit is again ready to read tape. The not ready signals are applied from the tape handler to transformer TC22 of Fig. 49 and set flip-flop TC23 to the "1" state. When flip-flop TC23 is in the "1" state, it continues to enable gate TC4 to allow the generation of test-in pulses from transformer TC8, and, when the tape handler returns a ready signal after a previous not-ready condition, it is applied at time CP1 to input terminals TC9, passing through transformer TC10 and a 4 microsecond delay to the enabled gate TC24 to set flip-flop TC25 to the "1" state. A transfer data pulse was generated by the clock, as illustrated in Fig. 50, and appeared on the output terminal TC94 of that figure; it was applied to the input terminal PRC1 of Fig. 64 and served to set flip-flop PRC75 to the "1" state, applying a signal to the "1" input of flip-flop PRC77 to generate a transfer data signal at output terminal PRC8. The transfer data signal was applied at the input terminal TC27 of Fig. 49, passing through gate TC26 to set the read-in flip-flop TC28 to the "1" state and generating an enable read-in signal at output terminal TC29. At the same time, the "1" output of flip-flop TC28 is applied to the gate TC47 to generate enable CP1 and CP2 signals and through TC55 to generate a CP3 printer signal at output terminal TC57. The transfer data signal applied at input terminal TC27 performs numerous functions as were explained earlier in the detailed description of Fig. 49. At this time, it suffices to say that the enable read-in signals operate to cause the transfer of information from the tape buffer memory to the data input register of the printer. Since the output from the tape unit comprises a plurality of bits in parallel disposition in time, all of the input signals from tape are applied to input terminals DR1–0 through DR1–6 of Fig. 32 to set the appropriate flip-flops DR6–0 through DR6–6. At the proper time, an SP1 pulse is applied to input terminal DR7 to transfer the information contained in the register to the buffer information register through output terminals DR31–0 through DR31–6. This information is applied through input terminal BR3–0 through BR3–6 of the buffer information register as illustrated in Figs. 33A and B. The transfer operations were explained above in the detailed description of Figs. 33A and B and Fig. 32.

Prior to the transfer of information into the data input register, the address register X and Y were cleared. When the inhibit signal is present, information is transferred from the buffer information register into the buffer memory. At the time that the information is transferred into the buffer memory initially, it is simultaneously applied to the odd-even checker and to the function table. In the function table, the information is analyzed for special characters which are not printable, but which serve as instructions. The non-printable character can appear during the first four addresses, and it is at this time that #4 address signals are generated by the special address gates shown in Fig. 58. The #4 address is applied to input terminal TC97 of Fig. 7 and serves to set the address flip-flop TC83 to the "1" state, removing an enable from an "and" gate. The flip-flop is set to the "0" condition by the general clear signal, and, so long as address #4 does not appear, the tape signal may pass through the enabled gate. The occurrence of address #4 sets the class prevent print flip-flop to prevent the decoding of a subsequent class symbol from being effective. The function table in Fig. 60 decodes the characters as they are transferred from the buffer information register into the buffer memory, and upon the decoding of a special character, applies the special character decoded signals from Fig. 50 to the "or" gates FT54, FT55, and FT56 of Fig. 62 to set flip-flop FT57 so as to generate a special character signal at output terminal FT58. This special character signal is applied to input terminal BR17 of Fig. 33B, passing through gate BR12–1 or BR12–2 to generate an ignore in the buffer information register in lieu of a special character which had been stored therein. Since this is a description of a normal operation, the special functions such as class prevent print, breakpoint, stop, any of the fast feed signals, multiline printing, or any other special instruction will not be considered. These special operations which are used primarily for format control have been explained in detail in the descriptive text above and their description will not be repeated at this time.

When the information is transferred from the buffer information register into the core memory, the data input register is cleared. The buffer memory read-write control is contained in two flip-flops, a read flip-flop BC1 and a write flip-flop BC2 as illustrated in Fig. 39. The character pulse occurring at time SP3 is applied to input terminals BC10 and performs a multitude of functions in serial fashion. Firstly, the character pulse sets read flip-flop BC1 to the "1" condition driving the read windings of the core memory to read out any information contained therein and thus clear the memory. Secondly, after a 4 microsecond delay, this same character pulse restores the read flip-flop BC1 to the "0" state. Thirdly, after a further delay of .6 microsecond, the character pulse sets the write flip-flop BC2 to the "1" condition, energizing the inhibit output terminal BC9 which applies the inhibit signal to the inhibit line in the buffer information register to transfer information therefrom and driving the X and Y write windings in the buffer memory. Fourthly, after further delay of 4 microseconds, the character pulse restores the write flip-flop BC2 to the "0" state and, fifthly, a further short delay of .6 microsecond is utilized before the character pulse reaches output terminal BC27 to be applied to the X address register at input terminal XR14 to step that register.

As was mentioned before, the X register is stepped through to its capacity at which time it generates an end carry signal which restores the X register to its initial state and is applied to the Y register to step that register. Further character pulses applied to input terminal XR14 step the X register again through capacity to again generate the end carry signals. The outputs of the X and Y registers operate to energize the diverters which provide a return path for the selected memory addresses into which information will be written from the buffer information register and from which information will be read. The above operation continues until the entire blockette of information, which comprises 120 characters, has been transferred from the tape unit to the buffer memory.

The operation from the computer follows a different pattern, since, rather than the computer being under the control of the printer as was the tape unit, the printer is now under the control of the computer. For reading information from a tape unit, the tape unit control circuits illustrated in Figs. 49, 50, and 70 are utilized. But, since operation from a computer is under control of the computer rather than of the printer, the tape control circuits are not suitable and the demand station circuits illustrated in Figs. 51, 52, 53, 54, and 55 are used. In addition to receiving information to be printed from the computer, the printer also receives format instructions over special instruction lines from the computer.

For initiation of a print operation when operating online, the tape-computer switch shown in Fig. 74 is set to the computer position and the entire system is generally cleared by means of the computer general clear. General clearing the printer unit restores flip-flop DS2 of Fig. 51 and flip-flop DS7 of Fig. 52 to the "0" condition. Gate DS9 of Fig. 52 is enabled by flip-flop DS7 as is gate DS10. Test-in pulses from the computer then restore the resynch flip-flop DS3 of Fig. 51 to the "0" state. Since the normal test switch in the computer is closed, relay DS19 is closed and the output of flip-flop DS3 is applied to gates DS23 and DS24 to enable them. When a CMA7 pulse, which is a timing pulse from the computer is applied to input terminals DS25, it passes therethrough and through gate DS23, which is also enabled by the output from flip-flop DS2, to generate the ready signal at output terminals DS27, and to restore flip-flop DS3 to the "0" condition. The computer then returns a demand-in pulse in response to the ready signal from the printer and applies this pulse to input terminals DS31, through transformer DS32, to set flip-flop DS4 and flip-flop DS5 to the "1" state. A subsequent CMA1 pulse from the computer passes through gate DS37, which is enabled by the set flip-flops, to generate a signal which probes the computer high speed line gates DS44–DS47 of Fig. 53, through which special instructions are transmitted from the computer to the printer. If any of these gates is open, a special pulse signal will be sent to the computer to condition it for special operation. Subsequent CMA7 pulses probe gates DS61 and DS64 of Fig. 51. If the equipment is to perform a special operation, gate DS64 is opened to generate the special out signal at terminals DS66 for transmission to the computer. If no special operation is to be performed, gate DS61 is opened and a demand-out pulse is generated at terminals DS63 for application to the computer. In either case, a start print signal is returned from the computer to the printer and is applied to input terminal DS81 to restore flip-flop DS2 to the "0" condition, placing the printer in the not ready state in which it remains until the printing operation is completed. This acts as an interlock to prevent the possibility of a new ready signal occurring while the printer is in use.

In some cases it is desirable to read information from the output registers of a computer and rewrite that information into the same register if the read out was destructive or into another register if further use is to be made of the information. Information read from the computer output register may be recalled by the application of read probe pulses to input terminals DS84 of Fig. 52. These pulses open gates DS86–DS89 and gates DS121–DS124 to allow information being received from the computer on input terminals DS11 to be reapplied to the computer through output terminals DS91 and DS92 and terminals DS125 and DS126. As explained earlier, if the computer supplying the printer uses two output registers alternately, provision is made for the switching of these registers at the appropriate times by means of gates DS9, DS10, DS76, and DS77 and the switch track signals applied to terminals DS71. Such a switching operation is often necessary when the output register of the computer is large enough to hold only one blockette of information. Then, when one register is unloading into the printer, another computer output register is being loaded by the computer. When these operations are completed, the registers are switched so that the unloaded register is fed from the computer and the newly filled register serves the printer.

The start print pulse from gate DS103 of Fig. 55 is applied to input terminal PRC3 of Fig. 64 to set flip-flop PRC83 to the "1" state. Flip-flop PRC77 had been set to the "1" state by the master general clear, and gate PRC69 generates the transfer signal at terminal PRC9, for application to input terminal IC4 of Fig. 56A. The start print pulse also sets flip-flop DS7 of Fig. 52 to the "1" state and restores flip-flops PF28, PF29, PF30, and PF37 to the "0" condition if they had been previously set to the "1" state. Gate IC6 of Fig. 56A is enabled by the transfer data signal applied to terminal IC4, and a subsequent blockette pulse passes therethrough to set flip-flops IC12 and IC18 (Fig. 56B) to the "1" state. A subsequent CMA1 pulse applied to input terminals IC14 restores flip-flop IC12 to the "0" state and passes through gate IC29 to clear the buffer memory, clear the data input register, start paper feed, and restore flip-flop PRC77 to the "0" condition to remove the transfer data signal. The printer then receives the serially arranged data from the computer output register at input terminals DR13 and DR14 of Fig. 32. The serial pulses are stepped along the shift register of Fig. 32 until a character has been fed into the data input register.

The transfer of the information out of the data input register and into the buffer information register occurs as explained above. However, since information comes from the computer low order first and from tape high order first, the X and Y address registers are cleared to different initial conditions, as explained in the detailed description of these circuits, for each of these feeding units, and the address counters count in one direction when operating from tape and in the opposite direction when operating from the computer. In this manner, regardless of how the information is fed into the printer, the circuits described herein may be arranged for proper operation.

From the above, it can be seen that the terms "tape unit" and "computer" are used figuratively to describe two different input devices with which this printer may operate. Considering the operation of the printer to the point where the information has been read into the buffer memory as described immediately above, it can already be seen that the controls of this printer are versatile. The printer may be used with devices which must control the printer and may be used with devices which must be controlled by the printer; the printer may be used with devices in which information is stored in serial form or it may be used with devices in which information is stored in parallel disposition in time; the printer may be used with devices in which information is contained high order first or it may be used with devices which utilize information low order first; or the printer may be used with a device having any combination of these characteristics. This may be accomplished by changing the wiring of the manual switches and of the input wiring so that the appropriate units respond to the proper stimuli, as is within the skill of those versed in this art.

On the initial read-in, when a character is entered into the buffer information register from the data input register, it is also applied to the function table for decoding into a special instruction if it is a non-printable character and to the odd-even checker for error checking. If a special character is decoded by the function table, the special character is replaced in the buffer information register by an ignore before the character is transferred into the buffer memory. If the odd-even checker detects an error, or if the 120 check at the end of the read-in detects an error, the printing of the blockette in the buffer memory is suppressed, and the same information is again read-in to the printer. If, on the second read-in, no errors are detected, then the cycle proceeds normally.

At the end of the read-in, the zero suppress cycle is initiated. Since the high speed printer of this invention is for scientific and business use, a substantial amount of the information printed thereby will be numeric, and the use of the zero suppress operation is important. The detection of the zero to be suppressed does not take place at the same time as the detection of the special characters, but occurs during a separate zero suppress cycle. After the buffer memory is filled and if no errors have been detected, the information stored in the buffer memory is again transferred, character-by-character, into the buffer information register for presentation to the function table a second time for zero detection.

Since the subsequent operation of the printer is primarily accomplished by the transmission of address information rather than of coded character pulses, the proper location of information in the buffer memory is important. As was explained above in connection with the transfer of information into the buffer memory, information comes from some feeding devices high order first and from other devices low order first. To accommodate both types of equipment, the X and Y address counters have been designed to count in either direction upon proper stimulation. In Fig. 40A, the right shift enable signal enables gates XR6 and XR18 to allow the step address register pulses applied to input terminal XR14 to step the register to the right. The left shift enable pulses applied to the X address register enable gates XR5, XR13, and XR19 so that the step address register pulses applied to input terminal XR14 step the address register to the left rather than to the right. The right shift enable signal is present when the printer is operating off-line and the left shift enable signal is present when the printer is operating on-line. Similar conditions prevail in the Y register as was described in the detailed description of the registers. In this manner, the address registers store information in the proper sequential addresses in the buffer memory regardless of the order in which the information is presented.

That the order in which the information is stored is important becomes evident with the understanding of a minor cycle. When information is read out of the buffer memory for presentation to the buffer information register, one character consisting of seven pulse positions is read out at one time. The particular character read out is determined by the settings of the X and Y address registers which enable the corresponding diverters, establishing a complete path for only those cores whose diverters are so enabled. This operation was described in detail in the description of Fig. 28, where the diverter 527 established or broke the path through the winding 524. During a read-in to the buffer memory, the information coming out of the memory cores as a result of the reading in of information is blocked from the buffer information register, but during a read-out operation, when information is read from the buffer memory, the pulse outputs from the cores are applied to input terminals BR3–0 through BR3–6 of Figs. 33A and B to set the proper flip-flops BR1–0 through BR1–6.

The zero suppress cycle is initiated by the setting of flip-flop FT61 to the "1" state at the end of a successful read-in from tape or computer by the application of an end computer read-in pulse generated at terminal IC68 of Fig. 57 or by the end tape read-in pulse from terminal TC81 of Fig. 49. This allows a ZS2 pulse to set flip-flop FT65 to the "1" condition so that a subsequent ZS2 pulse may pass gate FT66 to clear the address registers and restore flip-flop FT61 to the "0" condition. When flip-flop FT61 is restored, gate FT72 is enabled and the signals for initiating the zero suppress operations appear on terminals FT73, FT74, and FT75.

The X and Y address registers are set to X1, Y1 and the buffer information register is cleared by a character pulse which is generated by a ZS1 pulse passing gate IC91 of Fig. 56B, and, after clearing, the first character is read out of the buffer cores into the buffer information register under the control of the circuitry shown in Fig. 39 where the character pulse enters at terminal BC10. Setting the address cores generates a negative output pulse which is fed through the plugboard to the zero suppress circuitry. The output of the cores which are connected, through proper plugboard connections, to begin a zero field will set flip-flop FT100 as shown in Fig. 62. The "1" output of flip-flop FT100 probes the function table for zeros, and as long as the flip-flop is in the "1" state, zeros appearing at the function table will be replaced by ignores, as explained earlier. When cores which are connected through the end zero field hubs of the plugboard are set, the output pulses developed thereby restore flip-flop FT100 to the "0" condition, removing the function table probe. No more zeros will be replaced by ignores until the flip-flop is again set. The end of the zero suppress cycle is signaled when address 120 is reached.

After the zero suppress cycle, the printer enters the first of the 52 minor cycles into which a major print cycle is divided. The first of the minor cycles sets the address check cores as the addressed characters are read from the buffer memory into the buffer information register. The remaining 51 minor print cycles are identical, and compare each character in the buffer memory individually with the code representation of the character next approaching printing position on the type wheel to cause printing of that character at the proper paper position. If a direct match between the two character representations is found, the address of the buffer memory position of that character is transferred to the print cores, and, at the end of each minor cycle, the character then in printing position is printed at the addresses stored in the print cores. This process is repeated until all of the characters in the buffer memory have been compared with the 51 characters on the type wheel. As each character is printed, the corresponding check core is cleared, and when the major cycle ends, the check cores should all be cleared. If any is not, a printer error is generated. The addresses at which information is printed on a line need not be the same address as that at which it is stored in the buffer memory, but, by connecting the buffer memory address hubs of the plugboard to print core address hubs, the character stored in any address in the memory may be printed on any of 130 addresses in a line. In fact, any character may be printed in a plurality of positions on a line by multiple plugging, where the memory address hub is connected to several print core hubs.

To present some idea of the times involved, if the print wheel rotates at approximately 700–750 r.p.m. and each revolution of the wheel represents 51 minor cycles, each minor cycle may occupy approximately 1600 microseconds. In terms of the electronic timing, each minor cycle is long. As a character on the print wheel approaches printing position, its code representation, recorded magnetically on a magnetic drum rigidly connected to and driven with the print wheel, is read and the electrical pulses are fed into the code generator register illustrated in Fig. 35. Since the code representations are recorded correctly and are not changed, the seventh or parity position is not used on the code drum, and only six reading heads and six flip-flops are required for storing the information.

The "1" output of flip-flop PRC27 generates a read out enable signal for the buffer to permit the reading out of the characters from the buffer memory to the buffer information register. Clock pulses are applied to terminal PRC35, and, by sequentially enabling gates by the setting of corresponding flip-flops, a read-out character pulse is generated at terminal PRC19. After delays of 8 microseconds, the read-out character pulses become clock pulses which are applied to input terminal AS16 of Fig. 66. The output from terminal AS21 of Fig. 66 is applied to the address storage cores to set them. At the same time that the address cores are set, the comparison counter of Fig. 65 is advanced by the application to terminal CC2 of a pulse from output therminal AS15 of Fig. 66. After all of the characters stored in the buffer memory have been checked, address 120 from Fig. 58 enables gate PRC39 of Fig. 63 to allow a clock pulse to set flip-flop PRC41. As a result, flip-flop PRC32 is restored, the enable signal is removed from gate PRC37, and no further clock or character pulses will pass. A subsequent timing pulse passes gates PRC46 and PRC48 to become a signal at terminal PRC49 which is applied to input terminal CC11 of Fig. 65 to invert the comparison counter. The output of gate PRC46 is also applied to the core driver-pulse shaper PRC52 to generate output pulses which are applied through output terminal PRC17 to input terminals AS5-1, AS5-2, AS5-3, and AS5-4 for clearing the address cores and transferring the information contained therein to the check and print cores.

The output from the address storage cores is connected through the plugboard to the input terminals represented by PC2 and PC3 of Fig. 47 and PC22 and PC23 of Fig. 48. As explained in connection with Fig. 29, during the transfer of information from the address storage cores to the check and print cores, the print cores are inhibited, and only the check cores are set. Thus, at the end of the first minor cycle, the check cores are set with information representing the printing address of each addressed character to be printed, and the comparison counter contains the complement of the number of the characters to be printed.

The print and comparison minor cycles are initiated by the appearance of a code wheel character at the code generator register of Fig. 35. When character pulses appear on the input terminals CO2-0 through CO2-5, a pulse is applied to output terminals CO24 as the code generator character pulse, and is transferred to input terminal PRC24 of Fig. 63. Passage of the pulse through gate PRC25 sets flip-flops PRC27 and PRC26 to enable gates PRC34 and PRC33. Subsequent clock pulses applied to terminal PRC 35 pass through gate PRC33 to set flip-flop PRC31. By a sequence of such operations, a read-out pulse is applied to output terminal PRC19, and, after subsequent delays, clock pulses appear at output terminal PRC38 for application to input terminal AS16 of Fig. 66. These clock pulses pass gates AS35 or AS36 to set the appropriate address cores, and applied to output terminal AS15 for stepping the comparison counter. In addition to the clock pulses on terminal AS16, gate AS36 also requires the presence of the comparison signal from output terminal CO21 of Fig. 35 to open and allow the core set and comparison counter step pulses to pass. The comparison signal is generated by gate CO21 whenever there is a one-for-one comparison between the code representation of the character in the code generator register comprising flip-flops CO5-0 through CO5-5 and the contents of the buffer information register. The outputs of the buffer information register are applied to input terminals CO1-0 through CO1-5 of the comparator, and the outputs of the code generator register are applied directly to the comparator as shown in Fig. 35. When there is a match, the comparator signals this by the application of a signal on the output from gate CO21. The resulting signal sets the address cores indicated by the X and Y address counters and steps the comparison counter. Since the comparison counter was inverted after having been filled during the first minor cycle, at the end of all of the subsequent minor cycles it should be completely filled. If it is not, then an error is indicated. After a comparison between the characters stored in the buffer memory and the character stored in the code generator register which represents the type face approaching printing position, all of the address cores which represent the locations of the positions at which that type face is to be printed have been set. Address 120, generated in Fig. 58, is applied to input terminal PRC12 of Fig. 63 to set flip-flop PRC41, resulting in: the restoring of flip-flop PRC32 to prevent the further passage of character and clock pulses, the application of a clear code generator register signal at terminal PRC23, and the generation of a transfer address storage signal at output terminal PRC17. The transfer address storage signal is applied to input terminal AS5-1 through AS5-4 of Fig. 42 to clear the address cores and to transfer the information contained therein to the check and print cores. The outputs from the address cores are connected to the plugboard, and the information from the address cores may thereby be transferred to any arrangement of print and check cores desired.

The information from the address cores passes through the plugboard connections and into input terminals PC2, PC3 of Fig. 47 and PC22, PC23 of Fig. 48. Since the check cores had been set during the first minor cycle, they are not effected during the comparison and print cycles, and the information from the address storage affects only the print cores. Also connected to the type wheel is a second magnetic drum which has timing spots recorded thereon. The reading head for these spots is so positioned that when the type face is in position for printing, a pulse is generated in the code wheel index head and is applied to Fig. 63 to set flip-flop PRC43. As a result, output signals are applied to the core driver and pulse shaper circuits PRC53 and PRC54 to send pulses to the print cores of Figs. 47 and 48 to clear them. Since there are two sets of type faces on the type wheel, each set being displaced slightly from the other in staggered arrangement, there are two sets of address cores and two sets of signals from terminals PRC18 and PRC19 at slightly differing times. For convenience, these two different sets of devices are called "odd" and "even." When the print cores are cleared, the information that each contained is transmitted over its individual output line to the print thyratrons to fire them. Firing the print thyratrons energizes the actuator windings of the individual print hammers in the printer unit and the corresponding type face is imprinted on the paper.

The above procedure is repeated by the apparatus 51 times in a major print cycle, once for each type character as it comes into printing position. When a signal is applied to the core drivers and pulse shapers PRC53 and PRC54, a pulse is also applied to output terminal PRC57 for application to the print index counter of Fig. 67. The print index counter thus maintains count of the number of print cycles which have been completed, and at the end of the fifty-first, generates signals on output terminals P13 and P15. The 51 count from the print index counter applied to input terminals PRC58 and PRC59 of Fig. 63 will restore flip-flops PRC47 and PRC43 to the "0" condition. The "0" condition of flip-flop PRC47 lowers the voltage applied to the print thyratrons to prevent any subsequent firing, and the 51 count applied to terminal PRC58 passes through the core driver and pulse shaper circuits PRC55 to generate a check core probe pulse. The check cores of Figs. 47 and 48 were individually cleared by the firing of the respective print thyratron by the application of the thyratron current pulse to input terminals PC5, PC6, PC25, and PC26. When the check core probe pulse is applied to terminals PC7 and PC27 of Figs. 47 and 48 from output terminal PRC22 of Fig. 63, no check core should remain set. But, if the probe pulse does find a set check core, and clears it generating an output signal, that output signal will appear at output terminals PC8, PC9, PC28, or PC29 to indicate an error. The error indicated is that all of the addressed characters checked during the first minor cycle have not been printed. If no error appears in the probing of the check cores, special check cores generate a signal which is applied to input terminals PRC15 of Fig. 63 to generate the next read start signal for the initiation of the next read-in operation and the above described steps are repeated until all of the information has been printed.

This specification has described a new and improved electronically controlled high speed printer system which is suitable for use with electronic and mechanical scientific and business machines. The above description has included broad overall description of the system, a detailed description of the basic electronic circuits used in a typical system according to the invention, a logical description of the individual major components of such a printer system incorporating the principles of this invention, and a description of a typical operating cycle of such a system, pointing out how the individual components cooperate to achieve the final printed results. A particular printer system has been described herein to illustrate the principles of this invention, but as has been mentioned repeatedly throughout this specification, the specific machine described herein is for illustrative purposes only. It has been pointed out above how the versatile arrangements of the controls for such a printer system enable the operation of a printer according to this invention with many different types of input equipment. In this respect, it should be borne in mind that the device to which this printing system is an adjunct may be capable of controlling the printer or may be capable of being controlled by the printer, may be utilizing information in serial or in parallel form, may transmit information in either ascending order or in descending order, may require printed material in single, double or triple spaced copy or in any combination of these spacings, may require printing in close linear form or at widely spaced positions, may require that the same information be printed only once or repeatedly, or other such variations in control, information representations, or format as have been earlier described. A printing system according to the principles of this invention is a highly versatile system, and, although a specific example of such a system has been clearly and completely described herein, it is possible that the above description will suggest to those skilled in the art other forms in which the principles of this invention may be applied. It is, therefore, intended that this invention be limited only by the scope of the appended claims.

What is claimed is:

1. An electronically controlled high speed printing system comprising a printer unit and a control unit, first means in said control unit for receiving information in the form of groups of electrical impulses, said first means being so arranged in serial and in parallel form, second means in said control unit for storing a plurality of groups of impulses representative of items of information, third means for transmitting information received by said first means to said second means in individual groups of electrical impulses each arranged to represent one alphabetic numeric or symbolic character to be printed, fourth means in said printer unit for recording characters upon a record receiving medium, fifth means for generating groups of electrical impulses representative of each character in said fourth means, sixth means for individually comparing the groups of electrical impulses generated by said fifth means for each print position of said fourth means with the groups of electrical impulses stored in said second means, and seventh means responsive to the coincident application of identical groups of impulses to said sixth means for initiating the imprinting by said fourth means of the character represented thereby.

2. An electronically controlled high speed printing system comprising a printer unit and a control unit, the printer unit comprising first means for carrying type faces of the characters to be printed, mechanisms located at a printing station for causing the recording of type faces positioned at said printing station onto a record receiver, said type faces being sequentially moved into and out of printing position at said printing station, second means connected with said first means for movement therewith having means for generating groups of electrical impulses representative of the characters approaching printing position, and third means connected with said first means for generating electrical signals when each of said groups of type faces reaches printing position; said control unit comprising fourth means for receiving information to be printed in the form of groups of electrical impulses simultaneously in parallel disposition in time and also sequentially arranged in serial disposition in time, fifth means for comparing information received by said fourth means with the groups of electrical impulses generated by said second means, and sixth means responsive to a coincidence of character representations in said fifth means for causing the type faces in printing position at said printing station to be recorded on a record receiving medium.

3. An electronically controlled high speed printing system comprising a printer unit and a control unit, said printer unit comprising first means containing a plurality of type faces of each character printed by the system, said characters being arranged for movement into and out of printing position, second means for generating electrical code representations of the character approaching printing position, and third means causing the imprinting of the characters of those type faces in printing position; said control unit comprising a first register means for receiving information to be printed, said information being in parallel form and also in serial form, second register means for receiving information from said first register means in parallel form only, a comparator, means for applying the contents of said second register and the representations generated by said second means to said comparator, and third means for controlling said third means in response to the results of a comparison.

4. An electronically controlled printing system comprising a first register for receiving information to be printed, which information is presented to said first register in either serial or parallel form, second means connected to said first means for storing a plurality of characters received by said first means, third means for controlling the location of the information stored in said second means, and fourth means for controlling the operation of said third means in either direction to maintain the correct order of information in said second means despite variations in the order said information is received by said first means.

5. An electronically controlled high speed printing system comprising a printer unit having a plurality of type faces for each character to be printed at a printing station, the plurality of type faces for each character moving into printing position at said printing station for a limited interval of time, means for sensing the character represented by the type face approaching printing position and for generating an electrical impulse code representation of that character, a control unit comprising means for receiving groups of electrical impulses representative of characters to be printed, and means for determining the coincidence of a character to be printed and the approach of the corresponding type face into printing position at said printing station for causing the imprinting of that character upon an appropriate record receiving medium.

6. An electronically controlled high speed printing system comprising a first means for receiving information to be printed, said information being in the form of groups of electrical impulses representative of individual characters to be printed, said groups being applied to said first means in parallel and also in series, a plurality of type faces of each character to be printed at a printing station, means for detecting when the type faces for a particular character approach printing position at said printing station, means for determining the coincidence of characters received by said first means to be printed and the approach of the corresponding type faces into printing position at said printing station, and means responsive to such determination for causing the imprinting of the characters upon the surface to be imprinted.

7. An electronically controlled high speed printer comprising an input register capable of receiving characters to be printed, said characters being in the form of groups of electrical impulses in which the impulses may be arranged in either parallel or serial form, a storage device for storing a plurality of groups of electrical impulses in addressed locations, intermediate register means for transferring information from said input register to said storage device and from said storage device in individual groups of electrical impulses, and means for controlling the addresses of the locations at which characters are stored in said storage device and in which order they are transferred from said storage device to said intermediate register.

8. An electronically controlled high speed printer comprising an input register, said input register being adapted to receive information to be printed, said information being in the form of a group of electrical impulses for each character, said impulses being arranged in either serial form or parallel form for application to said register, an intermediate register, said intermediate register receiving characters from said input register in the form of groups of electrical impulses in which said impulses are in parallel, said intermediate register transferring to said storage device those groups of impulses received from said input register, said intermediate register receiving characters in the form of electrical impulses arranged in parallel groups from said storage device, and addressing means connected to said storage device for determining the sequence in which said groups are stored in said storage device and in which said groups are transferred from said storage device to said intermediate register, said addressing means being so arranged as to exercise its addressing control in either of two directions depending upon the order in which information is applied to the input register.

9. An electronically controlled high speed printer comprising an input register for receiving characters to be printed and instructions, said characters and instructions being in the form of groups of electrical impulses, means for storing a plurality of impulse groups, an intermediate register for receiving impulse groups from said input register and applying them to said storage means and for receiving individual impulse groups from said storage means, and means for analyzing the individual impulse groups received from said storage means by said intermediate register for determining which groups represent instructions.

10. An electronically controlled high speed printer comprising an input register for receiving in the form of series or parallel arranged impulses in groups of impulses representative of individual characters to be printed and instructions, a storage device for storing a plurality of groups of electrical impulses, an intermediate register for transferring groups of impulses from said input register to said storage device and for receiving individual groups of impulses from said storage device means connected to said intermediate register for analyzing the group of impulses in said intermediate register, and means responsive to the determination of an instruction group in said intermediate register for substituting a special code group for the instruction group.

11. An electrically controlled high speed printer comprising an input register for receiving electrical impulses arranged in parallel disposition or in series disposition to form groups of impulses, each group of impulses representing a character to be printed, means for storing a plurality of impulse groups in addressed locations, addressing means for determining the location in the storage device of each impulse group, said addressing means being operative in either of two directions dependent upon the order in which information is supplied to said input register, and an intermediate register for receiving individual impulse groups and for transferring such groups to the addresses of said storage device determined by said addressing means.

12. An electronically controlled high speed printer comprising an input register for receiving electrical impulses arranged in parallel disposition or in serial disposition to form groups of impulses, each of which groups of impulses represents a character, means for storing a plurality of impulse groups in addressed locations, addressing means for determining the location in the storage device of each impulse group, said addressing means being operative in either of two directions dependent upon the order in which the characters are supplied to the input register, an intermediate register for receiving individual impulse groups and transferring such groups to the address of said storage device determined by said addressing means, analyzing means connected to said register to detect the presence of special characters, and means responsive to the detection of a special character to cause replacement of that character in the intermediate register with an impulse group representing ignore.

13. An electronically controlled high speed printer comprising an input register for receiving electrical impulses arranged in parallel disposition or in serial disposition to form groups of impulses, each group of impulses representing a character, means for storing a plurality of impulse groups in addressed locations, addressing means for determining the location in the storage device of each impulse group, said addressing means being operative in either of two directions dependent upon the order in which the characters are supplied to the input register, an intermediate register for receiving individual impulse groups and transferring such groups to the address specified by said addressing means, analyzing means connected to said register to detect the presence of special characters, and means responsive to the detection of a special character to cause replacement of that character in the intermediate register with an impulse group representing ignore, such replacement occurring prior to the transfer of the impulse group to the storage device.

14. An electronically controlled high speed printer comprising an input register for receiving electrical impulses arranged in parallel disposition or in serial disposition to form groups of impulses, each group of impulses representing a character, means for storing a plurality of impulse groups in addressed locations, addressing means for determining the location in the storage device of each impulse group, said addressing means being operative in either of two directions dependent upon the order in which the characters are supplied to the input register, an intermediate register for receiving individual impulse groups and transferring such groups to the address specified by said addressing means, analyzing means connected to said register to detect the presence of special characters, means responsive to the detection of a special character to cause replacement of that character in the intermediate register with an impulse group representing ignore, said replacement occurring prior to the transfer of the impulse group to the storage device, and means connected to said intermediate register for detecting the presence of an improper impulse group.

15. An electronically controlled high speed printer comprising an input register for receiving electrical impulses arranged in parallel disposition or in serial disposition to form groups of impulses, each group of impulses representing a character, means for storing a plurality of impulse groups in addressed locations, addressing means for determining the location in the storage device of each impulse group, said addressing means being operative in either of two directions dependent upon the order in which the characters are supplied to the input register, an intermediate register for receiving individual impulse groups and transferring such groups to the address specified by said addressing means, analyzing means connected to said register to detect the presence of special characters, means responsive to the detection of a special character to cause replacement of that character in the intermediate register with an impulse group representing ignore, said replacement occurring prior to the transfer of the impulse group to the storage device, and means connected to said intermediate register for detecting the presence of an improper impulse group, the detection of an improper impulse group resulting in the generation by said improper group detecting means of an error signal to prevent the further processing of the improper group.

16. An electronically controlled high speed printer comprising a print unit having type faces for each character to be printed, said type faces being arranged to sequentially move into and out of printing position, means for detecting the type face approaching printing position and for generating a group of electrical impulses representative of that type face, an input register for receiving characters to be printed, said character being in the form of groups of electrical impulses, a storage device for storing a plurality of impulse groups in addressed locations, addressing means for determining the location in which each impulse group is stored, said addressing means operating in either ascending or in descending order in dependence upon the order in which information is supplied to said input register, an intermediate register for receiving characters from said input register and transmitting them to their assigned addresses in said storage device and for receiving individual groups of impulses from said storage device, a comparator connected to said intermediate register and to said means for generating impulse groups representative of the type faces approaching printing position, said comparator generating a signal when it determines that the character approaching printing position is that character which is in the intermediate register, and means responsive to the signal generated by said comparator for causing the imprinting of the type face approaching printing position.

17. An electronically controlled high speed printer comprising a print unit having type faces for each character to be printed, said type faces being arranged to sequentially move into and out of printing position, means for detecting the type face approaching printing position and for generating a group of electrical impulses representative of that type face, an input register for receiving characters to be printed, said characters being in the form of groups of electrical impulses, a storage device for storing a plurality of impulse groups in addressed locations, addressing means for determining the location in which each impulse group is stored, said addressing means operating in either ascending or descending order in dependence upon the order in which information is supplied to said input register, an intermediate register for receiving characters from said input register and transmitting them to their assigned addresses in said storage device and for receiving individual groups of impulses from said storage device, a comparator connected to said intermediate register and to said means for generating impulse groups representative of the type faces approaching printing position, said comparator generating a signal when it determines that the character approaching printing position is that character which is in the intermediate register, means responsive to the signal generated by the comparator for causing transmission from the addressing means the address of the character in the intermediate register, and means for receiving the transmission from the addressing means.

18. An electronically controlled high speed printer comprising a print unit having type faces for each character to be printed, said type faces being arranged to be moved into and out of printing position in sequence, means for detecting which type face is approaching printing position and for generating a group of electrical impulses representative of the character on the type faces moving into printing position, an input register for receiving characters in the form of groups of electrical impulses, a storage device for storing a plurality of impulse groups in addressed locations, addressing means for determining the location at which each character is stored, said addressing means operating in either ascending or descending order in dependence upon the order in which information is supplied to the input register, an intermediate register for transferring information in individual character groups from said input register to their appropriate addresses in said storage device and for receiving individual characters from said storage device, a comparator connected to said intermediate register and to said means for generating impulse groups representative of the type face approaching printing position, said comparator generating a signal when it determines that the type face approaching printing position is that of the character in the intermediate register, first and second address storage banks, and means responsive to the signal generated by the comparator for causing the addressing means to transmit the address of the character in the storage register to said first and second address storage banks.

19. An electronically controlled high speed printer comprising a print unit having type faces for each character to be printed, said type faces being arranged to be moved into and out of printing position in sequence, means for detecting which type face is approaching printing position and for generating a group of electrical impulses representative of the character on the type face approaching printing position; a control unit comprising an input register for receiving characters in the form of groups of electrical impulses, a storage device for storing a plurality of groups of electrical impulses in addressed locations, addressing means for determining the locations at which each character will be stored in said storage device, an intermediate register for transmitting individual characters from said input register to said storage device and for receiving individual impulse groups from said storage device, a comparator connected to said intermediate storage register and said means for generating impulse groups representative of the type face approaching printing position, said comparator generating a signal when it determines that the character in the intermediate register is the same as the type face approaching printing position, first and second address storage banks, means responsive to the signal generated by the comparator for causing the addressing means to transmit the address of the character in the intermediate register to said first and second address storage banks, and means for inhibiting the storage of any addresses in said second address storage bank during the time that information is initially applied to said storage device.

20. An electronically controlled high speed printer comprising a print unit having type faces for each character to be printed, said type faces being arranged to be moved into and out of printing position in sequence, means for detecting which type face is approaching printing position and for generating a group of electrical impulses representative of the character on the type face approaching printing position; a control unit comprising a storage device for storing a plurality of groups of electrical impulses representing characters to be printed in addressed locations, a register for receiving individual groups of impulses from said storage device, addressing means for indicating the address in said storage device from which the impulse group in said register was taken, a comparator connected to said register and to said means for generating an impulse group representative of the type face approaching printing position, said comparator generating a signal when it determines that the impulse group in said register is the same as the impulse group generated by said generating means, a first address storage bank and a second address storage bank, means responsive to the signal generated by said comparator for transferring an indication of the address of the impulse group in the register from said addressing means to said first and second address storage banks, and means for inhibiting the storage of information in said second address storage bank during the period when information is first supplied to said storage device for storage therein.

21. An electronically controlled high speed printer comprising a printer unit having a plurality of type faces adapted to be moved into and out of printing position and means for generating a group of electrical impulses representative of the character on the type face approaching printing position; and a control unit comprising means for storing a plurality of electrical impulse groups in addressed locations, each group of electrical impulses representing a character to be printed, a register for receiving individual impulse groups from said storage means, a comparator connected to said register and to said generating means, said comparator transmitting a signal when the impulse groups applied to it from the register and the generating means are the same, and means responsive to the signal transmitted by said comparator for storing the address of the impulse group in the register at that time.

22. An electronically controlled high speed printer comprising a print unit having a plurality of type faces adapted to move into printing position for only a short period of time, and means for generating a group of electrical impulses representative of the type face character then approaching printing position; storage means for storing a plurality of electrical impulse groups representing individual characters to be printed, said impulse groups being stored in addressed locations, a register for receiving individual impulse groups from said storage means, addressing means for determining the address from which the impulse group in the register was taken, address storage banks, a plugboard connected at one side to the outputs from said addressing means and on the other side to the inputs to the address storage banks, a comparator for comparing the impulse group generated by the generating means and that in the register, said comparator transmitting an output when the two impulse groups are the same, means responsive to the output from said comparator for causing the transmission from the addressing means of the address of the impulse group in the register at that time, and means for connecting the outputs from the addressing means to the inputs of the address storage banks.

23. An electronically controlled high speed printer comprising a printer unit having a printing station, a plurality of type faces adapted for movement into and out of printing position at said printing station in sequence, means for moving a record receiver past the type faces at said printing station, said means being capable of intermittent movement in varying amounts, said moving means including a timing device for generating signals each time the record receiver moves a predetermined amount, and means for halting the movement of the record receiver upon the receipt of a timing signal.

24. An electroncially controlled high speed printer comprising a printer unit having a plurality of type faces, means for causing relative movement between said type faces and a record receiver, means for generating timing signals each time the record receiver is moved a predetermined distance, means responsive to each timing signal for halting the movement of the record receiver, and means for inhibiting the action of said timing signals upon said halting means for a predetermined number of timing signals.

25. An electronically controlled high speed printer comprising a printer having a plurality of type faces, means for generating a signal each time a record receiver moves past the type face a predetermined amount, means responsive to the receipt of a signal generated by said generating means for halting movement of the record receiver, an input register adapted to receive characters to be printed and instructions in the form of groups of electrical impulses, an intermediate register, means for transferring individual impulse groups from said input register to said intermediate register, analyzing means connected to said intermediate register for analyzing the characters transferred thereto for instructions, and means for generating an appropriate paper feed signal in response to the detection by the analyzing means and transmitting said signal to said means responsive to the receipt of a signal generated by said generating means to inhibit the action of one or two of the record receiver movement signals.

26. An electronically controlled high speed printer comprising a print unit having a plurality of type faces for imprinting characters upon a record receiver moving past said type faces, an input register for receiving information in the form of groups of electrical impulses representative of characters to be printed and instructions, an intermediate register adapted to receive individual impulse groups from said input register, analyzing means connected to said intermediate register for analyzing the impulse group in the intermediate register, and means responsive to the determination by the analyzing means of particular groups of characters in said intermediate register for preventing the printing by said type faces of a predetermined number of characters supplied to said input register.

27. An electronically controlled high speed printer comprising a plurality of type faces adapted to print individual characters upon a record receiver moving past them upon the appropriate stimulation of printing operators, an input register for receiving information in the form of groups of electrical impulses, each group of impulses representing a character to be printed or an instruction, means for analyzing the information supplied to the input register, means for stimulating the appropriate printing operators when information is to be printed, and means responsive to be determination by the analyzing means that prescribed impulse groups have been supplied to the input register to inhibit the stimulation of the printing operators for a predetermined number of successive characters.

28. An electronically controlled high speed printer comprising a plurality of type faces adapted to print individual characters upon a record receiver moving past the type faces in steps, an input register for receiving groups of electrical impulses representative of characters to be printed and instructions, means responsive to the receipt by the input register of characters to be printed to initiate character sensing and printing operations, and analyzing means for detecting in the information supplied to the input register the existence of particular impulse groups to halt further operation of the sensing and printing operations.

29. An electronically controlled high speed printer comprising a plurality of type faces adapted to print individual characters upon a record receiver in prescribed lines, a storage device for storing a predetermined number of groups of electrical impulses in addressed locations, each group of electrical impulses representing a character to be printed, means for sensing each impulse group and causing actuation of the proper type face to imprint the characters stored in said storage device in a single line, and means for analyzing each character supplied to said storage device to initiate printing of the information in said storage device upon a plurality of lines upon the detection of a select character.

30. An electronically controlled high speed printer comprising means for supplying information to the printer, said information being in the form of groups of electrical impulses, each group of impulses representing a character to be printed, a storage device for storing a predetermined number of impulse groups, means for imprinting all of the characters represented by the impulse groups stored in said storage device at one time on a single line, and means for supplying an instruction signal from said means for supplying information to the printer for causing the imprinting of the information contained in said storage device at one time upon a plurality of lines.

31. An electronically controlled high speed printer comprising a plurality of type faces adapted to imprint individual characters upon a record receiver, said record receiver being moved past said type faces a predetermined distance subsequent to the imprinting of a prescribed number of characters, means for receiving said prescribed number of individual characters in the form of groups of electrical impulses from a source of information, means for receiving from said source of information a signal for initiating unrestrained movement of said record receiver, means responsive to the movement of the record receiver through a predetermined distance for generating a signal, and means responsive to said signal for halting the unrestrained movement of said record receiver.

32. An electronically controlled high speed printer comprising a plurality of type faces adapted to imprint individual characters on a record receiver, a storage device for storing a prescribed number of characters to be printed, means for receiving information to be printed from a source of information for transfer to said storage device, means for causing the imprinting of all of the characters stored in said storage device at one time along a single line on said record receiver, and means responsive to a signal from said source of information for causing imprinting of the characters stored in said storage device at one time along several lines on said record receiver.

33. An electronically controlled high speed printer comprising a plurality of type faces adapted to print individual characters upon a record receiver, a storage device for storing characters to be printed; said characters each being in the form of a group of electrical impulses; and means for receiving information in parallel form from a source of information for transfer to said storage device; said means comprising a plurality of bistable devices; each bistable device having an input adapted to place that bistable device into a first of its bistable states when energized; coincidence gating means having a first input connected to the first output of the highest order bistable device, a second input connected to the second output of the second highest order bistable device and a third input connected to a means for receiving information in serial form; said gating means passing a pulse of information only when all three inputs are energized; and additional gating means for each subsequent pair of bistable devices connected to said respective bistable devices of each pair to transfer input pulses received in serial form from the highest order bistable device to the next lower order bistable device in succession until all impulses of an impulse group have been so transferred, and means connected to said individual bistable devices for sensing the state of each device.

34. The printer defined in claim 33 further including a second group of coincidence gates, said second group comprising a gate for each pair of bistable devices, said gate having one input connected to the second output of the higher order bistable device and a second input to said means for receiving information and having its output connected to the second input of the lower order bistable device.

35. An electronically controlled high speed printing system comprising means for receiving items of information in the form of groups of electrical impulses, storage means having a plurality of addresses, each address storing an individual group of impulses representing an individual item of information, and means for assigning each item of information received by said receiving means to an individual address in said storage means, said assignment of addresses being in sequence from either end of said storage means.

36. An electronically controlled high speed printer comprising a plurality of type faces adapted to imprint individual characters on a record receiver which is movable past the type faces in steps, a storage device for storing a plurality of groups of electrical impulses, said impulse groups each representing an item of information, said items of information comprising characters to be printed and printing instructions including instructions for the movement of the record receiver, means for receiving items of information in said storage device from a source of information, means responsive to the receipt of information from said source of information initiating the movement of the record receiver past said type faces, means responsive to the movement of the record receiver a predetermined amount for generating signals to halt the movement of the record receiver, and means responsive to record receiver movement instructions for inhibiting the effect of at least one of said signals.

References Cited in the file of this patent

UNITED STATES PATENTS

| | | |
|---|---|---|
| 2,036,063 | Malmros | Mar. 31, 1936 |
| 2,066,029 | Carroll | Dec. 29, 1936 |
| 2,540,026 | Daly | Jan. 30, 1951 |
| 2,580,729 | Carroll | Jan. 1, 1952 |
| 2,692,551 | Potter | Oct. 26, 1954 |
| 2,790,528 | Teitler | Apr. 30, 1957 |
| 2,799,222 | Goldberg | July 16, 1957 |
| 2,800,073 | Block | July 23, 1957 |